(12) United States Patent
Zuckerman et al.

(10) Patent No.: US 12,664,780 B2
(45) Date of Patent: Jun. 23, 2026

(54) UTILIZING A PLURALITY OF ON-ROAD VEHICLES FOR INCREASING DESCRIPTIVE ACCURACY OF AREAS AND OBJECTS

(71) Applicants: Gal Zuckerman, Holon (IL); Moshe Salhov, Herzeliya (IL)

(72) Inventors: Gal Zuckerman, Holon (IL); Moshe Salhov, Herzeliya (IL)

( * ) Notice: Subject to any disclaimer, the term of this patent is extended or adjusted under 35 U.S.C. 154(b) by 112 days.

(21) Appl. No.: 18/538,868

(22) Filed: Dec. 13, 2023

(65) Prior Publication Data

US 2024/0127593 A1 Apr. 18, 2024

Related U.S. Application Data

(63) Continuation of application No. 17/519,591, filed on Nov. 5, 2021, now Pat. No. 11,893,793, which is a
(Continued)

(51) Int. Cl.
*G06V 20/40* (2022.01)
*G06V 10/762* (2022.01)
(Continued)

(52) U.S. Cl.
CPC ............ *G06V 20/46* (2022.01); *G06V 10/762* (2022.01); *G06V 10/764* (2022.01);
(Continued)

(58) Field of Classification Search
CPC .... G06V 20/46; G06V 10/762; G06V 10/764; G06V 10/774; G06V 10/95; G06V 20/52;
(Continued)

(56) References Cited

U.S. PATENT DOCUMENTS 6,307,526 B1 * 10/2001 Mann ..................... H04N 23/55
348/207.1
6,445,809 B1 9/2002 Sasaki et al.
(Continued)

FOREIGN PATENT DOCUMENTS

CN 108875749 A * 11/2018 ........... G06F 18/241
JP 2004234349 A * 8/2004
(Continued)

OTHER PUBLICATIONS

U.S. Appl. No. 10/007,854, filed Jun. 26, 2018, Blayvas et al.
(Continued)

*Primary Examiner* — Maria E Vazquez Colon
(74) *Attorney, Agent, or Firm* — Active Knowledge Ltd.

(57) ABSTRACT

A plurality of on-road vehicles moving along streets of a city, while utilizing onboard cameras for autonomous driving functions, are bound to capture, over time, random images of various city objects such as pedestrians, vehicles, building and other structures. Images of a certain city object may be captured by many of the vehicles at various times while passing by that object, thereby resulting in a corpus of imagery data containing various random images and other representations of that certain object. Per each of at least some of the city objects appearing more than once in the corpus of imagery data, appearances are detected and linked, and then analyzed and processed to result in representations and other data sets and types having a better descriptive accuracy in conjunction with the city object. The data sets having a better descriptive accuracy may then be used to reach certain conclusions or facilitate actions.

14 Claims, 39 Drawing Sheets

Related U.S. Application Data continuation of application No. 16/297,667, filed on Mar. 10, 2019, now Pat. No. 11,206,375.

(60) Provisional application No. 62/648,961, filed on Mar. 28, 2018.

(51) Int. Cl.

| | |
|---|---|
| *G06V 10/764* | (2022.01) |
| *G06V 10/774* | (2022.01) |
| *G06V 10/94* | (2022.01) |
| *G06V 20/52* | (2022.01) |
| *G06V 20/56* | (2022.01) |
| *G06V 40/20* | (2022.01) |
| *G07C 5/00* | (2006.01) |
| *H04N 7/18* | (2006.01) |
| *G06V 40/16* | (2022.01) |

(52) U.S. Cl.
CPC ............ *G06V 10/774* (2022.01); *G06V 10/95* (2022.01); *G06V 20/52* (2022.01); *G06V 20/56* (2022.01); *G06V 40/23* (2022.01); *G07C 5/008* (2013.01); *H04N 7/181* (2013.01); *G06V 20/44* (2022.01); *G06V 40/168* (2022.01)

(58) Field of Classification Search
CPC ........ G06V 20/56; G06V 40/23; G06V 20/44; G06V 40/168; G07C 5/008; H04N 7/181; G06F 18/23
See application file for complete search history.

(56) References Cited

U.S. PATENT DOCUMENTS

| | | | |
|---|---|---|---|
| 6,618,672 | B2 | 9/2003 | Sasaki |
| 6,727,807 | B2 | 4/2004 | Trajkovic |
| 7,042,345 | B2 | 5/2006 | Ellis |
| 7,233,233 | B2 | 6/2007 | Taniguchi et al. |
| 7,379,813 | B2 | 5/2008 | Kubota et al. |
| 7,436,982 | B2 | 10/2008 | Taniguchi et al. |
| 7,489,805 | B2 | 2/2009 | Nagaoka et al. |
| 7,493,202 | B2 | 2/2009 | Demro et al. |
| 7,561,037 | B1 | 7/2009 | Monroe |
| 7,576,639 | B2 | 8/2009 | Boyles et al. |
| 7,627,451 | B2 | 12/2009 | Vock et al. |
| 7,630,806 | B2 | 12/2009 | Breed |
| 7,783,403 | B2 | 8/2010 | Breed |
| 7,868,912 | B2 | 1/2011 | Venetianer et al. |
| 7,885,761 | B2 | 2/2011 | Tajima et al. |
| 7,932,923 | B2 | 4/2011 | Lipton et al. |
| 7,974,748 | B2 | 7/2011 | Goerick et al. |
| 8,085,140 | B2 | 12/2011 | Mochizuki et al. |
| 8,093,999 | B2 | 1/2012 | Bauer et al. |
| 8,164,432 | B2 | 4/2012 | Broggi et al. |
| 8,258,981 | B2 | 9/2012 | Turnbull |
| 8,275,497 | B2 | 9/2012 | Koch-Groeber et al. |
| 8,294,763 | B2 | 10/2012 | Cheng et al. |
| 8,301,344 | B2 | 10/2012 | Simon et al. |
| 8,301,765 | B2 | 10/2012 | Goodman |
| 8,320,628 | B2 | 11/2012 | Cheng et al. |
| 8,358,342 | B2 | 1/2013 | Park |
| 8,379,924 | B2 | 2/2013 | Schaufler |
| 8,471,726 | B2 | 6/2013 | Ekmark et al. |
| 8,630,497 | B2 | 1/2014 | Badawy et al. |
| 8,660,734 | B2 | 2/2014 | Zhu et al. |
| 8,749,401 | B2 | 6/2014 | Hara et al. |
| 8,831,352 | B2 | 9/2014 | Gao et al. |
| 8,933,797 | B2 | 1/2015 | Deigmoller et al. |
| 9,226,037 | B2 | 12/2015 | Zhu et al. |
| 9,269,263 | B2 | 2/2016 | Gieseke |
| 9,336,451 | B2 | 5/2016 | Boghossian et al. |
| 9,415,736 | B2 | 8/2016 | Lind et al. |
| 9,501,878 | B2 | 11/2016 | Palmer et al. |

| | | | |
|---|---|---|---|
| 9,602,738 | B2 | 3/2017 | Choe et al. |
| 9,734,390 | B2 | 8/2017 | Maurer et al. |
| 9,760,806 | B1 | 9/2017 | Ning et al. |
| 9,830,814 | B2 | 11/2017 | Thompson et al. |
| 9,875,445 | B2 | 1/2018 | Amer et al. |
| 9,892,606 | B2 | 2/2018 | Venetianer et al. |
| 9,984,568 | B2 | 5/2018 | Imai |
| 11,714,193 | B1 * | 8/2023 | Foster ................... G01S 7/4808 |
| | | | 356/4.01 |
| 2004/0080433 | A1 * | 4/2004 | Nitzan ...................... G08G 5/22 |
| | | | 340/972 |
| 2008/0164983 | A1 | 7/2008 | Daura Luna et al. |
| 2010/0033571 | A1 | 2/2010 | Fujita |
| 2010/0049405 | A1 | 2/2010 | Li |
| 2011/0128161 | A1 | 6/2011 | Bae et al. |
| 2012/0045090 | A1 | 2/2012 | Bobbitt et al. |
| 2012/0268600 | A1 | 10/2012 | Wagner |
| 2013/0106595 | A1 | 5/2013 | Loce et al. |
| 2013/0116905 | A1 | 5/2013 | Lucking et al. |
| 2013/0253816 | A1 | 9/2013 | Caminiti et al. |
| 2014/0078291 | A1 | 3/2014 | Hammarstrom et al. |
| 2014/0078304 | A1 * | 3/2014 | Othmer ............... G06F 21/6218 |
| | | | 348/148 |
| 2014/0176714 | A1 | 6/2014 | Li et al. |
| 2014/0257943 | A1 | 9/2014 | Nerayoff et al. |
| 2014/0293048 | A1 | 10/2014 | Titus et al. |
| 2015/0035962 | A1 | 2/2015 | Nagaoka et al. |
| 2015/0254514 | A1 | 9/2015 | Oami |
| 2015/0268172 | A1 | 9/2015 | Naithani et al. |
| 2015/0269722 | A1 | 9/2015 | Naithani et al. |
| 2015/0318015 | A1 | 11/2015 | Bose et al. |
| 2015/0348591 | A1 | 12/2015 | Kaps et al. |
| 2015/0371094 | A1 | 12/2015 | Gardiner et al. |
| 2016/0004906 | A1 | 1/2016 | Nerayoff et al. |
| 2016/0140872 | A1 | 5/2016 | Palmer et al. |
| 2016/0203720 | A1 | 7/2016 | Lee |
| 2016/0217325 | A1 | 7/2016 | Bose et al. |
| 2016/0236616 | A1 | 8/2016 | Kurihara et al. |
| 2016/0292509 | A1 | 10/2016 | Kaps et al. |
| 2017/0072880 | A1 | 3/2017 | Higgins-Luthman et al. |
| 2017/0084175 | A1 | 3/2017 | Sedlik et al. |
| 2017/0101056 | A1 | 4/2017 | Park |
| 2017/0229154 | A1 | 8/2017 | Bose et al. |
| 2017/0262697 | A1 | 9/2017 | Kaps et al. |
| 2017/0293815 | A1 | 10/2017 | Cosatto et al. |
| 2018/0012079 | A1 | 1/2018 | Blanchflower |
| 2018/0032829 | A1 | 2/2018 | Kim |
| 2018/0152673 | A1 | 5/2018 | Kim et al. |
| 2018/0174460 | A1 | 6/2018 | Jung et al. |
| 2018/0215333 | A1 | 8/2018 | Rosenbaum et al. |
| 2018/0218582 | A1 | 8/2018 | Hodge et al. |
| 2018/0253610 | A1 | 9/2018 | Hall |
| 2018/0362053 | A1 | 12/2018 | Isa et al. |
| 2019/0061610 | A1 | 2/2019 | Kato |
| 2019/0077400 | A1 | 3/2019 | Aharony et al. |
| 2019/0180114 | A1 | 6/2019 | Sabeti |
| 2019/0302766 | A1 * | 10/2019 | Mondello .............. G07C 5/085 |
| 2019/0303759 | A1 | 10/2019 | Farabet et al. |
| 2020/0010051 | A1 | 1/2020 | Dumov |
| 2020/0058218 | A1 | 2/2020 | Julian et al. |
| 2020/0065563 | A1 | 2/2020 | Zou et al. |
| 2020/0207339 | A1 | 7/2020 | Neil et al. |

FOREIGN PATENT DOCUMENTS

| | | | | |
|---|---|---|---|---|
| KR | 20180113060 A | * | 10/2018 | ............... G06T 7/13 |
| WO | WO2019153193 A1 | | 8/2019 | |

OTHER PUBLICATIONS

U.S. Appl. No. 10/043,323, filed Aug. 7, 2018, Konrardy et al.
U.S. Appl. No. 10/065,652, filed Sep. 4, 2018, Shenoy et al.
U.S. Appl. No. 10/220,782, filed Mar. 5, 2019, Shigemura.
U.S. Appl. No. 10/282,981, filed May 7, 2019, Nepomuceno et al.
U.S. Appl. No. 10/286,905, filed May 14, 2019, Lee.
U.S. Appl. No. 10/289,920, filed May 14, 2019, Hartmann.
U.S. Appl. No. 10/322,696, filed Jun. 18, 2019, Gao et al.
U.S. Appl. No. 10/360,739, filed Jul. 23, 2019, Palmer et al.

(56)         References Cited

OTHER PUBLICATIONS

U.S. Appl. No. 10/403,138, filed Sep. 3, 2019, Wu.
U.S. Appl. No. 10/755,080, filed Aug. 25, 2020, Matsushita et al.

* cited by examiner

Imagery data in visual record 4-visual-a2 collected
by 10a in location 10-loc-2 at time T1

1-object-2

4-visual-a2

1-ped-2

Imagery data in visual record 4-visual-c9
collected by 10c in location 10-loc-2 at time T2

4-visual-c9

1-object-2

1-ped-2

Imagery data in visual record 4-visual-b1
collected by 10b in location 10-loc-2 at time T2

1-object-2

1-ped-2

4-visual-b1

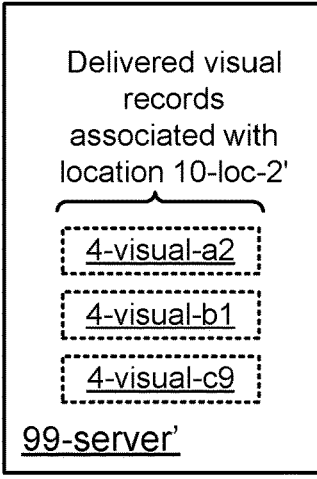

FIG. 1J

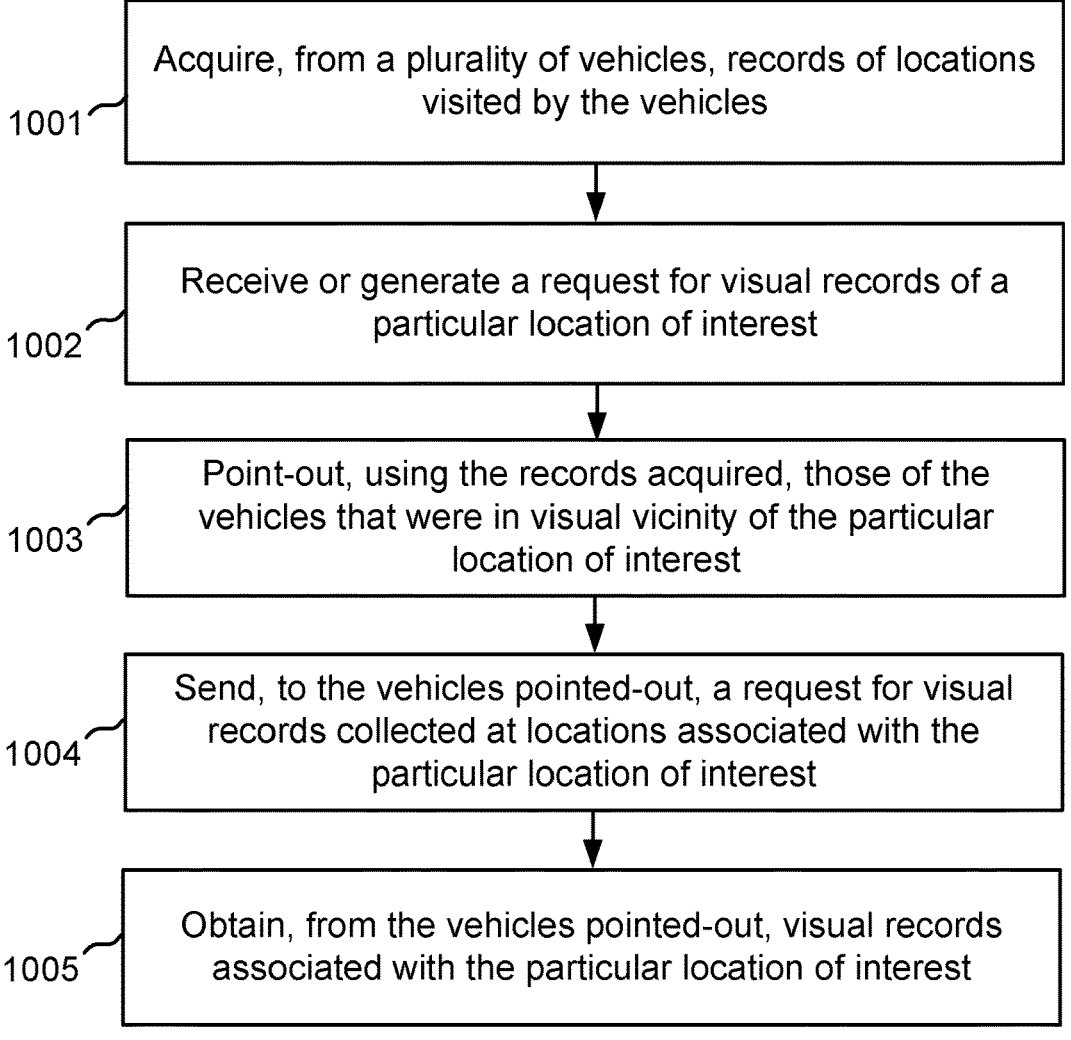

1001 — Acquire, from a plurality of vehicles, records of locations visited by the vehicles 1002 — Receive or generate a request for visual records of a particular location of interest 1003 — Point-out, using the records acquired, those of the vehicles that were in visual vicinity of the particular location of interest 1004 — Send, to the vehicles pointed-out, a request for visual records collected at locations associated with the particular location of interest 1005 — Obtain, from the vehicles pointed-out, visual records associated with the particular location of interest

FIG. 1K

1011 — Collect visual records or areas surrounding locations of visit

1012 — Receive a request for visual records associated with a specific location

1013 — Locate those of the visual records associated with the specific location

1014 — Send the visual records located

1031 — Detect objects or events surrounding a vehicle

1032 — Generate descriptions of the objects or events

1033 — Send to a server each of the descriptions together with a location-of-detection of the respective event or object

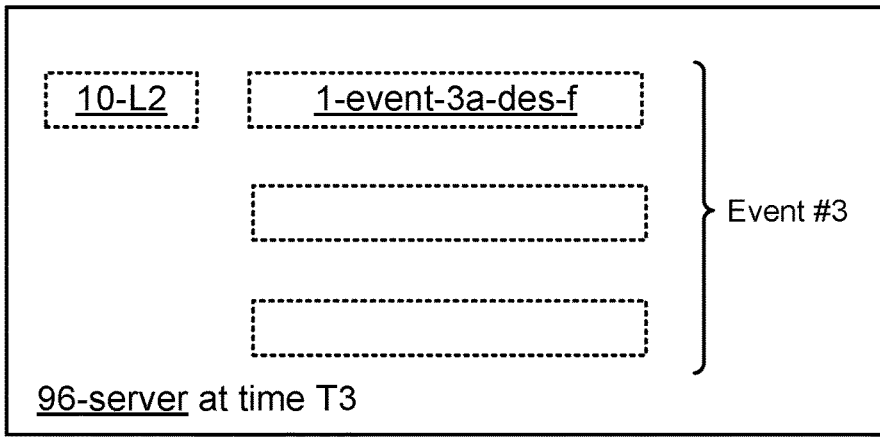
FIG. 5D
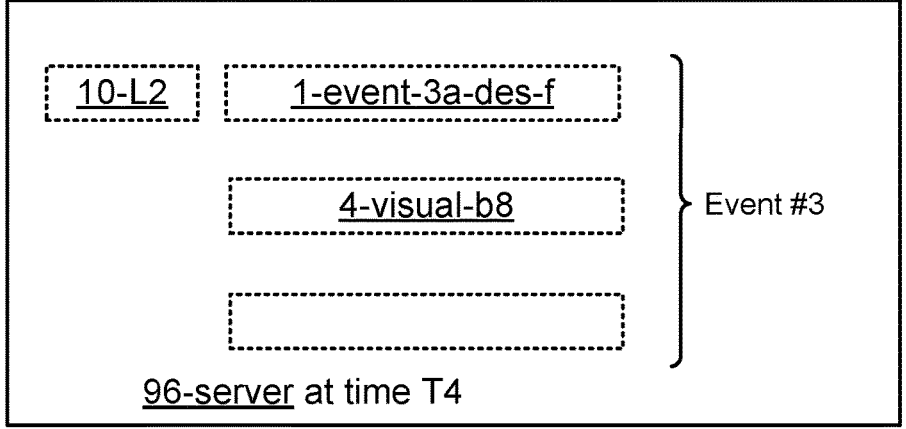
FIG. 5E
FIG. 5F

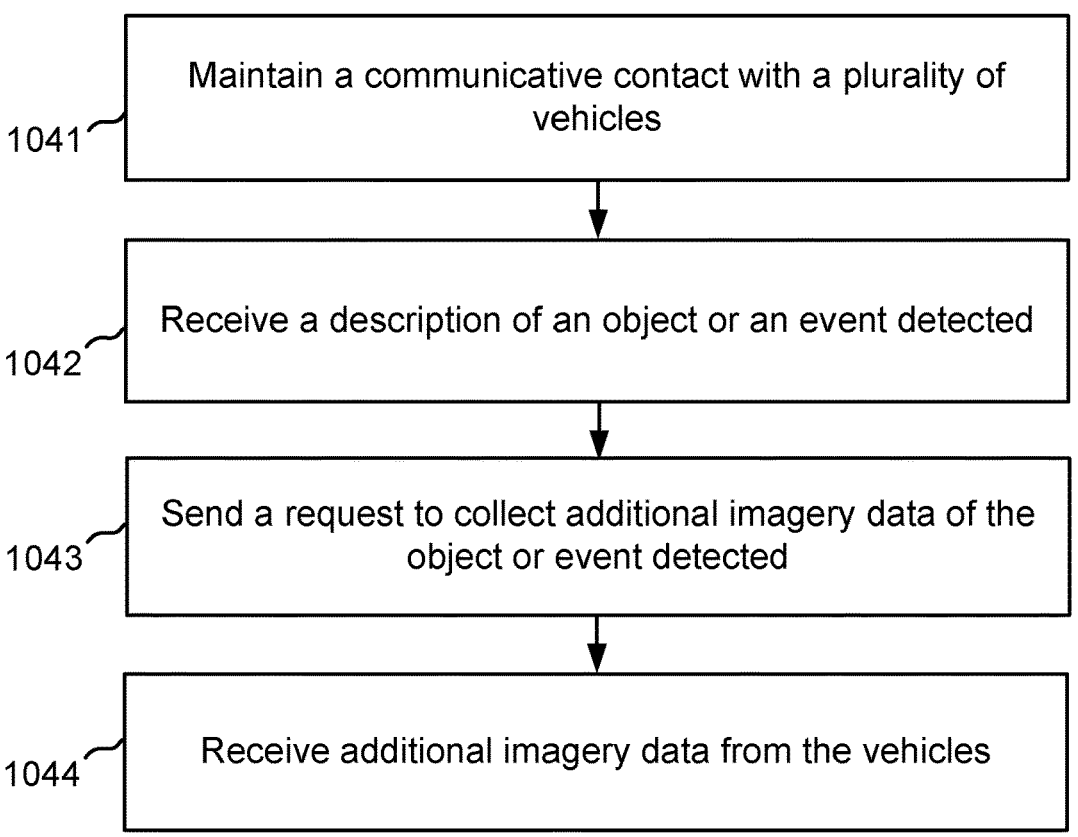

1041    Maintain a communicative contact with a plurality of vehicles

1042    Receive a description of an object or an event detected

1043    Send a request to collect additional imagery data of the object or event detected 1044    Receive additional imagery data from the vehicles

FIG. 5G

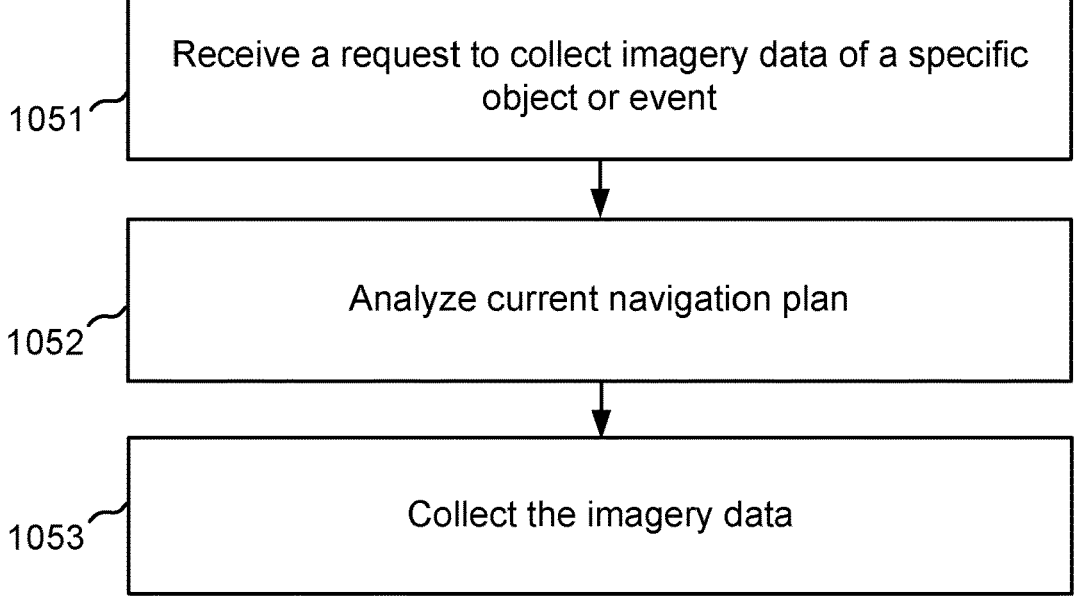

1051    Receive a request to collect imagery data of a specific object or event

1052    Analyze current navigation plan

1053    Collect the imagery data

FIG. 5H

1-object-4

10i
at time T8

1-object-3

10-path-1

10i
at time T7

1-object-2

1-object-1

1-GEO-AREA 10i
at time T6

10-path-1

1-object-4

1-object-3

10j
at time T9

10j
at time T8

1-object-2

1-object-1

10-path-1

1-GEO-AREA 10j
at time T7

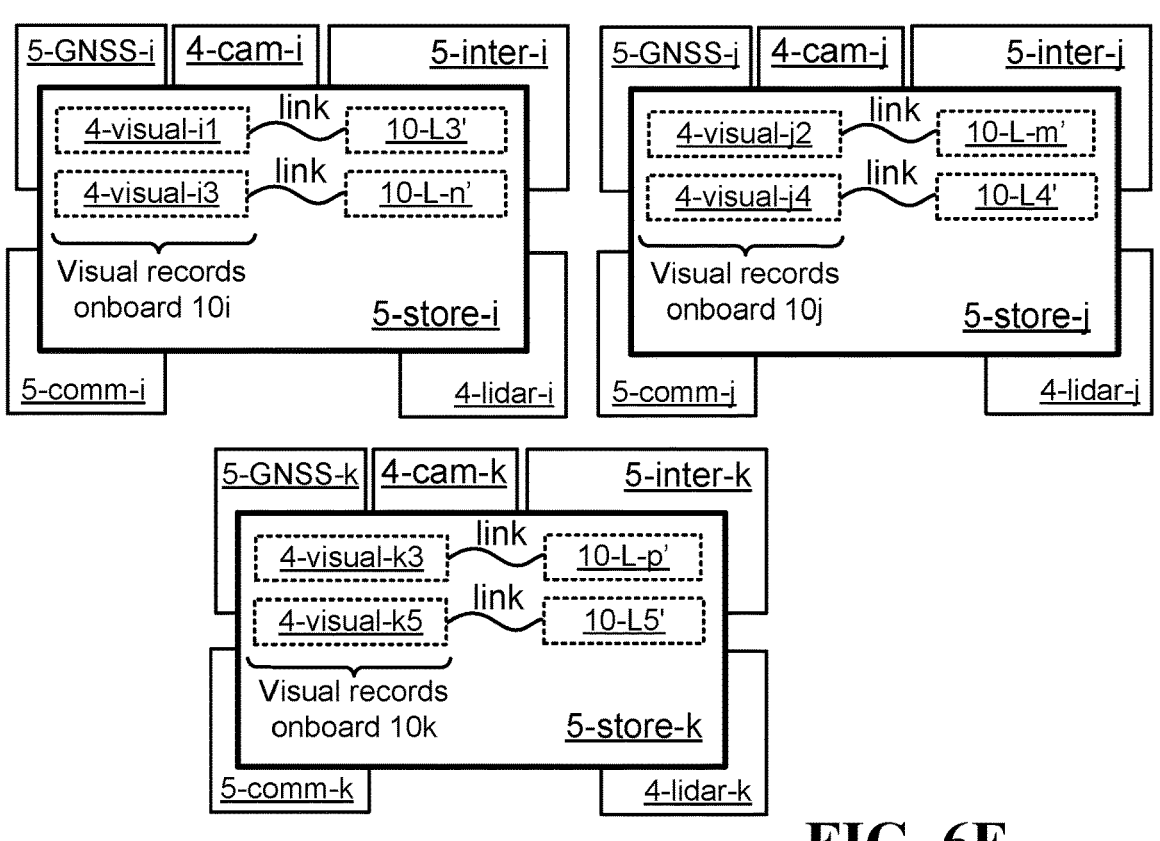
FIG. 6E
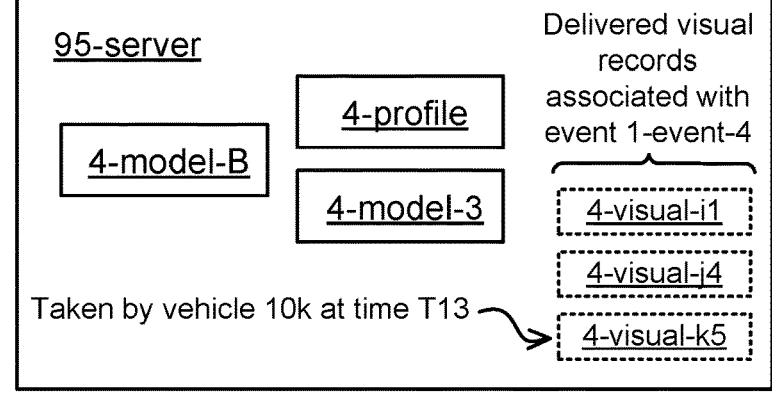
FIG. 6F
FIG. 6G

1061 — Maintain communicative contact with a plurality of vehicles

1062 — Receive a request to analyze a past event

1063 — Identify in the vehicles imagery data associated with the past event

1064 — Receive the imagery data identified from the vehicles 94-server

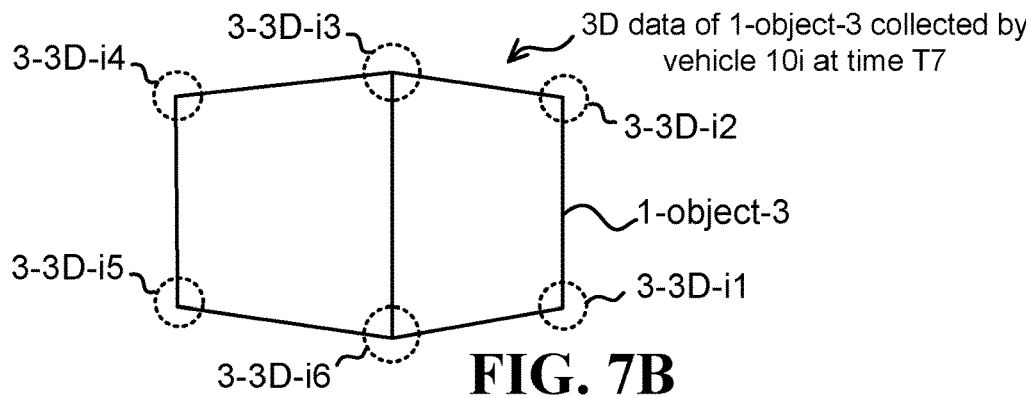
3-3D-i4    3-3D-i3    3D data of 1-object-3 collected by vehicle 10i at time T7
3-3D-i2
1-object-3
3-3D-i5    3-3D-i1
3-3D-i6    FIG. 7B
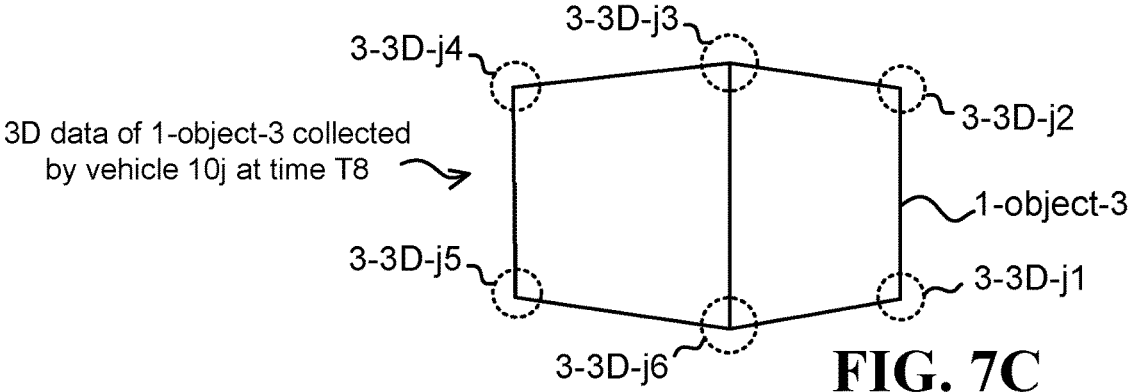
3-3D-j3
3-3D-j4
3D data of 1-object-3 collected by vehicle 10j at time T8    3-3D-j2
1-object-3
3-3D-j5    3-3D-j1
3-3D-j6    FIG. 7C
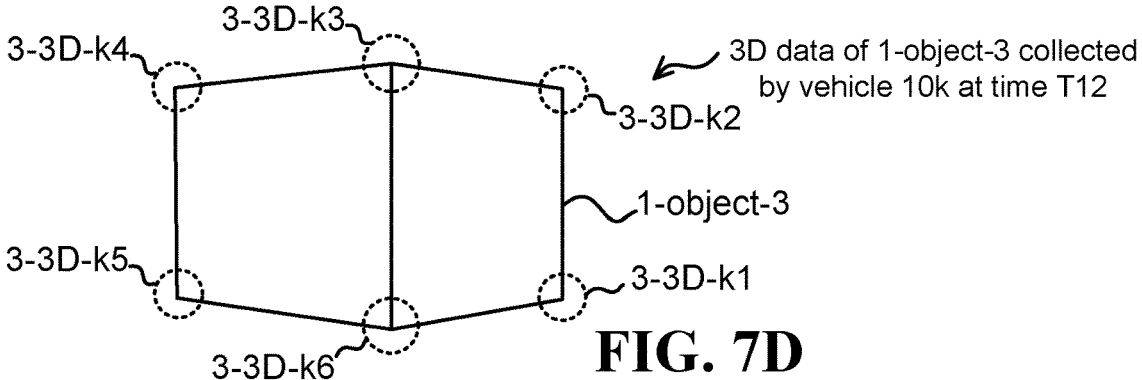
3-3D-k3
3-3D-k4    3D data of 1-object-3 collected by vehicle 10k at time T12
3-3D-k2
1-object-3
3-3D-k5    3-3D-k1
3-3D-k6    FIG. 7D
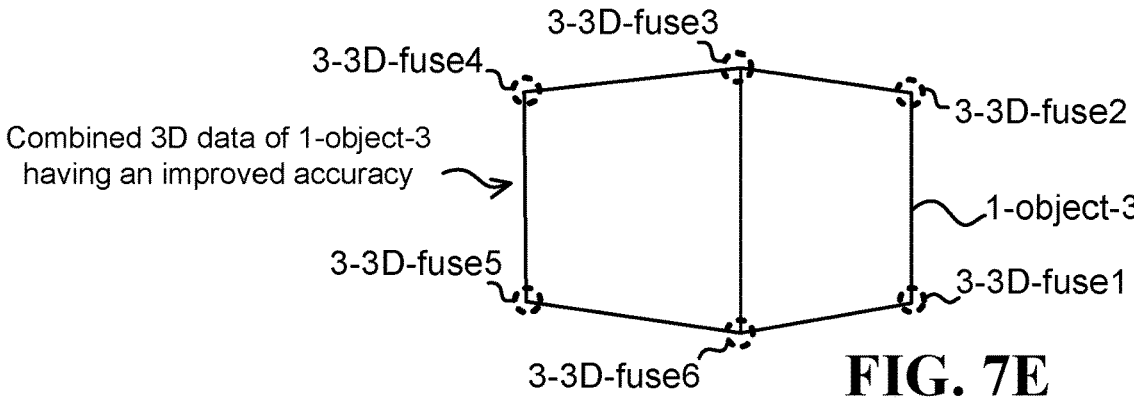
3-3D-fuse3
3-3D-fuse4    3-3D-fuse2
Combined 3D data of 1-object-3 having an improved accuracy    1-object-3
3-3D-fuse5    3-3D-fuse1
3-3D-fuse6    FIG. 7E

1071

1072

1081 — Obtain a data set for storage

1082 — Use a hash to identify a vehicle

1083 — Send the data set for storage on the vehicle identified

1091 — Receive a request to retrieve a data set

1092 — Use a hash to identify a vehicle in possession of the data set

1093 — Forward the request to the vehicle identified

1094 — Receive from the vehicle identified the data set

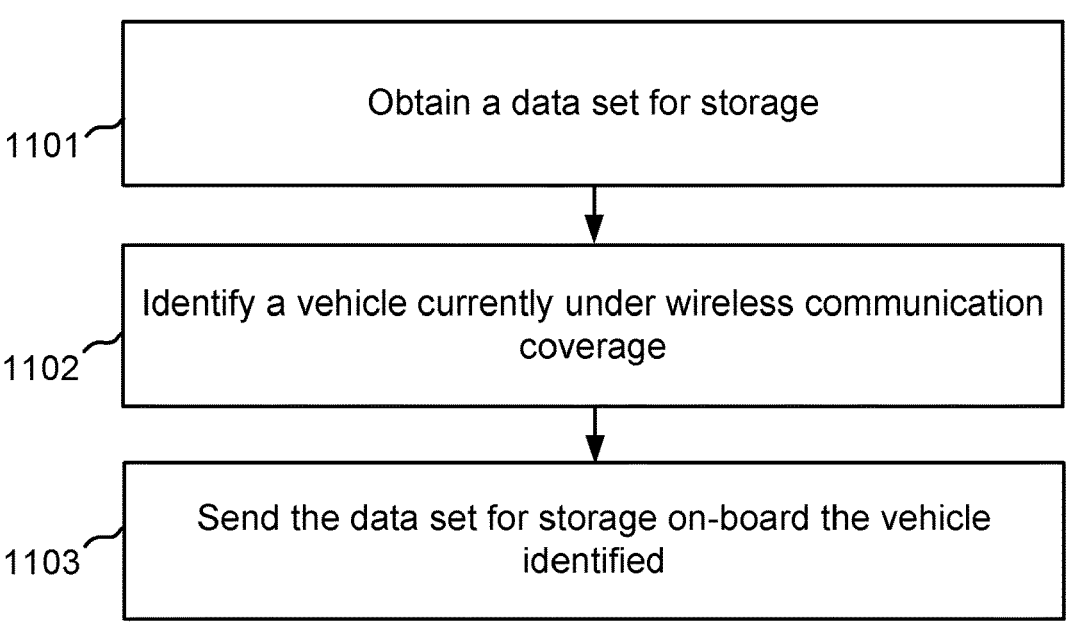

1101   Obtain a data set for storage

1102   Identify a vehicle currently under wireless communication coverage

1103   Send the data set for storage on-board the vehicle identified

FIG. 8I

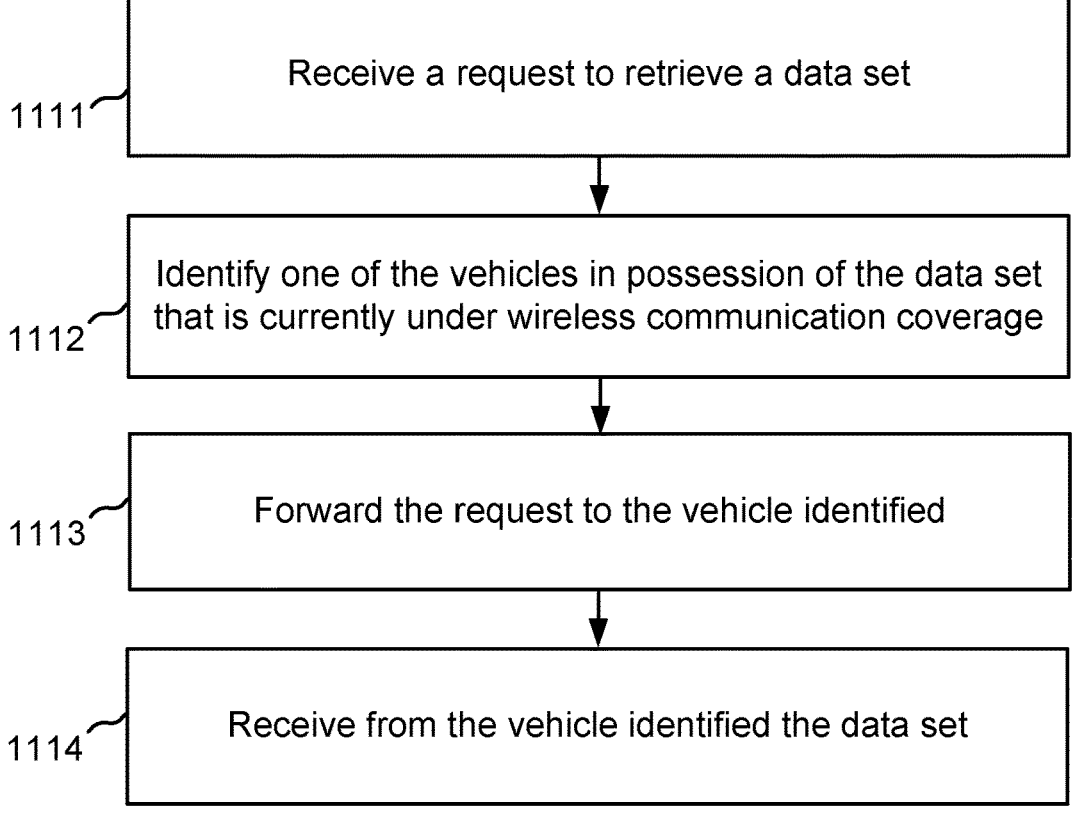

1111   Receive a request to retrieve a data set

1112   Identify one of the vehicles in possession of the data set that is currently under wireless communication coverage 1113   Forward the request to the vehicle identified 1114   Receive from the vehicle identified the data set

FIG. 8J

1121  Obtain a processing task to be executed

1122  Identify a vehicle currently computationally-available to execute the processing task 1123  Cause the vehicle identified to execute the processing task 1131  Obtain a processing task to be executed 1132  Send a bid to a plurality of vehicles 1133  Select a vehicle to execute the processing task according to a result of the bid 1141   Obtain in a vehicle a request to execute a processing task 1142   Determine availability of processing resources in the vehicle 1143   Execute the processing task in the vehicle 1144   Send a result

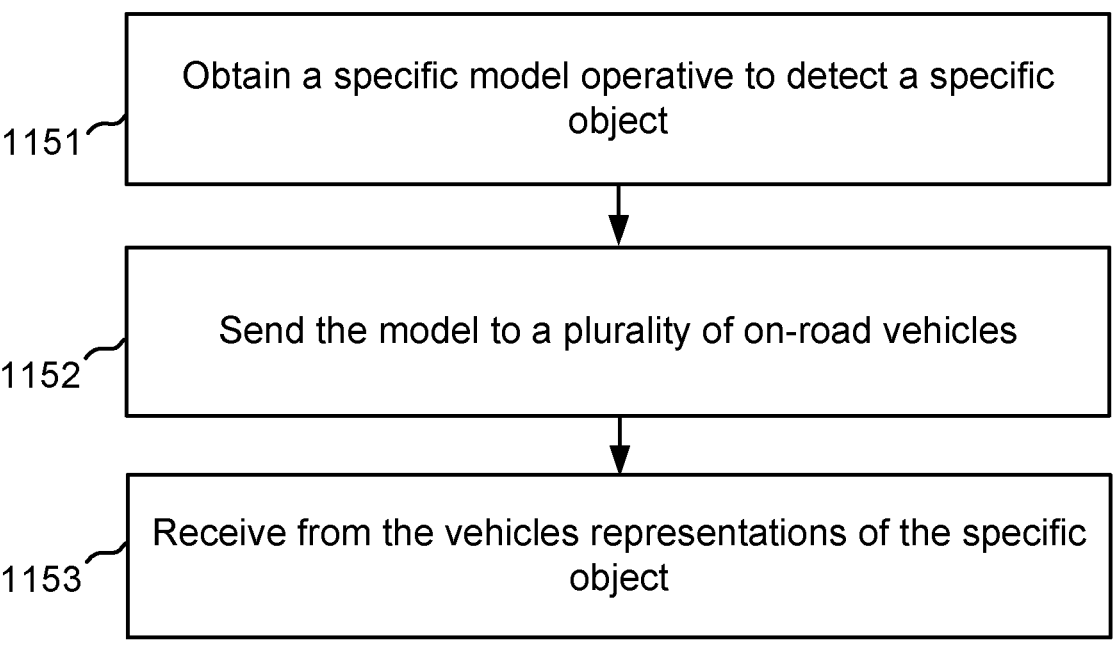

1151 — Obtain a specific model operative to detect a specific object

1152 — Send the model to a plurality of on-road vehicles

1153 — Receive from the vehicles representations of the specific object

FIG. 10A

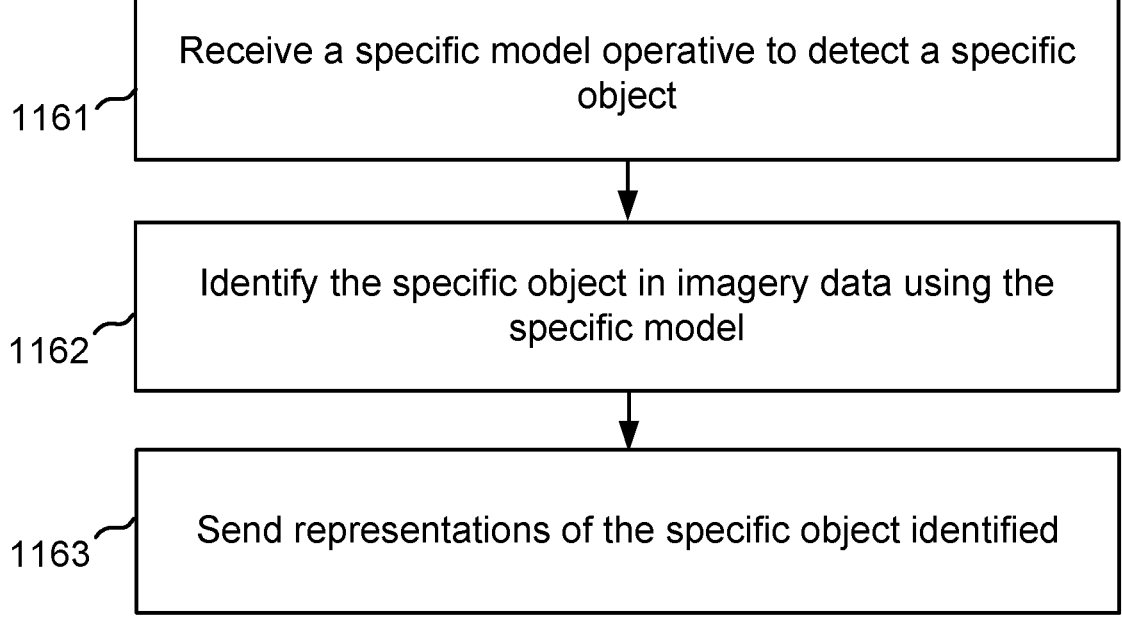

1161 — Receive a specific model operative to detect a specific object

1162 — Identify the specific object in imagery data using the specific model

1163 — Send representations of the specific object identified

FIG. 10B

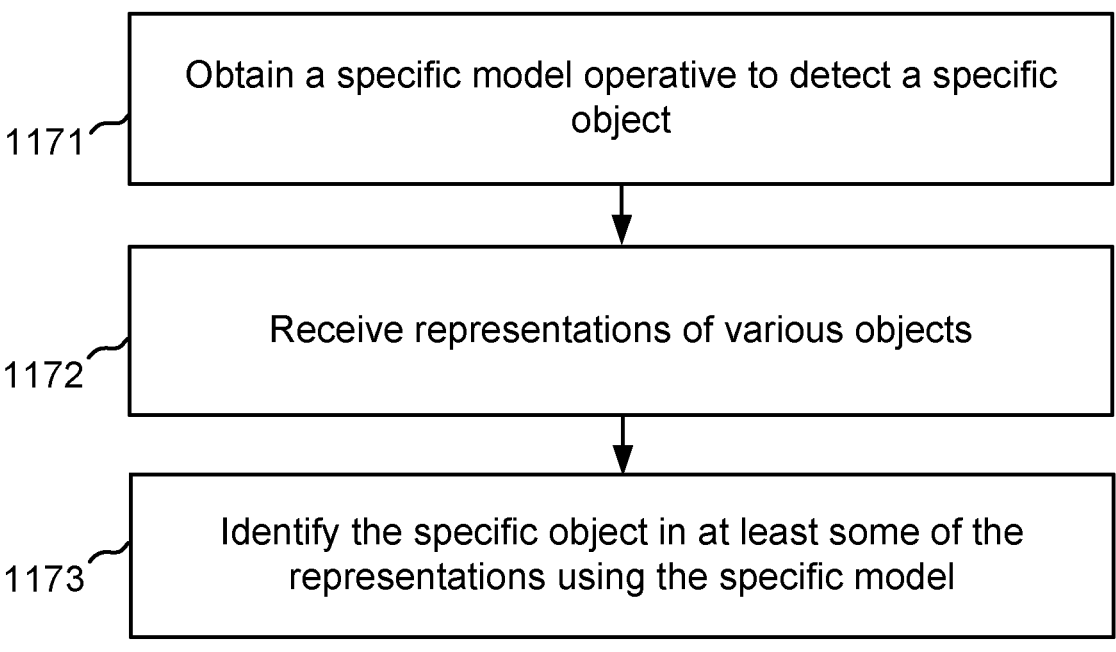

1171 — Obtain a specific model operative to detect a specific object

1172 — Receive representations of various objects

1173 — Identify the specific object in at least some of the representations using the specific model

FIG. 10C

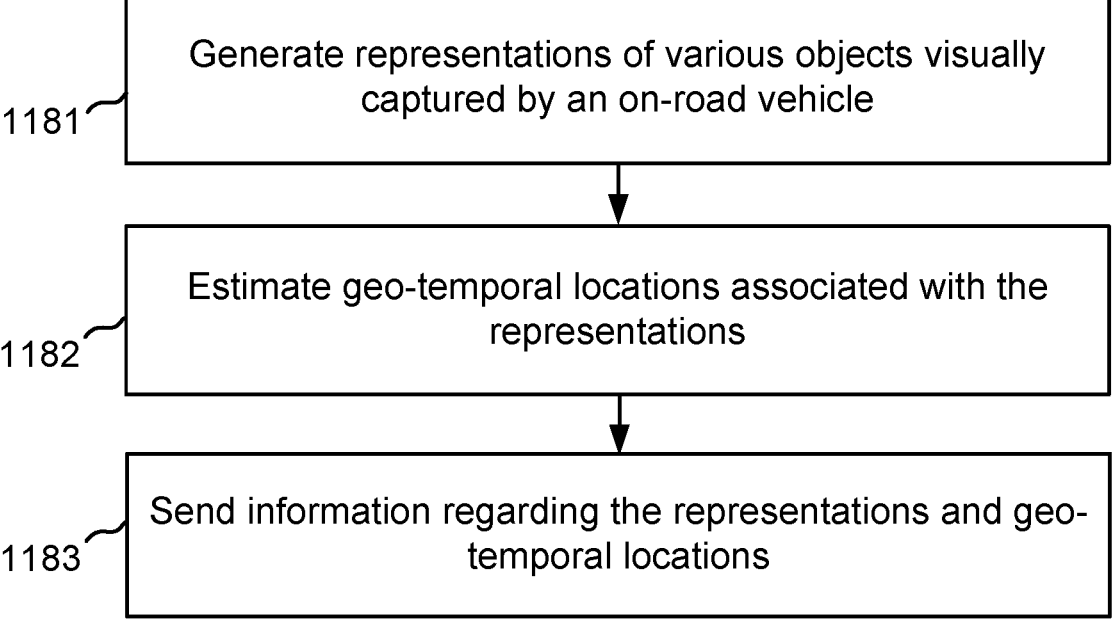

1181 — Generate representations of various objects visually captured by an on-road vehicle 1182 — Estimate geo-temporal locations associated with the representations 1183 — Send information regarding the representations and geo-temporal locations

FIG. 11

1191 — Receive a list of target objects associated with an organization

1192 — Identify multiple appearance of the target objects

1193 — Track the target object using the multiple appearances thereby placing the organization under surveillance Iterative model generation and usage

UTILIZING A PLURALITY OF ON-ROAD VEHICLES FOR INCREASING DESCRIPTIVE ACCURACY OF AREAS AND OBJECTS

CROSS REFERENCE TO RELATED APPLICATIONS

This application is a Continuation of patent application Ser. No. 17/519,591, filed on Nov. 5, 2021, which is a Continuation of patent application Ser. No. 16/297,667, filed on Mar. 10, 2019, now U.S. Pat. No. 11,206,375, which claims priority to U.S. Provisional Patent Application No. 62/648,961, filed on Mar. 28, 2018, which is hereby incorporated by reference.

BACKGROUND

A plurality of on-road vehicles moving along streets and roads may capture, intentionally or unintentionally, images of outdoor objects such as pedestrians, vehicles, building and other structures. Images of a certain object may be captured by one or several vehicles while passing nearby at a certain time, and other images of that same object may be captured by other vehicles while passing nearby that object at a later time, thereby resulting in a corpus of imagery data containing various images and other representations of that certain object at different times, in which such corpus of imagery data may be distributively stored onboard many different vehicles.

SUMMARY

One embodiment is a system operative to utilize a plurality of autonomous on-road vehicles for increasing descriptive accuracy of areas and/or objects, comprising: a plurality of on-road vehicles moving in a city, in which each of the on-road vehicles is configured to use an onboard imagery sensor to capture imagery data of areas surrounding locations visited by the on-road vehicle, thereby resulting in a corpus of imagery data collectively captured by the plurality of on-road vehicles, in which various areas and/or city objects appear in the corpus of imagery data; wherein the system is configured to: use the corpus of imagery data, in conjunction with data combining techniques, to increase descriptive accuracy of at least some aspects of the areas and/or city objects; and reach, in conjunction with current instances of the imagery data, and utilizing said increased descriptive accuracy, a certain conclusion.

One embodiment is a system operative to utilize a plurality of autonomous on-road vehicles for increasing descriptive accuracy of areas and/or objects, comprising: a plurality of data interfaces located respectively onboard a plurality of autonomous on-road vehicles moving in a certain geographical area; a plurality of data gathering configurations located respectively onboard said plurality of autonomous on-road vehicles and associated respectively with said plurality of data interfaces; and a server; wherein: each of the data interfaces is configured to: (i) use the respective data gathering configuration to create a representation of areas and/or objects surrounding locations visited by the respective autonomous on-road vehicle, in which said representation comprises an inherent inaccuracy, and (ii) send said representation to the sever; the server is configured to receive said plurality of representations respectively from the plurality of autonomous on-road vehicles, in which the plurality of representations comprises respectively the plurality of inherent inaccuracies; and the server is further configured to process said plurality of representations into a fused representation using at least one data combining technique, in which said fused representation comprises a better descriptive accuracy.

One embodiment is a method for utilizing a plurality of autonomous on-road vehicles for increasing descriptive accuracy of areas and/or objects, comprising: receiving, in a server, per an area and/or an object, a plurality of descriptions respectively from a plurality of autonomous on-road vehicles moving in visual vicinity of said particular area and/or an object, in which each of the descriptions having an inherent descriptive inaccuracy; and processing, in the server, said plurality of descriptions having said inherent inaccuracies, into a fused description, using at least one data combining techniques, in which said fused description has a better descriptive accuracy.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings:

FIG. 1J illustrates one embodiment of a server receiving from the on-road vehicles specific visual records associated with a particular geo-location of interest;

FIG. 1K illustrates one embodiment of a method for obtaining specific imagery data from a set of imagery data collected by a plurality of autonomous on-road vehicles;

FIG. 5D illustrates one embodiment of a server receiving an event description from an on-road vehicle at a certain time;

FIG. 5E illustrates one embodiment of the server receiving visual records associated with the event description as captured by another on-road vehicle at a later time;

FIG. 5F illustrates one embodiment of the server receiving additional visual records associated with the event description as captured by yet another on-road vehicle at still a later time;

FIG. 5G illustrates one embodiment of a method for analyzing initial imagery data and then obtaining further imagery data using a plurality of autonomous on-road vehicles;

FIG. 5H illustrates one embodiment of a method for obtaining imagery data using autonomous on-road vehicles;

FIG. 6E illustrates one embodiment of visual records taken by the several on-road vehicles and stored locally in which each of the visual records is associated with a particular geo-location;

FIG. 6F illustrates one embodiment of a server receiving visual records of the same event from two of the several an on-road vehicles that have previously passed at different times in visual vicinity of the event;

FIG. 6G illustrates one embodiment of the server receiving another visual record of the same event from a third of the several an on-road vehicles that has previously passed at yet a different time in visual vicinity of the event;

FIG. 7B illustrates one embodiment of a 3D representation of an object as generated by an on-road vehicle;

FIG. 7C illustrates one embodiment of another 3D representation of the same object as generated by another on-road vehicle;

FIG. 7D illustrates one embodiment of yet another 3D representation of the same object as generated by yet another on-road vehicle;

FIG. 7E illustrates one embodiment of combined 3D representation of the object as fused in a server using several 3D representations generated by several on-road vehicles;

FIG. 8I illustrates one embodiment of a method for utilizing a plurality of autonomous on-road vehicles for onboard storage of data;

FIG. 8J illustrates one embodiment of a method for retrieving data from a plurality of on-road vehicles;

FIG. 10A illustrates one embodiment of a method for identifying specific dynamic objects in a corpus of imagery data collected by a plurality of on-road vehicles and stored locally in the on-road vehicles;

FIG. 10B illustrates one embodiment of another method for identifying specific dynamic objects in a corpus of imagery data collected by a plurality of on-road vehicles and stored locally in the on-road vehicles;

FIG. 10C illustrates one embodiment of yet another method for identifying specific dynamic objects in a corpus of imagery data collected by a plurality of on-road vehicles and stored locally in the on-road vehicles;

FIG. 11 illustrates one embodiment of a method for geo-temporally tagging imagery data collected by an on-road vehicle;

DETAILED DESCRIPTION

Figures 1A, 1B:
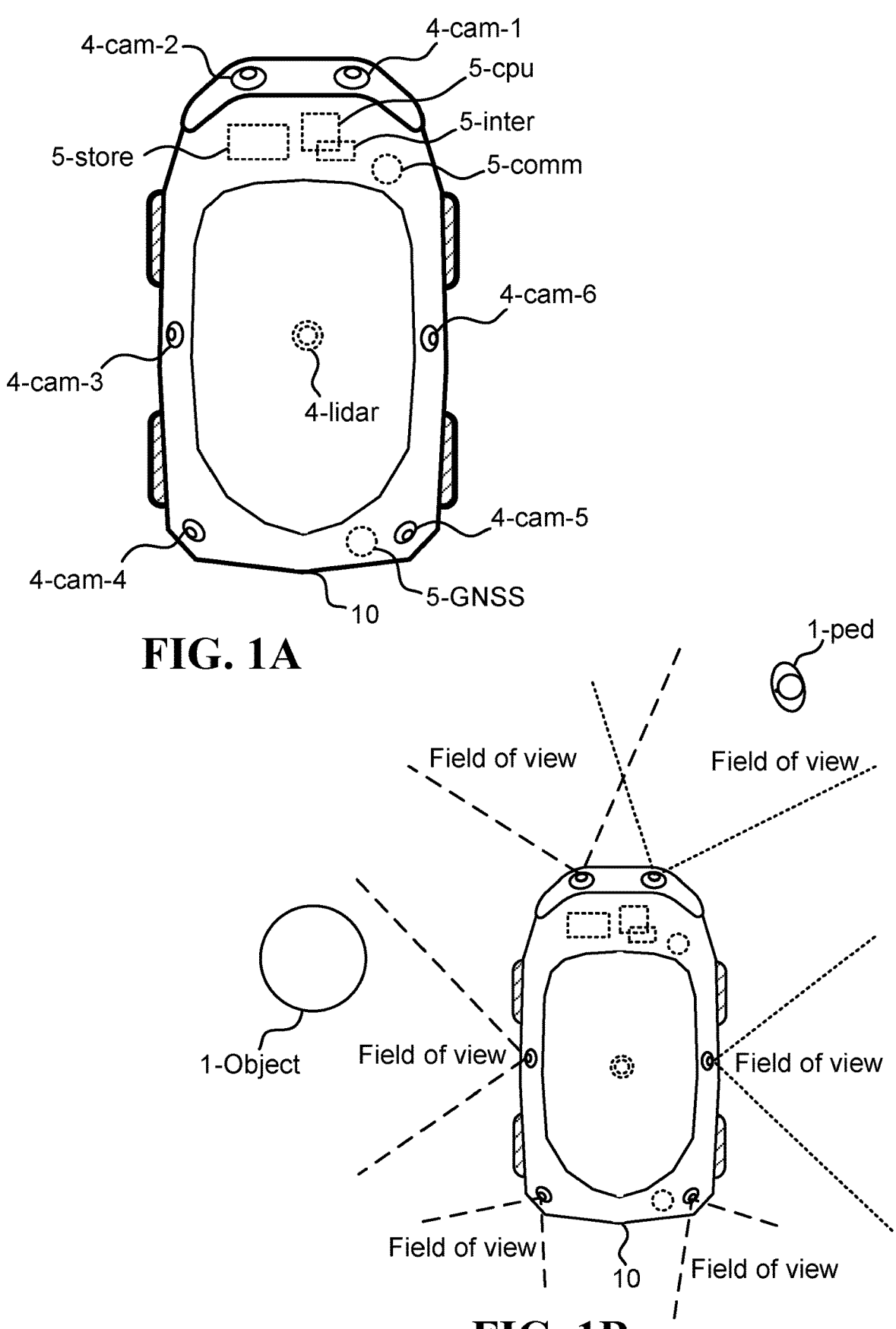
FIG. 1A illustrates one embodiment of an on-road vehicle employing various resources and sensors.
FIG. 1B illustrates one embodiment of an on-road vehicle employing several image sensors facilitating full or close to full visual coverage of surrounding environment.

FIG. 1A illustrates one embodiment of an on-road vehicle 10 employing various resources and multiple sensors including cameras with image sensors 4-cam-1, 4-cam-2, 4-cam-3, 4-cam-4, 4-cam-5, 4-cam-6, a lidar (Light Detection And Ranging) sensor 4-lidar, a global navigation satellite system (GNSS) receiver 5-GNSS such as a global positioning system (GPS) receiver, various communication interfaces 5-comm that may include cellular communication devices and vehicle peer-to-peer communication devices, data processing components 5-cpu that may include various computational resources such as graphical image processors (GPUs) and general purpose processors (CPUs), and a data storage space 5-store that may include flash memory and magnetic disks, in which all or part of the resources and sensors may be used by the on-road vehicle in conjunction with driving itself autonomously or semi autonomously, and in which all of the various resources and multiple sensors are integrated in-vehicle. A data interface 5-inter is also shown, in which the data interface may utilize the various resources and multiple sensors in facilitating functionality that is beyond autonomous or semi autonomous driving, as will be later explained. The data interface 5-inter may be a physical part of the data processing components 5-cpu, or it may be a dedicated mechanism executed in conjunction with the data processing components. On-road vehicle 10 may be referred to as an autonomous on-road vehicle, which means that on-road vehicle 10 may be fully autonomous, or it may be semi autonomous, with various possible degrees of driving automation, starting from simple automatic lane tracking or automatic braking and ending with full autonomous driving with minimal or zero driver intervention. The term autonomous on-road vehicle does not necessarily imply full autonomous driving capabilities, but the term does imply at least the on-board presence of at least some of the various resources and multiple sensors mentioned above, which are either originally built into the vehicle, or added to the vehicle at some later time.

FIG. 1B illustrates one embodiment of an on-road vehicle 10 employing several image sensors facilitating full or close to full visual coverage of surrounding environment. Six image sensors are shown, but any number of image sensors may be utilized, in which each of the image sensors is depicted has having an associated field of view. Objects within a line of sight of the image sensors, such as pedestrians 1-ped and structures 1-object, may be captured as imagery data by the on-road vehicle 10, and stored on-board as visual records for later use.

Figure 1C:
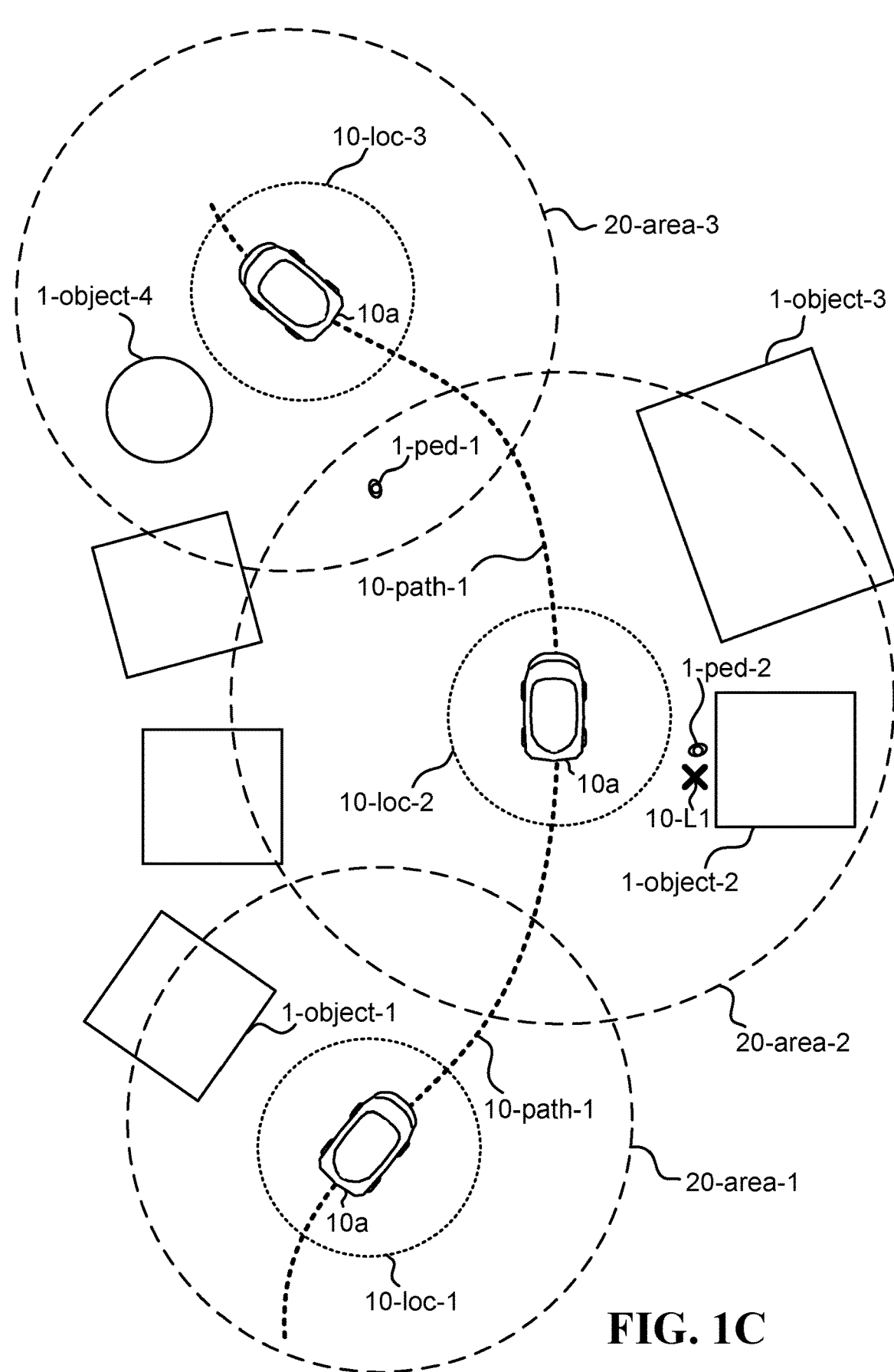
FIG. 1C illustrates one embodiment of an on-road vehicle travelling along a path and capturing visual records of surrounding environments at different times and different locations along the path of progression.

FIG. 1C illustrates one embodiment of an on-road vehicle 10a travelling along a path 10-path-1, which may be a road, a street, or a highway, and capturing visual records of surrounding environments at different times and different locations along the path of progression. For example, when the vehicle 10a is located at 10-loc-1, the on-board image sensors may capture visual records in the surrounding area 20-area-1, in which such visual records my include imagery data associated with object 1-object-1, which is perhaps a building. When the vehicle 10a is located at 10-loc-2, the on-board image sensors may capture visual records in the surrounding area 20-area-2, in which such visual records my include imagery data associated with object 1-object-3, which is perhaps another building, and imagery data associated with pedestrians 1-ped-1, 1-ped-2. When the vehicle 10a is located at 10-loc-3, the on-board image sensors may capture visual records in the surrounding area 20-area-3, in which such visual records my include imagery data associated with object 1-object-4, which is perhaps a tree, and imagery data associated again with 1-ped-1. It is noted that the same pedestrian 1-ped-1 may be seen at two different points in time by the same vehicle 10a from two different direction, as the vehicle moves from location 10-loc-2 to location 10-loc-3. It is noted that pedestrian 1-ped-2 is located at 10-L1, in which such location can be determined by the vehicle 10a, to some degree of accuracy, by knowing the vehicle's position and orientation, perhaps by using an on-board GPS receiver, and by knowing the direction at which the relevant imagery data was captured.

Figure 1D:
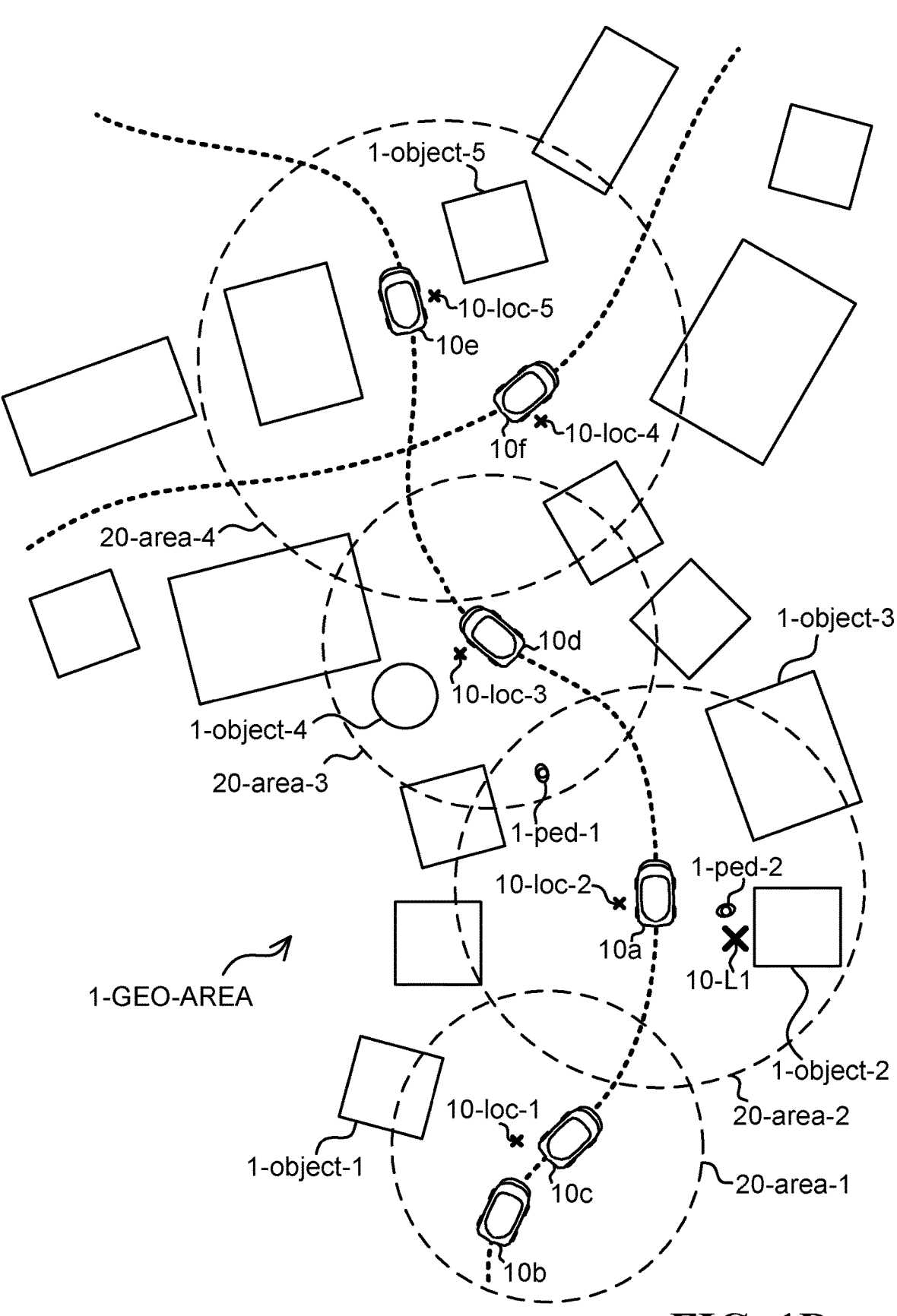
FIG. 1D illustrates one embodiment of a plurality of on-road vehicles traversing a certain geographical area while each of the on-road vehicles captures visual records of environments surrounding the vehicle.

FIG. 1D illustrates one embodiment of a plurality of on-road vehicles 10a, 10b, 10c, 10d, 10e, 10f traversing a certain geographical area 1-GEO-AREA, while each of the on-road vehicles 10a, 10b, 10c, 10d, 10e, 10f captures visual records of environments surrounding the vehicle. Vehicles 10b, 10c are depicted as being located at location 10-loc-1 and having visual access to area 20-area-1, vehicle 10a is depicted as being located at 10-loc-2 and having visual access to area 20-area-2, vehicle 10d is depicted as being located at 10-loc-3 and having visual access to area 20-area-3, and vehicles 10e, 10f are depicted as being located respectively at locations 10-loc-5, 10-loc-4 and having visual access to area 20-area-4, but at a later time the vehicles may be located at other locations and have visual access to other areas within the a certain geographical area 1-GEO-AREA. Over time, the vehicles 10a, 10b, 10c, 10d, 10e, 10f move and capture visual records of various objects at various times and from various angles and distances, in which such objects 1-object-1, 1-object-2, 1-object-3, 1-ob-ject-4, 1-object-5, 1-ped-1, 1-ped-2 may be static or dynamic.

Figures 1E, 1F:
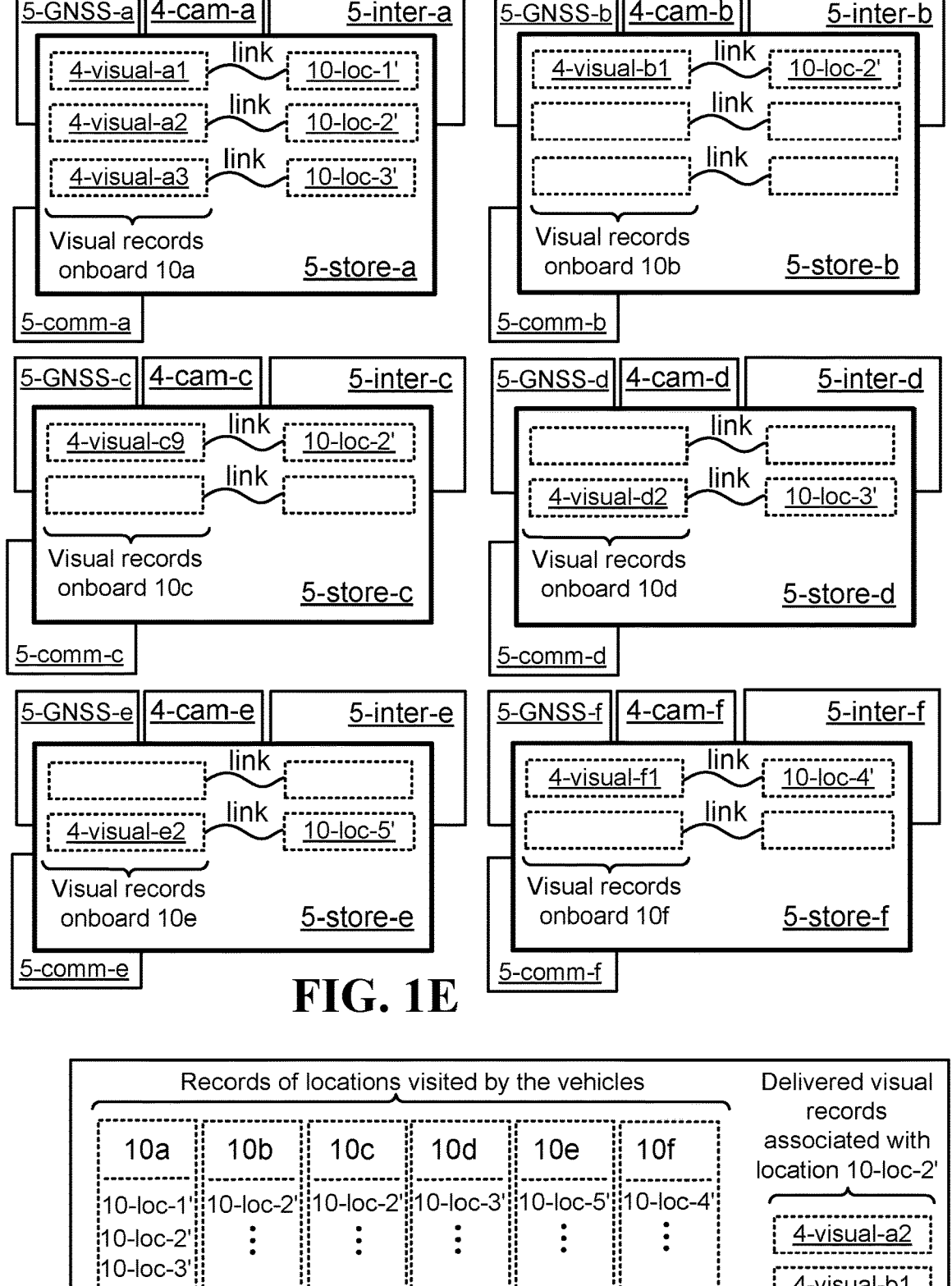
FIG. 1E illustrates one embodiment of visual records taken by the on-road vehicles and stored locally in which each of the visual records is associated with a particular geo-location.
FIG. 1F illustrates one embodiment of a server receiving from the on-road vehicles specific visual records associated with a particular geo-location of interest.

FIG. 1E illustrates one embodiment of visual records taken by the on-road vehicles 10a, 10b, 10c, 10d, 10e, 10f (FIG. 1D) and stored locally, in which each of the visual records is associated with a particular geo-location. For example, vehicle 10a has stored the visual records 4-visual-a1, 4-visual-a2, 4-visual-a3 in storage space 5-store-a that is on-board 10a, in which 4-visual-a1 is associated with the location 10-loc-1, which appears as coordinates 10-loc-1', 4-visual-a2 is associated with a location 10-loc-2, which appears as coordinates 10-loc-2', and 4-visual-a3 is associated with a location 10-loc-3, which appears as coordinates 10-loc-3'. Vehicle 10b has stored the visual record 4-visual-b1 in on-board storage space 5-store-b, in which 4-visual-b1 is associated with the location 10-loc-2, which appears as coordinates 10-loc-2'. Vehicle 10c has stored the visual record 4-visual-c9 in on-board storage space 5-store-c, in which 4-visual-c9 is associated with the location 10-loc-2, which appears as coordinates 10-loc-2'. Vehicle 10d has stored the visual record 4-visual-d2 in on-board storage space 5-store-d, in which 4-visual-d2 is associated with the location 10-loc-3, which appears as coordinates 10-loc-3'. Vehicle 10e has stored the visual record 4-visual-e2 in on-board storage space 5-store-e, in which 4-visual-e2 is associated with the location 10-loc-5, which appears as coordinates 10-loc-5'. Vehicle 10f has stored the visual record 4-visual-f1 in on-board storage space 5-store-f, in which 4-visual-f1 is associated with the location 10-loc-4, which appears as coordinates 10-loc-4'. Each of the vehicles 10a, 10b, 10c, 10d, 10e, 10f (FIG. 1D) is equipped with its own on-board resources and sensors. For example, 10a is equipped with a storage space 5-store-a, a GNSS device 5-GNSS-a, a set of cameras 4-cam-a, a data interface 5-inter-a, and a communication interface 5-comm-a. 10b is equipped with a storage space 5-store-b, a GNSS device 5-GNSS-b, a set of cameras 4-cam-b, a data interface 5-inter-b, and a communication interface 5-comm-b. 10c is equipped with a storage space 5-store-c, a GNSS device 5-GNSS-c, a set of cameras 4-cam-c, a data interface 5-inter-c, and a communication interface 5-comm-c. 10d is equipped with a storage space 5-store-d, a GNSS device 5-GNSS-d, a set of cameras 4-cam-d, a data interface 5-inter-d, and a communication interface 5-comm-d. 10e is equipped with a storage space 5-store-e, a GNSS device 5-GNSS-e, a set of cameras 4-cam-e, a data interface 5-inter-e, and a communication interface 5-comm-e. 10f is equipped with a storage space 5-store-f, a GNSS device 5-GNSS-f, a set of cameras 4-cam-f, a data interface 5-inter-f, and a communication interface 5-comm-f.

FIG. 1F illustrates one embodiment of a server 99-server receiving from the on-road vehicles 10a, 10b, 10c, 10d, 10e,

10f (FIG. 1D) specific visual records associated with a particular geo-location of interest. Server 99-server may first receive from each f the vehicles a list of visited locations. For example, 10a is reporting being at locations 10-loc-1, 10-loc-2, and 10-loc-3, which is recorded by the server in 1-rec-a. 10b is reporting being at location 10-loc-2, which is recorded by the server in 1-rec-b. 10c is reporting being at location 10-loc-2, which is recorded by the server in 1-rec-c. 10d is reporting being at location 10-loc-3, which is recorded by the server in 1-rec-d. 10e is reporting being at location 10-loc-5, which is recorded by the server in 1-rec-e. 10f is reporting being at location 10-loc-4, which is recorded by the server in 1-rec-f. The server 99-server can then know which of the vehicles posses visual records associated with a specific location. For example, if the server 99-server is interested in imagery data associated with location 10-loc-2, then according to the records in the server, only vehicles 10a, 10b, and 10c have relevant imagery data, and therefore the server may instruct 10a, 10b, and 10c to send the related visual records, following which 10a responds by sending 4-visual-a2, 10b responds by sending 4-visual-b1, and 10c responds by sending 4-visual-c9. The server 99-server, or any other server, may be located in a stationary data center or in conjunction with another stationary location such as an office or a building, or it may be located on-board one of the on-road vehicles, or it may be co-located (distributed) on-board several of the on-road vehicles, unless specifically mentioned otherwise. The server 99-server, or any other server, may be implemented as a single machine or it may be distributed over several machines.

Figure 1G:
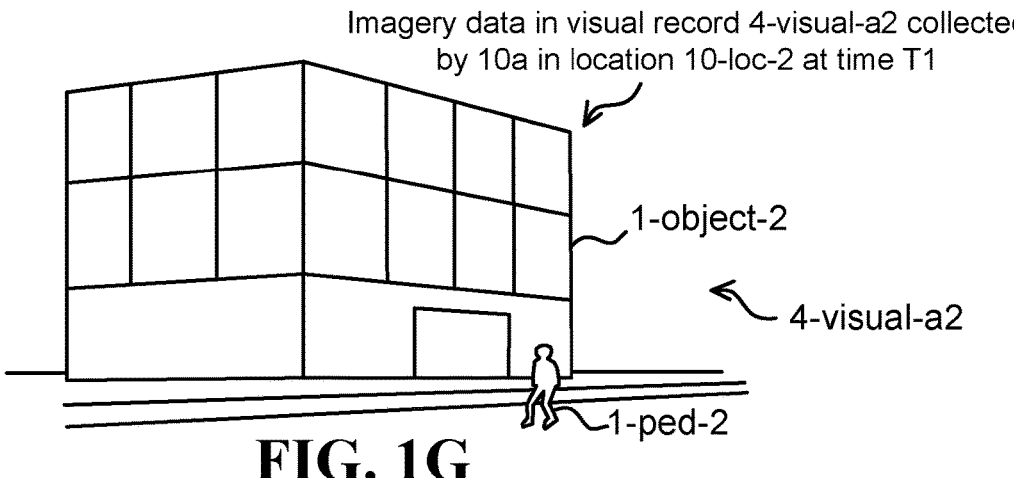
FIG. 1G illustrates one embodiment of imagery data in a visual record collected by a certain on-road vehicle at a particular time and in conjunction with a specific geo-location.

FIG. 1G illustrates one embodiment of imagery data in a visual record 4-visual-a2 collected by a certain on-road vehicle 10a (FIG. 1D) at a particular time T1 and in conjunction with a specific geo-location 10-loc-2 (FIG. 1D). Object 1-object-2 and pedestrian 1-ped-2 appear in this visual record.

Figure 1H:
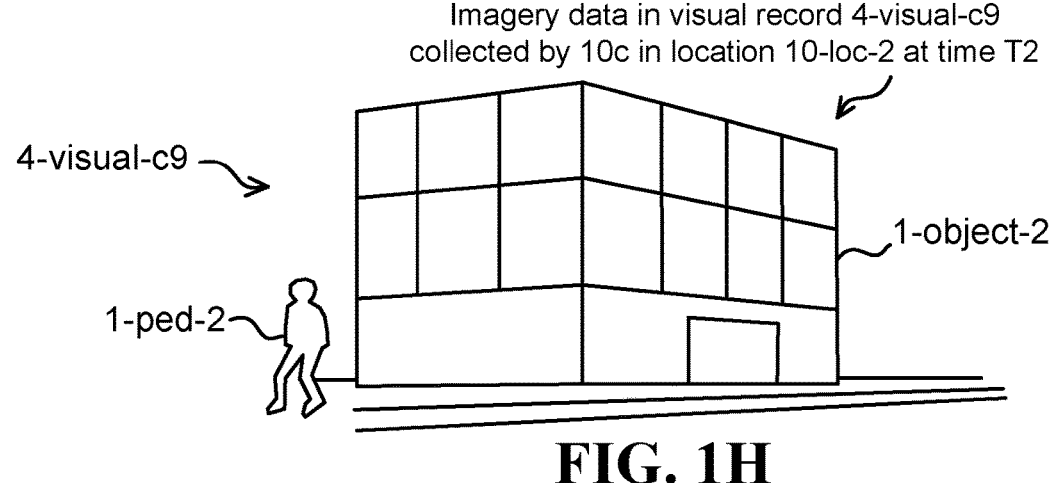
FIG. 1H illustrates one embodiment of imagery data in a visual record collected by another on-road vehicle at a later time and in conjunction with the same specific geo-location.

FIG. 1H illustrates one embodiment of imagery data in a visual record 4-visual-c9 collected by another on-road vehicle 10c at a later time T2 (when 10c has moved from 10-loc-1 in FIG. 1D to 10-loc-2) and in conjunction with the same specific geo-location 10-loc-2. Object 1-object-2 and pedestrian 1-ped-2 appear again in this visual record.

Figure 1I:
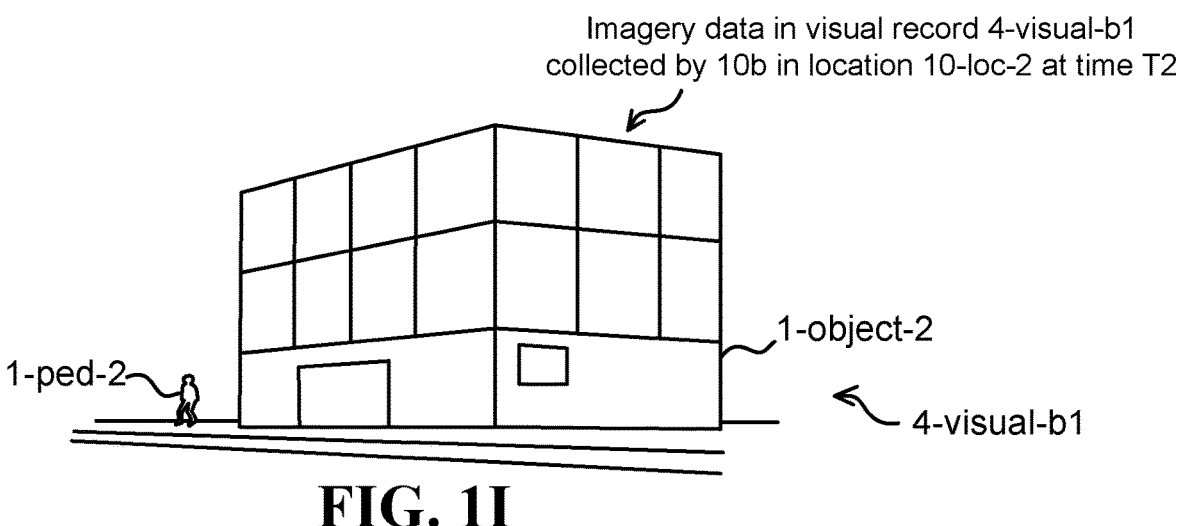
FIG. 1I illustrates one embodiment of imagery data in a visual record collected by yet another on-road vehicle at the later time and again in conjunction with the same specific geo-location.

FIG. 1I illustrates one embodiment of imagery data in a visual record 4-visual-b1 collected by yet another on-road vehicle 10b at the later time T2 (when 10b has moved from 10-loc-1 in FIG. 1D to 10-loc-2) and again in conjunction with the same specific geo-location 10-loc-2. Object 1-ob-ject-2 and pedestrian 1-ped-2 appear yet again in this visual record.

FIG. 1J illustrates one embodiment of a server 99-server' receiving from the on-road vehicles 10a, 10b, 10c (FIG. 1D), respectively, specific visual records 4-visual-a2, 4-vi-sual-b1, 4-visual c9 associated with a particular geo-location of interest 10-loc-2 (FIG. 1D).

One embodiment is a system operative to obtain specific imagery data from a set of imagery data collected by a plurality of autonomous on-road vehicles, comprising: a server 99-server (FIG. 1F); and a plurality of autonomous on-road vehicles 10a, 10b, 10c, 10d, 10e, 10f (FIG. 1D) moving in a certain geographical area 1-GEO-AREA, in which each of the autonomous on-road vehicles (e.g., autonomous on-road vehicle 10a, FIG. 1C) is configured to: (i) collect and store visual records (e.g., visual records 4-visual-a1, 4-visual-a2, 4-visual-a3, FIG. 1E) of areas (e.g., areas 20-area-1, 20-area-2, 20-area-3 respectively, FIG. 1C) surrounding locations (e.g., locations 10-loc-1, 10-loc-2, 10-loc-3 respectively, FIG. 1C) visited by the autonomous on-road vehicle (10*a* in this example), in which each of the visual records is linked with a respective one of the locations visited (e.g., 4-visual-a2 is linked with geospatial coordinate 10-loc-2' associated with location 10-loc-2 visited by autonomous on-road vehicle 10*a*), and to (ii) send to the server 99-server a record (e.g., 1-rec-a, FIG. 1F) of said locations (10-loc-1, 10-loc-2, 10-loc-3 in this example).

In one embodiment, the server 99-server is configured to: receive or generate a request to obtain visual records of a particular location of interest 10-L1 (FIG. 1C, FIG. 1D) within said certain geographical area 1-GEO-AREA; the server 99-server is further configured to point-out, using the records 1-rec-a, 1-rec-b, 1-rec-c, 1-rec-d, 1-rec-e, 1-rec-f (FIG. 1F) received from the plurality of autonomous on-road vehicles 10*a*, 10*b*, 10*c*, 10*d*, 10*e*, 10*f*, at least one of the plurality of autonomous on-road vehicles (e.g., 10*a*, 10*b*, 10*c* are pointed out) that was in visual vicinity (e.g., 10-loc-2) of said particular location of interest 10-L1; the server 99-server is further configured to send a request for visual records to said at least one autonomous on-road vehicle pointed-out 10*a*, 10*b*, 10*c*, in which said request includes a pointer (such as 10-loc-2' taken from record 1-rec-a) associated with the visual records collected in visual vicinity of said particular location of interest 10-L1; and the at least one autonomous on-road vehicle pointed-out 10*a*, 10*b*, 10*c* is configured to: (i) receive said request for visual records, (ii) locate, using the pointer, at least a specific one of the visual records (e.g., 10*a* locates using the pointer 10-loc-2' the visual record 4-visual-a2, 10*b* locates using the pointer 10-loc-2' the visual record 4-visual-b1, and 10*c* locates using the pointer 10-loc-2' the visual record 4-visual-c9), and (iii) reply by sending the specific visual records located (e.g., 10*a* sends 4-visual-a2 to 99-server, 10*b* sends 4-visual-b1 to 99-server, and 10*c* sends record 4-visual-c9 to 99-server, FIG. 1F).

In one embodiment, said request further includes a specific time of interest associated with said particular location of interest 10-loc-2, in which said specific visual records located 4-visual-a2 are not only associated with said particular location of interest 10-loc-2 requested, but are also associated with said specific time of interest.

FIG. 1K illustrates one embodiment of a method for obtaining specific imagery data from a set of imagery data collected by a plurality of autonomous on-road vehicles. The method comprises: In step 1001, acquiring, in a server 99-server (FIG. 1F), from each of a plurality of autonomous on-road vehicles 10*a*, 10*b*, 10*c*, 10*d*, 10*e*, 10*f* (FIG. 1D) moving in a certain geographical area 1-GEO-AREA, a record such as 1-rec-a, 1-rec-b, 1-rec-c, 1-rec-d, 1-rec-e, 1-rec-f (FIG. 1F) of locations 10-loc-1, 10-loc-2, 10-loc-3, 10-loc-4, 10-loc-5 (FIG. 1D) visited by the autonomous on-road vehicle, in which each of the autonomous on-road vehicles is operative to collect and store visual records such as 4-visual-a1, 4-visual-a2, 4-visual-a3, 4-visual-b1, 4-visual-c9, 4-visual-d2, 4-visual-e2, 4-visual-f1 (FIG. 1E) of areas 20-area-1, 20-area-2, 20-area-3, 20-area-4 (FIG. 1D) surrounding said locations visited by the autonomous on-road vehicle, and in which each of the visual records is linked with a respective one of the locations visited. In step 1002, receiving or generating, in the server 99-server, a request to obtain visual records of a particular location of interest 10-L1 (FIG. 1D) within said certain geographical area 1-GEO-AREA. In step 1003, pointing-out, by the server 99-server, using the records 1-rec-a, 1-rec-b, 1-rec-c, 1-rec-d, 1-rec-e, 1-rec-f obtained from the plurality of autonomous on-road vehicles, at least one of the plurality of autonomous on-road vehicles 10*a*, 10*b*, 10*c* that was in visual vicinity (e.g., 10-loc-2) of said particular location of interest 10-L1. In step 1004, sending, by the server, to said at least one autonomous on-road vehicle pointed-out 10*a*, 10*b*, 10*c*, a request for visual records collected at the location 10-loc-2 that is in visual vicinity of said particular location of interest 10-L1. In step 1005, obtaining, by the server 99-server, from said at least one autonomous on-road vehicle pointed-out 10*a*, 10*b*, 10*c*, at least a specific one of the visual records 4-visual-a2, 4-visual-b1, 4-visual-c9 (FIG. 1F) associated with said particular location of interest requested 10-L1, in which said specific visual records 4-visual-a2, 4-visual-b1, 4-visual-c9 are located, by the at least one autonomous on-road vehicle pointed-out 10*a*, 10*b*, 10*c*, using said link between the visual records and locations visited.

Figure 1L:
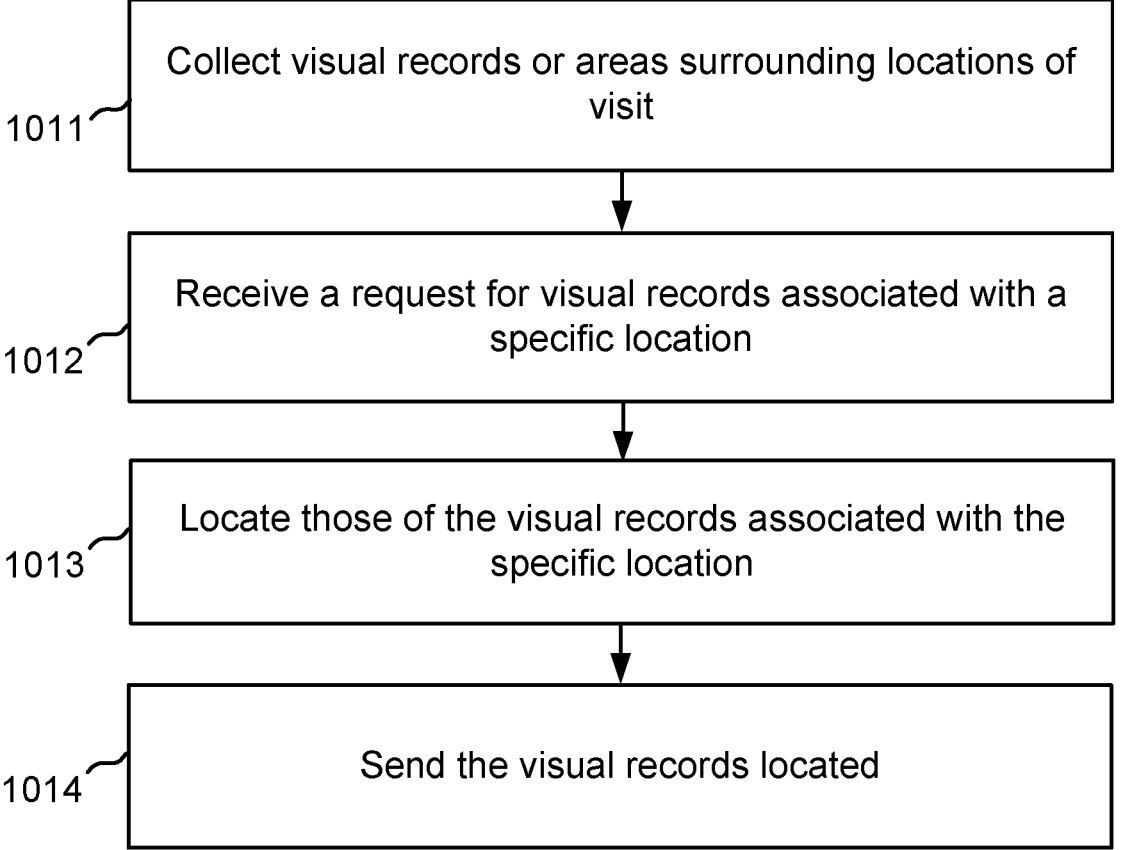
FIG. 1L illustrates one embodiment of a method for locating specific imagery data from a set of imagery data collected by an autonomous on-road vehicle.

FIG. 1L illustrates one embodiment of a method for locating specific imagery data from a set of imagery data collected by an autonomous on-road vehicle. The method comprises: In step 1011, collecting and storing, in an autonomous on-road vehicle 10*a* (FIG. 1C) moving in a certain geographical area 1-GEO-AREA, visual records 4-visual-a1, 4-visual-a2, 4-visual-a3 (FIG. 1E) of areas 20-area-1, 20-area-2, 20-area-3 (FIG. 1C) surrounding locations 10-loc-1, 10-loc-2, 10-loc-3 (FIG. 1C) visited by the autonomous on-road vehicle 10*a*, in which each of the visual records 4-visual-a1, 4-visual-a2, 4-visual-a3 is linked with a respective one of the locations visited 10-loc-1, 10-loc-2, 10-loc-3. In step 1012, receiving, in the autonomous on-road vehicle 10*a*, from a server 99-server, a request for visual records collected at a specific location (e.g., collected at 10-loc-2). In step 1013, locating, as a response to said request, in the autonomous on-road vehicle 10*a*, using said link between the visual records and locations visited, at least a specific one of the visual records 4-visual-a2 associated with said specific location 10-loc-2. In step 1014, sending, by the autonomous on-road vehicle 10*a*, to the server 99-server, the specific visual records located 4-visual-a2.

One embodiment is a system operative to locate specific imagery data from a set of imagery data collected in an autonomous on-road vehicle, comprising: image sensors 4-cam-1, 4-cam-2, 4-cam-3, 4-cam-4, 4-cam-5, 4-cam-6 (FIG. 1A) onboard an autonomous on-road vehicle 10 (FIG. 1A), 10*a* (FIG. 1C); a global-navigation-satellite-system (GNSS) receiver 5-GNSS (FIG. 1A), such as a GPS receiver, onboard the autonomous on-road vehicle 10 (FIG. 1A), 10*a* (FIG. 1C); a storage space 5-store (FIG. 1A), 5-store-a (FIG. 1E) onboard the autonomous on-road vehicle 10 (FIG. 1A), 10*a* (FIG. 1C); and a data interface 5-inter (FIG. 1A) onboard the autonomous on-road vehicle 10 (FIG. 1A), 10*a* (FIG. 1C).

In one embodiment, the data interface 5-inter is configured to: collect, using the image sensors 4-cam-1, 4-cam-2, 4-cam-3, 4-cam-4, 4-cam-5, 4-cam-6, while the autonomous on-road vehicle 10*a* (FIG. 1C) is moving in a certain geographical area 1-GEO-AREA (FIG. 1C), visual records 4-visual-a1, 4-visual-a2, 4-visual-a3 (FIG. 1E) of areas 20-area-1, 20-area-2, 20-area-3 (FIG. 1C) surrounding locations 10-loc-1, 10-loc-2, 10-loc-3 visited by the autonomous on-road vehicle 10*a*; store, in the storage space 5-store, 5-store-a, each of the visual records 4-visual-a1, 4-visual-a2, 4-visual-a3 together with geospatial information 10-loc-1', 10-loc-2', 10-loc-3' (FIG. 1E) of the respective locations 10-loc-1, 10-loc-2, 10-loc-3, thereby creating a link between the visual records 4-visual-a1, 4-visual-a2, 4-visual-a3 and the locations visited 10-loc-1, 10-loc-2, 10-loc-3, in which said geospatial information 10-loc-1', 10-loc-2', 10-loc-3' is facilitated by the GNSS receiver 5-GNSS; receive, from a server 99-server (FIG. 1F), a request for visual records, in which said request includes a particular location of interest 10-L1 (FIG. 1C); locate, as a response to said request, in the storage space 5-store, 5-store-a, using said link between the visual records 4-visual-a1, 4-visual-a2, 4-visual-a3 and locations visited 10-loc-1, 10-loc-2, 10-loc-3, at least a specific one of the visual records 4-visual-a2 associated with said particular location of interest requested 10-L1; and send, to the server 99-server, the specific visual records located 4-visual-a2.

In one embodiment, said request further includes a specific time of interest associated with said particular location of interest 10-L1, in which said specific visual records located 4-visual-a2 are not only associated with said particular location of interest requested 10-L1, but are also associated with said specific time of interest (e.g., visual record 4-visual-a2, FIG. 1G, was collected by 10a using image sensor 4-cam-5 or 4-cam-6 at a specific time of interest T1).

In one embodiment, said image sensors 4-cam-1, 4-cam-2, 4-cam-3, 4-cam-4, 4-cam-5, 4-cam-6 are the same image sensors used by the respective autonomous on-road vehicle 10, 10a to facilitate autonomous driving.

In one embodiment, said GNSS receiver 5-GNSS is the same GNSS receiver used by the respective autonomous on-road vehicle 10, 10a to facilitate autonomous driving.

In one embodiment, said particular location of interest 10-L1 is a certain geo-location of a particular object of interest 1-object-2 (FIG. 1C); said particular location of interest 10-L1 is conveyed in said request in the form of said certain geo-location; and the data interface 5-inter is further configured to: compare said geospatial information 10-loc-1', 10-loc-2', 10-loc-3' with said geo-location of the particular object of interest 10-L1; find, as a result of said comparison, at least one entry of said geospatial information 10-loc-2' (FIG. 1E, in 5-store-a) that is in visual proximity of said geo-location of the particular object of interest 10-L1; estimate, using said entry found, a previous bearing (e.g., right-back direction) of said geo-location (of 10-L1) in respect to the autonomous on-road vehicle 10a at the time said entry was taken; and use said estimation of the previous bearing to identify said specific visual record 4-visual-a2 as a record that includes said bearing, and is therefore likely to show said object of interest 1-object-2 (e.g., determine that the relevant visual record was taken by image sensor 4-cam-6 covering the right-back direction).

In one embodiment, said particular location of interest 10-L1 is a particular geo-spatial area of interest 20-area-2; said particular location of interest 10-L1 is conveyed in said request in the form said particular geo-spatial area 20-area-2; and the data interface 5-inter is further configured to: compare said geospatial information 10-loc-1', 10-loc-2', 10-loc-3' with said particular geo-spatial area 20-area-2; find, as a result of said comparison, at least one entry of said geospatial information 10-loc-2' (FIG. 1E, in 5-store-a) that is inside said particular geo-spatial area 20-area-2; and use said entry 10-loc-2' to identify said specific visual record 4-visual-a2.

One embodiment is a system operative to obtain specific imagery data from a set of imagery data collected by a plurality of autonomous on-road vehicles, comprising: a requestor 99-server' (FIG. 1J); and a plurality of autonomous on-road vehicles 10a, 10b, 10c, 10d, 10e, 10f (FIG. 1D) moving in a certain geographical area 1-GEO-AREA, in which each of the autonomous on-road vehicles (e.g., autonomous on-road vehicle 10a, FIG. 1C) is operative to collect and store visual records (e.g., visual records 4-visuala1, 4-visual-a2, 4-visual-a3, FIG. 1E) of areas (e.g., areas 20-area-1, 20-area-2, 20-area-3 respectively, FIG. 1C) surrounding locations (e.g., locations 10-loc-1, 10-loc-2, 10-loc-3 respectively, FIG. 1C) visited by the autonomous on-road vehicle (10a in this example), in which each of the visual records is linked with a respective one of the locations visited (e.g., 4-visual-a2 is linked with geospatial coordinate 10-loc-2' associated with location 10-loc-2 visited by autonomous on-road vehicle 10a).

In one embodiment, the requestor 99-server' is configured to generate a request to obtain visual records of a particular location of interest 10-L1 (FIG. 1C, FIG. 1D) within said certain geographical area 1-GEO-AREA; the requestor 99-server' is further configured to send a request for visual records to said plurality of autonomous vehicles 10a, 10b, 10c, 10d, 10e, 10f, in which said request comprises said particular location of interest 10-L1; and each of said plurality of autonomous on-road vehicles 10a, 10b, 10c, 10d, 10e, 10f is configured to: (i) receive said request for visual records, (ii) locate, if relevant to the autonomous on-road vehicle, using said link between the visual records and locations visited, at least a specific one of the visual records associated with said particular location of interest requested 10-L1 (e.g., 10a locates using the pointer 10-loc-2' the visual record 4-visual-a2, 10b locates using the pointer 10-loc-2' the visual record 4-visual-b1, and 10c locates using the pointer 10-loc-2' the visual record 4-visual-c9—FIG. 1E, in which the pointer 10-loc-2' is associated with 10-L1 by being in visual vicinity of 10-L1), and (iii) reply by sending the specific visual records located (e.g., 10a sends 4-visual-a2 to 99-server, 10b sends 4-visual-b1 to 99-server, and 10c sends record 4-visual-c9 to 99-server, FIG. 1F).

One embodiment is a system operative to identify and obtain specific imagery data from a set of imagery data collected by a plurality of autonomous on-road vehicles, comprising: a plurality of data interfaces 5-inter-a, 5-inter-b, 5-inter-c, 5-inter-d, 5-inter-e, 5-inter-f (FIG. 1E) located respectively onboard a plurality of autonomous on-road vehicles 10a, 10b, 10c, 10d, 10e, 10f (FIG. 1D) moving in a certain geographical area 1-GEO-AREA, in which each of the data interfaces is configured to collect and store visual records such as 4-visual-a1, 4-visual-a2, 4-visual-a3, 4-visual-b1, 4-visual-c9, 4-visual-d2, 4-visual-e2, 4-visual-f1 (FIG. 1E) of areas 20-area-1, 20-area-2, 20-area-3, 20-area-4 (FIG. 1D) surrounding locations 10-loc-1, 10-loc-2, 10-loc-3, 10-loc-4, 10-loc-5 (FIG. 1D) visited by the respective autonomous on-road vehicle; and a server 99-server (FIG. 1F), 99-server' (FIG. 1J) located off-board the plurality of autonomous on-road vehicles 10a, 10b, 10c, 10d, 10e, 10f.

In one embodiment, the server 99-server (FIG. 1F), 99-server' (FIG. 1J) is configured to receive or generate a request to obtain visual records of a particular location of interest 10-L1 (FIG. 1D) within said certain geographical area 1-GEO-AREA; as a response to said request, the system is configured to identify at least a specific one of the visual records 4-visual-a2, 4-visual-b1, 4-visual-c9 (FIG. 1E) that was collected by at least one of the autonomous on-road vehicles 10a, 10b, 10c while being in visual vicinity 10-loc-2 of said particular location of interest 10-L1, in which said specific visual records identified 4-visual-a2, 4-visual-b1, 4-visual-c9 contain imagery data associated with the particular location of interest 10-L1; and the system is further configured to deliver said specific visual records identified 4-visual-a2, 4-visual-b1, 4-visual-c9 (FIG. 1E) from the respective autonomous on-road vehicles 10a, 10b, 10c to the server 99-server (FIG. 1F), 99-server' (FIG. 1J).

In one embodiment, each of the autonomous on-road vehicles 10a, 10b, 10c, 10d, 10e, 10f is operative to send to the server 99-server (FIG. 1F) a record 1-rec-a, 1-rec-b, 1-rec-c, 1-rec-d, 1-rec-e, 1-rec-f (FIG. 1F) of said locations visited 10-loc-1, 10-loc-2, 10-loc-3, 10-loc-4, 10-loc-5 by the autonomous on-road vehicle, in which each of the visual records 4-visual-a1, 4-visual-a2, 4-visual-a3, 4-visual-b1, 4-visual-c9, 4-visual-d2, 4-visual-e2, 4-visual-f1 is linked (FIG. 1E) with a respective one of the locations visited 10-loc-1, 10-loc-2, 10-loc-3, 10-loc-4, 10-loc-5; the server 99-server (FIG. 1F) is further configured to point-out, using the records of locations 1-rec-a, 1-rec-b, 1-rec-c, 1-rec-d, 1-rec-e, 1-rec-f (FIG. 1F) received from the plurality of autonomous on-road vehicles 10a, 10b, 10c, 10d, 10e, 10f, at least one of the plurality of autonomous on-road vehicles 10a, 10b, 10c that was in visual vicinity (e.g., 10-loc-2) of said particular location of interest 10-L1; the server 99-server (FIG. 1F) is further configured to send a request for visual records to said at least one autonomous on-road vehicle pointed-out 10a, 10b, 10c, in which said request includes the particular location of interest 10-L1 or one of the locations 10-loc-2' (acting as a pointer) appearing in the records that is in visual vicinity of the particular location of interest 10-L1; and the at least one autonomous on-road vehicle pointed-out 10a, 10b, 10c is configured to: (i) receive said request for visual records, (ii) locate, using said link between the visual records and locations visited, at least a specific one of the visual records associated with said particular location of interest requested (e.g., 10a locates using the pointer 10-loc-2' the visual record 4-visual-a2, 10b locates using the pointer 10-loc-2' the visual record 4-visual-b1, and 10c locates using the pointer 10-loc-2' the visual record 4-visual-c9), and (iii) reply by said delivering of the specific visual records associated with said particular location of interest, thereby achieving said identification and delivery of the specific visual records (e.g., 10a sends 4-visual-a2 to 99-server, 10b sends 4-visual-b1 to 99-server, and 10c sends record 4-visual-c9 to 99-server, FIG. 1F).

In one embodiment, each of the autonomous on-road vehicles 10a, 10b, 10c, 10d, 10e, 10f is operative to keep a record of said locations 10-loc-1, 10-loc-2, 10-loc-3, 10-loc-4, 10-loc-5 visited by the autonomous on-road vehicle, in which each of the visual records is linked with a respective one of the locations visited (e.g., 4-visual-a2 is linked with geospatial coordinate 10-loc-2' associated with location 10-loc-2 visited by autonomous on-road vehicle 10a—FIG. 1E); the server 99-server' (FIG. 1J) is further configured to send, to the plurality of autonomous on-road vehicles 10a, 10b, 10c, 10d, 10e, 10f, a request for visual records, in which said request includes the particular location of interest 10-L1; and each of said plurality of autonomous on-road vehicles 10a, 10b, 10c, 10d, 10e, 10f is configured to: (i) receive said request for visual records, (ii) locate, if relevant to the autonomous on-road vehicle, using said link between the visual records and locations visited, at least a specific one of the visual records associated with said particular location of interest requested (e.g., 10a locates using the pointer 10-loc-2' the visual record 4-visual-a2, 10b locates using the pointer 10-loc-2' the visual record 4-visual-b1, and 10c locates using the pointer 10-loc-2' the visual record 4-visual-c9—FIG. 1E), and (iii) reply by sending the specific visual records located (e.g., 10a sends 4-visual-a2 to 99-server', 10b sends 4-visual-b1 to 99-server', and 10c sends record 4-visual-c9 to 99-server', FIG. 1J).

In one embodiment, the system further comprises, per each of the autonomous on-road vehicles 10a, 10b, 10c, 10d, 10e, 10f: image sensors onboard the autonomous on-road vehicle and associated with the respective data interface onboard (e.g., image sensors 4-cam-a, 4-cam-b, 4-cam-c, 4-cam-d, 4-cam-e, 4-cam-f, FIG. 1E, onboard 10a, 10b, 10c, 10d, 10e, 10f respectively, and associated respectively with data interfaces 5-inter-a, 5-inter-b, 5-inter-c, 5-inter-d, 5-inter-e, 5-inter-f, (FIG. 1E); a global-navigation-satellite-system (GNSS) receiver, such as a GPS receiver, onboard the autonomous on-road vehicle and associated with the respective data interface onboard (e.g., GNSS receivers 5-GNSS-a, 5-GNSS-b, 5-GNSS-c, 5-GNSS-d, 5-GNSS-e, 5-GNSS-f, FIG. 1E, onboard 10a, 10b, 10c, 10d, 10e, 10f respectively, and associated respectively with data interfaces 5-inter-a, 5-inter-b, 5-inter-c, 5-inter-d, 5-inter-e, 5-inter-f, (FIG. 1E); and a storage space onboard the autonomous on-road vehicle and associated with the respective data interface onboard (e.g., storage space 5-store-a, 5-store-b, 5-store-c, 5-store-d, 5-store-e, 5-store-f, FIG. 1E, onboard 10a, 10b, 10c, 10d, 10e, 10f respectively, and associated respectively with data interfaces 5-inter-a, 5-inter-b, 5-inter-c, 5-inter-d, 5-inter-e, 5-inter-f, (FIG. 1E); wherein, per each of the autonomous on-road vehicle 10a, 10b, 10c, 10d, 10e, 10f, the respective data interface onboard 5-inter-a, 5-inter-b, 5-inter-c, 5-inter-d, 5-inter-e, 5-inter-f is configured to: perform said collection of the visual records (e.g., 4-visual-a2 collected by 10a), using the respective image sensors onboard (e.g., using 4-cam-a by 10a); and perform said storage, in conjunction with the respective storage space onboard, of each of the visual records collected together with storing the geospatial information regarding the location visited at the time said visual record was collected (e.g., storing 4-visual-a2 together with geospatial information 10-loc-2' in 5-store-a by 10a), thereby creating a link between the visual records and the locations visited, in which said geospatial information is facilitated by the respective GNSS receiver onboard (e.g., a link is created between 4-visual-a2 and 10-loc-2' in 5-store-a, in which 10-loc-2' was determined using 5-GNSS-a at the time of 10a collecting 4-visual-a2); and wherein, per at least each of some of the autonomous on-road vehicle (e.g., per 10a), the respective data interface onboard (e.g., 5-inter-a) is configured to: receive, from the server 99-server (FIG. 1F), 99-server' (FIG. 1J), a request for visual records, in which said request includes a particular location of interest 10-L1 or a location 10-loc-2' associated with said particular location of interest; locate, as a response to said request, in the respective storage space onboard 5-store-a, using said link between the visual records and locations visited, at least said specific one of the visual records 4-visual-a2 associated with said particular location of interest requested, thereby facilitating said identification; and perform said delivery, to the server 99-server (FIG. 1F), 99-server' (FIG. 1J), of the specific visual records located 4-visual-a2.

In one embodiment, per each of the data interfaces 5-inter-a, 5-inter-b, 5-inter-c, 5-inter-d, 5-inter-e, 5-inter-f: the respective visual records (e.g., 4-visual-a1, 4-visual-a2, 4-visual-a3 per 5-inter-a), collected in the respective autonomous on-road vehicle 10a, are stored in a respective storage space onboard the respective autonomous on-road vehicle (e.g., storage space 5-store-a onboard 10a); said respective visual records 4-visual-a1, 4-visual-a2, 4-visual-a3 comprise a very large number of visual records associated respectively with a very large number of locations 10-loc-1, 10-loc-2, 10-loc-3 visited by the respective autonomous on-road vehicle 10a, and therefore said respective visual records occupy a very large size in the respective storage space 5-store-a; said delivery, of the specific visual records identified 4-visual-a2, from the respective autonomous on-road vehicles 10*a* to the server 99-server (FIG. 1F), 99-server'
(FIG. 1J), is done by the data interface 5-inter-a using a
respective communication link 5-comm-a onboard the
respective autonomous on-road vehicle 10*a*; and said
respective communication link 5-comm-a is: (i) too limited
to allow a delivery of all of the respective very large number
of visual records 4-visual-a1, 4-visual-a2, 4-visual-a3 to the
server 99-server (FIG. 1F), 99-server' (FIG. 1J), but (ii)
sufficient to allow said delivery of only the specific visual
records identified 4-visual-a2. In one embodiment, said very
large number of visual records 4-visual-a1, 4-visual-a2,
4-visual-a3 and respective locations visited loc-1, 10-loc-2,
10-loc-3 is above 100,000 (one hundred thousand) visual
records and respective locations per each day of said mov-
ing; the size of an average visual record is above 2 mega-
bytes (two million bytes); said very large size is above 200
gigabytes (two hundred billion bytes) per each day of said
moving; and said respective communication link 5-comm-a
is: (i) not allowed or is unable to exceed 2 gigabytes (two
billion bytes) of data transfer per each day, and is therefore
(ii) too limited to allow said delivery of all of the respective
very large number of visual records 4-visual-a1, 4-visual-a2,
4-visual-a3 to the server, but (iii) capable enough to allow
said delivery of only the specific visual records identified
4-visual-a2.

In one embodiment, said locations 10-loc-1, 10-loc-2,
10-loc-3, 10-loc-4, 10-loc-5 visited by each of the autono-
mous on-road vehicles 10*a*, 10*b*, 10*c*, 10*d*, 10*e*, 10*f* are
simply the locations through which the autonomous on-road
vehicle passes while moving, thereby resulting in a continu-
ous-like visual recording of all of the areas 20-area-1,
20-area-2, 20-area-3, 20-area-4 surrounding the autonomous
on-road vehicle while moving. In one embodiment, said
visual records (e.g., 4-visual-a1, 4-visual-a2, 4-visual-a3)
are a continuous video recording of said areas surrounding
the autonomous on-road vehicle (e.g., 10*a*) while moving
20-area-1, 20-area-2, 20-area-3. In one embodiment, said
visual records (e.g., 4-visual-a1, 4-visual-a2, 4-visual-a3)
are a periodic image snapshot of said areas 20-area-1,
20-area-2, 20-area-3, 20-area-4 surrounding the autonomous
on-road vehicle (e.g., 10*a*) while moving. In one embodi-
ment, each of said visual records (e.g., 4-visual-a1, 4-visual-
a2, 4-visual-a3) covers 360 (three hundred and sixty)
degrees all around the autonomous on-road vehicle (e.g.,
10*a*) while moving.

In one embodiment, said request further includes a spe-
cific time of interest associated with said particular location
of interest 10-L1, in which said specific visual records
identified 4-visual-a2 are not only associated with said
particular location of interest requested 10-L1, but are also
associated with said specific time of interest.

In one embodiment, said identification comprises the
identification of at least a first specific one 4-visual-a2 (FIG.
1E) and a second specific one 4-visual-b1 (FIG. 1E) of the
visual records that were collected respectively by at least a
first one 10*a* and a second one 10*b* of the autonomous
on-road vehicles while being in visual vicinity of said
particular location of interest 10-L1; said delivery of the
specific visual records identified comprises: the delivery,
from the first autonomous on-road vehicle 10*a* to the server
99-server (FIG. 1F), 99-server' (FIG. 1J), of said first
specific visual record identified 4-visual-a2; and said deliv-
ery of the specific visual records identified further com-
prises: the delivery, from the second autonomous on-road
vehicle 10*b* to the server 99-server (FIG. 1F), 99-server'
(FIG. 1J), of said second specific visual record identified
4-visual-b1. In one embodiment, the server 99-server (FIG.

1F), 99-server' (FIG. 1J) is further configured to: receive at
least said first specific visual record 4-visual-a2 and said
second specific visual record 4-visual-b1; and combine at
least said first specific visual record 4-visual-a2 and said
second specific visual record 4-visual-b1 into a combined
visual representation of the particular location of interest
10-L1. In one embodiment, said combining is a super-
resolution computational process, in which said combined
visual representation of the particular location of interest is
a super-resolution representation of the particular location of
interest 10-L1. In one embodiment, said combining is a
three-dimensional (3D) construction process, in which said
combined visual representation of the particular location of
interest is a 3D representation of the particular location of
interest 10-L1. In one embodiment, said particular location
of interest 10-L1 is a particular object of interest such as a
building 1-object-2 (FIG. 1C, FIG. 1D) or a person such as
a pedestrian 1-ped-2 (FIG. 1C, FIG. 1D). In one embodi-
ment, said particular location of interest 10-L1 is a particular
geo-spatial area of interest 20-area-2 (FIG. 1C, FIG. 1D). In
one embodiment, said at least first specific visual record and
second specific visual record are at least 100 (one hundred)
specific visual recorded received from at least 10 (ten)
separate autonomous on-road vehicles; and said combining
comprises the combining of said at least 100 (one hundred)
specific visual records into a data-rich combined visual
representation of the particular location of interest 10-L1.

One embodiment is a system operative to identify and
obtain specific imagery data from a set of imagery data
collected by a plurality of autonomous on-road vehicles,
comprising: a plurality of at least 100,000 (one hundred
thousand) data interfaces 5-inter-a, 5-inter-b, 5-inter-c, 5-in-
ter-d, 5-inter-e, 5-inter-f (FIG. 1E) located respectively
onboard a plurality of at least 100,000 (one hundred thou-
sand) autonomous on-road vehicles 10*a*, 10*b*, 10*c*, 10*d*, 10*e*,
10*f* (FIG. 1D) moving in a certain geographical area 1-GEO-
AREA, in which each of the data interfaces 5-inter-a,
5-inter-b, 5-inter-c, 5-inter-d, 5-inter-e, 5-inter-f is config-
ured to collect and store locally, in conjunction with a
respective storage space 5-store-a, 5-store-b, 5-store-c,
5-store-d, 5-store-e, 5-store-f, (FIG. 1E) onboard the respec-
tive autonomous on-road vehicle 10*a*, 10*b*, 10*c*, 10*d*, 10*e*,
10*f*, visual records 4-visual-a1, 4-visual-a2, 4-visual-a3,
4-visual-b1, 4-visual-c9, 4-visual-d2, 4-visual-e2, 4-visual-
f1 (FIG. 1E) of areas 20-area-1, 20-area-2, 20-area-3,
20-area-4 (FIG. 1D) surrounding locations 10-loc-1, 10-loc-
2, 10-loc-3, 10-loc-4, 10-loc-5 (FIG. 1D) visited by said
respective autonomous on-road vehicle, thereby resulting,
collectively, in a corpus of collected visual data 4-visual-a1,
4-visual-a2, 4-visual-a3, 4-visual-b1, 4-visual-c9, 4-visual-
d2, 4-visual-e2, 4-visual-f1 that exceeds 20 petabytes
(twenty quadrillion bytes) per each day of said moving,
which is collectively stored onboard the plurality of autono-
mous on-road vehicles 10*a*, 10*b*, 10*c*, 10*d*, 10*e*, 10*f*; and a
plurality of at least 100,000 (one hundred thousand) com-
munication interfaces 5-comm-a, 5-comm-b, 5-comm-c,
5-comm-d, 5-comm-e, 5-comm-f (FIG. 1E), associated
respectively with said plurality of at least 100,000 (one
hundred thousand) data interfaces 5-inter-a, 5-inter-b, 5-in-
ter-c, 5-inter-d, 5-inter-e, 5-inter-f, and located respectively
onboard said plurality of at least 100,000 (one hundred
thousand) autonomous on-road vehicles 10*a*, 10*b*, 10*c*, 10*d*,
10*e*, 10*f*.

In one embodiment, said plurality of data interfaces
5-inter-a, 5-inter-b, 5-inter-c, 5-inter-d, 5-inter-e, 5-inter-f
are not allowed or are unable to collectively deliver, via the
plurality of at least 100,000 (one hundred thousand) communication interfaces 5-comm-a, 5-comm-b, 5-comm-c, 5-comm-d, 5-comm-e, 5-comm-f (FIG. 1E), said corpus of collected visual data 4-visual-a1, 4-visual-a2, 4-visual-a3, 4-visual-b1, 4-visual-c9, 4-visual-d2, 4-visual-e2, 4-visual-f1, and therefore said visual records, collectively stored in said plurality of autonomous on-road vehicles 10a, 10b, 10c, 10d, 10e, 10f, are collectively trapped onboard the plurality of autonomous on-road vehicles; and therefore the system is configured to perform a search in conjunction with the visual records 4-visual-a1, 4-visual-a2, 4-visual-a3, 4-visual-b1, 4-visual-c9, 4-visual-d2, 4-visual-e2, 4-visual-f1, by performing a distributed search where each of the data interfaces 5-inter-a, 5-inter-b, 5-inter-c, 5-inter-d, 5-inter-e, 5-inter-f is configured to perform a search in conjunction with the respective locally stored visual records onboard the respective autonomous on-road vehicle 10a, 10b, 10c, 10d, 10e, 10f (e.g., data interface 5-inter-a is configured to perform a search in conjunction with visual records 4-visual-a1, 4-visual-a2, 4-visual-a3 stored locally in the respective storage space 5-store-a onboard 10a).

In one embodiment, the system is further configured to: receive a request to find and send at a specific one of the visual records that is associated with a particular location of interest 10-L1 (FIG. 1C, FIG. 1D); and forward the request received to at least some of the autonomous on-road vehicles 10a, 10b, 10c, 10d, 10e, 10f; wherein each of the autonomous on-road vehicles 10a, 10b, 10c, 10d, 10e, 10f receiving the forwarded request is configured to: locate locally, in the respective storage space 5-store-a, 5-store-b, 5-store-c, 5-store-d, 5-store-e, 5-store-f (FIG. 1E) onboard, using the respective data interface 5-inter-a, 5-inter-b, 5-inter-c, 5-inter-d, 5-inter-e, 5-inter-f, relevant visual records 4-visual-a2, 4-visual-b1, 4-visual-c9 that were collected in conjunction with said particular location of interest 10-L1; and send the relevant visual records located 4-visual-a2, 4-visual-b1, 4-visual-c9, if indeed such relevant visual records exist and located, to a designated destination, thereby facilitating said search.

In one embodiment, the system has no knowledge of which of the autonomous on-road vehicles 10a, 10b, 10c, 10d, 10e, 10f happened to be located in vicinity of the particular location of interest 10-L1; and therefore said forwarding is done to all of the autonomous on-road vehicles 10a, 10b, 10c, 10d, 10e, 10f.

In one embodiment, the system has some knowledge of which of the autonomous on-road vehicles 10a, 10b, 10c happened to be located in vicinity 10-loc-2 of the particular location of interest 10-L1; and therefore said forwarding is done in conjunction with only those of the autonomous on-road vehicles 10a, 10b, 10c that happened to be previously located 10-loc-2 in vicinity of the particular location of interest 10-L1, or that are suspected to be previously located in vicinity of the particular location of interest 10-L1.

In one embodiment, the system has exact knowledge of which of the autonomous on-road vehicles 10a, 10b, 10c happened to be located 10-loc-2 in vicinity of the particular location of interest 10-L1; and therefore said forwarding is done in conjunction with only those of the autonomous on-road vehicles 10a, 10b, 10c that were previously located in vicinity of the particular location of interest 10-L1.

In one embodiment, the system is further configured to: receive a request to find previous geo-locations of a specific object 1-object-4 (FIG. 1C, FIG. 1D); and forward the request received to at least some of the autonomous on-road vehicles 10a, 10b, 10c, 10d, 10e, 10f; wherein each of the autonomous on-road vehicles 10a, 10b, 10c, 10d, 10e, 10f receiving the forwarded request is configured to: find locally, in the respective storage space 5-store-a, 5-store-b, 5-store-c, 5-store-d, 5-store-e, 5-store-f (FIG. 1E) onboard, using the respective data interface 5-inter-a, 5-inter-b, 5-inter-c, 5-inter-d, 5-inter-e, 5-inter-f and object detection techniques, relevant visual records 4-visual-d2 (FIG. 1E) that show the specific object 1-object-4; and send the respective locations 10-loc-3' associated with the relevant visual records found 1-object-4, if indeed such relevant visual records exist and found, to a designated destination, thereby facilitating said search.

In one embodiment, the system is further configured to: receive a request to detect previous geo-locations of a specific event (e.g., a pedestrian or a suspect running away); and forward the request received to at least some of the autonomous on-road vehicles 10a, 10b, 10c, 10d, 10e, 10f; wherein each of the autonomous on-road vehicles 10a, 10b, 10c, 10d, 10e, 10f receiving the forwarded request is configured to: find locally, in the respective storage space 5-store-a, 5-store-b, 5-store-c, 5-store-d, 5-store-e, 5-store-f (FIG. 1E) onboard, using the data interface 5-inter-a, 5-inter-b, 5-inter-c, 5-inter-d, 5-inter-e, 5-inter-f and event detection techniques, relevant visual records 4-visual-a2, 4-visual-b1, 4-visual-c9 that show the specific event; and send the respective locations 10-loc-2 associated with the relevant visual records found 4-visual-a2, 4-visual-b1, 4-visual-c9, if indeed such relevant visual records exist and found, to a designated destination, thereby facilitating said search.

In one embodiment, said search, by each of the data interfaces 5-inter-a, 5-inter-b, 5-inter-c, 5-inter-d, 5-inter-e, 5-inter-f, in conjunction with the respective locally stored visual records onboard the respective autonomous on-road vehicle 10a, 10b, 10c, 10d, 10e, 10f, is done using a processing element (such as processing element 5-cpu, FIG. 1A) onboard the respective autonomous on-road vehicle, in which said processing element is the same processing element used by the autonomous on-road vehicle 10a, 10b, 10c, 10d, 10e, 10f to drive autonomously.

Figure 2A:
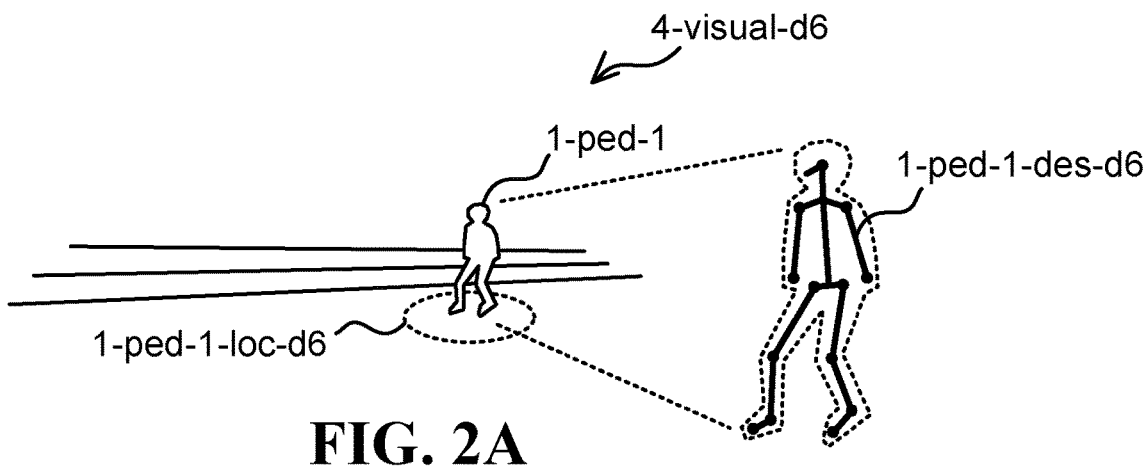
FIG. 2A illustrates one embodiment of an object description generated by a certain on-road vehicle from imagery data taken by the vehicle in conjunction with a particular object.

FIG. 2A illustrates one embodiment of an object description 1-ped-1-des-d6, which may be a description of a pedestrian 1-ped-1 walking in a certain way, generated by a certain on-road vehicle 10d (FIG. 1D) from imagery data in a visual record 4-visual-d6 taken by the vehicle 10d in conjunction with a particular object 1-ped-1 such as a pedestrian. The object description 1-ped-1-des-d6 was generated by the certain on-road vehicle 10d in conjunction with a certain location 1-ped-loc-d6 associated with pedestrian 1-ped-1.

Figure 2B:
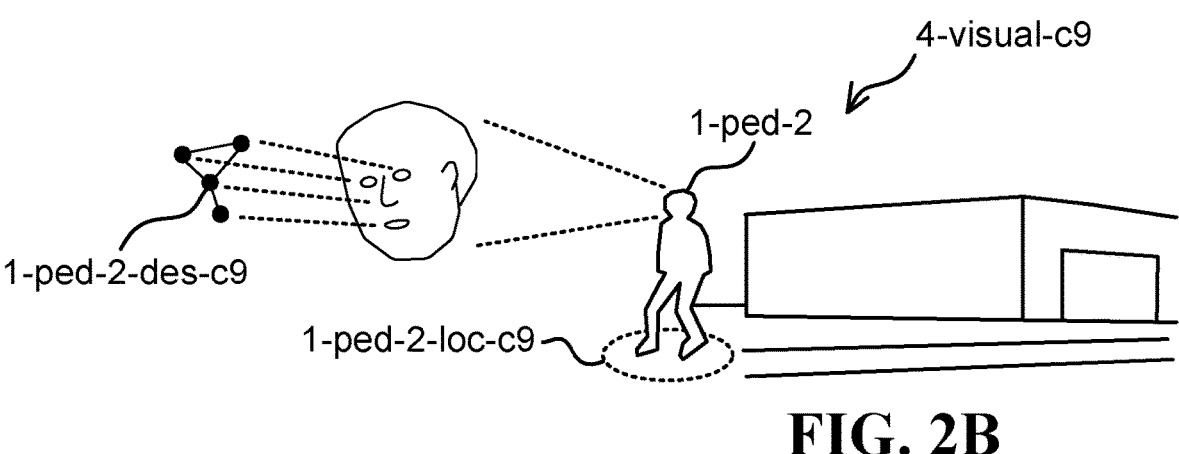
FIG. 2B illustrates one embodiment of another object description generated by another on-road vehicle from imagery data taken by the vehicle in conjunction with a second object.

FIG. 2B illustrates one embodiment of a second object description 1-ped-2-des-c9, which may be a facial description of a pedestrian, generated by another on-road vehicle 10c at a later time (when 10c has moved from 10-loc-1 in FIG. 1D to 10-loc-2) from imagery data in a visual record 4-visul-c9 taken by the vehicle 10c in conjunction with a second object such as a second pedestrian 1-ped-2. The object description 1-ped-2-des-c9 was generated by on-road vehicle 10c in conjunction with a certain location 1-ped-2-loc-c9 associated with the second pedestrian 1-ped-2.

Figure 2C:
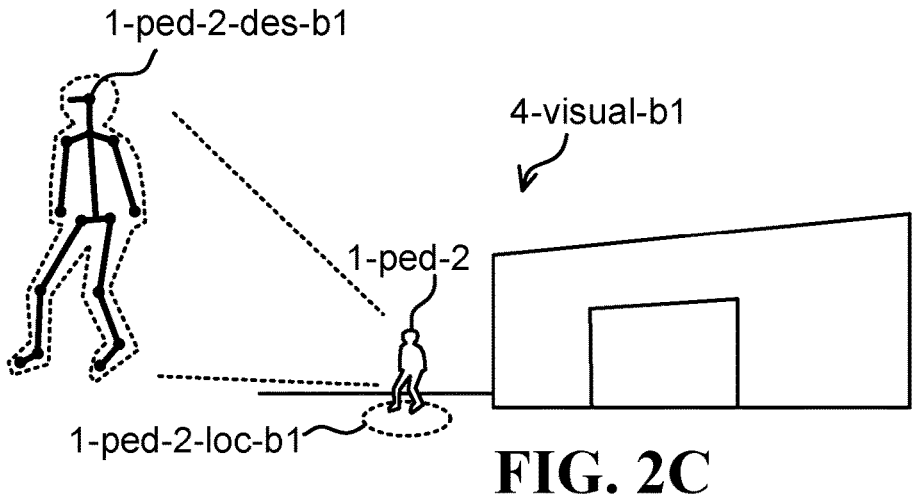
FIG. 2C illustrates one embodiment of yet another object description generated by yet another on-road vehicle from imagery data taken by the vehicle in conjunction with the same second object.

FIG. 2C illustrates one embodiment of yet another object description 1-ped-2-des-b1 generated by yet another on-road vehicle 10b at perhaps the same later time (when 10b has moved from 10-loc-1 in FIG. 1D to 10-loc-2) from imagery data in a visual record 4-visul-b1 taken by the vehicle 10b in conjunction with the same second object, which is the second pedestrian 1-ped-2. The object description 1-ped-2-des-b1 was generated by on-road vehicle 10b in conjunction with a certain location 1-ped-2-loc-b1 associated with the second pedestrian 1-ped-2. Descriptions 1-ped-2-des-b1

(FIG. 2C) and 1-ped-2-des-c9 (FIG. 2B) may be combined in order to generate a better overall description of pedestrian 1-ped-2.

Figure 2D:
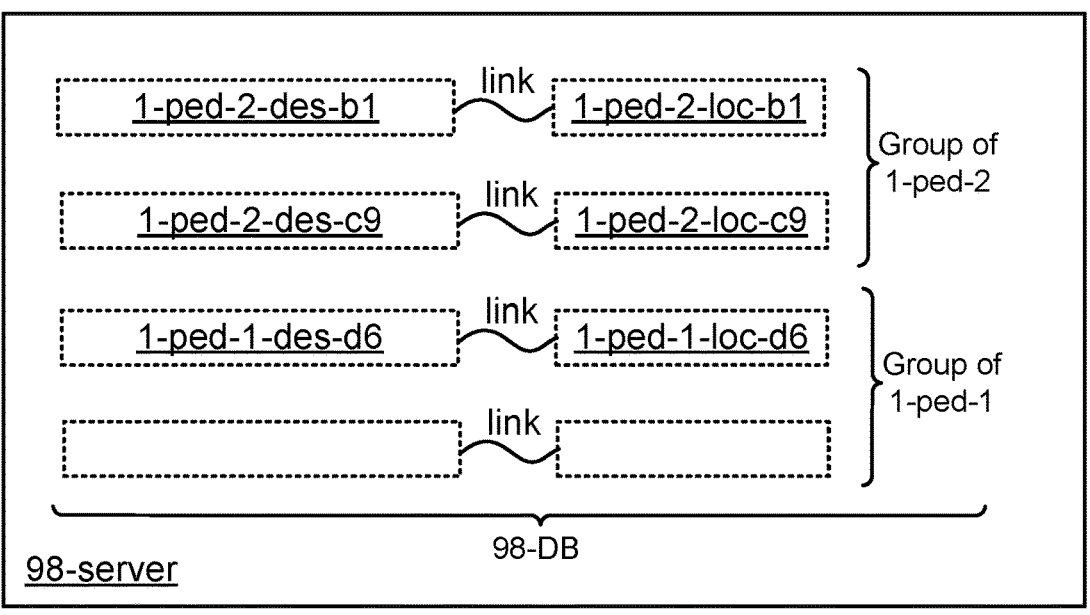
FIG. 2D illustrates one embodiment of a server receiving from the on-road vehicles specific object descriptions associated respectively with related geo-locations of detection.

FIG. 2D illustrates one embodiment of a server 98-server receiving from the on-road vehicles 10b, 10c, 10d (FIG. 1D), respectively, specific object descriptions 1-ped-2-des-b1, 1-ped-2-des-c9, 1-ped-1-des-d6 associated respectively with related geo-locations of detection 1-ped-2-loc-b1, 1-ped-2-loc-c9, 1-ped-1-loc-d6. The server 98-server may generate a database 98-DB comprising the object-descriptions 1-ped-2-des-b1, 1-ped-2-des-c9, 1-ped-1-des-d6 linked with the respective locations-of-detection 1-ped-2-loc-b1, 1-ped-2-loc-c9, 1-ped-1-loc-d6. The server may group together descriptions associated with the same object. For example, descriptions 1-ped-2-des-b1, 1-ped-2-des-c9 may be grouped together as they describe the same pedestrian 1-ped-2.

Figure 2E:
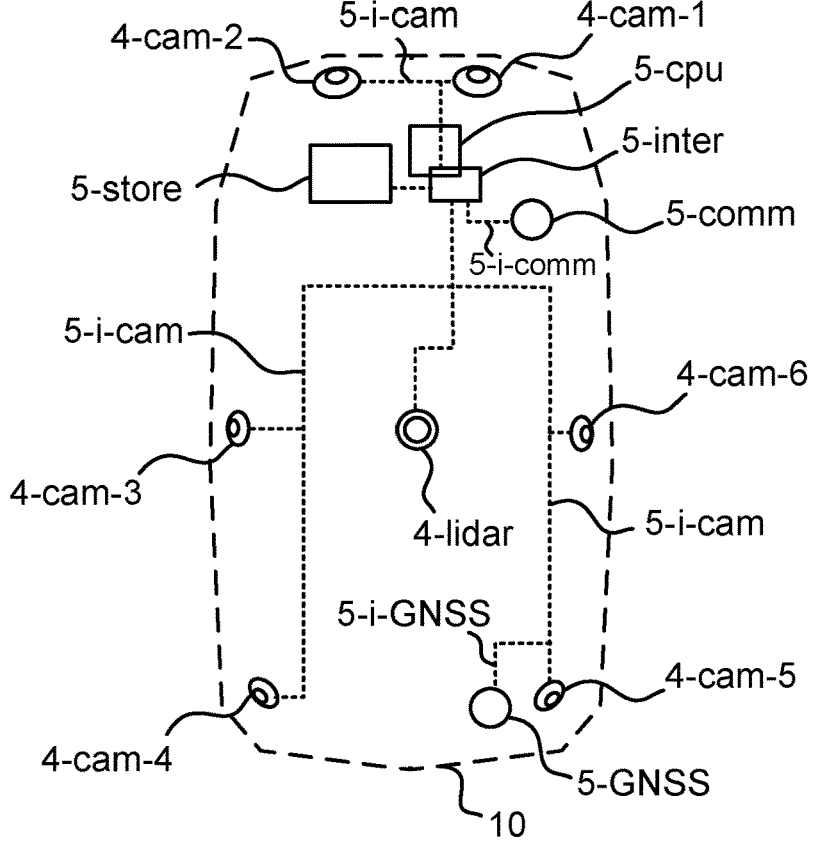
FIG. 2E illustrates one embodiment of an on-road vehicle employing various resources and sensors.

FIG. 2E illustrates one embodiment of an on-road vehicle 10 employing a data interface 5-inter associated using various interfaces to various resources and sensors on-board the vehicle. The data interface 5-inter may comprise or utilize: a computational element 5-cpu and a data storage space 5-store; an interface 5-i-cam to imagery sensors 4-cam-1, 2, 3, 4, 5, 6 and lidar (light-detection-and-ranging) sensors 4-lidar; an interface 5-i-comm to a wireless communication system 5-comm; and an interface 5-i-GNSS to a GNSS sensor onboard. The data interface 5-data may utilize the various interfaces, resources, and sensors to control and realize various functions in vehicle 10 that are not necessarily associated with driving the vehicle autonomously, in which such functions may be associated with some of the embodiments.

Figure 3A:
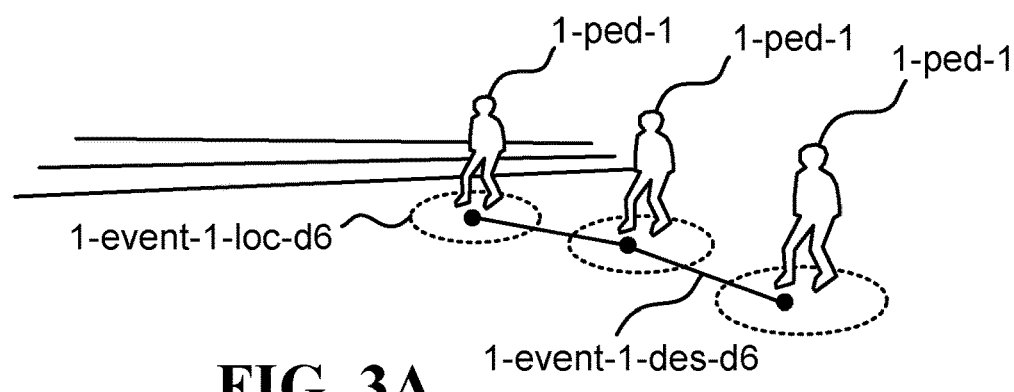
FIG. 3A illustrates one embodiment of an event description generated by a certain on-road vehicle from imagery data taken by the vehicle in conjunction with a particular object.

FIG. 3A illustrates one embodiment of a description 1-event-1-des-d6 of a first event, such as a description of a pedestrian 1-ped-1 walking or acting in a certain way, generated by a certain on-road vehicle 10d (FIG. 1D) from imagery data taken by the vehicle 10d in conjunction with a particular object such as pedestrian 1-ped-1. The event description 1-event-1-des-d6 is associated with a certain location 1-event-1-loc-d6 at which the event took place.

Figure 3B:
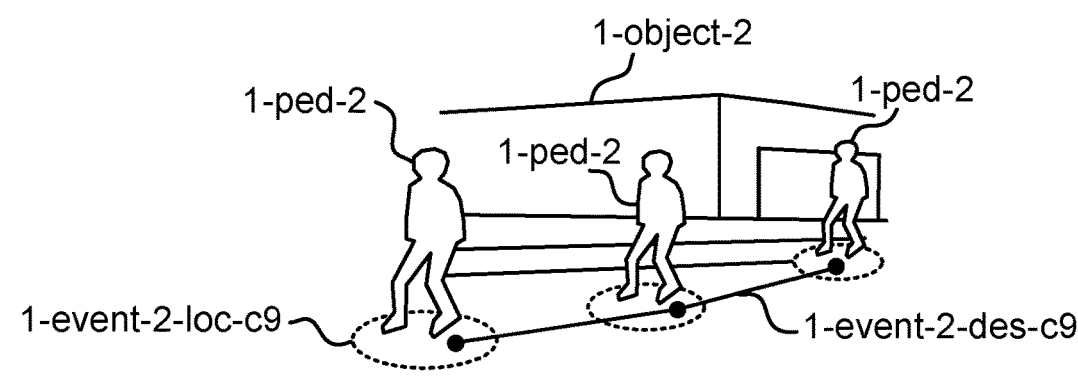
FIG. 3B illustrates one embodiment of another event description generated by another on-road vehicle from imagery data taken by the vehicle in conjunction with a second object.

FIG. 3B illustrates one embodiment of a description 1-event-2-des-c9 of a second event, such as a second pedestrian 1-ped-2 walking or acting in a certain way, generated by another on-road vehicle 10c (FIG. 1D) from imagery data taken by the vehicle 10c in conjunction with a second object such as second pedestrian 1-ped-2. The event description 1-event-2-des-c9 is associated with a certain location 1-event-2-loc-c9 at which the second event took place.

Figure 3C:
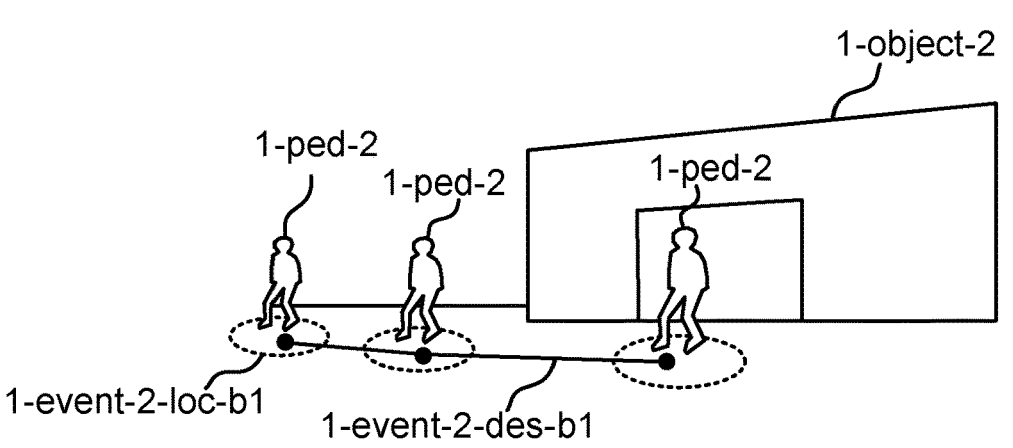
FIG. 3C illustrates one embodiment of yet another event description generated by yet another on-road vehicle from imagery data taken by the vehicle in conjunction with the same second object.

FIG. 3C illustrates one embodiment of a description 1-event-2-des-b1 of the same second event, such as the same second pedestrian 1-ped-2 walking or acting in the certain way, generated by yet another on-road vehicle 10b (FIG. 1D) from imagery data taken by the vehicle 10b in conjunction with the same second pedestrian 1-ped-2. The event description 1-event-2-des-b1 is associated with a certain location 1-event-2-loc-b1 at which the second event took place. Event descriptions 1-event-2-des-b1 (FIG. 3C) and 1-event-2-des-c9 (FIG. 3B) may be combined in order to generate a better overall description of the second event, in which a second pedestrian 1-ped-2 was walking or acting in the certain way.

Figure 3D:
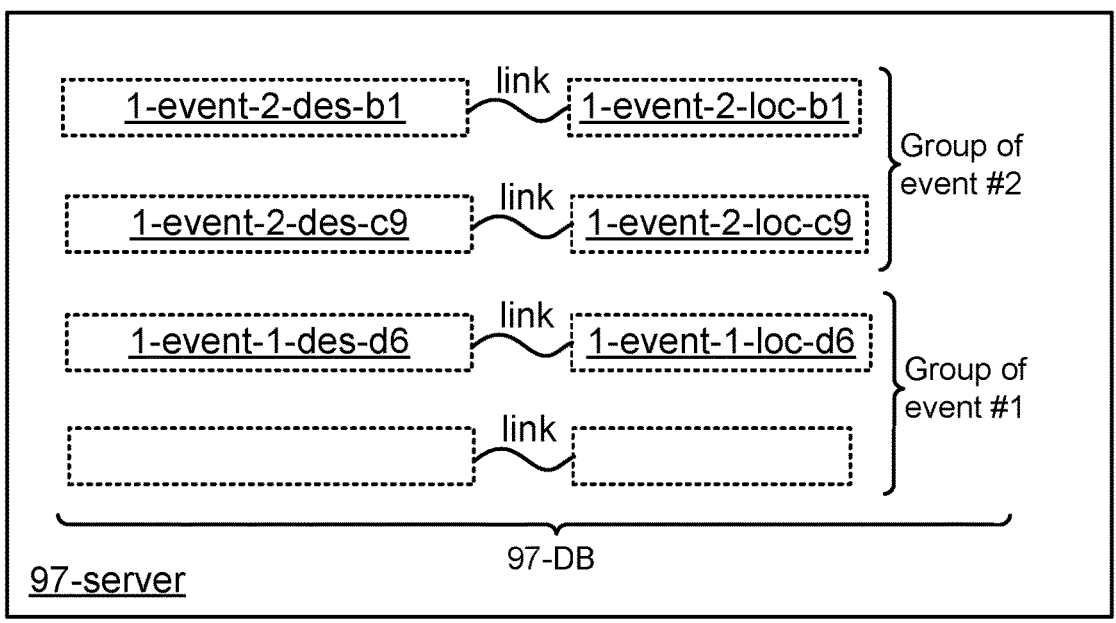
FIG. 3D illustrates one embodiment of a server receiving from the on-road vehicles specific event descriptions associated respectively with related geo-locations of detection.

FIG. 3D illustrates one embodiment of a server 97-server receiving from the on-road vehicles 10b, 10c, 10d (FIG. 1D), respectively, specific event descriptions 1-event-2-des-b1, 1-event-2-des-c9, 1-event-1-des-d6 associated respectively with related geo-locations of detection 1-event-2-loc-b1, 1-event-2-loc-c9, 1-event-1-loc-d6. The server 97-server may generate a database 97-DB comprising the event-descriptions 1-event-2-des-b1, 1-event-2-des-c9, 1-event-1-des-d6 linked with the respective locations-of-detection 1-event-2-loc-b1, 1-event-2-loc-c9, 1-event-1-loc-d6. The server may group together descriptions associated with the same event. For example, descriptions 1-event-2-des-b1, 1-event-2-des-c9 may be grouped together as they describe the same second event, in which a second pedestrian 1-ped-2 was walking or acting in the certain way.

One embodiment is a system operative to analyze imagery data obtained from a plurality of autonomous on-road vehicles, comprising: a server 98-server (FIG. 2D); and a plurality of data interfaces 5-inter-a, 5-inter-b, 5-inter-c, 5-inter-d, 5-inter-e, 5-inter-f (FIG. 1E) located respectively onboard a plurality of autonomous on-road vehicles 10a, 10b, 10c, 10d, 10e, 10f (FIG. 1D) moving in a certain geographical area 1-GEO-AREA, in which each of the data interfaces is configured to: (i) detect objects 1-object-1, 1-object-2, 1-object-3, 1-object-4, 1-object-5, 1-ped-1, 1-ped-2 (FIG. 1D) in areas 20-area-1, 20-area-2, 20-area-3, 20-area-4 (FIG. 1D) surrounding locations 10-loc-1, 10-loc-2, 10-loc-3, 10-loc-4, 10-loc-5 (FIG. 1D) visited by the respective autonomous on-road vehicle (e.g., 5-inter-b onboard 10b detects object 1-ped-2, 5-inter-c onboard 10c detects 1-ped-2 as well, and 5-inter-d onboard 10d detects 1-ped-1), (ii) generate an object-description of each of said objects detected (e.g., 5-inter-b onboard 10b generates the object description 1-ped-2-des-b1 (FIG. 2C) of pedestrian 1-ped-2 detected, 5-inter-c onboard 10c generates the object description 1-ped-2-des-c9 (FIG. 2B) of the same pedestrian 1-ped-2, and 5-inter-d onboard 10d generates the object description 1-ped-1-des-d6 (FIG. 2A) of another pedestrian 1-ped-1 detected), and (iii) send to the server 98-server the object-descriptions generated 1-ped-2-des-b1, 1-ped-2-des-c9, 1-ped-1-des-d6, in which each of the object-descriptions is sent together with a location-of-detection associated with the respective object detected (e.g., 5-inter-b sends 1-ped-2-des-b1 together with location-of-detection 1-ped-2-loc-b1 (FIG. 2C), 5-inter-c sends 1-ped-2-des-c9 together with location-of-detection 1-ped-2-loc-c9 (FIG. 2B), and 5-inter-d sends 1-ped-1-des-d6 together with location-of-detection 1-ped-1-loc-d6 (FIG. 2A)).

In one embodiment, the server 98-server is configured to: receive, per each of the data interfaces (e.g., 5-inter-b, 5-inter-c, 5-inter-d), said object-descriptions (e.g., 1-ped-2-des-b1, 1-ped-2-des-c9, 1-ped-1-des-d6 are received respectively) and the respective locations-of-detection (e.g., 1-ped-2-loc-b1, 1-ped-2-loc-c9, 1-ped-1-loc-d6 are received respectively), thereby receiving, overall, a plurality of object-descriptions 1-ped-2-des-b1, 1-ped-2-des-c9, 1-ped-1-des-d6 and a plurality of respective locations-of-detection 1-ped-2-loc-b1, 1-ped-2-loc-c9, 1-ped-1-loc-d6; and generate a database 98-DB (FIG. 2D) comprising said plurality of object-descriptions 1-ped-2-des-b1, 1-ped-2-des-c9, 1-ped-1-des-d6 and said plurality of respective locations-of-detection 1-ped-2-loc-b1, 1-ped-2-loc-c9, 1-ped-1-loc-d6.

In one embodiment, as a phase in said database generation, the server 98-server is further configured to: determine, using the plurality of locations-of-detection 1-ped-2-loc-b1, 1-ped-2-loc-c9, 1-ped-1-loc-d6, which object-descriptions in the plurality of object-descriptions are actually describing a same one of the objects (e.g., the location 1-ped-2-loc-b1 happens to be the same as location 1-ped-2-loc-c9, therefore the server 98-server determines that the related descriptions 1-ped-2-des-b1, 1-ped-2-des-c9 are actually describing a single object 1-ped-2. The location 1-ped-1-loc-d6 happens to be different than locations 1-ped-2-loc-b1, 1-ped-2-locc9, therefore the server 98-server determines that the related description 1-ped-1-des-d6 describes a different object 1-ped-1); and per each of the objects for which at least two object-descriptions exist (e.g., per 1-ped-2 having the two descriptions 1-ped-2-des-b1, 1-ped-2-des-c9), group all of the object-descriptions that were determined to describe the same object (e.g., group 1-ped-2-des-b1, 1-ped-2-des-c9 together), thereby associating each of at least some of the objects (e.g., object 1-ped-2) with at least two object-descriptions 1-ped-2-des-b1, 1-ped-2-des-c9, and thereby increasing an amount of descriptive information associated with at least some of the objects 1-ped-2.

In one embodiment, per each of the objects (e.g., per 1-ped-2), the server 98-server is further configured to use the object-descriptions 1-ped-2-des-b1, 1-ped-2-des-c9 grouped for that object 1-ped-2 in order to classify the object (e.g., classify 1-ped-2 as a pedestrian, and further classify 1-ped-2 as a male pedestrian, and perhaps further classify 1-ped-2 using 1-ped-2-des-c9 as a happy person who is about to go shopping).

In one embodiment, as a result of said determination and grouping, each of the objects (e.g., 1-ped-1, 1-ped-2) is represented only once in the database 98-DB as one of the groups, despite possibly being detected multiple times by one autonomous on-road vehicle, or despite possibly being detected multiple times by several of the autonomous on-road vehicles.

In one embodiment, the server 98-server is further configured to: use said classifications to cluster the objects into several clusters (e.g., one cluster is a cluster of pedestrians, comprising the pedestrians 1-ped-1, 1-ped-2), in which each cluster includes only object being of the same type; and count the number of objects in at least one of the clusters (e.g., count two pedestrians 1-ped1, 1-ped-2 in the cluster of pedestrians), thereby estimating the number of objects being of a certain same type which are located in said certain geographical area 1-GEO-AREA.

In one embodiment, as a result of said determination and grouping, each of the objects is represented only once in the database as one of the groups, despite possibly being detected multiple times by one autonomous on-road vehicle, or despite possibly being detected multiple times by several of the autonomous on-road vehicles; and the server 98-server is further configured to: use said grouping in order to generate a detailed object-level description, including object locations, of at least some areas (e.g., areas 20-area-1, 20-area-2, 20-area-3 respectively, FIG. 1C) within said certain geographical area 1-GEO-AREA.

In one embodiment, said classification is an improved classification as a result of said increasing of the amount of descriptive information associated with at least some of the objects (e.g., 1-ped-2-des-b1 by itself may be used to determine that 1-ped-2 is a pedestrian, but only when combining 1-ped-2-des-b1 with 1-ped-2-des-c9 it can be determined that 1-prd-2 is a male having certain intensions).

In one embodiment, per each of the objects (e.g., per 1-ped-2) for which at least two object-descriptions 1-ped-2-des-b1, 1-ped-2-des-c9 and the respective locations-of-detection 1-ped-2-loc-b1, 1-ped-2-loc-c9 exist, the server 98-server is further configured to group all of the locations-of-detection 1-ped-2-loc-b1, 1-ped-2-loc-c9 that are determined to be associated with the same object 1-ped-2, thereby associating each of at least some of the objects with at least two locations-of-detection, and thereby increasing the accuracy of location detection for these objects.

In one embodiment, each of said locations-of-detection is determined, per each of the objects detected, using a technique associated with at least one of: (i) a parallax technique associated with stereographic vision utilized by the respective data interface and involving at least two imagery sensors (such as 4-cam-5, 4-cam-6, FIG. 1A) onboard the respective autonomous on-road vehicle, and (ii) a laser range-finding technique utilized by the respective data interface and involving a lidar (light-detection-and-ranging) device (such as 4-lodar, FIG. 1A) onboard the respective autonomous on-road vehicle.

In one embodiment, each of at least some of the data interfaces (e.g., 5-inter, FIG. 2E, which could be anyone of 5-inter-a, b, c, d, e, f, FIG. 1E) comprises: a computational element 5-cpu (FIG. 2E); an interface 5-i-cam (FIG. 2E) to imagery sensors 4-cam-1, 2, 3, 4, 5, 6 and lidar (light-detection-and-ranging) sensors 4-lidar (FIG. 2E) onboard the respective autonomous on-road vehicle; an interface 5-i-comm (FIG. 2E) to a wireless communication system 5-comm (FIG. 2E) onboard the respective autonomous on-road vehicle; and an interface 5-i-GNSS (FIG. 2E) to a GNSS sensor onboard the respective autonomous on-road vehicle; in which: said detection and generation is done in said computational element 5-cpu; said location-of-detection is produced in conjunction with said imagery sensors 4-cam, lidar sensors 4-lidar, and GNSS sensor 5-GNSS; and said sending is facilitated by the wireless communication system 5-comm.

In one embodiment, said computational element 5-cpu is at least part of a computational system 5-cpu, 5-store utilized by the respective autonomous on-road vehicle (e.g., 10a, b, c, d, e, f) to drive autonomously.

In one embodiment, said object-description is associated with at least one of: (i) facial markers (1-ped-2-des-c9, FIG. 2B), (ii) feature-extraction, (iii) machine-learning based data compression, and (iv) neural-network aided feature detection.

In one embodiment, each of said objects is associated with at least one of: (i) a building or a structure off-road, such as 1-object-2, (ii) an obstacle such as a foreign object on-road, (iii) a specific person such as a missing person or a celebrity, (iv) a branded object such as a specific brand shirt or shoes, in which the branded object is worn by person 1-ped-2, and (v) other vehicles on-road or objects associated therewith such as a plate number.

In one embodiment, each of the descriptions takes up less data than the imagery data from which the description was generated, and therefore the respective autonomous on-road vehicle is able to send the descriptions to the server, while being unable or constrained to send the imagery data to the server.

In one embodiment, each of the autonomous on-road vehicles is able to send more than 10 descriptions per second, as a result of each description taking up less than 10 (ten) kilobytes of data.

One embodiment is a system operative to analyze imagery data obtained from a plurality of autonomous on-road vehicles, comprising: a server 97-server (FIG. 3D); and a plurality of data interfaces 5-inter-a, 5-inter-b, 5-inter-c, 5-inter-d, 5-inter-e, 5-inter-f (FIG. 1E) located respectively onboard a plurality of autonomous on-road vehicles 10a, 10b, 10c, 10d, 10e, 10f (FIG. 1D) moving in a certain geographical area 1-GEO-AREA, in which each of the data interfaces is configured to: (i) detect events while occurring in areas 20-area-1, 20-area-2, 20-area-3, 20-area-4 (FIG. 1D) surrounding locations 10-loc-1, 10-loc-2, 10-loc-3, 10-loc-4, 10-loc-5 (FIG. 1D) visited by the respective autonomous on-road vehicle, (ii) generate an event-description of each of said events detected (e.g., 5-inter-b onboard 10*b* generates the event description 1-event-2-des-b1 (FIG. 3C) that describes an event of a pedestrian 1-ped-2 exiting a shop 1-object-2, 5-inter-c onboard 10*c* generates the event description 1-event-2-des-c9 (FIG. 3B) that describes the same event of the same pedestrian 1-ped-2 exiting the same shop 1-object-2, and 5-inter-d onboard 10*d* generates the event description 1-des-1-des-d6 (FIG. 3A) that describes another event of another pedestrian 1-ped-1 crossing the street), and (iii) send to the server 97-server (FIG. 3D) the event-descriptions generated 1-event-2-des-b1, 1-event-2-des-c9, 1-event-1-des-d6, in which each of the event-descriptions is sent together with a location-of-detection associated with the respective event detected (e.g., 5-inter-b sends 1-event-2-des-b1 together with location-of-detection 1-event-2-loc-b1 (FIG. 3C), 5-inter-c sends 1-event-2-des-c9 together with location-of-detection 1-event-2-loc-c9 (FIG. 3B), and 5-inter-d sends 1-event-1-des-d6 together with location-of-detection 1-event-1-loc-d6 (FIG. 3A)).

In one embodiment, the server 97-server is configured to: receive, per each of the data interfaces (e.g., 5-inter-b, 5-inter-c, 5-inter-d), said event-descriptions (e.g., 1-event-2-des-b1, 1-event-2-des-c9, 1-event-1-des-d6 are received respectively) and the respective locations-of-detection (e.g., 1-event-2-loc-b1, 1-event-2-loc-c9, 1-event-1-loc-d6 are received respectively), thereby receiving, overall, a plurality of event-descriptions 1-event-2-des-b1, 1-event-2-des-c9, 1-event-1-des-d6 and a plurality of respective locations-of-detection 1-event-2-loc-b1, 1-event-2-loc-c9, 1-event-1-loc-d6; and generate a database 97-DB (FIG. 3D) comprising said plurality of event-descriptions 1-event-2-des-b1, 1-event-2-des-c9, 1-event-1-des-d6 and said plurality of respective locations-of-detection 1-event-2-loc-b1, 1-event-2-loc-c9, 1-event-1-loc-d6.

In one embodiment, as a phase in said database generation, the server 97-server is further configured to: determine, using the plurality of locations-of-detection 1-event-2-loc-b1, 1-event-2-loc-c9, 1-event-1-loc-d6, which event-descriptions in the plurality of event-descriptions are actually describing a same one of the events (e.g., the location 1-event-2-loc-b1 happens to be the same as location 1-event-2-loc-c9, therefore the server 97-server determines that the related descriptions 1-event-2-des-b1, 1-event-2-des-c9 are actually describing a single event. The location 1-event-1-loc-d6 happens to be different than locations 1-event-2-loc-b1, 1-event-2-loc-c9, therefore the server 97-server determines that the related description 1-event-1-des-d6 describes a different event); and per each of the events for which at least two event-descriptions exist (e.g., per the event having the two descriptions 1-event-2-des-b1, 1-event-2-des-c9), group all of the event-descriptions that were determined to describe the same event (e.g., group 1-event-2-des-b1, 1-event-2-des-c9 together), thereby associating each of at least some of the events (e.g., the event of the pedestrian 1-ped-2 exiting the shop 1-object-2) with at least two event-descriptions 1-event-2-des-b1, 1-event-2-des-c9, and thereby increasing an amount of descriptive information associated with at least some of the events.

In one embodiment, per each of the events (e.g., per event of the pedestrian 1-ped-2 exiting the shop 1-object-2), the server 97-server is further configured to use the event-descriptions 1-event-2-des-b1, 1-event-2-des-c9 grouped for that event in order to classify the event (e.g., using 1-event-2-des-b1 to classify the event as a shopping event, and further using 1-event-2-des-c9 to determined what was shopped by 1-ped-2).

In one embodiment, as a result of said determination and grouping, each of the events is represented only once in the database 97-DB as one of the groups, despite possibly being detected multiple times by one autonomous on-road vehicle, or despite possibly being detected multiple times by several of the autonomous on-road vehicles. In one embodiment, the grouping is done not only by grouping events associated with a single location, but also by grouping events associated with a single particular point in time. In one embodiment, the grouping is done by grouping together events that are all: (i) associated with a certain location and (ii) associated with a particular point in time. For example, the location 1-event-2-loc-b1 happens to be the same as location 1-event-2-loc-c9, therefore the server 97-server determines that the related descriptions 1-event-2-des-b1, 1-event-2-des-c9 are actually describing a single event, but only if both descriptions 1-event-2-des-b1, 1-event-2-des-c9 are also associated with a single particular period in time during which the single event took place.

In one embodiment, said classification is an improved classification as a result of said increasing of the amount of descriptive information associated with at least some of the events (e.g., 1-event-2-des-b1 by itself may be used to determine that 1-ped-2 exited a shop, but only when combining 1-event-2-des-b1 with 1-event-2-des-c9 it can be determined that 1-prd-2 is walking in a manner indicative of a satisfied customer).

In one embodiment, each of said events is associated with at least one of: (i) a crime event, (ii) a traffic event such as a car leaving parking, or a traffic violation such as a car crossing in red light, or an accident (iii) people grouping together, (iv) people reading street ads, (v) people entering or exiting a building such as a store, (vi) a traffic congestion, and (vii) a malfunction event such as a car getting stuck on road or a hazard evolving.

In one embodiment, said event-descriptions 1-event-2-des-b1, 1-event-2-des-c9, 1-event-1-des-d6 are generated using a technique associated with at least one of: (i) motion detection, (ii) object tracking, (iii) object analysis, (iii) gesture analysis, (iv) behavioral analysis, and (v) machine learning prediction and classification models.

Figure 4A:
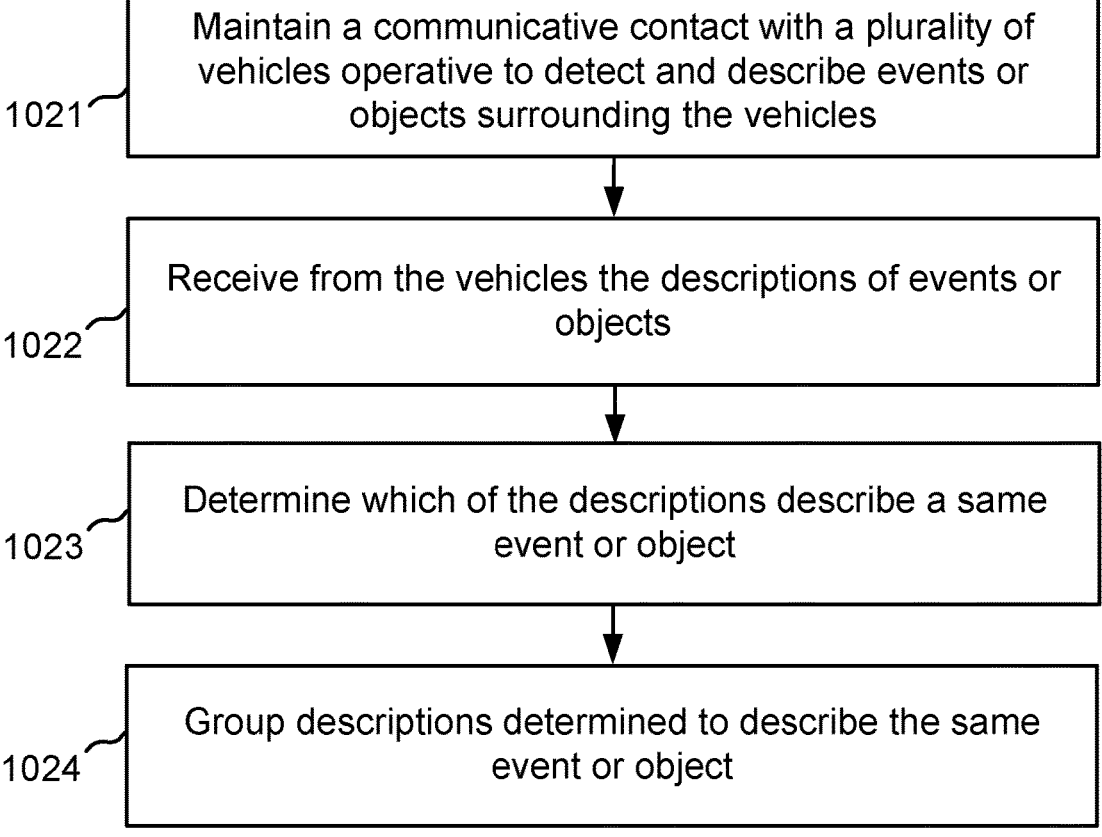
FIG. 4A illustrates one embodiment of a method for analyzing imagery data obtained from a plurality of autonomous on-road vehicles.

FIG. 4A illustrates one embodiment of a method for analyzing imagery data obtained from a plurality of autonomous on-road vehicles. The method comprises: In step 1021, maintaining, by a server 98-server (FIG. 2D) or 97-server (FIG. 3D), a communicative contact with a plurality of data interfaces 5-inter-a, 5-inter-b, 5-inter-c, 5-inter-d, 5-inter-e, 5-inter-f (FIG. 1E) located respectively onboard a plurality of autonomous on-road vehicles 10*a*, 10*b*, 10*c*, 10*d*, 10*e*, 10*f* (FIG. 1D) moving in a certain geographical area 1-GEO-AREA, in which each of the data interfaces: (i) detects objects or events in areas 20-area-1, 20-area-2, 20-area-3, 20-area-4 (FIG. 1D) surrounding locations 10-loc-1, 10-loc-2, 10-loc-3, 10-loc-4, 10-loc-5 (FIG. 1D) visited by the respective autonomous on-road vehicle, (ii) generates a description 1-event-2-des-b1, 1-event-2-des-c9, 1-event-1-des-d6 (FIG. 3A, FIG. 3B, FIG. 3A), 1-ped-2-des-b1, 1-ped-2-des-c9, 1-ped-1-des-d6 (FIG. 2A, FIG. 2B, FIG. 2C) of each of said objects or events detected, and (iii) sends to the server 98-server or 97-server the descriptions generated 1-event-2-des-b1, 1-event-2-des-c9, 1-event-1-des-d6, 1-ped-2-des-b1, 1-ped-2-des-c9, 1-ped-1-des-d6, in which each of the descriptions is sent together with a location-of-detection (1-event-2-loc-b1, 1-event-2-loc-c9, 1-event-1-loc-d6 (FIG. 3A, FIG. 3B, FIG. 3A), 1-ped-2-loc-b1, 1-ped-2-loc-c9, 1-ped-1-loc-d6 (FIG. 2A, FIG. 2B, FIG. 2C) associated with the respective object or event detected. In step 1022, receiving, in the sever 98-server or 97-server, per each of the data interfaces, said descriptions and the respective locations-of-detection, thereby receiving, overall, a plurality of descriptions 1-event-2-des-b1, 1-event-2-des-c9, 1-event-1-des-d6, 1-ped-2-des-b1, 1-ped-2-des-c9, 1-ped-1-des-d6 and a plurality of respective locations-of-detection 1-event-2-loc-b1, 1-event-2-loc-c9, 1-event-1-loc-d6, 1-ped-2-loc-b1, 1-ped-2-loc-c9, 1-ped-1-loc-d6. In step 1023, determining, by the server 98-server or 97-server, using the plurality of locations-of-detection 1-event-2-loc-b1, 1-event-2-loc-c9, 1-event-1-loc-d6, 1-ped-2-loc-b1, 1-ped-2-loc-c9, 1-ped-1-loc-d6, which descriptions in the plurality of descriptions 1-event-2-des-b1, 1-event-2-des-c9, 1-event-1-des-d6, 1-ped-2-des-b1, 1-ped-2-des-c9, 1-ped-1-des-d6 are actually describing a same one of the objects or events (e.g., the location 1-ped-2-loc-b1 happens to be the same as location 1-ped-2-loc-c9, therefore the server 98-server determines that the related descriptions 1-ped-2-des-b, 1-ped-2-des-c9 are actually describing a single object 1-ped-2. The location 1-ped-1-loc-d6 happens to be different than locations 1-ped-2-loc-b1, 1-ped-2-loc-c9, therefore the server 98-server determines that the related description 1-ped-1-des-d6 describes a different object 1-ped-1. In another example, the location 1-event-2-loc-b1 happens to be the same as location 1-event-2-loc-c9, therefore the server 97-server determines that the related descriptions 1-event-2-des-b1, 1-event-2-des-c9 are actually describing a single event. The location 1-event-1-loc-d6 happens to be different than locations 1-event-2-loc-b1, 1-event-2-loc-c9, therefore the server 97-server determines that the related description 1-event-1-des-d6 describes a different event). In step 1024, per each of the objects or events for which at least two descriptions exist (e.g., per the event having the two descriptions 1-event-2-des-b1, 1-event-2-des-c9, or per 1-ped-2 having the two descriptions 1-ped-2-des-b1, 1-ped-2-des-c9), grouping, in the server 98-server or 97-server, all of the descriptions that were determined to describe the same object or event (e.g., group 1-ped-2-des-b1, 1-ped-2-des-c9 together, and group 1-event-2-des-b1, 1-event-2-des-c9 together), thereby associating each of at least some of the objects or events with at least two descriptions, and thereby increasing an amount of descriptive information associated with at least some of the objects or events.

In one embodiment, the method further comprises, per each of the objects or events, using the descriptions grouped for that object or event in order to classify the object or event.

Figure 4B:
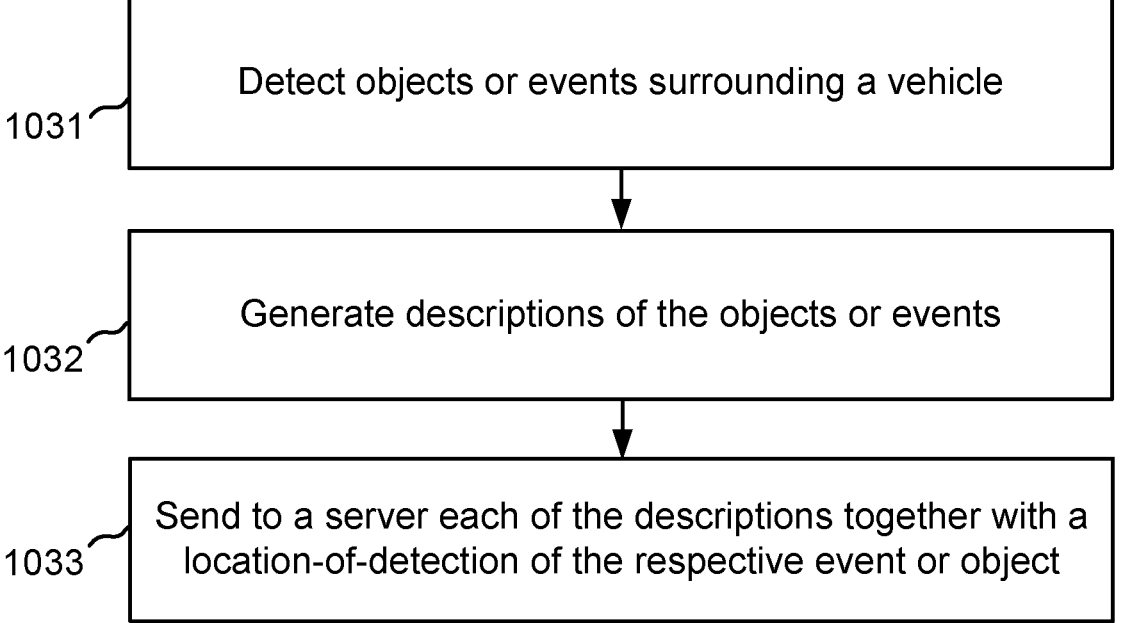
FIG. 4B illustrates one embodiment of a method for analyzing imagery data obtained in an autonomous on-road vehicle.

FIG. 4B illustrates one embodiment of a method for analyzing imagery data obtained in an autonomous on-road vehicle. The method comprises: In step 1031, detecting, in an autonomous on-road vehicle 10b (FIG. 1D), objects or events in areas 20-area-1, 20-area-2, 20-area-3, 20-area-4 (FIG. 1D) surrounding locations 10-loc-1, 10-loc-2, 10-loc-3, 10-loc-4, 10-loc-5 (FIG. 1D) visited by the autonomous on-road vehicle. In step 1032, generating, in an autonomous on-road vehicle 10b, a description (e.g., 1-ped-2-des-b1, FIG. 2C, 1-event-2-des-b1, FIG. 3C) of each of said objects or events detected. In step 1033, sending wirelessly, to a server 98-server (FIG. 2D) or 97-server (FIG. 3D), the descriptions generated 1-ped-2-des-b1, 1-event-2-des-b1, in which each of the descriptions is sent together with a location-of-detection (e.g., 1-ped-2-loc-b1, FIG. 2C, 1-event-2-loc-b1, FIG. 3C) associated with the respective object or event detected.

In one embodiment, each of said descriptions 1-ped-2-des-b1, 1-event-2-des-b1 is generated so as to take up less than 10 (ten) kilobytes of data, and therefore said sending wirelessly of the descriptions does not constraint a wireless bandwidth limitation associated with the autonomous on-road vehicle 10b.

In one embodiment, said descriptions 1-ped-2-des-b1, 1-event-2-des-b1 are associated with image compassion achieved in conjunction with at least one of: (i) facial markers (1-ped-2-des-c9, FIG. 2B), (ii) feature-extraction, (iii) machine-learning based data compression, (iv) neural-network aided feature detection, (v) motion analysis, and (vi) object tracking.

Figure 5A:
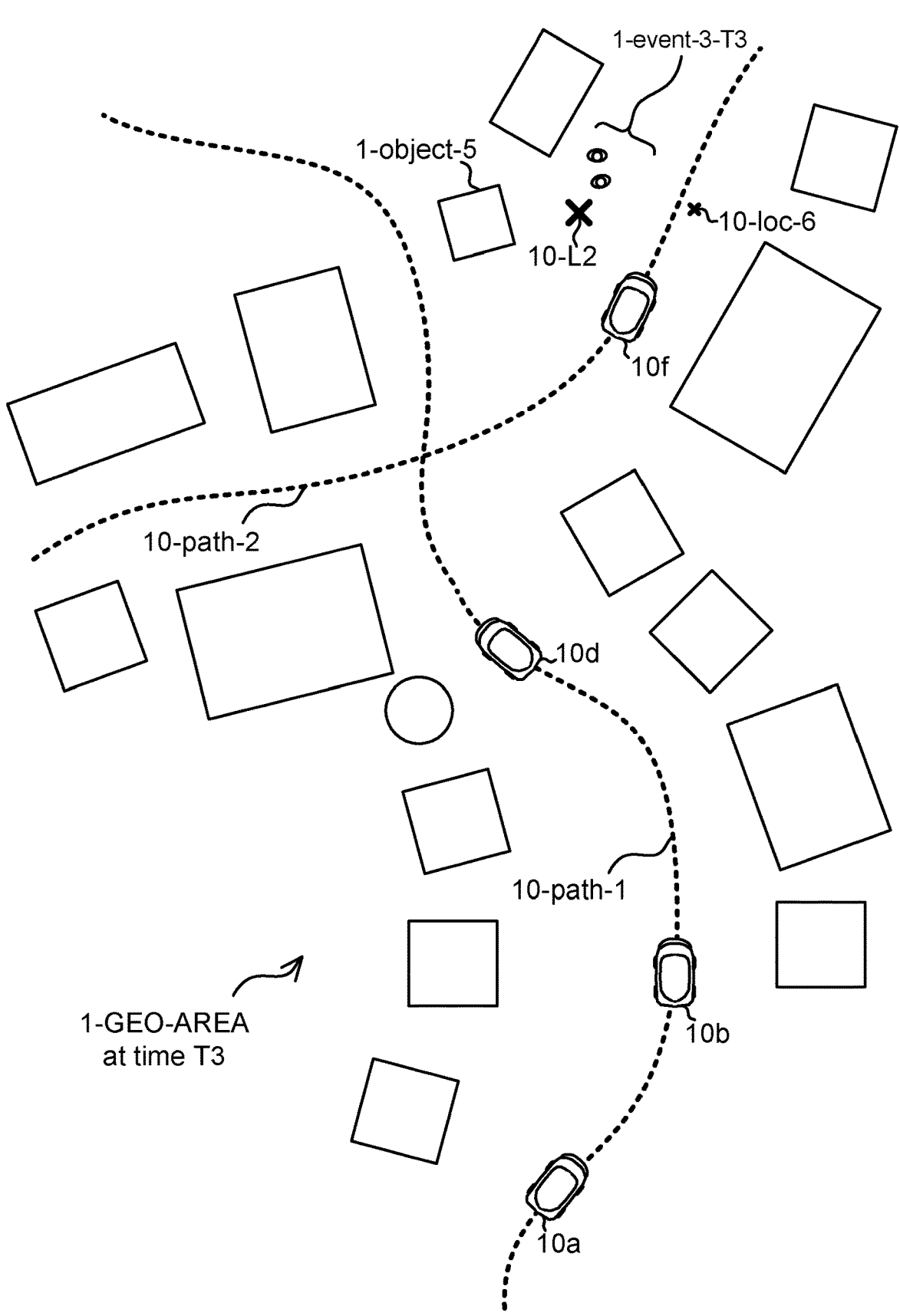
FIG. 5A illustrates one embodiment of an on-road vehicle passing by a certain event at a certain time.

FIG. 5A illustrates one embodiment of an on-road vehicle 10f passing by a certain event 1-event-3 at a certain time T3 (also referred to as 1-event-3-T3). The certain event takes place at location 10-L2, and the vehicle 10f captures the event from a near-by location 1-loc-6 along a path of progression 10-path-2. Other vehicles 10a, 10b, 10d and objects 1-object-5 are shown.

Figure 5B:
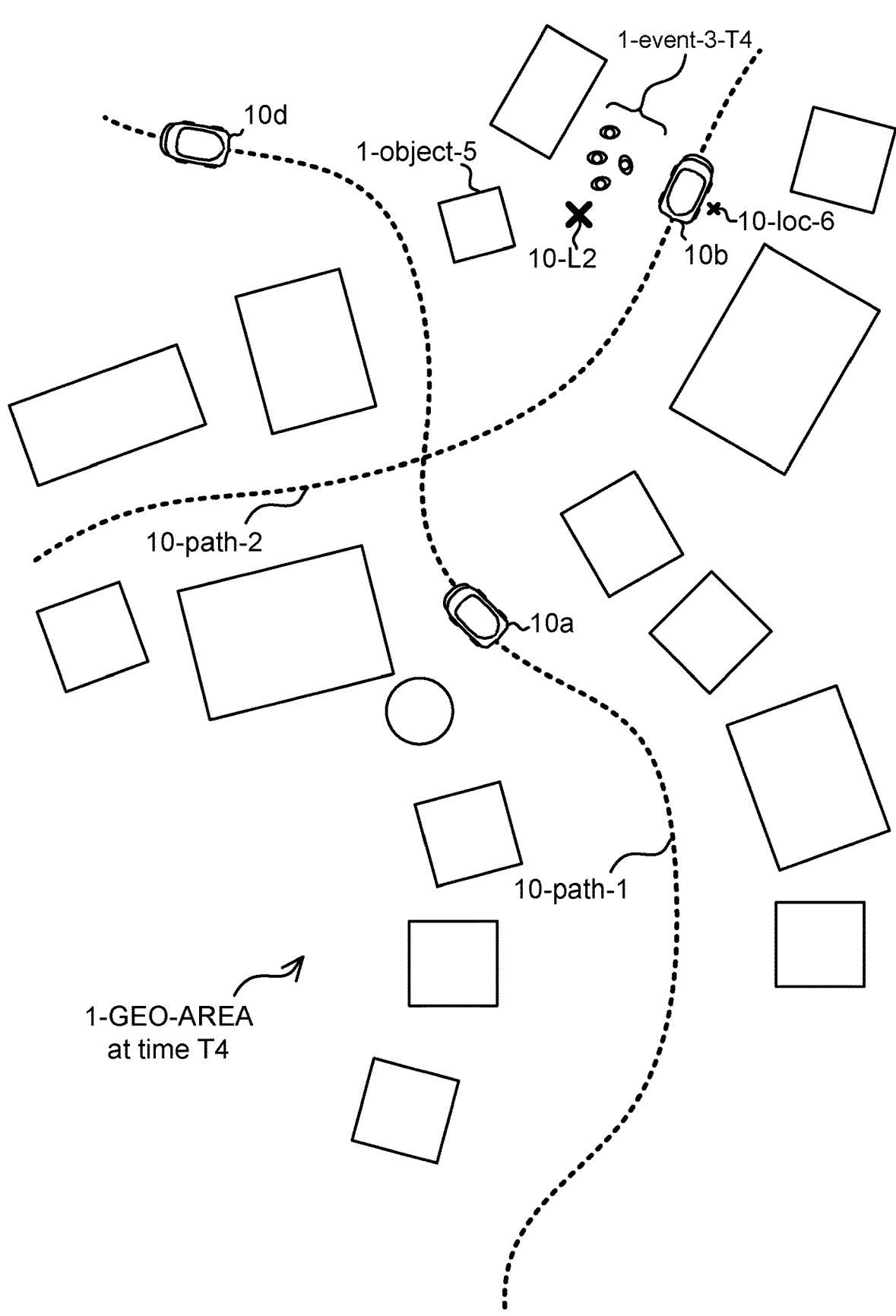
FIG. 5B illustrates one embodiment of another on-road vehicle passing by the same certain event at a later time.

FIG. 5B illustrates one embodiment another on-road vehicle 10b passing by the same certain event 1-event-3 at a later time T4 (also referred to as 1-event-3-T4). The certain event still takes place at location 10-L2, and the vehicle 10b captures the event from a near-by location 1-loc-6, or a different near-by location, along a path of progression 10-path-2. Other vehicles 10a, 10d and objects 1-object-5 are shown.

Figure 5C:
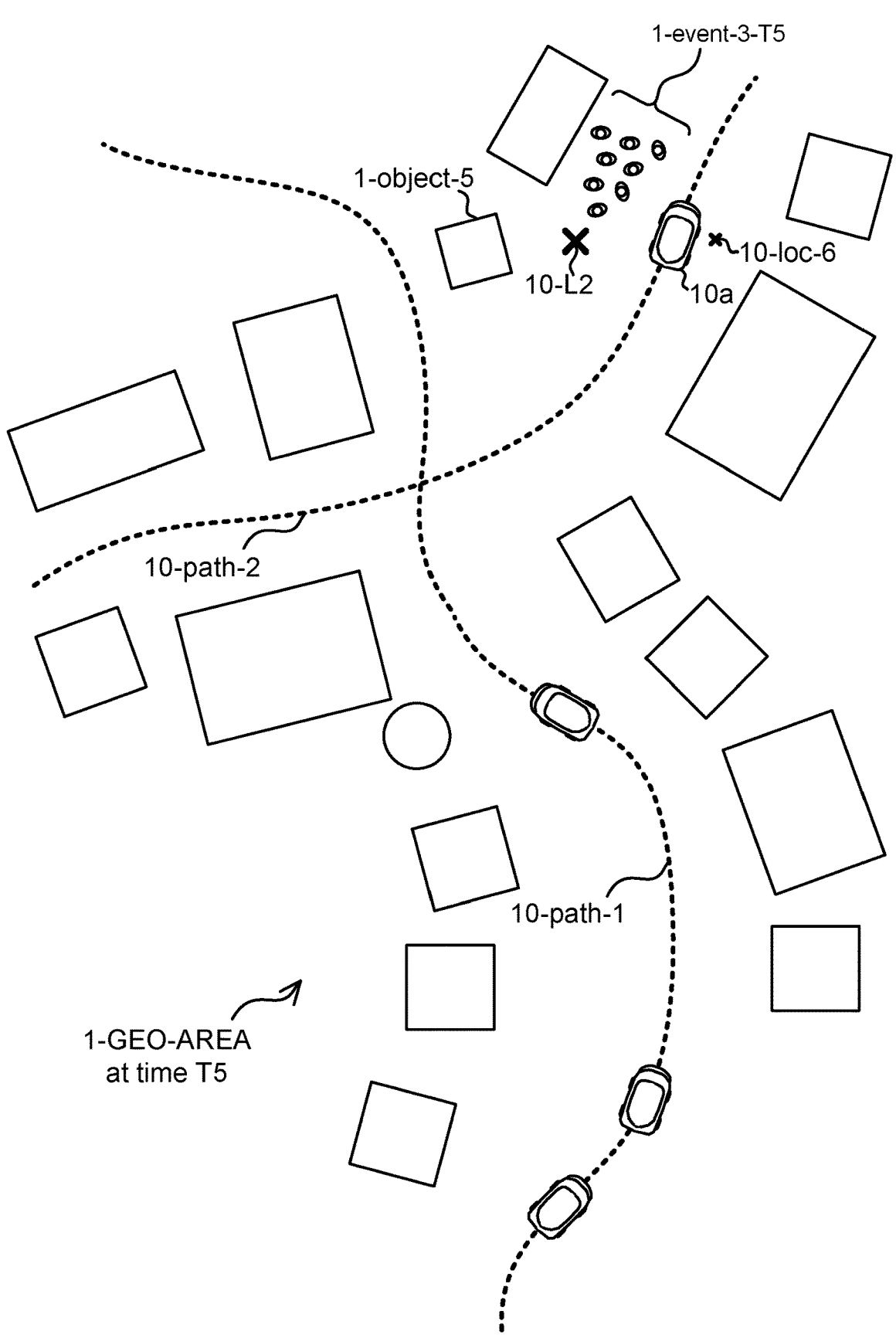
FIG. 5C illustrates one embodiment of yet another on-road vehicle passing by the same certain event at still a later time.

FIG. 5C illustrates one embodiment yet another on-road vehicle 10a passing by the same certain event 1-event-3 at still a later time T5 (also referred to as 1-event-3-T5). The certain event still takes place at location 10-L2, and the vehicle 10a captures the event from a near-by location 1-loc-6, or a different near-by location, along a path of progression 10-path-2. Other vehicles and objects 1-object-5 are shown.

FIG. 5D illustrates one embodiment of a server 96-server receiving an event description 1-event-3a-des-f from an on-road vehicle 10f (FIG. 5A) at a certain time T3, in which the event description 1-event-3a-des-f describes the event 1-event-3 at time T3, as detected and analyzed by vehicle 10f. The location 10-L2 of the event 1-event-3 is recorded.

FIG. 5E illustrates one embodiment of the server 96-server receiving a visual record 4-visual-b8 associated with the event 1-event-3, in which the visual record 4-visual-b8 is captured by another on-road vehicle 10b (FIG. 5B) at a later time T4, perhaps as a direct request made by server 96-server in order to gather additional information about the on-going event 1-event-3.

FIG. 5F illustrates one embodiment of the server 96-server receiving an additional visual record 4-visual-a7 associated with the event 1-event-3, in which the visual record 4-visual-a7 is captured by yet another on-road vehicle 10a (FIG. 5C) at still a later time T5, perhaps as an additional request made by server 96-server in order to gather yet additional information about the evolving event 1-event-3.

One embodiment is a system operative to first analyze initial imagery data and then obtain further imagery data using a plurality of autonomous on-road vehicles, comprising: a plurality of data interfaces 5-inter-a, 5-inter-b, 5-inter-c, 5-inter-d, 5-inter-e, 5-inter-f (FIG. 1E) located respectively onboard a plurality of autonomous on-road vehicles 10a, 10b, 10c, 10d, 10e, 10f (FIG. 1D) moving in a certain geographical area 1-GEO-AREA, in which each of the data interfaces is configured to: (i) initially detect and describe objects or events in areas surrounding locations visited by the respective autonomous on-road vehicle (e.g., 5-inter-f onboard 10f initially detects at time T3, as seen in FIG. 5A, a certain event 1-event-3-T3 involving two pedestrians at location 10-L2, and then describes this certain event), and (ii) send, for further analysis, the initial description of each of the objects or events 1-event-3-T3 detected together with a respective location 10-L2 (FIG. 5A) associated with said detection; and a server 96-server (FIG. 5D) configured to: (i) receive, from at least one of the autonomous on-road vehicles in the first plurality, at least a specific one of the initial descriptions of a specific one of the objects or events detected, together with the respective location of detection (in this example, server 96-server, in FIG. 5D, receives from 10f a description 1-event-3a-des-f of said certain event 1-event-3-T3 together with the location 10-L2 of this certain event), (ii) further analyze said initial specific description 1-event-3a-des-f, and (iii) send a request, to at least one of the other autonomous on-road vehicles in said certain geographical area (e.g., to 10a, 10b, 10d), to collect additional imagery data, at said respective location 10-L2, and in conjunction with the specific object or event 1-event-3-T3 detected; and at least one of the autonomous on-road vehicles (e.g., 10a, 10b), receiving said request, is configured to: (i) collect, at or in visual vicinity of the respective location, the additional imagery data associated with said specific object or event detected, and (ii) send back to the server said additional imagery data collected (e.g., 10b receives the request, passes near 10-L2 at time T4, as shown in FIG. 5B, takes a visual record of the certain event 1-event-3-T4, and sends the visual record 4-visual-b8 to server 96-server, FIG. 5E. Similarly, 10a receives the request, passes near 10-L2 at time T5, as shown in FIG. 5C, takes a visual record of the same certain event 1-event-3-T5, and sends the visual record 4-visual-a7 to server 96-server, FIG. 5F).

In one embodiment, the server 96-server is further configured to: receive said additional imagery data collected 4-visual-b8, 4-visual-a7; further analyze said additional imagery data collected 4-visual-b8, 4-visual-a7; and use said further analysis to make a final classification or a decision regarding the specific object or events detected (e.g., said certain event detected 1-event-3-T3,4,5 is concluded to be an escalating incident involving a growing number of pedestrians, and therefore the sever 96-server may decide to alert law enforcement elements).

In one embodiment, said request is sent only to those of the autonomous on-road vehicles that happens to be currently located at said respective location 10-L2 of the specific object or event 1-event-3-T3 detected, or that happens to be currently located in visual vicinity of the respective location of the specific object or event 1-event-3-T3 detected.

In one embodiment, said request is sent only to those of the autonomous on-road vehicles 10b that happens to already be planning to pass via said respective location 10-L2 of the specific object or event 1-event-3-T3 detected, or that are already planning to pass within visual vicinity of the respective location 10-L2 of the specific object or event 1-event-3-T3 detected.

In one embodiment, said request is sent to all of the autonomous on-road vehicles in said certain geographical area. In one embodiment, one of the on-road vehicles, that happens to be currently located at or in visual vicinity of the specific object or event 1-event-3-T3 detected, is said one of the on-road vehicles making the collection of the additional imagery data. In one embodiment, one of the on-road vehicles 10b, that happens to be already currently planning to pass via or in visual vicinity of the respective location 10-L2 of the specific object or event 1-event-3-T3 detected, is said one of the on-road vehicles making the collection of the additional imagery data 4-visual-b8. In one embodiment, one of the on-road vehicles 10a, that changes current navigation plans, to a new navigation plan to pass via or in visual vicinity of the respective location 10-L2 of the specific object or event 1-event-3-T3 detected, is said one of the on-road vehicles making the collection of the additional imagery data 4-visual-a7. For example, 10a (FIG. 5A) receives, at time T3 a request to collect additional imagery data of event 1-event-3-T3, however, 10a is planning to continue to drive on path 10-path-1, which does not pass close enough to event 1-event-3-T3, and therefore 10a decides to change the navigation plan, and to turn right into path 10-path-2, which passes close enough to 1-event-3-T3. 10a then passes, at time T5, near 1-event-3-T5 (FIG. 5C) and collects 4-visual-a7.

In one embodiment, at least several ones of the autonomous on-road vehicles (e.g., to 10a, 10b), receiving said request, are configured to: (i) perform said collection, at or in visual vicinity of the respective location 10-L2, of the additional imagery data 4-visual-b8, 4-visual-a7 associated with said specific object or event 1-event-3-T3 detected, and (ii) carry out said sending back to the server of said additional imagery data collected 4-visual-b8, 4-visual-a7, thereby resulting in a respective several ones of said additional imagery data associated with said specific object or event detected 1-event-3-T3. In one embodiment, said several ones of the additional imagery data 4-visual-b8, 4-visual-a7 associated with said specific object or event 1-event-3-T3 detected are collected at different several times T4, T5 by the respective several autonomous on-road vehicles 10b, 10a, thereby making said several ones of the additional imagery data 4-visual-b8, 4-visual-a7 an image sequence that evolves over time T4, T5. In one embodiment, the server 96-server is further configured to use said image sequence 4-visual-b8, 4-visual-a7 evolving over time T4, T5 to further analyze said specific object or event 1-event-3-T3 evolving over time 1-event-3-T4, 1-event-3-T5. In one embodiment, said specific event 1-event-3-T3 evolving over time 1-event-3-T4, 1-event-3-T5 is associated with at least one of: (i) a crime event, (ii) a traffic event such as a car leaving parking or a traffic violation such as a car crossing in red light, (iii) people grouping together, (iv) people reading street ads, (v) people entering or exiting a building such as a store, (vi) a traffic congestion, and (vii) a malfunction event such as a car getting stuck on road or a hazard evolving.

FIG. 5G illustrates one embodiment of a method for analyzing initial imagery data and then obtaining further imagery data using a plurality of autonomous on-road vehicles. The method comprises: In step 1041, maintaining, by a server 96-server (FIG. 5D), a communicative contact with a plurality of data interfaces 5-inter-a, 5-inter-b, 5-inter-c, 5-inter-d, 5-inter-e, 5-inter-f (FIG. 1E) located respectively onboard a plurality of autonomous on-road vehicles 10a, 10b, 10c, 10d, 10e, 10f (FIG. 1D) moving in a certain geographical area 1-GEO-AREA, in which each of the data interfaces is configured to: (i) initially detect and describe objects or events in areas surrounding locations visited by the respective autonomous on-road vehicle (e.g., 5-inter-f onboard 10f initially detects at time T3, as seen in FIG. 5A, a certain event 1-event-3-T3 involving two pedestrians at location 10-L2, and then describes this certain event), and (ii) send, for further analysis, the initial description of each of the objects or events 1-event-3-T3 detected together with a respective location 10-L2 (FIG. 5A) associated with said detection. In step 1042, receiving, in the server, from at least one of the autonomous on-road vehicles in the plurality, at least a specific one of the initial descriptions of a specific one of the objects or events detected, together with the respective location of detection (in this example, server 96-server, in FIG. 5D, receives from 10_f_ a description 1-event-3a-des-f of said certain event 1-event-3-T3 together with the location 10-L2 of this certain event). In step 1043, sending, by the server 96-server, a request, to at least one of the other autonomous on-road vehicles in said certain geographical area (e.g., to 10*a*, 10*b*, 10*d*), to collect additional imagery data, at said respective location 10-L2, and in conjunction with the specific object or event detected 1-event-3-T3. In step 1044, receiving and further analyzing, in the server, said additional imagery data collected from at least one of the autonomous on-road vehicles that is at or in visual vicinity of the respective location of said specific object or event detected (e.g., 10*b* receives the request, passes near 10-L2 at time T4, as shown in FIG. 5B, takes a visual record of the certain event 1-event-3-T4, and sends the visual record 4-visual-b8 to server 96-server, FIG. 5E. Similarly, 10*a* receives the request, passes near 10-L2 at time T5, as shown in FIG. 5C, takes a visual record of the same certain event 1-event-3-T5, and sends the visual record 4-visual-a7 to server 96-server, FIG. 5F).

FIG. 5H illustrates one embodiment of a method for obtaining imagery data using autonomous on-road vehicles. The method comprises: In step 1051, receiving, in an autonomous on-road vehicle (e.g., in 10*b*, FIG. 5A), a request to collect, at or in visual vicinity of a specific location 10-L2 (FIG. 5A), imagery data associated with a specific object or event 1-event-3-T3. In step 1052, analyzing, by the autonomous on-road vehicle 10*b*, current navigation plan, and concluding that said collection is possible. In step 1053, collecting (FIG. 5*b*), by the autonomous on-road vehicle 10*b*, at or in visual vicinity of the specific location 10-L2, the imagery data 4-visual-b8 associated with said specific object or event 1-event-3-T4 (1-event-3-T4 referrers to same event 1-event-3-T3 but at a different time T4); and sending said imagery data collected (e.g., 10*b* sends the visual record 4-visual-b8 to server 96-server, FIG. 5E).

In one embodiment, said analysis of the current navigation plan results in the conclusion that the autonomous on-road vehicle (e.g., 10*b*) will pass at or in visual vicinity of the specific location 10-L2, without any need for any alteration of the current navigation plan.

In one embodiment, said analysis of the current navigation plan results in the collusion that the autonomous on-road vehicle (e.g., 10*b*) will not pass at or in visual vicinity of the specific location 10-L2, and therefore there is a need for an alteration of the current navigation plan; and altering, by the autonomous on-road vehicle 10*b*, the current navigation plan into a new navigation plan, thereby causing the autonomous on-road vehicle 10*b* to pass at or in visual vicinity of the specific location 10-L2.

One embodiment is a system operative to facilitate direction-specific real-time visual gazing using real-time imagery data collected by a plurality of autonomous on-road vehicles, comprising: a plurality of data interfaces 5-inter-a, 5-inter-b, 5-inter-c, 5-inter-d, 5-inter-e, 5-inter-f (FIG. 1E) located respectively onboard a plurality of autonomous on-road vehicles 10*a*, 10*b*, 10*c*, 10*d*, 10*e*, 10*f* (FIG. 1D) moving in a certain geographical area 1-GEO-AREA, in which each of the data interfaces is operative to collect in real-time imagery data of areas surrounding the respective autonomous on-road vehicle; and a server 96-server (FIG. 5D).

In one embodiment, the server 96-server is configured to receive a request to visually gaze at a certain direction 10-L2 (FIG. 5A) from a specific location 10-loc-6 (FIG. 5A); as a response to said request, the system is configured to identify which of the autonomous on-road vehicles (e.g., 10*a*, 10*b*) is about to pass via said specific location 10-loc-6; and obtain, from each of the autonomous on-road vehicles identified 10*a*, 10*b*, in real-time, at the moment of said autonomous on-road vehicle passing via the specific location (e.g., at time T4, FIG. 5B, at which 10*b* passes via 10-loc-6, and at time T5, FIG. 5C, at which 10*a* passes via 10-loc-6), imagery data collected by the respective data interface in the certain direction (e.g., imagery data 4-visual-b8, FIG. 5E, collected at location 10-loc-6 by 5-inter-b onboard 10*b* at time T4 and in conjunction with direction 10-L2, and imagery data 4-visual-a7, FIG. 5F, collected at location 10-loc-6 by 5-inter-a onboard 10*a* at time T5 and in conjunction with direction 10-L2), thereby creating a sequence of imagery data 4-visual-b8+4-visual-a7 obtained collectively by the autonomous on-road vehicles identified 10*a*, 10*b*.

In one embodiment, the server 96-server is further configured to process said sequence of imagery data obtained collectively 4-visual-b8+4-visual-a7 into a video sequence, as if the video sequence was taken by a single stationary source located in the specific location 10-loc-6 and directed toward the certain direction 10-L2.

In one embodiment, at least some of the autonomous on-road vehicles identified happens (e.g., 10*b*) to pass via said specific location 10-loc-6 during a course of already planned navigation.

In one embodiment, at least some of the autonomous on-road vehicles identified (e.g., 10*a*) change an already existing planned navigation into a new navigation plan that incorporates said specific location 10-loc-6.

Figure 6A:
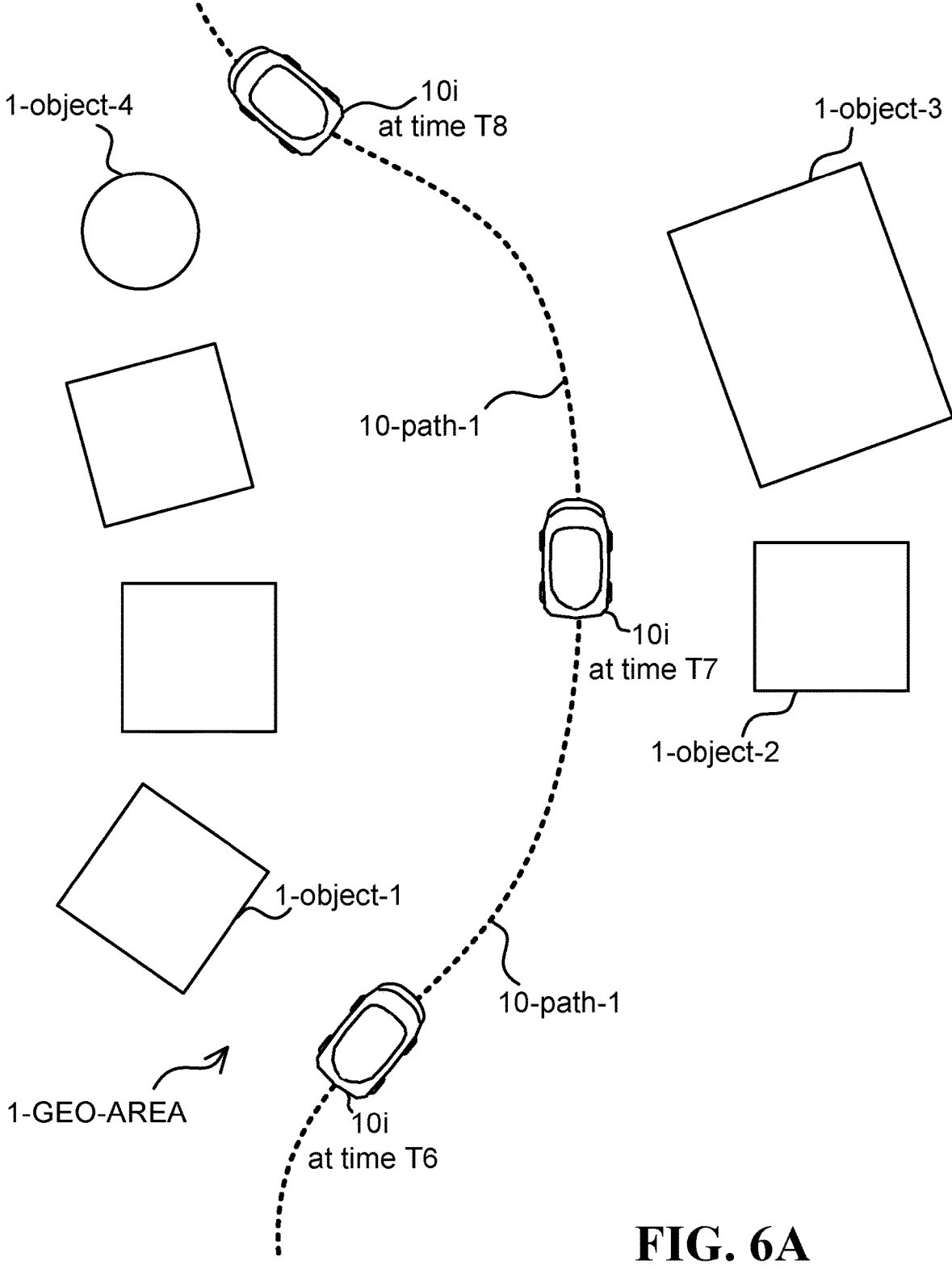
FIG. 6A illustrates one embodiment of an on-road vehicle travelling along a path and capturing visual records of surrounding environments at different times and different locations along the path of progression.

FIG. 6A illustrates one embodiment of an on-road vehicle 10*i* travelling along a path 10-pathe-1 and capturing visual records of surrounding environments in 1-GEO-AREA at different times T6, T7, T8 and different locations along the path of progression 10-path-1. Several different objects are shown 1-object-2, 1-object-3, 1-object-4.

Figure 6B:
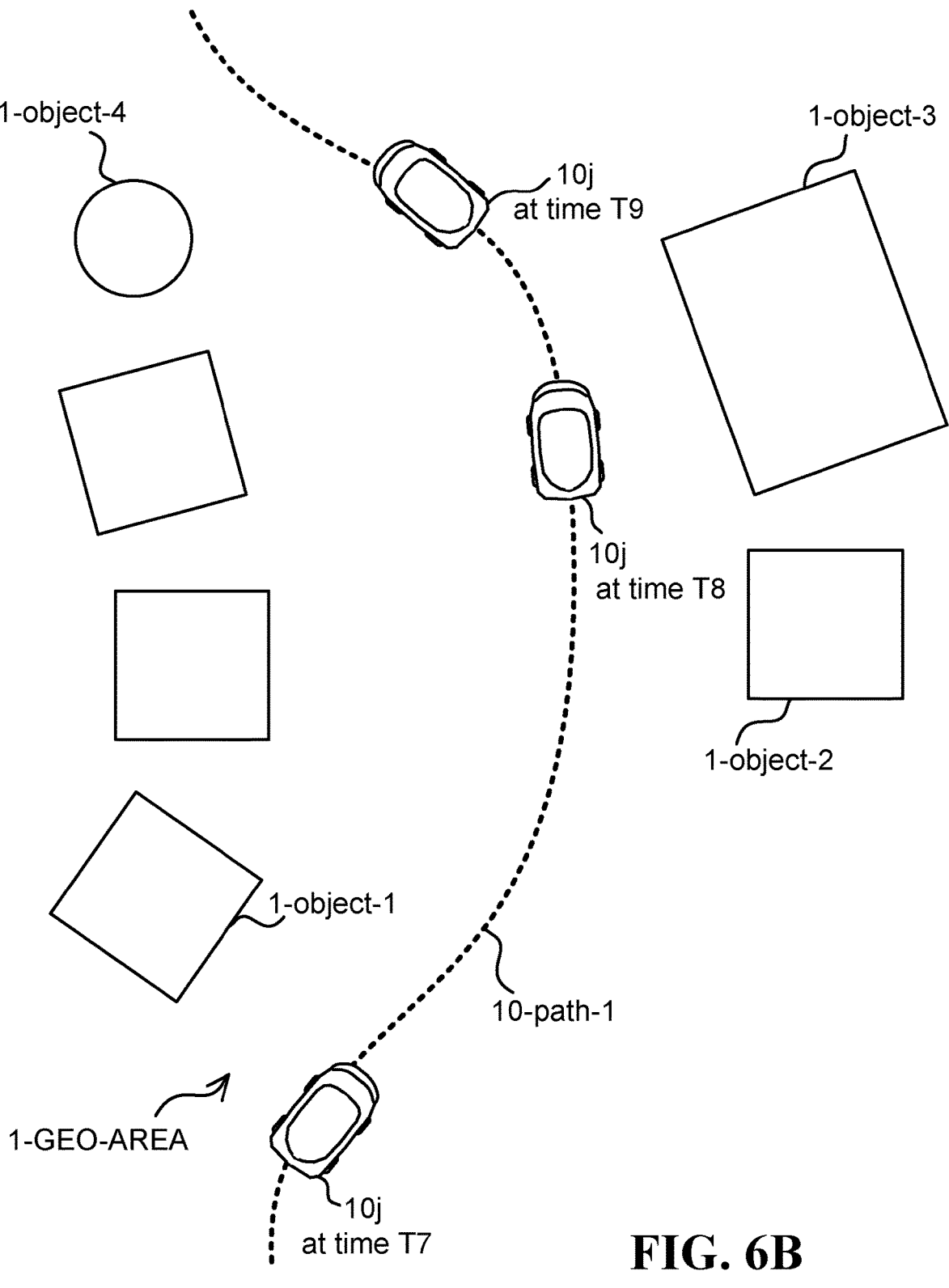
FIG. 6B illustrates one embodiment of another on-road vehicle travelling along the same path and capturing additional visual records of the same surrounding environments at different times and different locations along the path of progression.

FIG. 6B illustrates one embodiment of another on-road vehicle 10*j* travelling along the same path 10-path-1 and capturing additional visual records of the same surrounding environments in 1-GEO-AREA at perhaps different times T8, T9 and different locations along the path of progression 10-path-1. At T7 both vehicles 10*j* and 10*i* (FIG. 6A) capture visual records in 1-GEO-AREA, but of different location alone the path. The same several different objects are shown 1-object-2, 1-object-3, 1-object-4.

Figure 6C:
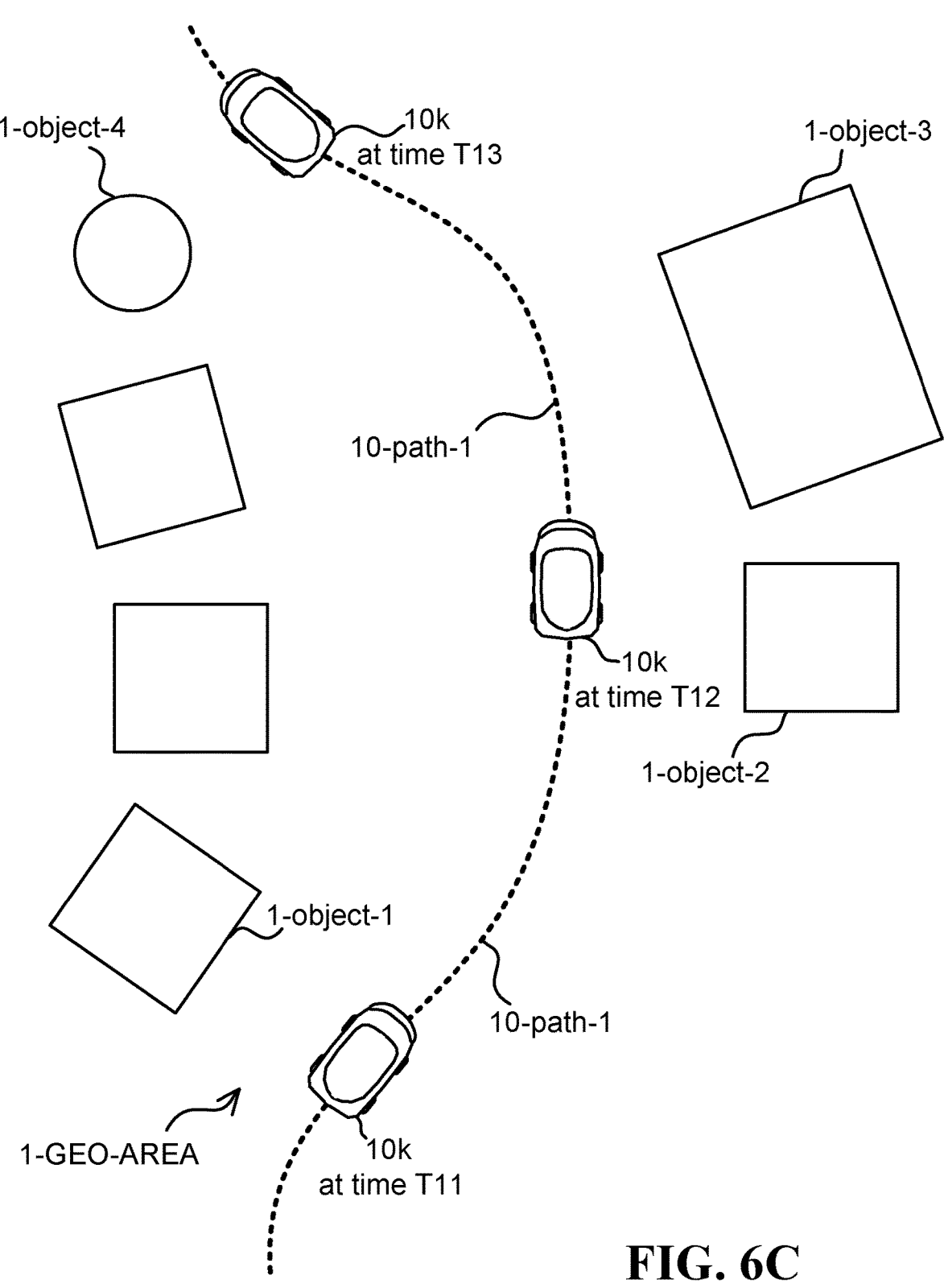
FIG. 6C illustrates one embodiment of yet another on-road vehicle travelling along the same path and capturing yet additional visual records of the same surrounding environments at different times and different locations along the path of progression.

FIG. 6C illustrates one embodiment of yet another on-road vehicle 10*k* travelling along the same path 10-path-1 and capturing yet additional visual records of the same surrounding environments in 1-GEO-AREA at perhaps later different times T11, T12, T13 and different or same locations along the path of progression 10-path-1.

Figure 6D:
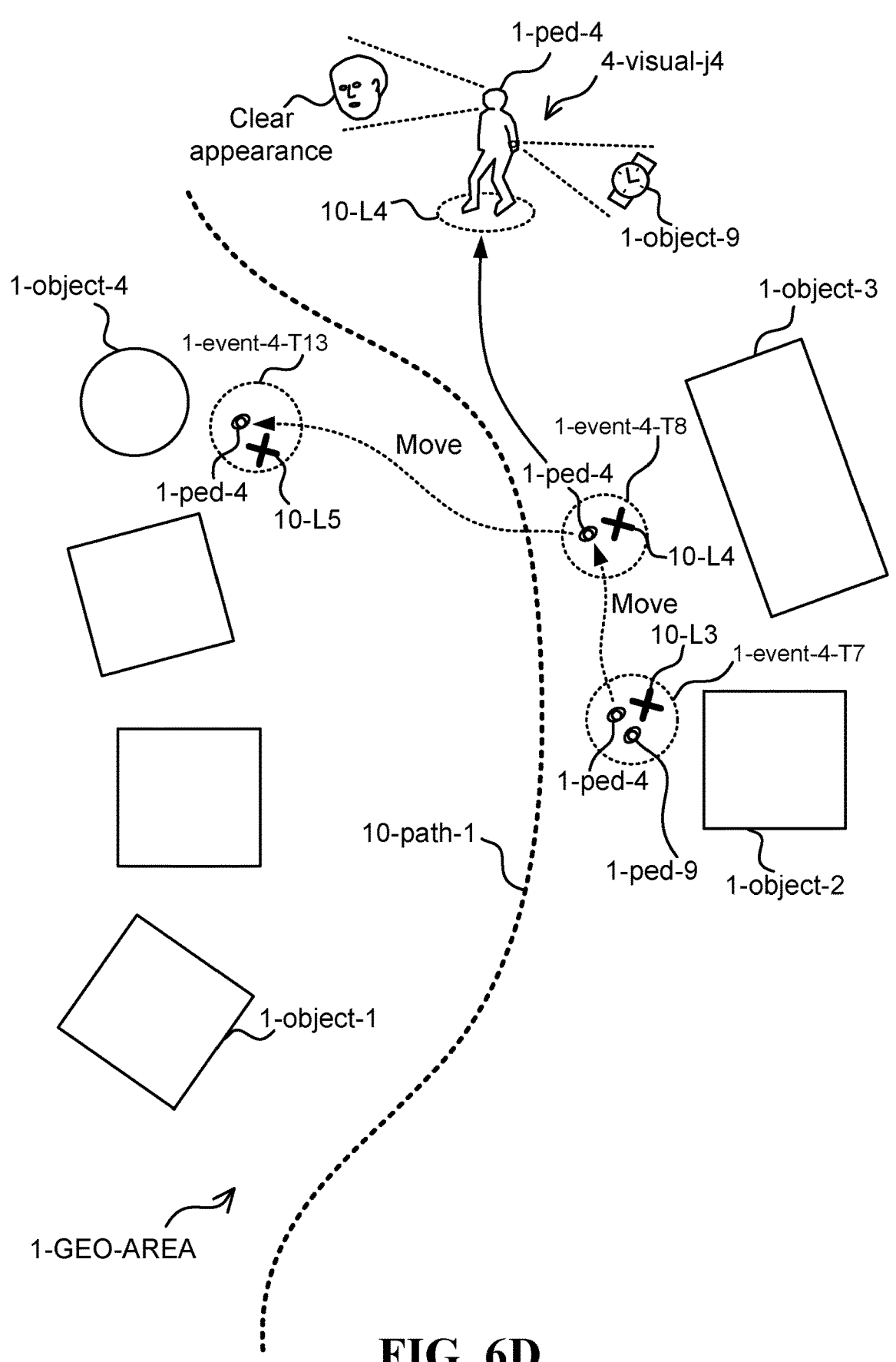
FIG. 6D illustrates one embodiment of analyzing a certain event by collecting and fusing together information from several on-road vehicles passing in visual vicinity of the event at different times.

FIG. 6D illustrates one embodiment of analyzing a certain event 1-event-4 (also referred to as 1-event-4-T7, 1-event-4-T8, 1-event-4-T13) by collecting and fusing together information in visual records from several on-road vehicles 10*i*, 10*j*, 10*k* (FIG. 6A, FIG. 6B, FIG. 6C respectively) that have passed in visual vicinity of the event 1-event-4 at different times T7, T8, T13. The event 1-event-4 comprises: at time T7: a pedestrian 1-ped-4 initially located at 10-L3 near object 1-object-2 (1-event-4-T7), at time T8: the pedestrian 1-ped-4 then moving to location 10-L4 near object 1-object-3 (1-event-4-T8), and at time T13: the pedestrian 1-ped-4 then moving again to location 10-L5 near object 1-object-4 (1-event-4-T13). Various different static objects are shown 1-object-2, 1-object-3, 1-object-4, as well as dynamic objects such as pedestrians 1-ped-4, 1-ped-9. Some of the objects shown are wearable objects, such as a watch 1-object-9 that is captured in imagery data 4-visual-j4 collected by vehicle 10*j* and in conjunction with pedestrian 1-ped-4.

FIG. 6E illustrates one embodiment of visual records taken by the several on-road vehicles 10*i*, 10*j*, 10*k* (FIG. 6A, FIG. 6B, FIG. 6C respectively) and stored locally, in which each of the visual records may be associated with a particular geo-location and may also be associated with a particular time. For example, vehicle 10*i* has stored the visual records 4-visual-i1 and 4-visual-i3 in storage space 5-store-i that is on-board 10*i*, in which 4-visual-i1 is associated with the location 10-L3, which appears as coordinates 10-L3', and 4-visual-i3 is associated with the location 10-L-n (not shown), which appears as coordinates 10-L-n'. Vehicle 10*j* has stored the visual records 4-visual-j2 and 4-visual-j4 in storage space 5-store-j that is on-board 10*j*, in which 4-visual-j2 is associated with the location 10-L-m (not shown), which appears as coordinates 10-L-m', and 4-visual-j4 is associated with the location 10-L4, which appears as coordinates 10-L4'. Vehicle 10*k* has stored the visual records 4-visual-k3 and 4-visual-k5 in storage space 5-store-k that is on-board 10*k*, in which 4-visual-k3 is associated with the location 10-L-p (not shown), which appears as coordinates 10-L-p', and 4-visual-k5 is associated with the location 10-L5, which appears as coordinates 10-L5'. Each of the vehicles 10*i*, 10*j*, 10*k* (FIG. 6A, FIG. 6B, FIG. 6C respectively) is equipped with its own on-board resources and sensors. For example, 10*i* is equipped with a storage space 5-store-i, a GNSS device 5-GNSS-i, a set of cameras 4-cam-i, a data interface 5-inter-i, a communication interface 5-comm-i, and a lidar device 4-lidar-i. 10*j* is equipped with a storage space 5-store-j, a GNSS device 5-GNSS-j, a set of cameras 4-cam-j, a data interface 5-inter-j, a communication interface 5-comm-j, and a lidar device 4-lidar-j. 10*k* is equipped with a storage space 5-store-k, a GNSS device 5-GNSS-k, a set of cameras 4-cam-k, a data interface 5-inter-k, a communication interface 5-comm-k, and a lidar device 4-lidar-k.

FIG. 6F illustrates one embodiment of a server 95-server receiving visual records 4-visual-i1, 4-visual-j4 of the same event 1-event-4 (FIG. 6D) from two of the several an on-road vehicles 10*i*, 10*j* (FIG. 6A, FIG. 6B respectively) that have previously passed at different times T7, T8 respectively, in visual vicinity of the event 1-event-4. The server may construct, train, obtain, improve, or receive various models 4-model-1, 4-model-2, which are operative to detect and identify various static or dynamic objects.

FIG. 6G illustrates one embodiment of the server 95-server receiving another visual record 4-visual-k5 of the same event 1-event-4 (FIG. 6D) from a third of the several an on-road vehicles 10*k* (FIG. 6C) that has previously passed at yet a later time T13 in visual vicinity of the event 1-event-4. The server may construct, train, obtain, improve, or receive various models 4-model-B, 4-model-3, which are operative to detect and identify various static or dynamic objects. The server may create or update a profile 4-profile per each of the objects.

One embodiment is a system operative to analyze past events using a set of imagery data collected and stored locally by a plurality of autonomous on-road vehicles, comprising: a plurality of data interfaces 5-inter-i, 5-inter-j, 5-inter-k (FIG. 6E) located respectively onboard a plurality of autonomous on-road vehicles 10*i* (FIG. 6A), 10*j* (FIG. 6B), 10*k* (FIG. 6C) moving in a certain geographical area 1-GEO-AREA; a plurality of storage spaces 5-store-i, 5-store-j, 5-store-k (FIG. 6E) located respectively onboard said plurality of autonomous on-road vehicles 10*i*, 10*j*, 10*k* and associated respectively with said plurality of data interfaces 5-inter-i, 5-inter-j, 5-inter-k; and a server 95-server (FIG. 6F, FIG. 6G) located off-board the plurality of autonomous on-road vehicles 10*i*, 10*j*, 10*k*.

In one embodiment, each of the data interfaces 5-inter-i, 5-inter-j, 5-inter-k is configured to: (i) collect visual records of areas surrounding locations visited by the respective autonomous on-road vehicle (e.g., 4-visual-i1 and 4-visual-i3 collected by 10*i*, 4-visual-j2 and 4-visual-j4 collected by 10*j*, 4-visual-k3 and 4-visual-k5 collected by 10*k*), and (ii) store locally said visual records in the respective storage space (e.g., 4-visual-i1 and 4-visual-i3 stored in 5-store-i, 4-visual-j2 and 4-visual-j4 stored in 5-store-j, 4-visual-k3 and 4-visual-k5 stored in 5-store-k), thereby generating, by the system, an imagery database 4-visual-i1, 4-visual-i3, 4-visual-j2, 4-visual-j4, 4-visual-k3, 4-visual-k5 that is distributed among the plurality of autonomous on-road vehicles 10*i*, 10*j*, 10*k*; the server 95-server is configured to receive or generate a request to analyze a specific past event 1-event-4 (FIG. 6D, appears as 1-event-4-T7, 1-event-4-T8, 1-event-4-T13) associated with at least one particular location 10-L3, 10-L4; as a response to said request, the system is configured to identify, in the imagery database, several specific ones of the visual records that were collected respectively by several ones of the autonomous on-road vehicles, at several different points in time respectively, while being in visual vicinity of said particular location, in which the several specific visual records identified contain imagery data associated with said specific past event (e.g., the system identifies 4-visual-i1 as a visual record that was taken by 10*i* while in visual vicinity of 10-L3, in which the event 1-event-4 at time T7 appears in 4-visual-i1 perhaps as a pedestrian 1-ped-4, FIG. 6D. The system further identifies 4-visual-j4 as another visual record that was taken by 10*j* while in visual vicinity of 10-L4, in which the same event 1-event-4 at time T8 appears in 4-visual-j4 perhaps again as the same pedestrian 1-ped-4, FIG. 6D, which is now in location 10-L4); and the system is further configured to extract said several identified specific visual records 4-visual-i1, 4-visual-j4 from several of the respective storage spaces 5-store-i, 5-store-j in the several respective autonomous on-road vehicles 10*i*, 10*j*, and to export said several specific visual records, thereby facilitating said analysis of the specific past event 1-event-4.

In one embodiment, the server 95-server is further configured to: receive said several specific visual records 4-visual-i1, 4-visual-j4 (FIG. 6F); locate, in each of the several specific visual records 4-visual-i1, 4-visual-j4, at least one object 1-ped-4 associated with the specific past event 1-event-4, in which each of the several specific visual records contains imagery data associated with that object at a specific different point in time (e.g., 4-visual-i1 contains imagery data associated with 1-ped-4 at time T7, and 4-visual-j4 contains imagery data associated with 1-ped-4 at time T8); and process the imagery data of the object 1-ped-4 in conjunction with the several specific different points in time T7, T8, thereby gaining understanding of the object 1-ped-4 evolving over time and in conjunction with said specific past event 1-event-4.

In one embodiment, during the course of said processing, the sever 95-server is further configured to detect movement of the object 1-ped-4 from said particular location 10-L3, 10-L4 to a new location 10-L5 (FIG. 6D), or from a previous location to said particular location; and consequently; the system is configured to identify again, in the imagery database, several additional ones of the visual records 4-vi-sul-k5 that were collected respectively by several additional ones of the autonomous on-road vehicles 10k, at several additional different points in time respectively T13, while being in visual vicinity of said new or previous location 10-L5, in which the several additional specific visual records 4-visul-k5 identified contain additional imagery data asso-ciated with said specific past event 1-event-4 (1-event-4-T13); and the system is further configured to extract said additional several identified specific visual records 4-visul-k5 from several of the additional respective storage spaces 5-store-k in the several additional respective autonomous on-road vehicles 10k (FIG. 6G), and to export again said several additional specific visual records, thereby facilitating further analysis of the specific past event 1-event-4.

In one embodiment, said specific past event 1-event-4 is a crime; and the system is configured to track, back in time or forward in time relative to a reference point in time, criminals or objects 1-ped-4 associated with said crime.

In one embodiment, the specific past event 1-event-4 is associated with at least one of: (i) a crime event, (ii) a traffic event such as a car leaving parking, or a traffic violation such as a car crossing in red light, or an accident (iii) people grouping together, (iv) people reading street ads, (v) people entering or exiting a building such as a store, (vi) a traffic congestion, and (vii) a malfunction event such as a car getting stuck on road or a hazard evolving.

In one embodiment, said identification comprises: point-ing-out, by the server 95-server, said several ones of the autonomous on-road vehicles 10i, 10j in possession of said several ones of the specific visual records 4-visual-i1, 4-vi-sual-j4; and requesting, by the server 95-server, from each of said several autonomous on-road vehicles pointed-out 10i, 10j, the respective one of the specific visual records.

In one embodiment, said identification comprises: each of the autonomous on-road vehicles 10i, 10j, 10k keeping a record (FIG. 6E) of locations 10-L3' (associated with 10-L3), 10-L4' (associated with 10-L3), 10-L5' (associated with 10-L5), visited by the autonomous on-road vehicle, in which each of the visual records is linked with a respective one of the locations visited; the server 95-server sending, to the plurality of autonomous on-road vehicles 10i, 10j, 10k, a request for visual records, in which said request includes the particular location 10-L3, 10-L4; and each of said plurality of autonomous on-road vehicles 10i, 10j, 10k: (i) receiving said request for visual records, (ii) locating, if relevant to the autonomous on-road vehicle, at least a specific one of the visual records associated with said particular location requested, and (iii) replying by sending the specific visual records located (e.g., 10i sends 4-visual-i1, and 10j sends 4-visual-j4).

Figures 6H, 7A:
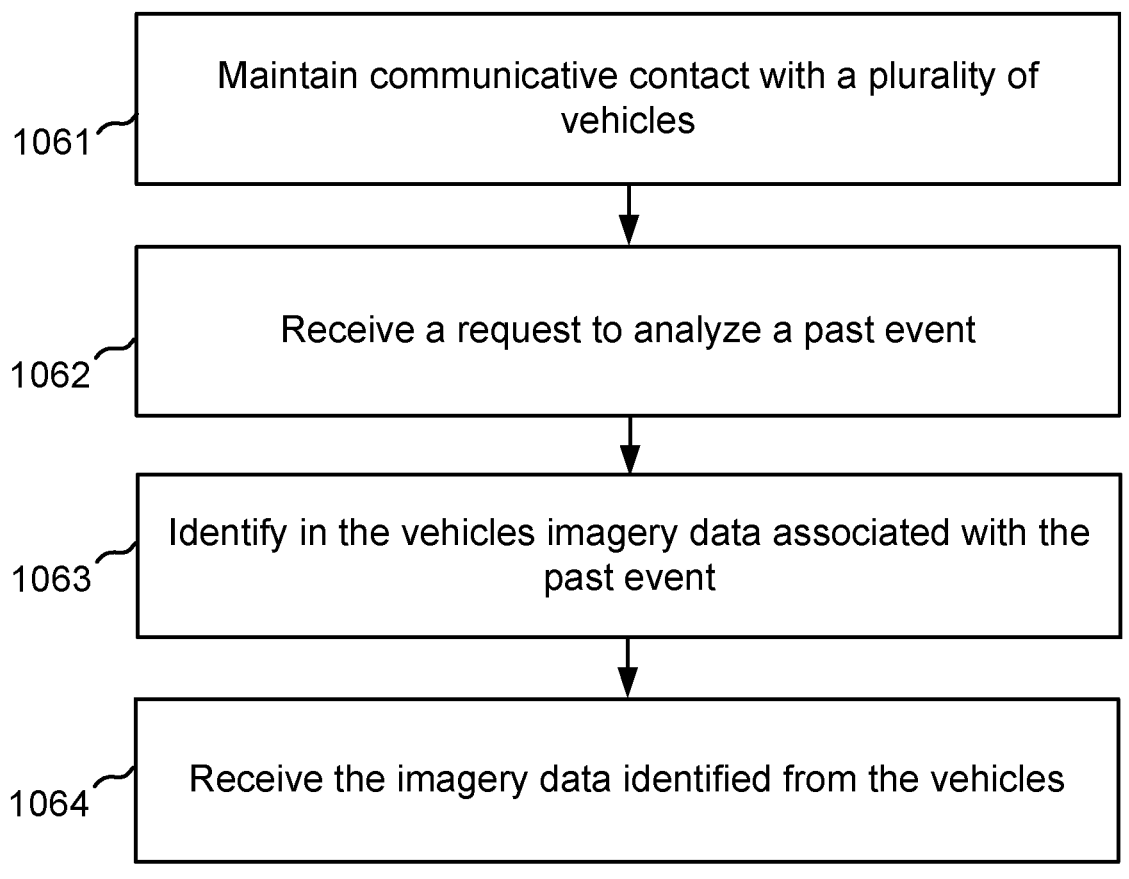
FIG. 6H illustrates one embodiment of a method for to analyzing past events using a set of imagery data collected and stored locally by a plurality of autonomous on-road vehicles.
FIG. 7A illustrates one embodiment of a server operative to fuse together a plurality of location estimations received from a plurality of on-road vehicles.

FIG. 6H illustrates one embodiment of a method for to analyzing past events using a set of imagery data collected and stored locally by a plurality of autonomous on-road vehicles. The method comprises: In step 1061, maintaining, by a server 95-server (FIG. 6F, FIG. 6G), a communicative contact with a plurality of data interfaces 5-inter-i, 5-inter-j, 5-inter-k (FIG. 6E) located respectively onboard a plurality of autonomous on-road vehicles 10i (FIG. 6A), 10j (FIG. 6B), 10k (FIG. 6C) moving in a certain geographical area 1-GEO-AREA, in which each of the data interfaces 5-inter-i, 5-inter-j, 5-inter-k is operative to: (i) collect visual records of areas surrounding locations visited by the respective autonomous on-road vehicle (e.g., 4-visual-i1 and 4-visual-i3 collected by 10i, 4-visual-j2 and 4-visual-j4 collected by 10j, 4-visual-k3 and 4-visual-k5 collected by 10k), and (ii) store locally said visual records in a storage space onboard the respective autonomous on-road vehicle (e.g., 4-visual-i1 and 4-visual-i3 stored in 5-store-i, 4-visual-j2 and 4-visual-j4 stored in 5-store-j, 4-visual-k3 and 4-visual-k5 stored in 5-store-k). In step 1062, receiving or generating, in the server 95-server, a request to analyze a specific past event 1-event-4 (FIG. 6D, appears as 1-event-4-T7, 1-event-4-T8, 1-event-4-T13) associated with at least one particular loca-tion 10-L3, 10-L4. In step 1063, identifying, in conjunction with the server or by the server, several specific ones of the visual records that were collected respectively by several ones of the autonomous on-road vehicles, at several different points in time respectively, while being in visual vicinity of said particular location, in which the several specific visual records identified contain imagery data associated with said specific past event (e.g., the system identifies 4-visual-i1 as a visual record that was taken by 10i while in visual vicinity of 10-L3, in which the event 1-event-4 at time T7 appears in 4-visual-i1 perhaps as a pedestrian 1-ped-4, FIG. 6D. The system further identifies 4-visual-j4 as another visual record that was taken by 10j while in visual vicinity of 10-L4, in which the same event 1-event-4 at time T8 appears in 4-visual-j4 perhaps again as the same pedestrian 1-ped-4, FIG. 6D. which is now in location 10-L4). In step 1064, receiving, in the server 95-server (FIG. 6F), said several identified specific visual records 4-visual-i1, 4-visual-j4 from several of the respective storage spaces 5-store-i, 5-store-j onboard the several respective autonomous on-road vehicles 10i, 10j, thereby facilitating said analysis of the specific past event 1-event-4.

FIG. 7A illustrates one embodiment of a server 94-server operative to fuse together a plurality of location estimations received from a plurality of on-road vehicles.

FIG. 7B illustrates one embodiment of a 3D representa-tion of an object 1-object-3 as generated by an on-road vehicle 10i (FIG. 6A). In the 3D representation, the esti-mated locations of six of the object's vertices are shown as 3-3D-i1, 3-3D-i2, 3-3D-i3, 3-3D-i4, 3-3D-i5, and 3-3D-i6.

FIG. 7C illustrates one embodiment of another 3D rep-resentation of the same object 1-object-3 as generated by another on-road vehicle 10j (FIG. 6B). In the 3D represen-tation, the estimated locations of six of the object's vertices are shown as 3-3D-j1, 3-3D-j2, 3-3D-j3, 3-3D-j4, 3-3D-j5, and 3-3D-j6.

FIG. 7D illustrates one embodiment of yet another 3D representation of the same object 1-object-3 as generated by yet another on-road vehicle 10k (FIG. 6C). In the 3D representation, the estimated locations of six of the object's vertices are shown as 3-3D-k1, 3-3D-k2, 3-3D-k3, 3-3D-k4, 3-3D-k5, and 3-3D-k6.

FIG. 7E illustrates one embodiment of a combined 3D representation of the object 1-object-3 as fused in a server 94-server (FIG. 7A) using several 3D representations (FIG. 7B, FIG. 7C, FIG. 7D) generated by several on-road vehicles 10i, 10j, 10k (FIG. 6A, FIG. 6B, FIG. 6C respec-tively). In the combined 3D representation, the newly esti-mated locations of six of the object's vertices are shown as 3-3D-fuse1, 3-3D-fuse2, 3-3D-fuse3, 3-3D-fuse4, 3-3D-fuse5, and 3-3D-fuse6, in which the newly estimated loca-tions of the vertices are more accurate than the estimated locations shown in FIG. 7B, FIG. 7C, and FIG. 7D.

One embodiment is a system operative to utilize a plu-rality of autonomous on-road vehicles for increasing accu-racy of three-dimensional (3D) mapping, comprising: a plurality of data interfaces 5-inter-i, 5-inter-j, 5-inter-k (FIG. 6E) located respectively onboard a plurality of autonomous on-road vehicles 10i (FIG. 6A), 10j (FIG. 6B), 10k (FIG. 6C) moving in a certain geographical area 1-GEO-AREA; a plurality of three-dimensional (3D) mapping configurations 4-lidar-i, 4-lidar-j, 4-lidar-k (FIG. 6E) located respectively onboard said plurality of autonomous on-road vehicles 10i, 10j, 10k and associated respectively with said plurality of data interfaces 5-inter-i, 5-inter-j, 5-inter-k; and a server 94-server (FIG. 7A) located off-board the plurality of autonomous on-road vehicles 10i, 10j, 10k.

In one embodiment, each of the data interfaces is configured to: (i) use the respective three-dimensional mapping configuration to create a three-dimensional representation of areas surrounding locations visited by the respective autonomous on-road vehicle, in which said three-dimensional representation comprises an inherent inaccuracy (e.g., 5-inter-i uses 4-lidar-i to create a 3D representation of objects in 1-GEO-AREA, such as a 3D representation 3-3D-i1, 3-3D-i2, 3-3D-i3, 3-3D-i4, 3-3D-i5, 3-3D-i6, FIG. 7B, of object 1-object-3. 5-inter-j uses 4-lidar-j to create a 3D representation of objects in 1-GEO-AREA, such as a 3D representation 3-3D-j1, 3-3D-j2, 3-3D-j3, 3-3D-j4, 3-3D-j5, 3-3D-j6, FIG. 7C, of object 1-object-3. 5-inter-k uses 4-lidar-k to create a 3D representation of objects in 1-GEO-AREA, such as a 3D representation 3-3D-k1, 3-3D-k2, 3-3D-k3, 3-3D-k4, 3-3D-k5, 3-3D-k6, FIG. 7D, of object 1-object-3), and (ii) send said three-dimensional representation 3-3D-i, 3-3D-j, 3-3D-k to the sever 94-server; the server 94-server is configured to receive said plurality of three-dimensional representations 3-3D-i, 3-3D-j, 3-3D-k respectively from the plurality of autonomous on-road vehicles 10i, 10j, 10k, in which the plurality of three-dimensional representations comprises respectively the plurality of inherent inaccuracies; and the server 94-server is further configured to fuse said plurality of three-dimensional representations 3-3D-i, 3-3D-j, 3-3D-k into a single fused three-dimensional representation 3-3D-fuse (FIG. 7E) using at least one data combining technique, in which said single fused three-dimensional representation 3-3D-fuse (3-3D-fuse1, 3-3D-fuse2, 3-3D-fuse3, 3-3D-fuse4, 3-3D-fuse5, 3-3D-fuse6) comprises a new level of inaccuracy that is lower than said inherent inaccuracies as a result of said data combining technique. For example, the geo-spatial coordinate of the upper-front-right vertex of object 1-object-3 is perceived by vehicle 10i as being 3-3D-i3. The geo-spatial coordinate of the same upper-front-right vertex of object 1-object-3 is perceived by vehicle 10j as being 3-3D-j3. The geo-spatial coordinate of yet the same upper-front-right vertex of object 1-object-3 is perceived by vehicle 10k as being 3-3D-k3. Now, since 3-3D-i3, 3-3D-j3, 3-3D-k3 are all inaccurate, the server 94-server fuses the coordinates 3-3D-i3, 3-3D-j3, 3-3D-k3 into a more accurate coordinate 3-3D-fuse3 of the upper-front-right vertex of object 1-object-3.

In one embodiment, the plurality of three-dimensional mapping configurations are a plurality of lidar (light-imaging-detection-and-ranging) sensors 4-lidar-i, 4-lidar-j, 4-lidar-k.

In one embodiment, said inherent inaccuracies are worse than +/−(plus/minus) 1 (one) meter; and said new level of inaccuracy is better than +/−(plus/minus) 10 (ten) centimeter.

In one embodiment, the plurality of three-dimensional representations comprises at least 1,000 (one thousand) three-dimensional representations, and therefore said new level of inaccuracy is better than +/−(plus/minus) 1 (one) centimeter.

In one embodiment, said inherent inaccuracy is associated with an inherent inaccuracy of a laser beam angle and timing in the lidar sensor 4-lidar-i, 4-lidar-j, 4-lidar-k.

In one embodiment, said inherent inaccuracy is associated with an inherent inaccuracy in determining the exact geo-spatial position of the lidar sensor 4-lidar-i, 4-lidar-j, 4-lidar-k.

In one embodiment, said inherent inaccuracy is associated with movement of the autonomous on-road vehicle 10i, 10j, 10k while creating said three-dimensional representation.

In one embodiment, the plurality of three-dimensional mapping configurations are a plurality of multi-camera vision configurations 4-cam-i, 4-cam-j, 4-cam-k (FIG. 6E). For example. 4-cam-i may include several cameras such as 4-cam-1, 4-cam-2, 4-cam-3, 4-cam-4, 4-cam-5, 4-cam-6 (FIG. 1A).

In one embodiment, said inherent inaccuracies are worse than +/−(plus/minus) 2 (two) meter; and said new level of inaccuracy is better than +/−(plus/minus) 20 (twenty) centimeter.

In one embodiment, each of the multi-camera vision configurations 4-cam-i, 4-cam-j, 4-cam-k uses at least two cameras and an associated stereographic image processing to achieve said three-dimensional representation.

In one embodiment, the three-dimensional representations comprises representation of static objects such as 1-object-3 in said areas.

In one embodiment, the static objects are associated with at least one of: (i) buildings, (ii) traffic signs, (iii) roads, (iv) threes, and (v) road hazards such as pits.

In one embodiment, said data combining technique is associated with at least one of: (i) statistical averaging, (ii) inverse convolution, (iii) least-mean-squares (LMS) algorithms, (iv) monte-carlo methods, (v) machine learning prediction models.

In one embodiment, said inherent inaccuracy is manifested as a reduced resolution of the three-dimensional representation.

In one embodiment, said inherent inaccuracy is manifested as a reduced accuracy in geo-spatial positioning of elements in the three-dimensional representation.

Figure 7F:
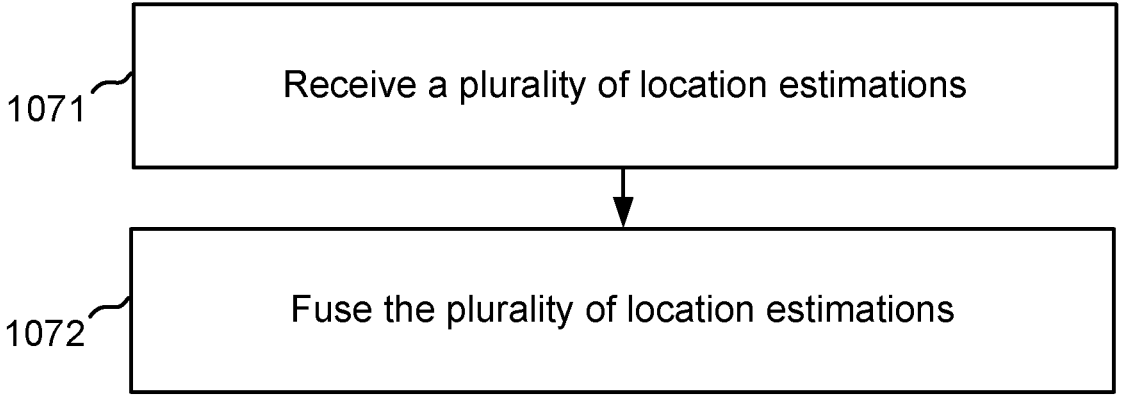
FIG. 7F illustrates one embodiment of a method for utilizing a plurality of autonomous on-road vehicles for increasing accuracy of three-dimensional (3D) mapping.

FIG. 7F illustrates one embodiment of a method for utilizing a plurality of autonomous on-road vehicles for increasing accuracy of three-dimensional (3D) mapping. The method comprises: In step 1071, receiving, in a server 94-server (FIG. 7A), per a particular point on a surface of a specific object (e.g., per the upper-front-right vertex of object 1-object-3), a plurality of location estimations 3-3D-i3 (FIG. 7B), 3-3D-j3 (FIG. 7C), 3-3D-k3 (FIG. 7D) respectively from a plurality of autonomous on-road vehicles 10i, 10j, 10k moving in visual vicinity of said particular point, in which each of the location estimations 3-3D-i3, 3-3D-j3, 3-3D-k3 is a an estimation, having an inherent inaccuracy, made by the respective autonomous on-road vehicle 10i, 10j, 10k regarding the geo-spatial position of said particular point. In step 1072, fusing, in the server 94-server, said plurality of location estimations 3-3D-i3, 3-3D-j3, 3-3D-k3 having said inherent inaccuracies, into a single fused estimation 3-3D-fuse3 (FIG. 7E), using at least one data combining techniques, in which said single fused estimation 3-3D-fuse3 has a new level of inaccuracy that is lower than said inherent inaccuracies as a result of said data combining technique.

In one embodiment, each of the location estimations 3-3D-i3, 3-3D-j3, 3-3D-k3 is made using a lidar (light-imaging-detection-and-ranging) sensors 4-lidar-i, 4-lidar-j, 4-lidar-k onboard the respective autonomous on-road vehicle 10i, 10j, 10k.

In one embodiment, said inherent inaccuracies are worse than +/–(plus/minus) 1 (one) meter; and said new level of inaccuracy is better than +/–(plus/minus) 10 (ten) centimeter.

In one embodiment, the plurality of autonomous on-road vehicles 10*i*, 10*j*, 10*k* comprises at least 1,000 (one thousand) autonomous on-road vehicles, and therefore said new level of inaccuracy is better than +/–(plus/minus) 1 (one) centimeter.

Figure 8A:
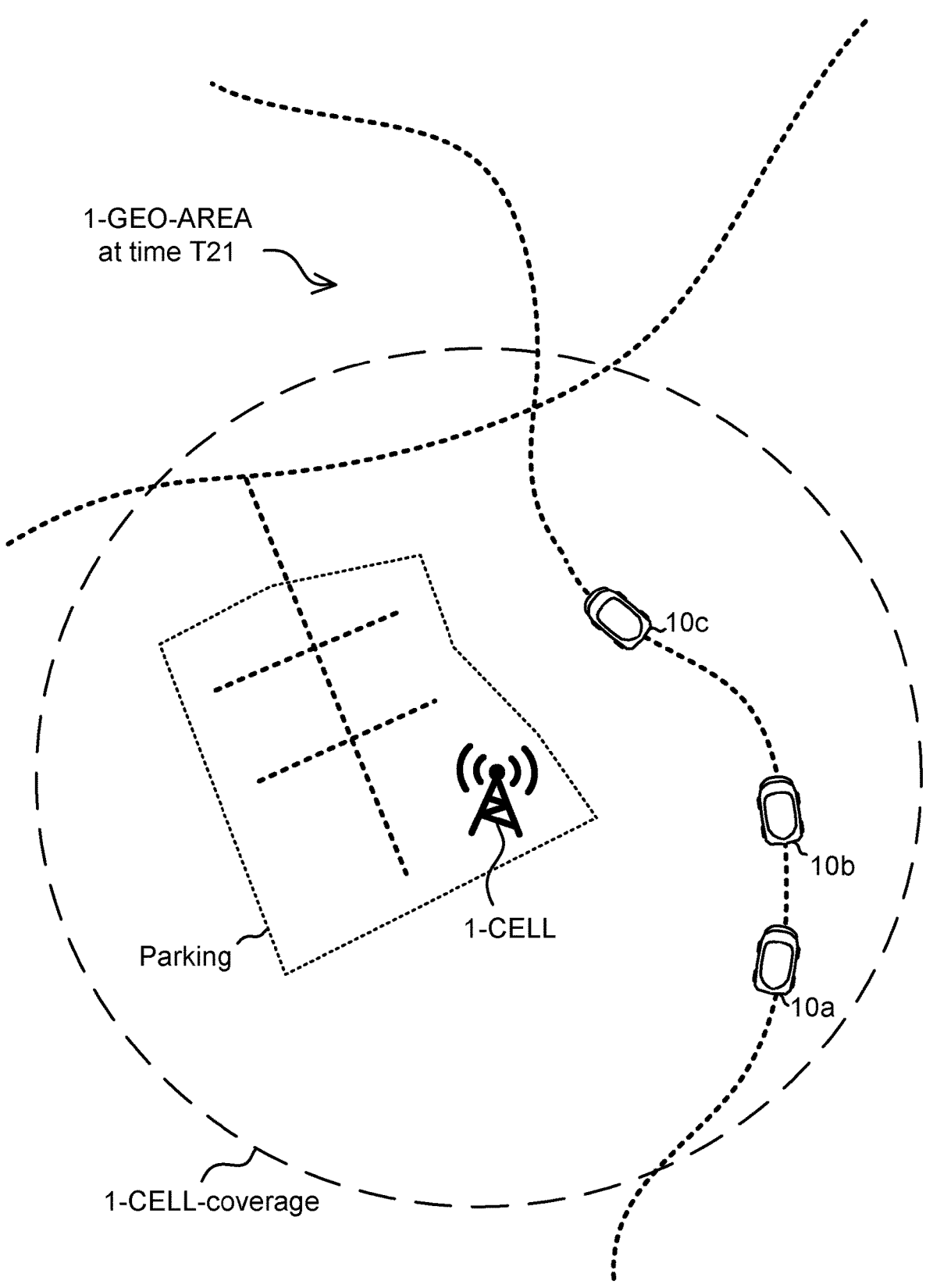
FIG. 8A illustrates one embodiment of several on-road vehicles passing through a coverage area of a cellular base-station.

FIG. 8A illustrates one embodiment of several on-road vehicles 10*a*, 10*b*, 10*c* passing through a coverage area 1-CELL-coverage of a cellular base-station 1-CELL at time T21.

Figure 8B:
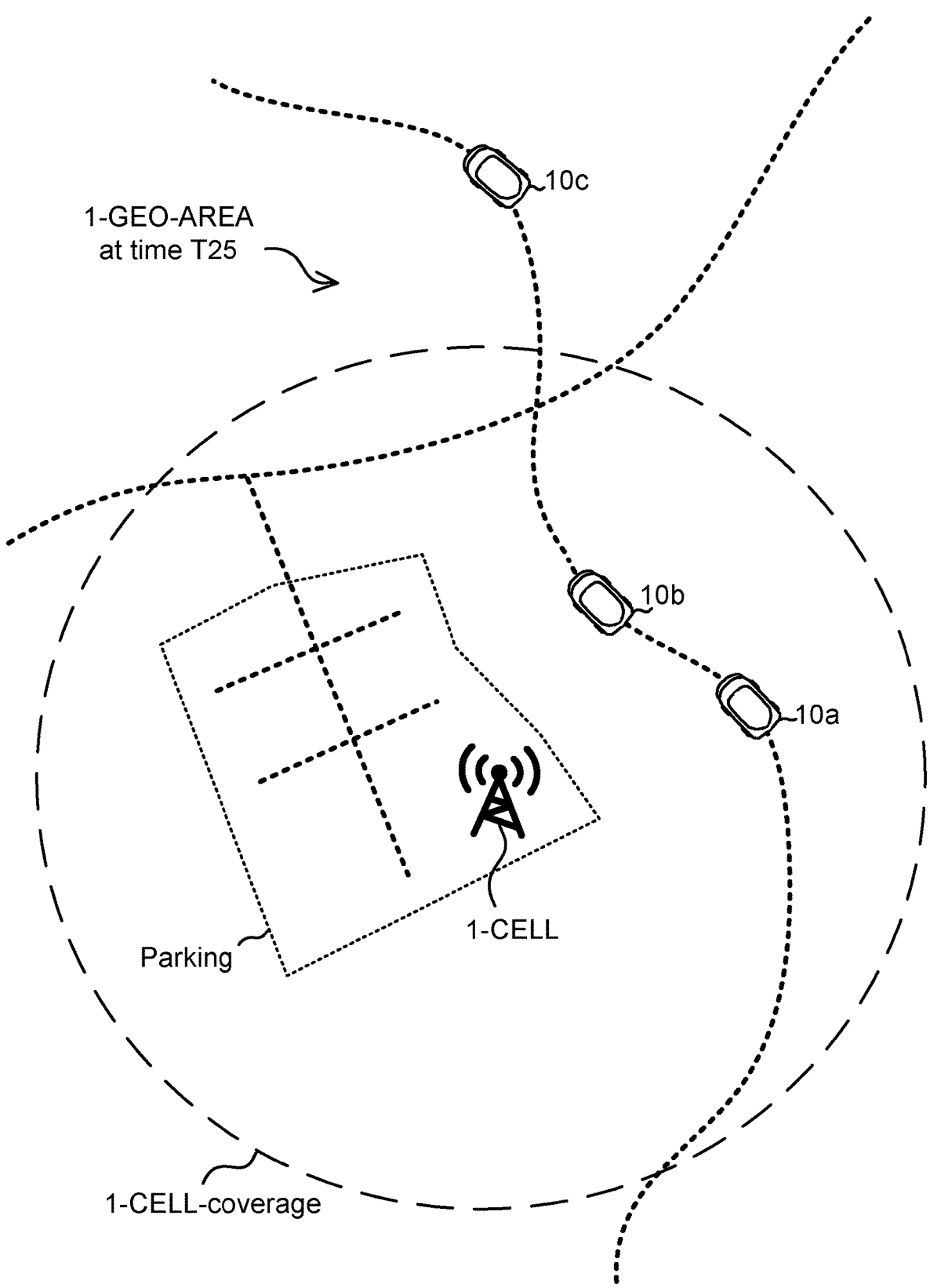
FIG. 8B illustrates one embodiment of one of the several on-road vehicles going out of the coverage area.

FIG. 8B illustrates one embodiment of one of the several on-road vehicles 10*c* going out of the coverage area 1-CELL-coverage at time T25. The other vehicles 10*a*, 10*b* are still inside the coverage area 1-CELL-coverage of a cellular base-station 1-CELL.

Figure 8C:
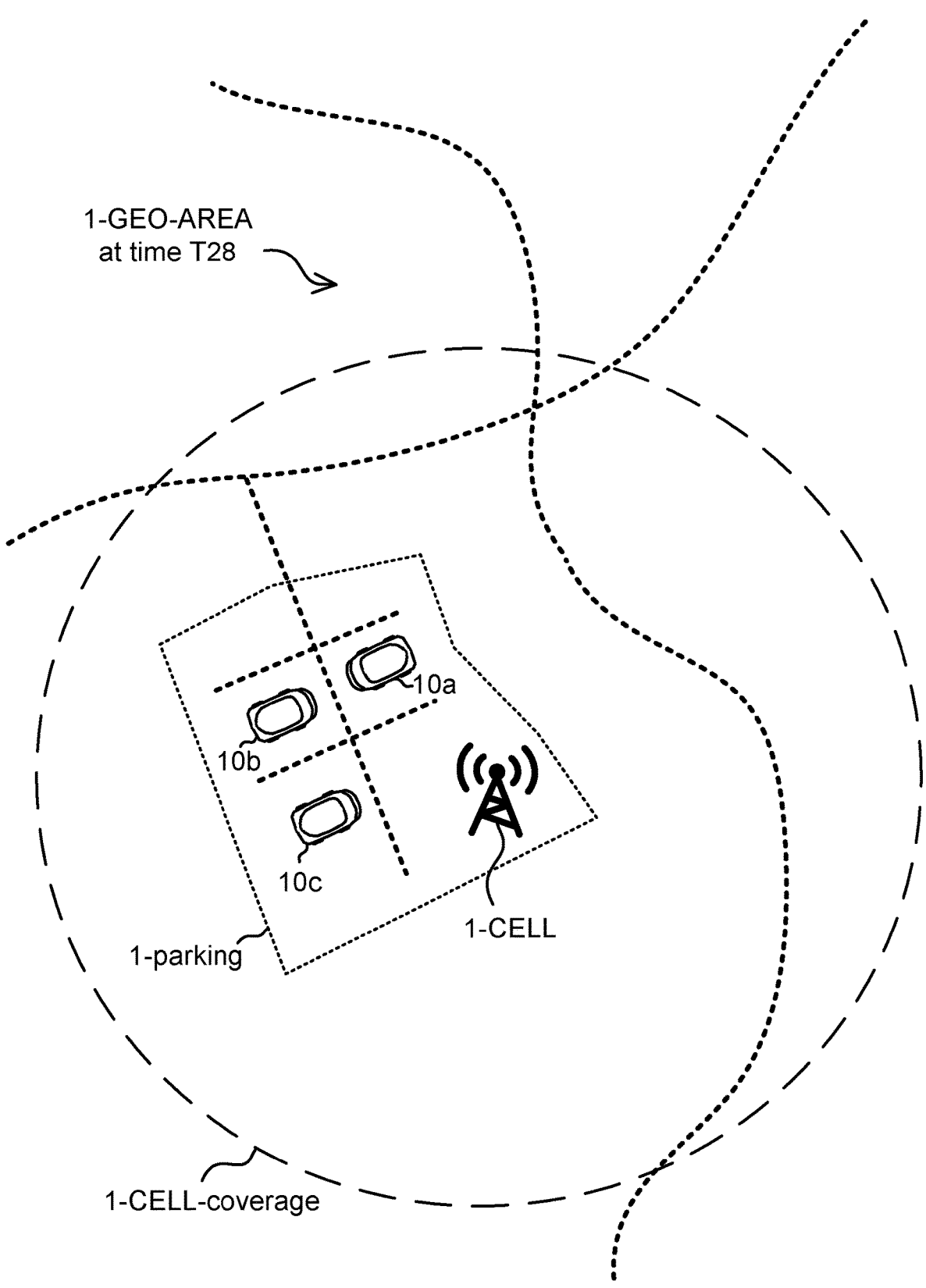
FIG. 8C illustrates one embodiment of the several on-road vehicles parking at a location that is inside the coverage area of the cellular base-station.

FIG. 8C illustrates one embodiment of the several on-road vehicles 10*a*, 10*b*, 10*c* at time T28 parking at a location that is inside the coverage area 1-CELL-coverage of the cellular base-station 1-CELL.

Figure 8D:
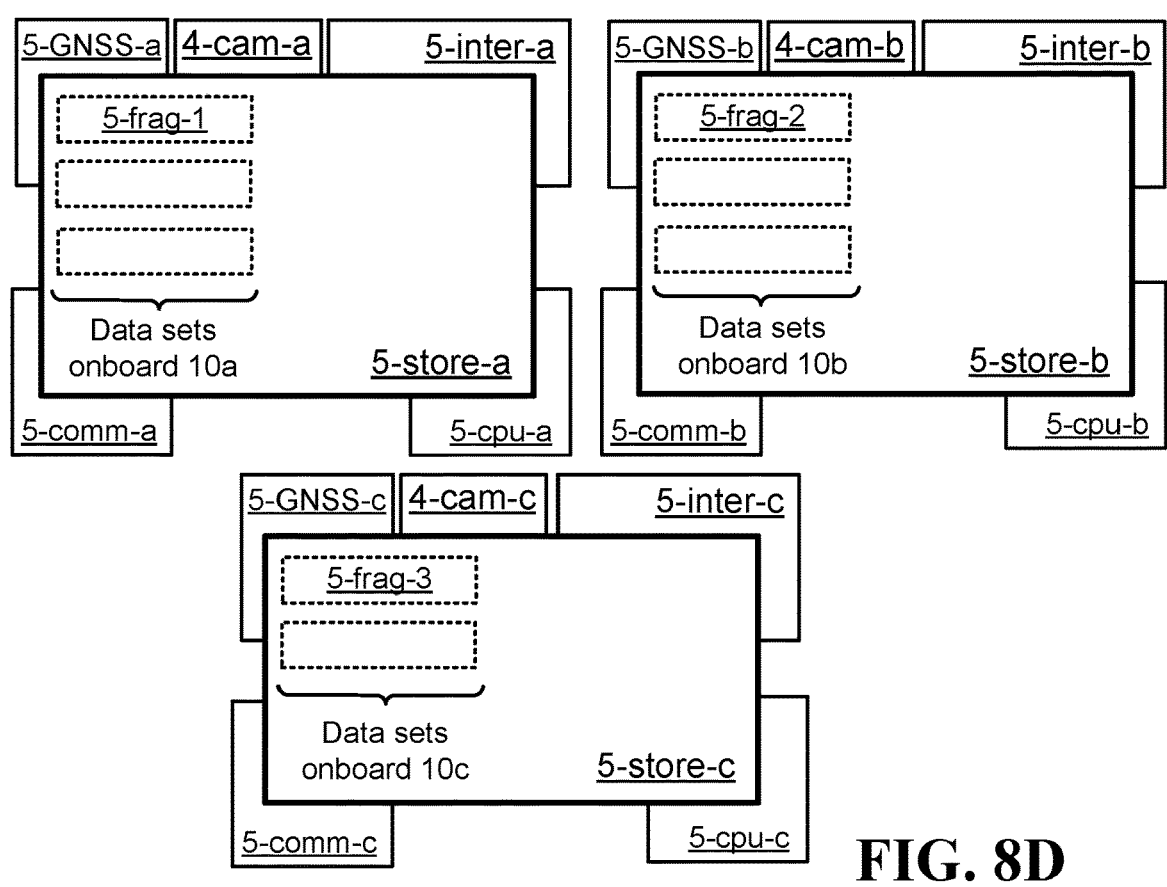
FIG. 8D illustrates one embodiment of a plurality of on-road vehicles storing fragments of a data segment.

FIG. 8D illustrates one embodiment of a plurality of on-road vehicles 10*a*, 10*b*, 10*c* (FIG. 8A) storing respectively fragments 5-frag-1, 5-frag-2, 5-frag-3 of a data segment. Each of the vehicles 10*a*, 10*b*, 10*c* (FIG. 8A) is equipped with its own on-board resources and sensors. For example, 10*a* is equipped with a storage space 5-store-a, a GNSS device 5-GNSS-a, a set of cameras 4-cam-a, a data interface 5-inter-a, a communication interface 5-comm-a, and a data processing device 5-cpu-a. 10*b* is equipped with a storage space 5-store-b, a GNSS device 5-GNSS-b, a set of cameras 4-cam-b, a data interface 5-inter-b, a communication interface 5-comm-b, and a data processing device 5-cpu-b. 10*c* is equipped with a storage space 5-store-c, a GNSS device 5-GNSS-c, a set of cameras 4-cam-c, a data interface 5-inter-c, a communication interface 5-comm-c, and a data processing device 5-cpu-c.

Figure 8E:
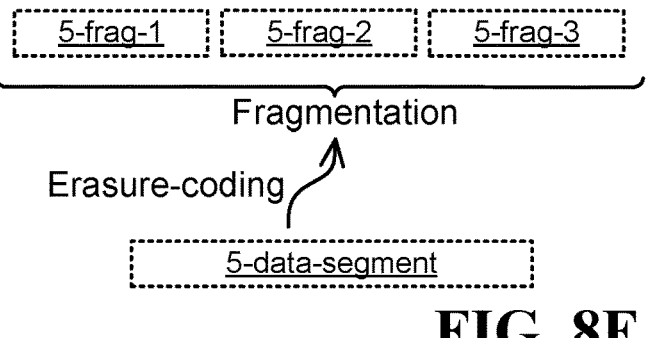
FIG. 8E illustrates one embodiment of a data fragmentation process.

FIG. 8E illustrates one embodiment of a data fragmentation process. Fragments 5-frag-1, 5-frag-2, 5-frag-3 are erasure coded from an original data segment 5-data-segment. Erasure coding schemes may include, but are not limited to, Turbo codes, Reed Solomon codes, rate-less codes, RAID schemes, duplication schemes, error correction schemes, or any scheme or code in which data is fragmented into fragments, encoded with redundant information, and stored among a plurality of different locations or storage places, such as different storage onboard different vehicles, for later retrieval and reconstruction of the original data.

Figure 8F:
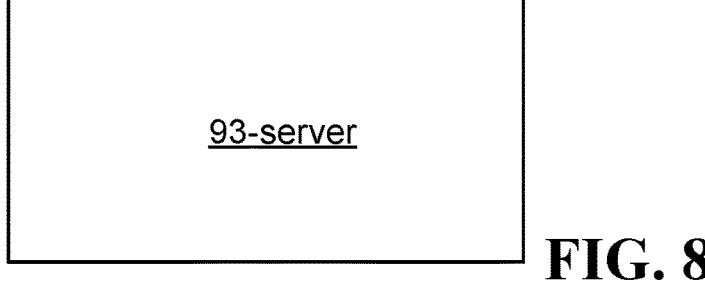
FIG. 8F illustrates one embodiment of a server operative to handle data storage and processing in conjunction with a plurality of on-road vehicles.

FIG. 8F illustrates one embodiment of a server 93-server operative to handle data storage and processing in conjunction with a plurality of on-road vehicles.

One embodiment is a system operative to utilize a plurality of autonomous on-road vehicles for onboard storing of data, comprising: a plurality of data interfaces 5-inter-a, 5-inter-b, 5-inter-c (FIG. 8D) located respectively onboard a plurality of autonomous on-road vehicles 10*a*, 10*b*, 10*c* (FIG. 8A); a plurality of storage spaces 5-store-a, 5-store-b, 5-store-c (FIG. 8D) located respectively onboard said plurality of autonomous on-road vehicles 10*a*, 10*b*, 10*c* and associated respectively with said plurality of data interfaces 5-inter-a, 5-inter-b, 5-inter-c, in which each of the storage spaces 5-store-a, 5-store-b, 5-store-c is operative to store at least imagery data 4-visual-a1, 4-visual-b1, 4-visual-c9 (FIG. 1E) collected in facilitation of autonomously driving the respective autonomous on-road vehicle 10*a*, 10*b*, 10*c*; a plurality of communication interfaces 5-comm-a, 5-commb, 5-comm-c (FIG. 8D) located respectively onboard said plurality of autonomous on-road vehicles 10*a*, 10*b*, 10*c* and associated respectively with said plurality of data interfaces 5-inter-a, 5-inter-b, 5-inter-c; and a server 93-server (FIG. 8F) located off-board the plurality of autonomous on-road vehicles 10*a*, 10*b*, 10*c*.

In one embodiment, the server 93-server is configured to send a plurality of data sets 5-frag-1, 5-frag-2, 5-frag-3 (FIG. 8E) for storage onboard at least some of the autonomous on-road vehicles 10*a*, 10*b*, 10*c*, in which said data sets are unrelated to said autonomous driving; and each of the data interfaces 5-inter-a, 5-inter-b, 5-inter-c is configured to: receive, via the respective communication interface onboard the respective autonomous on-road vehicle, at least one of the data sets (e.g., 5-inter-a receives 5-frag-1 via 5-comm-a, 5-inter-b receives 5-frag-2 via 5-comm-b, and 5-inter-c receives 5-frag-3 via 5-comm-c); and store said data set received in the respective storage space onboard the autonomous on-road vehicle, thereby making dual-use of said respective storage space (e.g., FIG. 8D, 5-inter-a stores 5-frag-1 in 5-store-a, 5-inter-b stores 5-frag-2 in 5-store-b, and 5-inter-c stores 5-frag-3 in 5-store-c).

In one embodiment, said plurality of data sets are a plurality of erasure-coded fragments respectively 5-frag-1, 5-frag-2, 5-frag-3; and the plurality of erasure-coded fragments 5-frag-1, 5-frag-2, 5-frag-3 were created, by the server 93-server, from an original segment of data 5-data-segment (FIG. 8E), using an erasure coding technique, in which the plurality of erasure-coded fragments 5-frag-1, 5-frag-2, 5-frag-3 has a total size that is larger than a total size of said original segment of data 5-data-segment, and therefore only some of the plurality of erasure-coded fragments are needed (e.g., only 5-frag-1 and 5-frag-2, or only 5-frag-1 and 5-frag-3) to fully reconstruct the original segment of data 5-data-segment.

In one embodiment, as some of the autonomous on-road vehicles are on the move (10*a*, 10*b*, 10*c* as seen in FIG. 8B relative to FIG. 8A), at least some of the autonomous on-road vehicles (e.g., 10*c* in FIG. 8B) are outside effective wireless communicative contact 1-CELL-coverage (FIG. 8B) at some given time T25; and therefore the server 93-server is further configured to reconstruct the original segment of data 5-data-segment by being configured to: receive, from, those of the autonomous on-road vehicles 10*a*, 10*b* (FIG. 8B) that are within effective wireless communicative contact 1-CELL-coverage (FIG. 8B), the respective erasure-coded fragments 5-frag-1, 5-frag-2, but not all of the erasure-coded fragments 5-frag-1, 5-frag-2, 5-frag-3 associated with the original segment of data 5-data-segment (since 5-frag-3 is stored in 10*c* that is currently out of communication range); and reconstruct, using only the erasure-coded fragments received 5-frag-1, 5-frag-2, the original segment of data 5-data-segment, thereby achieving data resiliency in conjunction with the original segment of data 5-data-segment and despite the autonomous on-road vehicles 10*a*, 10*b*, 10*c* being on the move and some 10*c* being currently out of effective wireless communicative contact.

In one embodiment, each of the autonomous on-road vehicles 10*a*, 10*b*, 10*c* is a storage node having a specific designation; each of the data sets 5-frag-1, 5-frag-2, 5-frag-3 is matched with at least one of the storage nodes 10*a*, 10*b*, 10*c* using at least one hush function or hush table activated on the data set and resulting in one of the designations; and said matching is used in conjunction with both said sending/storing of the data set 5-frag-1, 5-frag-2, 5-frag-3 and retrieving of the data set 5-frag-1, 5-frag-2, 5-frag-3.

In one embodiment, each of the communication interfaces 5-comm-a, 5-comm-b, 5-comm-c is a wireless communication interface; and at least some of the autonomous on-road vehicles 10a, 10b, 10c drive autonomously to or park in an area 1-parking (FIG. 8C) of good wireless communication coverage 1-CELL-coverage in order to better facilitate said sending of the data sets 5-frag-1, 5-frag-2, 5-frag-3 and a retrieval of the data sets 5-frag-1, 5-frag-2, 5-frag-3.

Figure 8G:
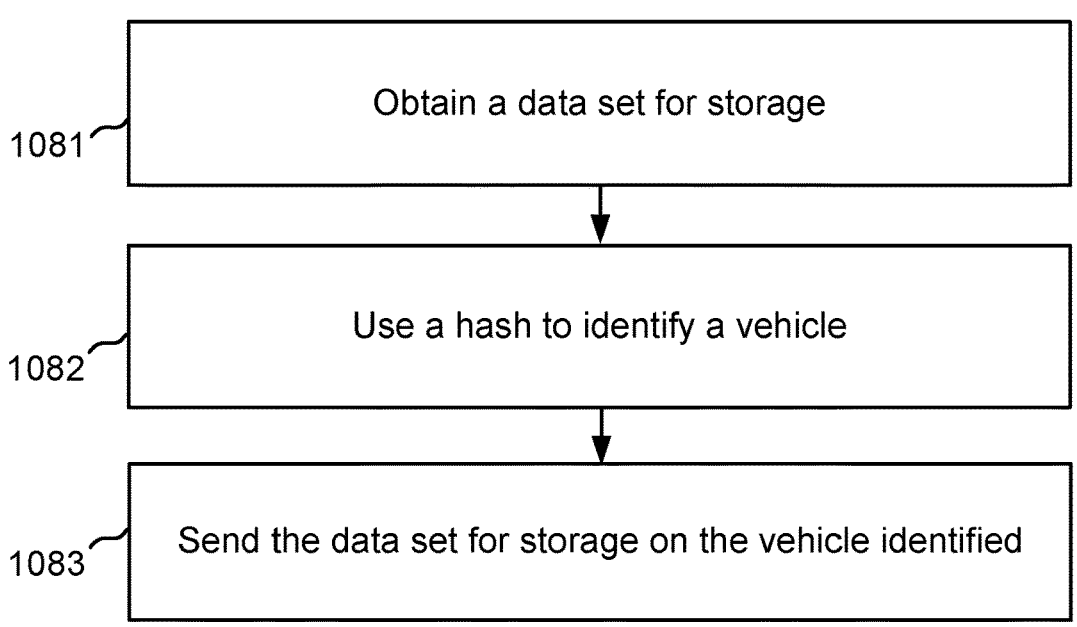
FIG. 8G illustrates one embodiment of a method for utilizing a plurality of on-road vehicles for onboard storage of data.

FIG. 8G illustrates one embodiment of a method for utilizing a plurality of on-road vehicles for onboard storage of data. The method comprises: In step 1081, obtaining, by a server 93-server (FIG. 8F), a data set for storage 1-frag-1 (FIG. 8E). In step 1082, using a hash function or a hash table, in conjunction with the data set 1-frag-1, to identify at least one of a plurality of autonomous on-road vehicles 10a (FIG. 8A). In step 1083, sending, to the autonomous on-road vehicles identified 10a, the data set 1-frag-1 for storage onboard the autonomous on-road vehicles 10a.

Figure 8H:
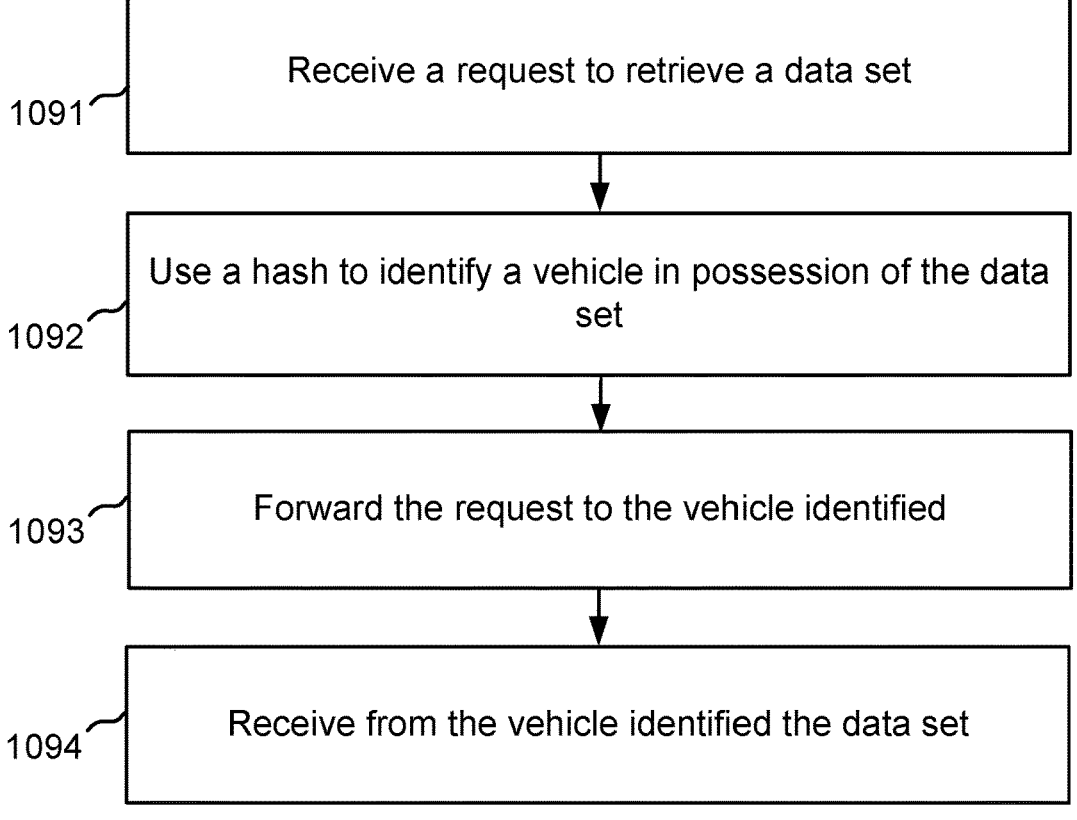
FIG. 8H illustrates one embodiment of a method for retrieving data from a plurality of on-road vehicles.

FIG. 8H illustrates one embodiment of a method for retrieving data from a plurality of on-road vehicles. The method comprises: In step 1091, receiving a request, in the server 93-server, to retrieve the data 1-frag-1 sets stored. In step 1092, using the hash function or the hash table, in conjunction with the data set 1-frag-1, to identify the at least one of the autonomous on-road vehicles 10a in possession of the data set 1-frag-1. In step 1093, forwarding, to the autonomous on-road vehicles identified 10a, said request. In step 1094, receiving, from the autonomous on-road vehicles identified 10a, the data set 1-frag-1.

FIG. 8I illustrates one embodiment of a method for utilizing a plurality of autonomous on-road vehicles for onboard storage of data. The method comprises: In step 1101, obtaining, by a server 93-server (FIG. 8F), a data set for storage 1-frag-1. In step 1102, identifying at least one of a plurality of autonomous on-road vehicles 10a currently under wireless communication coverage 1-CELL-coverage (FIG. 8A). In step 1103, sending, to the autonomous on-road vehicles identified 10a, the data set 1-frag-1 for storage onboard the autonomous on-road vehicles 10a.

FIG. 8J illustrates one embodiment of a method for retrieving data from a plurality of on-road vehicles. The method comprises: In step 1111, receiving a request, in the server 93-server, to retrieve the data sets 1-frag-1 stored. In step 1112, identifying at least one of the autonomous on-road vehicles 10a in possession of the data set 1-frag-1 that is currently under wireless communication coverage 1-CELL-coverage (FIG. 8B). In step 1113, forwarding, to the autonomous on-road vehicles identified 10a, said request. In step 1114, receiving, from the autonomous on-road vehicles identified 10a, the data set 1-frag-1.

One embodiment is a system operative to utilize a plurality of autonomous on-road vehicles for onboard processing of data, comprising: a plurality of data interfaces 5-inter-a, 5-inter-b, 5-inter-c (FIG. 8D) located respectively onboard a plurality of autonomous on-road vehicles 10a, 10b, 10c (FIG. 8A); a plurality of processing elements 5-cpu-a, 5-cpu-b, 5-cpu-c (FIG. 8D) located respectively onboard said plurality of autonomous on-road vehicles 10a, 10b, 10c and associated respectively with said plurality of data interfaces 5-inter-a, 5-inter-b, 5-inter-c, in which each of the processing elements 5-cpu-a, 5-cpu-b, 5-cpu-c is operative to facilitate autonomous driving of the respective autonomous on-road vehicle 10a, 10b, 10c; a plurality of communication interfaces 5-comm-a, 5-comm-b, 5-comm-c (FIG. 8D) located respectively onboard said plurality of autonomous on-road vehicles 10a, 10b, 10c and associated respectively with said plurality of data interfaces 5-inter-a, 5-interb, 5-inter-c; and a server 93-server (FIG. 8F) located off-board the plurality of autonomous on-road vehicles 10a, 10b, 10c.

In one embodiment, the server 93-server is configured to send a plurality of requests to execute specific processing tasks to at least some of the autonomous on-road vehicles 10a, 10b, 10c, in which said processing tasks are unrelated to said autonomous driving; and each of the data interfaces 5-inter-a, 5-inter-b, 5-inter-c is configured to: receive, via the respective communication interface 5-comm-a, 5-comm-b, 5-comm-c onboard the respective autonomous on-road vehicle 10a, 10b, 10c, at least one of the requests; and execute at least one of said specific processing task requested, in which said execution is done using the respective processing element 5-cpu-a, 5-cpu-b, 5-cpu-c onboard the respective autonomous on-road vehicle 10a, 10b, 10c, thereby making dual-use of said respective processing element 5-cpu-a, 5-cpu-b, 5-cpu-c.

In one embodiment, said specific processing tasks are associated with a mathematical task.

In one embodiment, said mathematical tasks are crypto-currency mining such as bitcoin or ethereum mining.

In one embodiment, said mathematical tasks are associated with a machine learning process or a mathematical model associated with machine learning.

In one embodiment, said specific processing tasks are associated with Internet related tasks such as searching.

In one embodiment, each of said processing elements 5-cpu-a, 5-cpu-b, 5-cpu-c has a processing power above 10 (ten) teraflops (trillion floating point operations per second); the plurality of autonomous on-road vehicles 10a, 10b, 10c comprises over 100,000 (one hundred thousand) autonomous on-road vehicles and the respective over 100,000 (one hundred thousand) processing elements; and therefore a total potential aggregated processing power available is above 1,000,000 (one million) teraflops, out of which some processing power is required for autonomously driving the plurality of autonomous on-road vehicles 10a, 10b, 10c, but at least 50,000 (fifty thousand) teraflops, at any given time, are not utilized for autonomously driving the plurality of autonomous on-road vehicles, and are therefore available for performing said specific processing tasks.

In one embodiment, each of the autonomous on-road vehicles 10a, 10b, 10c determines, according to the respective autonomous driving state, how many computational resources, in the respective processing elements 5-cpu-a, 5-cpu-b, 5-cpu-c, are currently being made available for said execution of the specific tasks.

In one embodiment, when the driving state is a parking state (e.g., 10a is parking as seen in FIG. 8C at time T28), then all of the computational resources in the respective processing element (e.g., in 5-cpu-a at time T28) are made available for said execution of the specific tasks.

In one embodiment, as the driving state changes dynamically (e.g., the vehicles 10a, 10b, 10c are autonomously driving as seen in FIG. 8A at time T21, but the same vehicles 10a, 10b, 10c are then parking as seen in FIG. 8C at time T28), each of the autonomous on-road vehicles 10a, 10b, 10c determines dynamically when to stop allocating computational resources in the respective processing element 5-cpu-a, 5-cpu-b, 5-cpu-c for said execution of the specific tasks, as a result of a complex autonomous driving situation requiring high utilization of the respective processing element.

In one embodiment, each of said processing elements 5-cpu-a, 5-cpu-b, 5-cpu-c is associated with at least one of: (i) a graphics processing unit (GPU), (ii) a neural net, (iii) an application specific integrated circuit (ASIC), (iv) a field-programmable gate array (FPGA), and (v) a central processing unit (CPU).

In one embodiment, the system further comprises a plurality of storage spaces 5-store-a, 5-store-b, 5-store-c (FIG. 8D) located respectively onboard the plurality of autonomous on-road vehicles 10a, 10b, 10c and associated respectively with the plurality of data interfaces 5-inter-a, 5-inter-b, 5-inter-c, in which each of the storage spaces 5-store-a, 5-store-b, 5-store-c is operative to store at least imagery data 4-visual-a1, 4-visual-b1, 4-visual-c9 (FIG. 1E) collected in facilitation of autonomously driving the respective autonomous on-road vehicle 10a, 10b, 10c; wherein: each of the data interfaces 5-inter-a, 5-inter-b, 5-inter-c is configured to: receive, via the respective communication interface 5-comm-a, 5-comm-b, 5-comm-c onboard the respective autonomous on-road vehicle 10a, 10b, 10c, at least one data set 5-frag-1, 5-frag-2, 5-frag-3 (FIG. 8E) associated with one of the specific processing tasks (e.g., 5-inter-a receives 5-frag-1 via 5-comm-a, 5-inter-b receives 5-frag-2 via 5-comm-b, and 5-inter-c receives 5-frag-3 via 5-comm-c); store said data set received in the respective storage space onboard the respective autonomous on-road vehicle, thereby making dual-use of said respective storage space (e.g., FIG. 8D, 5-inter-a stores 5-frag-1 in 5-store-a, 5-inter-b stores 5-frag-2 in 5-store-b, and 5-inter-c stores 5-frag-3 in 5-store-c); and use said data set 5-frag-1, 5-frag-2, 5-frag-3 in conjunction with said execution of the specific processing task onboard the respective autonomous on-road vehicle 10a, 10b, 10c.

In one embodiment, said data set 5-frag-1, 5-frag-2, 5-frag-3 constitutes data to be processed by the specific processing tasks.

In one embodiment, said specific processing task is associated with a map-reduce or a single-instruction-multiple-data (SIMD) computational operation, in which each of the data interfaces 5-inter-a, 5-inter-b, 5-inter-c receives the same specific processing task but with a different data set 5-frag-1, 5-frag-2, 5-frag-3 to be processed by said specific processing task.

In one embodiment, the system constitutes a hyper-convergence computational infrastructure 5-cpu-a, 5-cpu-b, 5-cpu-c, 5-store-a, 5-store-b, 5-store-c, in which hyper-convergence computational infrastructure is a type of infrastructure system with a software-centric architecture that tightly integrates compute, storage, networking and virtualization resources.

Figures 9A, 9B:
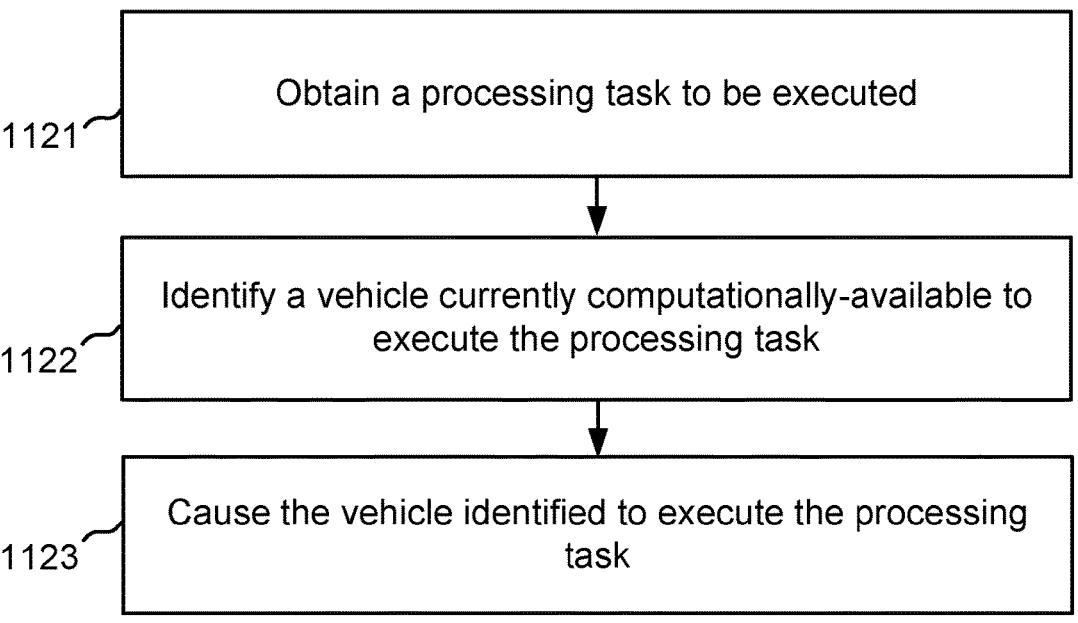
FIG. 9A illustrates one embodiment of a method for utilizing a plurality of on-road vehicles for onboard processing of data.
FIG. 9B illustrates one embodiment of another method for utilizing a plurality of on-road vehicles for onboard processing of data.

FIG. 9A illustrates one embodiment of a method for utilizing a plurality of on-road vehicles for onboard processing of data. The method comprises: In step 1121, obtaining, by a server 93-server (FIG. 8F), a processing task to be executed. In step 1122, identifying at least one of a plurality of autonomous on-road vehicles 10a, 10b, 10c (FIG. 8A) currently operative to execute the processing task. In step 1123, sending, to the autonomous on-road vehicle identified (e.g., 10a), a description of the processing task for execution onboard the autonomous on-road vehicle 10a.

In one embodiment, the method further comprises: receiving, from the autonomous on-road vehicle identified 10a, a result of said processing task executed by said autonomous on-road vehicle identified.

In one embodiment, said autonomous on-road vehicle identified 10a is one of the autonomous on-road vehicles that is currently not using all onboard computational resources for autonomous driving (e.g., when 10a is standing in red light).

In one embodiment, said autonomous on-road vehicle identified 10a is one of the autonomous on-road vehicles that is currently parking, and is therefore not using all onboard computational resources for autonomous driving (e.g., 10a is parking, as seen in FIG. 8C).

In one embodiment, said autonomous on-road vehicle identified 10a is one of the autonomous on-road vehicles that is currently driving in straight line, and is therefore not using all onboard computational resources for autonomous driving.

In one embodiment, said autonomous on-road vehicle identified 10a is one of the autonomous on-road vehicles that is currently in a location having a wireless communication coverage 1-CELL-coverage (FIG. 8A).

FIG. 9B illustrates one embodiment of another method for utilizing a plurality of on-road vehicles for onboard processing of data. The method comprises: In step 1131, obtaining, by a server 93-server (FIG. 8F), a processing task to be executed. In step 1132, sending a bid for executing the processing task to a plurality of autonomous on-road vehicles 10a, 10b, 10c (FIG. 8A). In step 1133, selecting at least one of the plurality of autonomous on-road vehicles (e.g., 10a) to execute the processing task according to results of the bid.

In one embodiment, the method further comprises: receiving, from the autonomous on-road vehicle selected 10a, a result of said processing task executed by said autonomous on-road vehicle selected.

Figure 9C:
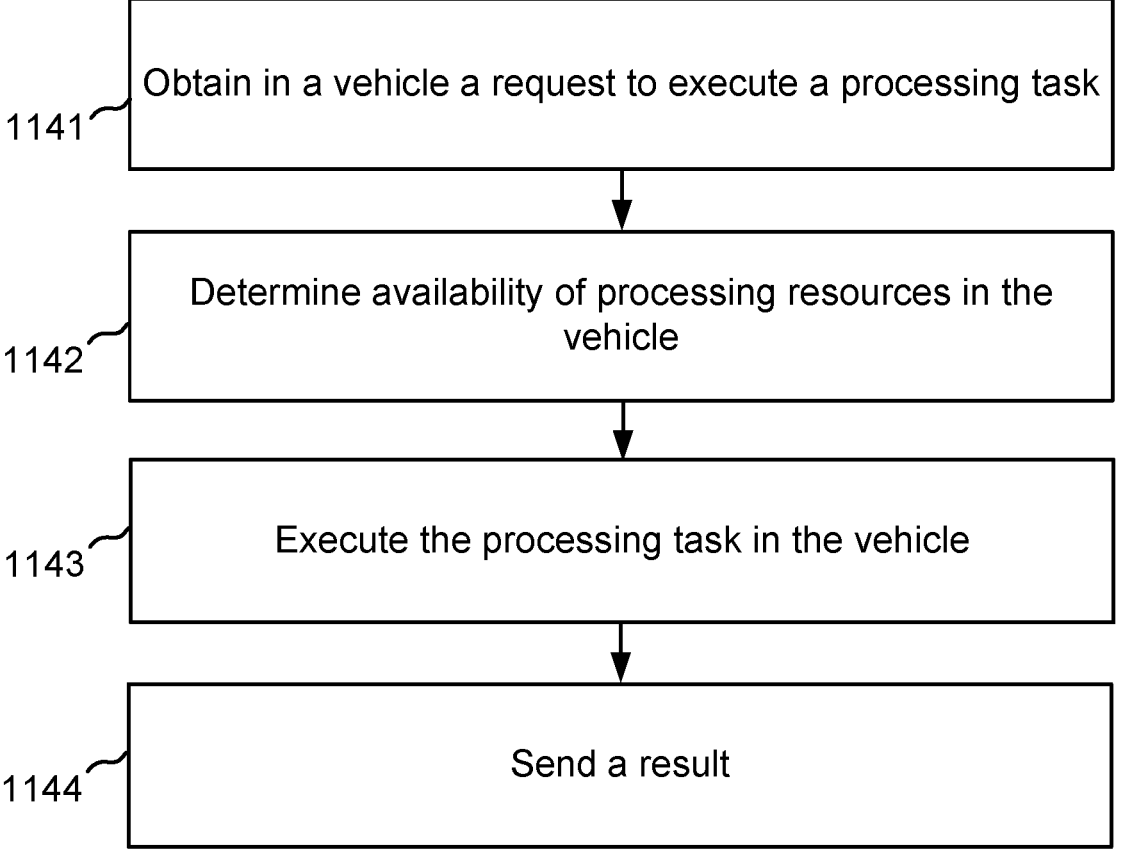
FIG. 9C illustrates one embodiment of yet another method for utilizing a plurality of on-road vehicles for onboard processing of data.

FIG. 9C illustrates one embodiment of yet another method for utilizing a plurality of on-road vehicles for onboard processing of data. The method comprises: In step 1141, obtaining, by an autonomous on-road vehicle 10a (FIG. 8A), a request to execute a processing task. In step 1142, determining, by an autonomous on-road vehicle 10a, that an onboard processing element 5-cpu-a (FIG. 8D), which is associated with autonomously driving the autonomous on-road vehicle, is currently at least partially available for executing the processing task. In step 1143, executing the processing task. In step 1144, sending a result of the processing task.

One embodiment is a system operative to track and cross-associate objects by utilizing a corpus of imagery data collected by a plurality of on-road vehicles. The system includes: a plurality of on-road vehicles 10i, 10j, 10k (FIG. 6A, FIG. 6B, FIG. 6C respectively) moving in a certain geographical area 1-GEO-AREA, in which each of the on-road vehicles 10i, 10j, 10k is configured to capture imagery data of areas surrounding locations visited by the on-road vehicle 10i, 10j, 10k, thereby resulting in a corpus of visual data 4-visual (FIG. 6E) collectively captured by the plurality of on-road vehicles 10i, 10j, 10k, in which various objects, such as pedestrians 1-ped-4, 1-ped-9 (FIG. 6D) and static structures 1-object-2, 1-object-4, appear in the corpus of imagery data 4-visual, and in which each of at least some of the objects 1-ped-4, 1-ped-9, 1-object-2, 1-object-4 appear more than once in the corpus of imagery data 4-visual and in conjunction with more than one location or time of being captured.

In one embodiment, the system is configured to: generate representations 4-visual-i1, 4-visual-j4, 4-visual-k5 (FIG. 6E) for at least some appearances of objects in the corpus of imagery data 4-visual, in which each of the representations 4-visual-i1, 4-visual-j4, 4-visual-k5 is generated from a specific one appearance, or from a specific one sequence of related appearances, of a specific one of the objects, in imagery data captured by one of the on-road vehicles (for example, the representation 4-visual-i1 is generated from the appearance of pedestrian 1-ped-4 in imagery data captured by on-road vehicle 10*i* when passing near object 1-object-2 at time T7 as shown in FIG. 6A, the representation 4-visual-j4 is generated from the appearance of the same pedestrian 1-ped-4 in imagery data captured by on-road vehicle 10*j* when passing near object 1-object-2 at time T8 as shown in FIG. 6B, and the representation 4-visual-k5 is generated from the appearance of the same pedestrian 1-ped-4 in imagery data captured by on-road vehicle 10*k* when passing near object 1-object-4 at time T13 as shown in FIG. 6C); and estimate 10-L3', 10-L4', 10-L5' (FIG. 6E), per each of at least some of the representations 4-visual-i1, 4-visual-j4, 4-visual-k5, a location-at-the-time-of-being-captured of the respective object 1-ped-4, based at least in part on the location of the respective on-road vehicle during the respective capture, thereby associating the representations 4-visual-i1, 4-visual-j4, 4-visual-k5 with static locations respectively 10-L3, 10-L4, 10-L5 (FIG. 6D), and regardless of a dynamic nature of the on-road vehicles that are on the move 10*i*, 10*j*, 10*k*.

In one embodiment, the system is further configured to associate each of the representations 4-visual-i1, 4-visual-j4, 4-visual-k5 with a time at which the respective object 1-ped-4 was captured, thereby possessing, per each of the representations 4-visual-i1, 4-visual-j4, 4-visual-k5, a geo-temporal tag comprising both the time at which the respective object 1-ped-4 was captured and estimated location of the respective object 1-ped-4 at the time of being captured. For example, the representation 4-visual-i1 is associated with a geo-temporal tag T7,10-L3 comprising both the time T7 and the location 10-L3, the representation 4-visual-j4 is associated with a geo-temporal tag T8,10-L4 comprising both the time T8 and the location 10-L4, and the representation 4-visual-k5 is associated with a geo-temporal tag T13,10-L5 comprising both the time T13 and the location 10-L5.

In one embodiment, the system is further configured to: point-out, using the geo-temporal tags T7,10-L3 and T8,10-L4 and T13,10-L5, at least two of the representations 4-visual-i1, 4-visual-j4 as representations having a similar, though not necessarily identical, geo-temporal tags, which indicates geo-temporal proximity, in which the representations that are currently pointed-out 4-visual-i1, 4-visual-j4 were generated from imagery data captured previously by at least two different ones of the on-road vehicles 10*i*, 10*j* respectively (for example, time of capture T8 may be only 40 seconds later than time of capture T7, and location of capture 10-L4 may be only 30 meters away from location of capture 10-L3, which suggests the possibility that the separate representations 4-visual-i1, 4-visual-j4, taken by separate vehicles 10*i*, 10*j*, are actually representing the same one pedestrian 1-ped-4 walking down the street); analyze the representations 4-visual-i1, 4-visual-j4, which were pointed-out, to identify which of the representations belong to a single object 1-ped-4 (as some of them may belong to other objects, such as 1-ped-9); link the representations identified 4-visual-i1, 4-visual-j4, thereby creating a linked-representation 4-visual-i1+4-visual-j4 of the single object 1-ped-4; and link the geo-temporal tags T7,10-L3 and T8,10-L4 of the representations identified 4-visual-i1, 4-visual-j4, thereby creating a linked geo-temporal tag T7,10-L3+T8, 10-L4 associated with the linked-representation 4-visual-i1+ 4-visual-j4.

In one embodiment, the system is further configured to detect, using the linked geo-temporal tag T7,10-L3+T8,10-L4, a movement of the respective object 1-ped-4 from a first geo-temporal coordinate T7,10-L3 to a second geo-temporal coordinate T8,10-L4 which are present in the linked geo-temporal tag, thereby tracking the respective object 1-ped-4.

In one embodiment, the system is further configured to: point-out, using the linked-geo-temporal tags T7,10-L3+T8, 10-L4 and the geo-temporal tags T13,10-L5, one of the linked-representations 4-visual-i1+4-visual-j4 and at least one other linked-representation or a non-linked representation 4-visual-k5 as representations having a similar, though not necessarily identical, geo-temporal coordinates appearing in the respective tags, which indicates geo-temporal proximity (for example, time of capture T13 may be only 120 seconds later than time of capture T8, and location of capture 10-L5 may be only 100 meters away from location of capture 10-L4, which suggests the possibility that the separate representations 4-visual-k5, 4-visual-j4, taken by separate vehicles 10*k*, 10*j*, are actually representing the same one pedestrian 1-ped-4 crossing the street and walking in a certain direction. Similarity between geo-temporal coordinates can be determined for longer times and distances as well, and up to 1 kilometer and 10 minutes differentials or even further and longer); analyze the representations 4-visual-i1+4-visual-j4, 4-visual-k5, which were pointed-out, to identify which of the other representations 4-visual-k5 belong to the single object 1-ped-4 associated with said one of the linked-representations 4-visual-i1+4-visual-j4; expand said one of the linked-representations 4-visual-i1+ 4-visual-j4 using at least a second one of the linked representations or representation identified 4-visual-k5, thereby creating an updated linked-representation 4-visual-i1+4-visual-j4+4-visual-k5 of the single object 1-ped-4; and link the geo-temporal tags T7,10-L3+T8,10-L4 and T13,10-L5 of said one linked-representation 4-visual-i1+4-visual-j4 and the other representations 4-visual-k5 identified, thereby creating an updated linked geo-temporal tag T7,10-L3+T8,10-L4+T13,10-L5 associated with the updated linked-representation 4-visual-i1+4-visual-j4+4-visual-k5. In one embodiment, the system is further configured to detect, using the updated linked geo-temporal tag T7,10-L3+T8,10-L4+T13,10-L5, a movement of the respective object 1-ped-4 from a first geo-temporal coordinate T8,10-L4 to a second geo-temporal coordinate T13,10-L5 which are present in the updated linked geo-temporal tag, thereby tracking the respective object 1-ped-4.

In one embodiment, each of the representations 4-visual-i1, 4-visual-j4, 4-visual-k5 comprises features extracted from imagery data associated with the respective appearance of the respective object 1-ped-4; and the analysis of the representations is done by comparing said features extracted. In one embodiment, the single object 1-ped-4 is a pedestrian; and the features extracted comprise at least one of: (i) facial features of the pedestrian, (ii) motion features of the pedestrian, such as a certain walking dynamics (iii) clothing worn by the pedestrian including clothing colors and shapes, (iv) body features of the pedestrian, such as height, width, construction, proportions between body parts, and (v) any feature enabling to compare and match the representations 4-visual-i1, 4-visual-j4, 4-visual-k5 thereby achieving said identification.

In one embodiment, each of the representations 4-visual-i1, 4-visual-j4, 4-visual-k5 comprises at least one classification performed in conjunction with the respective appearance of the respective object 1-ped-4 in the respective imagery data; and said analysis of the representations (to determine if the representations belong to a single object) is done by comparing and matching the classifications of the representations. In one embodiment, the single object is a pedestrian 1-ped-4; and each of the classifications is done using classification models, such as a machine learning classification models, that are trained or designed to classify at least one of: (i) facial features of the pedestrian, (ii) motion features of the pedestrian, such as a certain walking dynamics (iii) clothing worn by the pedestrian including clothing colors and shapes, (iv) body features of the pedestrian, such as height, width, construction, proportions between body parts, and (v) the pedestrian appearance or behavior in general.

In one embodiment, each of the representations 4-visual-i1, 4-visual-j4, 4-visual-k5 comprises at least one image or a part of an image or a video sequence derived from the respective appearance of the respective object 1-ped-4 in the respective imagery data; and said analysis of the representations is done by comparing and matching the images.

In one embodiment, each of the representations 4-visual-i1, 4-visual-j4, 4-visual-k5 is generated in the respective on-road vehicle 10i, 10j, 10k from the respective appearance of the respective object 1-ped-4 in the imagery data collected by that on-road vehicle, using an on-board processing elements 5-inter-i, 5-inter-j, 5-inter-k (FIG. 6E) that processes the imagery data locally. In one embodiment, said generation of the representations 4-visual-i1, 4-visual-j4, 4-visual-k5 is done in real-time by the respective on-road vehicles 10i, 10j, 10k, as the respective imagery data is captured therewith. In one embodiment, said generation of the representations 4-visual-i1, 4-visual-j4, 4-visual-k5 is done in retrospect, by the respective on-road vehicles 10i, 10j, 10k, using the respective imagery data that is stored 5-store-i, 5-store-j, 5-store-k (FIG. 6E) in the respective on-road vehicle 10i, 10j, 10k after being captured therewith. In one embodiment, the system further comprises a server 95-server (FIG. 6f, FIG. 6G); wherein said generation retrospectively is done in the respective on-road vehicle 10i, 10j, 10k as a response to a request, from the server 95-server, to the specific on-road vehicle 10i, 10j, 10k, to generate the representations 4-visual-i1, 4-visual-j4, 4-visual-k5 in conjunction with a specific past location 10-L3, 10-L4, 10-L5 or period in time T7, T8, T13. In one embodiment, said generation retrospectively is done in the respective on-road vehicle 10i, 10j, 10k at a time when the respective on-board processing element 5-inter-i, 5-inter-j, 5-inter-k (FIG. 6E) is available to make such generation.

In one embodiment, the system further comprises a server 95-server (FIG. 6F, FIG. 6G); wherein: the representations 4-visual-i1, 4-visual-j4, 4-visual-k5 and geo-temporal tags T7,10-L3 and T8,10-L4 and T13,10-L5 are sent to the server 95-server after being generated in the respective on-road vehicles 10i, 10j, 10k; and said pointing-out, analyzing, and linking is done in the server 95-server using the representations 4-visual-i1, 4-visual-j4, 4-visual-k5 and geo-temporal tags T7,10-L3 and T8,10-L4 and T13,10-L5 accumulated from at least some of the plurality of on-road vehicles 10i, 10j, 10k.

In one embodiment, the system is further configured to train a specific model 4-model-2 (FIG. 6F), such as a specific machine learning classification model, to detect and identify the single object 1-ped-4, in which said training is based at least in part on said linked-representation 4-visual-i1+4-visual-j4 of the single object 1-ped-4. In one embodiment, the system is further configured to use the specific model 4-model-2 to identify additional representations 4-visual-k5 and related geo-temporal tags T13,10-L5 associated with the single object 1-ped-4, thereby tracking the single object 1-ped-4. In one embodiment, the single object 1-ped-4 is a specific person; and the specific model 4-model-2 is operative to detect and identify the specific person.

In one embodiment, the system is further configured to: point-out, using the geo-temporal tags T7,10-L3, at least additional two of the representations 4-visual-c9 (FIG. 1H), 4-visual-b1 (FIG. 1I) as representations having a similar, though not necessarily identical, geo-temporal tags T2,10-L1 and T2,10-L1, which indicates geo-temporal proximity, in which the additional representations 4-visual-c9, 4-visual-b1 that are currently pointed-out were generated from imagery data captured previously by at least additional two different ones 10c, 10b of the on-road vehicles respectively; analyze the additional representations 4-visual-c9, 4-visual-b1, which were pointed-out, to identify which of the additional representations 4-visual-c9, 4-visual-b1 belong to an additional single object 1-ped-2; link the additional representations identified 4-visual-c9, 4-visual-b1, thereby creating an additional linked-representation 4-visual-c9+4-visual-b1 of the additional single object 1-ped-2; and link the geo-temporal tags T2,10-L1 and T2,10-L1 of the additional representations identified, thereby creating an additional linked geo-temporal tag T2,10-L1+T2,10-L1 associated with the additional linked-representation 4-visual-c9+4-visual-b1. In one embodiment, the system is further configured to identify an identical or similar geo-temporal coordinate appearing in both the linked geo-temporal tag T7,10-L3+T8,10-L4 and the additional linked geo-temporal tag T2,10-L1+T2,10-L1, thereby determining a cross-association between the two objects 1-ped-4, 1-ped-2. For example, T7,10-L3 and T2,10-L1 may be identical to within 2 seconds and 10 meters, thereby triggering said cross-association. In one embodiment, the single object 1-ped-4 and the additional single object 1-ped-2 are two different pedestrians, in which said cross associated is related to a meeting or another interaction between the two pedestrians. In one embodiment, the single object is a pedestrian 1-ped-4 and the additional single object 1-ped-2 is a structure 1-object-2 such as a house or a shop, in which said cross associated is related to an entering or exiting of the pedestrian 1-ped-4 to/from the structure 1-object-2.

In one embodiment, the system further comprises a server 95-server (FIG. 6F, FIG. 6G); wherein the server 95-server is configured to: select a certain one of the representations 4-visual-i1 having a respective certain geo-temporal tag T7,10-L3 and associated with a certain appearance of a certain one of the objects 1-ped-4, in which said certain representation selected 4-visual-i1 was generated from imagery data captured by a certain one of the on-road vehicles 10i; and track said certain object 1-ped-4 by identifying additional representations 4-visual-j4, 4-visual-k5 and respective geo-temporal tags T8,10-L4 and T13,10-L5 that are associated with additional appearances of said certain object 1-ped-4, in which the additional representations identified 4-visual-j4, 4-visual-k5 were generated from imagery data captured by additional ones 10j, 10k of the on-road vehicles. In one embodiment, said identification is achieved by: pointing-out, in the system, a group of several representations 4-visual-j4, 4-visual-k5 associated with respective several geo-temporal tags T8,10-L4 and T13,10-L5 having a geo-temporal proximity to said certain geo-temporal tag T7,10-L3; and analyzing and comparing the group of several representations 4-visual-j4, 4-visual-k5 in respect to the certain representation 4-visual-i1, in which the representations identified 4-visual-j4, 4-visual-k5 are the ones in the group that resemble the certain representation 4-visual-i1 as apparent from said analysis and comparison.

In one embodiment, the system further comprises a server 95-server (FIG. 6F, FIG. 6G); wherein the server 95-server is configured to track a specific one of the objects 1-ped-4 by identifying which of the representations 4-visual-i1, 4-visual-j4, 4-visual-k5 and related geo-temporal tags T7,10-L3 and T8,10-L4 and T13,10-L5 generated by several ones of the on-road vehicles 10i, 10j, 10k are associated with said specific object 1-ped-4, in which said identification is achieved by using a specific model 4-model-2 (FIG. 6F), such as a machine learning classification model, that is specifically trained or designed to detect and identify the specific object 1-ped-4 in conjunction with any of the representations 4-visual-i1, 4-visual-j4, 4-visual-k5. In one embodiment, said identification is achieved by: using the specific model 4-model-2 to identify a first representation 4-visual-i1 as a representation that is associated with the specific object 1-ped-4; using the geo-temporal tag T7,10-L3 associated with the first representation identified 4-visual-i1, to identify other representations 4-visual-j4, 4-visual-k5 having geo-temporal tags T8,10-L4 and T13,10-L5 that are in geo-temporal proximity to the geo-temporal tag T7,10-L3 of the first representation 4-visual-i1; and using the specific model 4-model-2 to identify at least some of the other representations 4-visual-j4, 4-visual-k5 as being associated with the specific object 1-ped-4. In one embodiment, each of the representations 4-visual-i1, 4-visual-j4, 4-visual-k5 comprises at least one image or a part of an image or a video sequence derived from the respective appearance of the respective object 1-ped-4 in the respective imagery data; each of the representations 4-visual-i1, 4-visual-j4, 4-visual-k5 is generated and stored 5-store-i, 5-store-j, 5-store-k locally by the respective on-road vehicle 10i, 10j, 10k; and said identification of the other representations 4-visual-j4, 4-visual-k5 is achieved by: identifying which of the on-road vehicles 10j, 10k were in geo-temporal proximity in respect to the geo-temporal tag T7,10-L3 associated with the first representation 4-visual-i1; and identifying which of the representations 4-visual-j4, 4-visual-k5, in the on-road vehicles identified 10j, 10k, has a geo-temporal tag T8,10-L4 and T13,10-L5 in geo-temporal proximity to the geo-temporal tag T7,10-L3 associated with the first representation 4-visual-i1. In one embodiment, said using of the specific model 4-model-2 comprises: sending the model 4-model-2 from the sever 95-server to the on-road vehicles identified 10j, 10k; and applying the specific model 4-model-2, by each of the on-road vehicles identified 10j, 10k, on the representations identified 4-visual-j4, 4-visual-k5 in the on-road vehicle and stored locally 5-store-j, 5-store-k.

In one embodiment, the representations 4-visual-j4, 4-visual-k5 are delivered from the on-road vehicles 10j, 10k to the server 95-server; and said using of the specific model 4-model-2 is done in the server 95-server.

One embodiment is a system operative to generate and train specific models to identify specific persons by utilizing a corpus of imagery data collected by a plurality of on-road vehicles. The system includes: a plurality of on-road vehicles 10i, 10j, 10k (FIG. 6A, FIG. 6B, FIG. 6C respectively) moving in a certain geographical area 1-GEO-AREA, in which each of the on-road vehicles 10i, 10j, 10k is configured to capture imagery data of areas surrounding locations visited by the on-road vehicle 10i, 10j, 10k, thereby resulting in a corpus of visual data 4-visual (FIG. 6E) collectively captured by the plurality of on-road vehicles 10i, 10j, 10k, in which various persons 1-ped-4 (FIG. 6D), such as pedestrians or drivers, appear in the corpus of imagery data 4-visual, and in which each of at least some of the persons 1-ped-4 appear more than once in the corpus of imagery data 4-visual and in conjunction with more than one location or time of being captured.

In one embodiment, the system is configured to: use at least one of the appearances, or a representation thereof 4-visual-i1 (FIG. 6E), of one of the persons 1-ped-4 in the corpus of visual data 4-visual collectively captured by the plurality of on-road vehicles 10i, 10j, 10k, to generate an initial specific model 4-model-1 (FIG. 6F) operative to at least partially detect and identify said one person 1-ped-4 specifically; identify, using the initial specific model 4-model-i, additional appearances, or representations thereof 4-visual-j4 (FIG. 6E), of said one of the persons 1-ped-4 in the corpus of visual data 4-visual collectively captured by the plurality of on-road vehicles 10i, 10j, 10k; and improve said initial specific model 4-model-1 using the additional appearances identified 4-visual-j4, thereby resulting in an improved specific model 4-model-2 (FIG. 6F) operative to better detect and identify said one person 1-ped-4 specifically.

In one embodiment, the system is further configured to: identify, using the improved specific model 4-model-2, yet additional appearances, or representations thereof 4-visual-k5, of said one of the persons 1-ped-4 in the corpus of visual data 4-visual collectively captured by the plurality of on-road vehicles 10i, 10j, 10k; and improve further said initial model using the yet additional appearances identified 4-visual-k5, thereby resulting in an even more improved specific model 4-model-3 (FIG. 6G) operative to even better detect and identify said one person 1-ped-4 specifically.

In one embodiment, said improvement of the initial specific model 4-model-1 is done by training or re-training the model using at least the additional appearances 4-visual-j4 as input, in which said training is associated with machine learning techniques. In one embodiment, at least some of the additional appearances 4-visual-j4 (FIG. 6D, FIG. 6E) are captured while the respective person 1-ped-4 was less than 10 (ten) meters from the respective on-road vehicle 10j capturing the respective imagery data, and so as to allow a clear appearance of the person's face; and said clear appearance of the person's face is used as an input to said training or re-training the model. In one embodiment, at least some of the additional appearances 4-visual-j4 are captured in conjunction with the respective person 1-ped-4 walking or moving, and so as to allow a clear appearance of the person's walking or moving patterns of motion; and said clear appearance of the person 1-ped-4 walking or moving is used as an input to said training or re-training the model, thereby resulting in said improved specific model 4-model-2 that is operative to both detect and identify the person's face and detect and identify the person's motion dynamics.

In one embodiment, said using of the clear appearance of the person's face as an input to said training or re-training the model, results in said improved specific model 4-model-2 that is operative to detect and identify said one person 1-ped-4 specifically; and the system is further configured to use the improved specific model 4-model-2 to identify said one person 1-ped-4 in an external visual database, thereby determining an identity of said one person 1-ped-4.

In one embodiment, the system is further configured to: generate representations 4-visual-i1 for at least some appearances of persons 1-ped-4 in the corpus of imagery data 4-visual, in which each of the representations 4-visual-i1 is generated from a specific one appearance, or from a specific one sequence of related appearances, of one of the persons 1-ped-4, in imagery data captured by one of the on-road vehicles 10i; estimate, per each of at least some of the representations 4-visual-i1, a location-at-the-time-of-being-captured 10-L3 of the respective person 1-ped-4, based at least in part on the location of the respective on-road vehicle 10*i* during the respective capture, thereby associating the representations 4-visual-i1 with static locations 10-L3 respectively, and regardless of a dynamic nature of the on-road vehicles 10*i* that are on the move; and associate each of the representations 4-visual-i1 with a time T7 at which the respective person 1-ped-4 was captured, thereby possessing, per each of the representations 4-visual-i1, a geo-temporal tag T7,10-L3 comprising both the time T7 at which the respective person 1-ped-4 was captured and estimated location 10-L3 of the respective person 1-ped-4 at the time of being captured. In one embodiment, said at least one of the appearances 4-visual-i1 of one of the persons 1-ped-4, which is used to generate the initial specific model 4-model-1, comprises at least two appearances, in which the two appearance are found in the system by: pointing-out, using the geo-temporal tags T7,10-L3, at least two of the representations as representations having a similar, though not necessarily identical, geo-temporal tags, which indicates geo-temporal proximity, in which the representations that are currently pointed-out were generated from imagery data captured previously by at least two different ones of the on-road vehicles respectively; and analyzing the representations, which were pointed-out, to identify which of the representations belong to a single person, in which the representations identified constitute said at least two appearances found in the system.

In one embodiment, the initial specific model 4-model-1 is passed by a server 95-server (FIG. 6F, FIG. 6G) in the system to at least some of the on-road vehicles 10*i*, 10*j*, 10*k*; and said identification, using the initial specific model 4-model-1, of the additional appearances 4-visual-j4 of said one of the persons 1-ped-4 in the corpus of visual data, is done locally on-board the on-road vehicles 10*j*.

In one embodiment, at least some of the appearances 4-visual-j4 are passed by the on-road vehicles 10*j* to a server 95-server (FIG. 6F, FIG. 6G) in the system; and said identification, using the initial specific model 4-model-1, of the additional appearances 4-visual-j4 of said one of the persons 1-ped-4 in the corpus of visual data, is done in the server 95-server.

One embodiment is a system operative to associate persons with other persons or objects by utilizing a corpus of imagery data collected by a plurality of on-road vehicles. The system includes: a plurality of on-road vehicles 10*i*, 10*j*, 10*k* (FIG. 6A, FIG. 6B, FIG. 6C respectively) moving in a certain geographical area 1-GEO-AREA, in which each of the on-road vehicles 10*i*, 10*j*, 10*k* is configured to capture imagery data of areas surrounding locations visited by the on-road vehicle 10*i*, 10*j*, 10*k*, thereby resulting in a corpus of visual data 4-visual (FIG. 6E) collectively captured by the plurality of on-road vehicles 10*i*, 10*j*, 10*k*, in which various persons, such as pedestrians 1-ped-4 (FIG. 6D) and drivers, and various objects, such as wearable items 1-object-9 (FIG. 6D) worn by persons and structures 1-object-2 (FIG. 6D) visited by persons, appear in the corpus of imagery data 4-visual, and in which each of at least some of the persons 1-ped-4 and objects 1-object-9 appear more than once in the corpus of imagery data 4-visual and in conjunction with more than one location or time of being captured.

In one embodiment, the system is configured to: generate or receive, per each of at least some persons 1-ped-4, a model 4-model-2 (FIG. 6F) operative to detect and identify the person 1-ped-4 specifically; identify, per each of the persons 1-ped-4 associated with a model 4-model-2, from the corpus of visual data 4-visual collectively captured by the plurality of on-road vehicles 10*i*, 10*j*, 10*k*, appearances

4-visual-i1, 4-visual-j4, 4-visual-k5 (FIG. 6E) of that person 1-ped-4, using the respective model 4-model-2; and per each of the persons 1-ped-4 for which appearances 4-visual-i1, 4-visual-j4, 4-visual-k5 have been identified, use the appearances identified 4-visual-i1, 4-visual-j4, 4-visual-k5, together with a bank of object models 4-model-B (FIG. 6G), to associate the person 1-ped-4 with at least one specific object 1-object-9 (FIG. 6D).

In one embodiment, said specific object 1-object-9 is a specific wearable object such as a specific brand watch or a specific brand shirt worn by the person 1-ped-4; and the specific wearable object 1-object-9 is clearly visible in at least one of the appearances identified 4-visual-j4, thereby allowing said association.

In one embodiment, said clear visibility of the specific wearable object 1-object-9 is facilitated by at least one of the on-road vehicles 10*j* passing within 2 (two) meters proximity to the respective person 1-ped-4 wearing the specific wearable object 1-object-9 while capturing the respective imagery data. In one embodiment, said passing within 2 (two) meters proximity is achieved as a result of a pure coincidence. In one embodiment, said passing within 2 (two) meters proximity is achieved as a result of a direct request to achieve said clear visibility, in which at least one of the on-road vehicles 10*j*, which may be autonomous, changes a respective navigation plan to comply with the request.

In one embodiment, said clear visibility of the specific wearable object 1-object-9 is facilitated by at least one of the on-road vehicles 10*j* stopping or having a zero relative velocity in conjunction with the respective person 1-ped-4 wearing the specific wearable object 1-object-9 while capturing the respective imagery data. In one embodiment, said stopping or having a zero relative velocity is achieved as a result of a pure coincidence. In one embodiment, said stopping or having a zero relative velocity is achieved as a result of a direct request to achieve said clear visibility, in which at least one of the on-road vehicles 10*j*, which may be autonomous, changes a respective navigation plan to comply with the request.

In one embodiment, said specific object is a another person 1-ped-9 (FIG. 6D); and the another person 1-ped-9 is clearly visible together with the respective person 1-ped-4 in at least one of the appearances identified 4-visual-i1, thereby allowing said association. In one embodiment, said clear visibility of the another person 1-ped-9 is facilitated by at least one of the on-road vehicles 10*i* passing within 2 (two) meters proximity to the respective person 1-ped-4 and the another person 1-ped-9 while capturing the respective imagery data showing the two persons together.

In one embodiment, said specific object is a another person 1-ped-9; the another person 1-ped-9 is visible together with the respective person 1-ped-4 in at least one of the appearances identified 4-visual-i1, but not clearly visible, thereby not directly allowing said association; and the association is done indirectly, by tracking the another person 1-ped-9 using the corpus of visual data 4-visual, and identifying the another person 1-ped-9 using other appearances of the other person 1-ped-9.

In one embodiment, said specific object is a specific structure 1-object-2 (FIG. 6D) such as a specific shop or a specific house; and the specific structure 1-object-2 is visible together with the respective person 1-ped-4 in at least one of the appearances identified 4-visual-i1.

In one embodiment, per each of the persons 1-ped-4 for which association have been made to several specific objects 1-object-9, 1-object-2, 1-ped-9, the system is further configured to generate, using said association, a specific profile 4-profile (FIG. 6G) of that respective person 1-ped-4.

In one embodiment, at least some of the specific objects are other persons 1-ped-9, in which said association is made by detecting the respective person 1-ped-4 together with said other persons 1-ped-9 in at least some of the appearances identified 4-visual-i1; and the specific profile generated 4-profile comprises a social profile, in which said social profile comprises said other persons associated 1-ped-9.

In one embodiment, at least some of the specific objects are structures 1-object-2, such as recreational centers and private houses, in which said association is made by detecting the respective person 1-ped-4 entering or exiting the structures 1-object-2 in at least some of the appearances identified 4-vosual-i1; and the specific profile generated 4-profile comprises a location profile, in which said location profile comprises the structures associated 1-object-2.

In one embodiment, at least some of the specific objects are wearable or carryable objects such as a specific brand watch 1-object-9 or a specific brand suitcase worn or carried by the respective person 1-ped-4, in which said association is made by detecting the respective person 1-ped-4 wearing or carrying the objects 1-object-9 in at least some of the appearances identified 4-visual-i1; and the specific profile generated 4-profile comprises a brand profile, in which said brand profile comprises the objects associated 1-object-9 and related brands.

In one embodiment, the specific profile 4-profile is generated, updated, and maintained over a long period of time by using the respective appearances of the respective person 1-ped-4 in the corpus of imagery data 4-visual collected by the plurality of on-road vehicles 10i, 10j, 10k over said long period of time. In one embodiment, said long period of time is at least one year. In one embodiment, said long period of time is at least one month.

In one embodiment, the specific profile 4-profile is used for targeted advertising in conjunction with the respective person 1-ped-4.

In one embodiment, said targeted advertising is presented to the respective person 1-ped-4 in a certain shop, in which the respective person is identified in the certain shop using the respective model 4-model-2 or another model of that respective person.

In one embodiment, said targeted advertising is presented to the respective person 1-ped-4 by a certain on-road vehicle passing near the respective person, in which the respective person is identified by the certain on-road vehicle using the related model 4-model-2 or another model of that respective person.

In one embodiment, said targeted advertising is presented to the respective person 1-ped-4 inside a certain on-road vehicle carrying the respective person, in which the respective person is identified by the certain on-road vehicle using the related model 4-model-2 or another model of that respective person.

In one embodiment, said targeted advertising is presented to the respective person 1-ped-4 via an electronic medium, such as the Internet.

In one embodiment, the specific profile, or selected parts of the specific profile, is sent to potential advertisers; and the potential advertisers bid for said advertising in conjunction with the respective person 1-ped-4.

One embodiment is a system operative to predict intentions or needs of specific persons by utilize a corpus of imagery data collected by a plurality of on-road vehicles. The system includes: a plurality of on-road vehicles 10i, 10j, 10k (FIG. 6A, FIG. 6B, FIG. 6C respectively) moving in a certain geographical area 1-GEO-AREA, in which each of the on-road vehicles 10i, 10j, 10k is configured to capture imagery data of areas surrounding locations visited by the on-road vehicle 10i, 10j, 10k, thereby resulting in a corpus of visual data 4-visual (FIG. 6E) collectively captured by the plurality of on-road vehicles 10i, 10j, 10k, in which various objects, such as pedestrians 1-ped-4 (FIG. 6D) and static structures 1-object-2 (FIG. 6D), appear in the corpus of imagery data 4-visual, and in which each of at least some of the objects appear more than once in the corpus of imagery data and in conjunction with more than one location or time of being captured.

In one embodiment, the system is configured to: generate or receive, per each of at least some persons 1-ped-4, a model 4-model-2 (FIG. 6F) operative to detect and identify the person 1-ped-4 specifically; identify, per each of the persons 1-ped-4 associated with a model 4-model-2, in the corpus of visual data 4-visual collectively captured by the plurality of on-road vehicles 10i, 10j, 10k, appearances 4-visual-i1, 4-visual-j4, 4-visual-k5 of that person 1-ped-4, using the respective model 4-model-2; and per each of the persons 1-ped-4 for which appearances have been identified, use the appearances identified 4-visual-i1, 4-visual-j4, 4-visual-k5 to: (i) predict intentions or needs of that person 1-ped-4, and (ii) perform at least a certain action based on said prediction.

In one embodiment, said appearances identified 4-visual-i1, 4-visual-j4, 4-visual-k5 indicate that the person 1-ped-4 is currently interested in getting a taxi, or may be interested in getting a taxi, or may need a taxi service soon; said prediction is a prediction that the person 1-ped-4 is likely to use a taxi service soon; and the certain action is directing a taxi to the location of the person 1-ped-4. In one embodiment, said appearances identified 4-visual-i1, 4-visual-j4, 4-visual-k5 comprise at least two appearances 4-visual-i1, 4-visual-k5 captured respectively by different two of the on-road vehicles 10i, 10k at different locations 10-L3, 10-L5, thereby concluding that the person 1-ped-4 has already been walking a certain distance and therefore is likely to use a taxi service soon. In one embodiment, said appearances identified 4-visual-i1, 4-visual-j4, 4-visual-k5 comprise at least two appearances 4-visual-i1, 4-visual-j4 captured respectively by different two of the on-road vehicles 10i, 10j at different times, in which the first appearance 4-visual-i1 show the person 1-ped-4 getting to a certain location 10-L3 using a taxi, and the second appearance 4-visual-j4 show the person 1-ped-4 exiting the certain location and therefore possibly needing a taxi to go back.

In one embodiment, said appearances identified 4-visual-i1, 4-visual-j4, 4-visual-k5 indicate that the person 1-ped-4 is currently interested in a certain product or brand, or may be interested in a certain product or brand, or may need a certain product or brand; said prediction is a prediction that the person 1-ped-4 is likely to buy, or to consider buying, the certain product or brand soon; and the certain action is associated with targeted advertising of the certain product or brand in conjunction with said person 1-ped-4. In one embodiment, said appearances identified 4-visual-i1, 4-visual-j4, 4-visual-k5 comprise at least two appearances captured respectively by different two of the on-road vehicles at different times, in which the first appearance show the person 1-ped-4 with a first product, and the second appearance show the person with a second product, in which said first and second products are related to the certain product or brand and therefore indicating a possible interest of that person in the certain product or brand. In one embodiment, the first product is a product of a first type, such as a specific brand watch; the second product is similar to the first product but of a second type, such that a watch of another brand, thereby indicating a general interest in watches.

One embodiment is a system operative to use imagery data captured separately by at least two on-road vehicles to arrive at a certain conclusion regarding a certain person. The system includes: a first on-road vehicle 10*i* (FIG. 6A) capturing imagery data 4-visual-i1 (FIG. 6E) of a certain person 1-ped-4 in conjunction with a first geo-temporal location T7,10-L3 (FIG. 6D); and a second on-road vehicle 10*j* (FIG. 6B) capturing additional imagery data 4-visual-j4 (FIG. 6E) of the same certain person 1-ped-4 in conjunction with a second geo-temporal location T8,10-L4 (FIG. 6D).

In one embodiment, the system is configured to analyze the imagery data 4-visual-i1, 4-visual-j4 from the first and second on-road vehicles 10*i*, 10*j*, in conjunction with the first and second geo-temporal locations T7,10-L3 and T8,10-L4, thereby arriving at said certain conclusion.

In one embodiment, the imagery data 4-visual-i1 from the first on-road vehicle 10*i* shows the certain person 1-ped-4 parking his car at a first location 10-L3; the additional imagery data 4-visual-j4 from the second on-road vehicle 10*j* shows the certain person 10-ped-4 at a certain distance from the first location 10-L3 where his car is parked; and said conclusion is a conclusion that the certain person 1-ped-4 needs to get back to his car and that the certain person may soon need a taxi to do so.

In one embodiment, the system further comprises additional on-road vehicles 10*k* (FIG. 6C) capturing yet additional imagery data 4-visual-k5 (FIG. 6E) of the certain person 1-ped-4 in conjunction with additional geo-temporal location T13,10-L5 (FIG. 6D); wherein: the imagery data suggests that the certain person did not eat for a certain period of time; and said conclusion is a conclusion that the certain person 1-ped-4 needs to eat soon. In one embodiment, said conclusion is a decision to send targeted food ads to the certain person 1-ped-4. In one embodiment, said conclusion is a decision to send a food-serving vehicle to the vicinity of the certain person 1-ped-4.

In one embodiment, the system further comprising additional on-road vehicles 10*k* (FIG. 6C) capturing yet additional imagery data 4-visual-k5 (FIG. 6E) of the certain person 1-ped-4 in conjunction with additional geo-temporal location T13,10-L5 (FIG. 6D); wherein: the imagery data suggests that the certain person 1-ped-4 is using a certain product, such as wearing the same pair of shoes, for a long time; and said conclusion is a conclusion that the certain person 1-ped-4 needs a new product, such as a new pair of shoes. In one embodiment, said conclusion is a decision to send targeted shoes ads to the certain person 1-ped-4.

FIG. 10A illustrates one embodiment of a method for identifying specific dynamic objects in a corpus of imagery data collected by a plurality of on-road vehicles and stored locally in the on-road vehicles. The method includes: In step 1151, obtaining, in a server 95-server (FIG. 6F), a specific model 4-model-2 operative to detect and identify a specific object 1-ped-4 (FIG. 6D) such as a specific person or a specific car. In step 1152, sending, by the server 95-server, the specific model 4-model-2 to at least some of a plurality of on-road vehicles 10*i*, 10*j*, 10*k* (FIG. 6A, FIG. 6B, FIG. 6C respectively), in which each of the on-road vehicles 10*i*, 10*j*, 10*k* receiving the model 4-model-2 is operative to use the model received to detect and identify the specific object 1-ped-4 in conjunction with imagery data captured by that vehicle and stored locally therewith 5-store-i, 5-store-j, 5-store-k (FIG. 6E). In step 1153, receiving, in the server 95-server, from at least one of the on-road vehicle 10*i*, 10*j*,

10*k* to which the specific model 4-model-2 was sent, a representation 4-visual-i1, 4-visual-j4, 4-visual-k5 (FIG. 6E) of the specific object 1-ped-4, or geo-temporal coordinates thereof. T7,10-L3 and T8,10-L4 and T13,10-L5, as found by that vehicle in the respective local storage 5-store-i, 5-store-j, 5-store-k using the specific model 4-model-2.

In one embodiment, the method further includes: further obtaining, from the plurality of on-road vehicles 10*i*, 10*j*, 10*k*, information regarding geo-temporal locations T7,10-L3 and T8,10-L4 and T13,10-L5 visited by the vehicles; and further obtaining, in the server 95-server, a particular geo-temporal location T7,10-L3 associated with the specific object 1-ped-4 previously being detected; wherein: said sending of the specific model 4-model-2 is done only to those of the on-road vehicles 10*i*, 10*j* that are, or were, according to said information, in geo-temporal proximity T7,10-L3 and T8,10-L4 to the particular geo-temporal location T7,10-L3 associated with the specific object 1-ped-4 previously being detected. In one embodiment, said geo-temporal proximity is a proximity of closer that 20 meters and 20 seconds. In one embodiment, said geo-temporal proximity is a proximity of closer that 100 meters and 1 minute. In one embodiment, said geo-temporal proximity is a proximity of closer than 1 kilometer and 10 minutes. In one embodiment, said geo-temporal proximity is a proximity of closer than 10 kilometers and one hour.

In one embodiment, the method further includes: sending the particular geo-temporal location T7,10-L3 in conjunction with the specific model 4-model-2, thereby allowing the on-road vehicles 10*i*, 10*j*, 10*k* to detect and identify the specific object 1-ped-4 only in conjunction with imagery data that was captured in geo-temporal proximity T7,10-L3 and T8,10-L4 to said particular geo-temporal location T7,10-L3.

In one embodiment, the method further includes: using, by the server 95-server, said representation 4-visual-i1, 4-visual-j4, 4-visual-k5 of the specific object 1-ped-4 received, to improve or train further 4-model-3 (FIG. 6G) the specific model 4-model-2.

In one embodiment, the method further includes: using, by the server 95-server, said representation 4-visual-i1, 4-visual-j4, 4-visual-k5 of the specific object 1-ped-4 received, to associate the specific object 1-ped-4 with other objects 1-oblect-9 (FIG. 6D), 1-ped-9 (FIG. 6D), 1-object-4 (FIG. 6D).

FIG. 10B illustrates one embodiment of another method for identifying specific dynamic objects in a corpus of imagery data collected by a plurality of on-road vehicles and stored locally in the on-road vehicles. The method includes: In step 1161, receiving, in an on-road vehicle 10*i* (FIG. 6A), a specific model 4-model-2 (FIG. 6F) operative to detect and identify a specific object 1-ped-4 (FIG. 6D) such as a specific person or a specific car. In step 1162, detecting and identifying, in an on-road vehicle 10*i*, the specific object 1-ped-4 in conjunction with imagery data captured by that vehicle 10*i* and stored locally 5-store-i (FIG. 6E) therewith. In step 1163, sending, from the on-road vehicle 10*i*, a representation of the specific object 1-ped-4, or geo-temporal coordinates thereof T7,10-L3, as found by that vehicle 10*i* in the respective local storage 5-store-i using the specific model 4-model-2.

In one embodiment, the method further includes: further receiving, in conjunction with the specific model 4-model-2, a particular geo-temporal location T7,10-L3 associated with the specific object 1-ped-4 previously being detected; wherein: said detecting and identifying, in an on-road vehicle 10*i*, of the specific object 1-ped-4, is done in conjunction with only a certain part of the imagery data, in which said certain part is associated with geo-temporal location of capture that are in geo-temporal proximity to said particular geo-temporal location T7,10-L3.

FIG. 10C illustrates one embodiment of yet another method for identifying specific dynamic objects in a corpus of imagery data collected by a plurality of on-road vehicles and stored locally in the on-road vehicles. The method includes: In step 1171, obtaining, in a server 95-server (FIG. 6F), a specific model 4-model-2 operative to detect and identify a specific object 1-ped-4 such as a specific person or a specific car. In step 1172, receiving, in the server 95-server, from a plurality of on-road vehicle 10i, 10j, 10k (FIG. 6A, FIG. 6B, FIG. 6C respectively), representation 4-visual-i1, 4-visual-j4, 4-visual-k5 (FIG. 6E) of various objects 1-ped-4, 1-object-9, 1-ped-9, 1-object-4 visually captured by the on-road vehicles 10i, 10j, 10k. In step 1173, detecting and identifying, in the server 95-server, using the specific model 4-model-2, the specific object 1-ped-4 in conjunction with the representations received 4-visual-i1, 4-visual-j4, 4-visual-k5.

In one embodiment, the method further includes: further obtaining, in the server 95-server, a particular geo-temporal location T7,10-L3 associated with the specific object 1-ped-4 previously being detected; and further receiving, in the server 95-server, a geo-temporal location T7,10-L3 and T8,10-L4 and T13,10-L5 per each of the representations 4-visual-i1, 4-visual-j4, 4-visual-k5, in which said geo-temporal location is estimated by the respective on-road vehicle using the vehicle's location at the time of the respective capture; wherein: said detecting and identifying is done in conjunction with only those of the representations 4-visual-i1, 4-visual-j4 associated with geo-temporal locations T7,10-L3 and T8,10-L4 that are in geo-temporal proximity to said particular geo-temporal location T7,10-L3.

In one embodiment, the method further includes: using, by the server 95-server, said representation 4-visual-i1, 4-visual-j4, 4-visual-k5 of the specific object 1-ped-4 received, to associate the specific object 1-ped-4 with other objects 1-oblect-9 (FIG. 6D), 1-ped-9 (FIG. 6D), 1-object-4 (FIG. 6D).

FIG. 11 illustrates one embodiment of a method for geo-temporally tagging imagery data collected by an on-road vehicle. The method includes: In step 1181, generating respective representations 4-visual-i1, 4-visual-i3 (FIG. 6E) of various objects 1-ped-4, 1-object-3 (FIG. 6D) visually captured by an on-road vehicle 10i (FIG. 6A). In step 1182, estimating a geo-temporal location of each of the representations generated (e.g., geo-temporal location T7,10-L3 for 4-visual-i1), using a respective location of the on-road vehicle 10i at the time of said capture. In step 1183, sending information comprising the representations 4-visual-i1 together with the respective geo-temporal locations T7,10-L3, in which said information is operative to facilitate geo-temporal tracking and identification of specific dynamic objects 1-ped-4.

In one embodiment, said generation or sending is done on demand from an external source 95-server (FIG. 6F), in which said demand is associated with a specific geo-temporal span (e.g., 1 minute and 100 meters span around T7,10-L3).

In one embodiment, said sending is done on demand from an external source 95-server (FIG. 6F), in which said demand is associated with specific objects 1-ped-4.

In one embodiment, said generation or sending is done on demand from an external source 95-server (FIG. 6F), in which said demand is associated with specific classes of objects.

One embodiment is a system operative to survey and track dynamic objects by utilizing a corpus of imagery data collected by a plurality of moving on-road vehicles, comprising: a plurality of N on-road vehicles 10a, 10f (FIG. 1D), in which each of the N on-road vehicles (e.g., 10a in FIG. 10C) moves on-road along a respective path of progression 10-path-1 (FIG. 1C) and at a respective velocity that may change over time, and is configured to capture imagery data of areas 20-area-1, 20-area-2, 20-area-3 (FIG. 1C) surrounding the respective path of progression 10-path-1, thereby resulting in a corpus of imagery data 4-visual (FIG. 1E) collectively captured by the plurality of on-road vehicles 10a, 10f while moving.

In one embodiment, the system is configured to utilize the corpus of imagery data 4-visual to survey and track various dynamic objects 1-ped-2, 1-ped-1, 1-object-5 (FIG. 1D) in said areas 20-area-1, 20-area-2, 20-area-3, 20-area-4 (FIG. 1D) surrounding the paths of progression, in which the sum of all the areas surveyed 20-area-1+20-area-2+20-area-3+20-area-4, during any given time interval of dT (delta-T), is proportional to the product dT*V*N, in which V is the average of all said velocities during the given time interval dT.

In one embodiment, on average, each of the on-road vehicles 10a, 10f is capable of capturing usable imagery data, for said surveillance and tracking of the dynamic objects, at distances of up to 30 (thirty) meters from the on-road vehicle.

In one embodiment, inside cities, V is between 3 (three) meters-per-second and 10 (ten) meters-per-second; and therefore per each 100,000 (one hundred thousand) of said plurality of on-road vehicles 10a, 10f, said sum of all the areas surveyed, during a time interval of 60 (sixty) seconds, is between (2*30)*60*3*100,000=~1.1 (one point one) billion square-meters and (2*30)*60*10*100,000=~3.6 (three point six) billion square-meters.

In one embodiment, said sum of all the areas surveyed, per each 100,000 (one hundred thousand) of said plurality of on-road vehicles, would have required between 300,000 (three hundred thousand) and 1.2 (one point two) million stationary surveillance cameras.

One embodiment is a system operative to capture diverse imagery data of objects by utilizing movement of on-road vehicles, comprising: an on-road vehicle 10a (FIG. 1C); and image sensors 4-cam-1, 4-cam-2, 4-cam-3, 4-cam-4, 4-cam-5, 4-cam-6 (FIG. 1A) onboard the on-road vehicle 10a. In one embodiment, the on-road vehicle 10a is configured to: move on-road along a certain path of progression 10-path-1 (FIG. 1C) at a certain velocity that may change over time; capture, at a first location 10-loc-2 (FIG. 1C) along the path of progression 10-path-1, a first set of imagery data of a particular outdoor object 1-ped-1 (FIG. 1C); and capture, at a second location 10-loc-3 (FIG. 1C) along the path of progression 10-path-1, a second diverse set of imagery data of the same particular outdoor object 1-ped-1; in which the system is configured to use the diverse first and second sets of imagery data to complete a certain action associated with the particular outdoor object 1-ped-1.

In one embodiment, said diversity is a result of the on-road vehicle 10a changing orientation relative to the particular outdoor object 1-ped-1 as the on-road vehicle moves from the first location 10-loc-2 to the second location 10-loc-3 along the path of progression 10-path-1.

In one embodiment, said diversity is a result of the on-road vehicle 10a changing distance relative to the particular outdoor object 1-ped-1 as the on-road vehicle moves from the first location 10-loc-2 to the second location 10-loc-3 along the path of progression 10-path-1.

In one embodiment, the certain action is using the diverse first and second sets to train a model to detect and identify the particular outdoor object 1-ped-1, in which said training is done in conjunction with machine learning techniques.

In one embodiment, the certain action is using the diverse first and second sets to identify the particular outdoor object 1-ped-1 in conjunction with an already trained model.

One embodiment is a system operative to train and use a behavioral model of a specific person by utilize a corpus of imagery data collected by a plurality of on-road vehicles, comprising: a plurality of on-road vehicles 10i, 10j, 10k (FIG. 6A, FIG. 6B, FIG. 6C respectively) moving in a certain geographical area 1-GEO-AREA, in which each of the on-road vehicles 10i, 10j, 10k is configured to capture imagery data of areas surrounding locations visited by the on-road vehicle 10i, 10j, 10k, thereby resulting in a corpus of visual data 4-visual (FIG. 6E) collectively captured by the plurality of on-road vehicles 10i, 10j, 10k, in which various objects, such as pedestrians 1-ped-4 (FIG. 6D) and static structures 1-object-2 (FIG. 6D), appear in the corpus of imagery data 4-visual, and in which each of at least some of the objects appear more than once in the corpus of imagery data and in conjunction with more than one location or time of being captured. In one embodiment, the system is configured to: identify sequences of appearances, such as the sequence 4-visual-i1, 4-visual-j4, 4-visual-k5, of a specific person 1-ped-4 in the corpus of visual data 4-visual; use the sequences of appearances identified to detect a specific action performed several times by the specific person 1-ped-4; associate each occurrence of the specific action to a respective one or more of the sequences; and train, using the sequences associated, a behavioral model, in which once trained, the behavioral model is operative to predict future occurrences of the specific action using future sequences of appearances of the specific person 1-ped-4.

In one embodiment, the system is further configured to: identify additional sequences of appearances of the specific person 1-ped-4; and use the behavioral model in conjunction with the additional sequences to predict that the specific person 1-ped-4 is about to perform the specific action again.

In one embodiment, the specific action is related to the specific person 1-ped-4 getting into a taxi; and the behavioral model is operative to predict, based on future sequences, that the specific person 1-ped-4 is about to order a taxi. In one embodiment, the system is further configured to direct a taxi into a vicinity of the specific person 1-ped-4 as a result of said prediction.

In one embodiment, the specific action is related to the specific person 1-ped-4 buying certain items; and the behavioral model is operative to predict, based on future sequences, that the specific person 1-ped-4 is about to go shopping. In one embodiment, the system is further configured to send a shopping advertisement to the specific person 1-ped-4 as a result of said prediction.

One embodiment is a system operative to improve or increase efficiency of a taxi service by utilizing a corpus of imagery data collected by a plurality of on-road taxi or non-taxi vehicles, comprising: a plurality of on-road taxi or non-taxi vehicles 10i, 10j, 10k (FIG. 6A, FIG. 6B, FIG. 6C respectively) moving in a certain geographical area 1-GEO-AREA, in which each of the on-road vehicles 10i, 10j, 10k is configured to capture imagery data of areas surrounding locations visited by the on-road vehicle 10i, 10j, 10k, thereby resulting in a corpus of visual data 4-visual (FIG. 6E) collectively captured by the plurality of on-road vehicles 10i, 10j, 10k, in which various objects, such as taxi users 1-ped-4 (FIG. 6D) and other vehicles, appear in the corpus of imagery data 4-visual, and in which each of at least some of the objects appear more than once in the corpus of imagery data and in conjunction with more than one location or time of being captured. In one embodiment, the system is configured to: use the corpus of visual data 4-visual to analyze a behavior of the taxi users 1-ped-4; and utilize said analysis to improve or increase efficiency of the on-road taxi vehicles in conjunction with servicing the taxi users 1-ped-4.

In one embodiment, said analysis indicates that a specific one of the taxi users 1-ped-4 is currently interested in getting a taxi, or may be interested in getting a taxi, or may need a taxi service soon; and as a result of said indication, the system is further configured to take at least one action out of: (i) dispatching one of the on-road taxi vehicles 10i, 10j, 10k to pick up the taxi user 1-ped-4, (ii) sending one of the on-road taxi vehicles 10i, 10j, 10k to wait near-by the taxi user 1-ped-4 in a stand-by mode for picking up the taxi user, (iii) suggesting a pick up to the taxi user 1-ped-4, and (iv) changing current navigation plan of at least some of the on-road taxi vehicles 10i, 10j, 10k, which may be autonomous, to better facilitate the taxi user 1-ped-4.

In one embodiment, said analysis is based on examining a recent path traversed by the taxi user 1-ped-4.

In one embodiment, said analysis is based on examining a current gesture made by the taxi user 1-ped-4, such as raising a hand to call for a taxi.

In one embodiment, said analysis is based on examining a recent action taken by the taxi user 1-ped-4, such as getting out of a taxi at a certain location and therefore probably needing a taxi back home.

In one embodiment, per each of the users 1-ped-4, the system is further configured to conclude that the user 1-ped-4 is a potential taxi user by generating and using a specific profile 4-profile (FIG. 6G) of that respective user 1-ped-4.

In one embodiment, said profile indicates previous usage of taxi services by the user 1-ped-4, in which said usage is related either to a taxi service to which the on-road taxi vehicles 10i, 10j, 10k belong, or related to another competing taxi service.

One embodiment is a system operative to utilize a corpus of imagery data collected by a plurality of on-road vehicles to analyze a dynamic group of objects. The system includes: a plurality of on-road vehicles 10a, 10b, 10c, 10d, 10e, 10f (FIG. 1D) moving in a certain geographical area 1-GEO-AREA, in which each of the on-road vehicles is configured to capture imagery data 4-visual (FIG. 1E) of areas 20-area-1, 20-area-2, 20-area-3, 20-area-4 (FIG. 1D) surrounding locations visited by the on-road vehicle, thereby resulting in a corpus of visual data 4-visual collectively captured by the plurality of on-road vehicles, in which various dynamic objects, such as pedestrians 1-ped-1, 1-ped-2 (FIG. 1D) and moving vehicles 10i (FIG. 6A), and various static objects, such as parking vehicles and buildings 1-object-1, 1-object-2, 1-object-3 (FIG. 1D), appear in the corpus of imagery data 4-visual, and in which each of at least some of the objects (e.g., 1-ped-2), either dynamic or static, appears more than once in the corpus of imagery data 4-visual and in conjunction with more than one location or time of being captured (e.g., 1-ped-2 appears in both 4-visual-a2, 4-visual-c9, and 4-visual-b1, as can be seen respectively in FIG. 1G, FIG.

1H, and FIG. 11, in which each appearance was captured by a different vehicle at a different time).

In one embodiment, the system is configured to: receive an initial list comprising at least one of: object descriptions (e.g., 1-ped-2-des-b1 in FIG. 2C), object models (e.g., 4-model-1 in FIG. 6F), and object locations (e.g., 10-L1 in FIG. 1D), of at least some target objects (e.g., 1-ped-2 in FIG. 1D) currently known to be associated with a particular group of objects (e.g., a group comprising 1-ped-1, 1-ped-2, 1-object-3 in FIG. 1D), in which said target objects comprise at least one of: (i) specific structure/s associated with said particular group of objects, (ii) specific person/s associated with said particular group of objects, (iii) specific vehicle/s associated with said particular group of objects, and (iv) specific product/s or machine/s or material/s associated with said particular group of objects; identify, in the corpus of visual data 4-visual, using said at least one of: object descriptions, object models, and object locations, multiple appearances (e.g., 4-visual-a2, 4-visual-c9, and 4-visual-b1) of each of at least some of the target objects (e.g., 1-ped-2), as captured by multiple ones of the on-road vehicles at different times; and analyze said multiple appearances at multiple times, of at least one of the target objects, thereby revealing a dynamic process occurring in conjunction with the particular group.

In one embodiment, the particular group of objects is a specific fleet of on-road vehicles (10i, 10j, 10k in FIG. 6A, FIG. 6B, and FIG. 6C respectively); said at least one of the target objects is several on-road vehicles (e.g., 10i, 10j) of the specific fleet that have stopped moving during a certain period of time; and said dynamic process revealed is a decline of efficiency in conjunction with the specific fleet 10i, 10j, 10k.

In one embodiment, the particular group of objects is a specific group of individuals (1-ped-1, 1-ped-2); said at least one of the target objects is several of the individuals (e.g., 1-ped-2) that have stopped interacting with the rest of the specific group during a certain period of time; and said dynamic process revealed is a decline in popularity of the specific group of individuals.

One embodiment is a system operative to utilize a corpus of imagery data collected by a plurality of on-road vehicles to analyze objects arranged as a group. The system includes: a plurality of on-road vehicles 10a, 10b, 10c, 10d, 10e, 10f (FIG. 1D) moving in a certain geographical area 1-GEO-AREA, in which each of the on-road vehicles is configured to capture imagery data 4-visual (FIG. 1E) of areas 20-area-1, 20-area-2, 20-area-3, 20-area-4 (FIG. 1D) surrounding locations visited by the on-road vehicle, thereby resulting in a corpus of visual data 4-visual collectively captured by the plurality of on-road vehicles, in which various dynamic objects, such as pedestrians 1-ped-1, 1-ped-2 (FIG. 1D) and moving vehicles 10i (FIG. 6A), and various static objects, such as parking vehicles and buildings 1-object-1, 1-object-2, 1-object-3 (FIG. 1D), appear in the corpus of imagery data 4-visual, and in which each of at least some of the objects, either dynamic or static, appears more than once in the corpus of imagery data and in conjunction with more than one location or time of being captured.

In one embodiment, the system is configured to: receive an initial list comprising at least one of: object descriptions, object models, and object locations, of at least some target objects (e.g., 1-ped-1, 1-ped-2, 1-object-3) currently known to be associated with a particular organization (e.g., an organization comprising 1-ped-1, 1-ped-2, 1-object-3), in which said target objects comprise at least one of: (i) specific structure/s associated with said particular organization, (ii)

specific person/s associated with said particular organization, (iii) specific vehicle/s associated with said particular organization, and (iv) specific product/s or machine/s or material/s associated with said particular organization; identify, in the corpus of visual data 4-visual, using said at least one of: object descriptions, object models, and object locations, multiple appearances (e.g., 4-visual-a2, 4-visual-c9, and 4-visual-b1) of each of at least some of the target objects 1-ped-2, as captured by multiple ones of the on-road vehicles at different times; and analyze said multiple appearances at multiple times, of at least one of the target objects 1-ped-2, thereby placing the particular organization under surveillance.

In one embodiment, said at least one target object is a certain employee 1-ped-2 of the particular organization; and said analysis of multiple appearances at multiple times 4-visual-a2, 4-visual-c9, and 4-visual-b1 of the certain employee results in a conclusion that the certain employee has stopped working for the particular organization. In one embodiment, said at least one target object is a plurality of employees 1-ped-1, 1-ped-2 of the particular organization; and said analysis of multiple appearances at multiple times of the plurality of employees 1-ped-1, 1-ped-2 results in a conclusion that many employees are leaving the particular organization, thereby facilitating said surveillance.

In one embodiment, said at least one target object is a certain building 1-object-3 of the particular organization; and said analysis of multiple appearances at multiple times of the certain building 1-object-3 results in a conclusion that activity has increased or decreased in recent time, thereby facilitating said surveillance.

In one embodiment, the system is further configured to identify, in conjunction with at least one of the respective multiple appearances of the respective at least one target object 1-ped-2, at least one appearance of said target object together with or in close proximity to a new object 1-object-2, thereby associating said new object with the target object 1-ped-2. In one embodiment, the system is further configured to infer a certain conclusion regarding a state of the particular organization based on said association. In one embodiment, said at least one target object 1-ped-2 is a certain employee of the particular organization; and said new object 1-object-2 is a certain structure or a certain person associated with a particular service or a second organization, in which the particular service or second organization comprises at least one of: (i) a law enforcement agency, in which the conclusion is that the particular organization is involved in a law enforcement investigation, and (ii) a certain organization associated with a specific field, in which the conclusion is that the particular organization is involved in said specific field. In one embodiment, said at least one target object is a certain building 1-object-3 of the particular organization; and said new object is a certain person or a certain vehicle associated with a particular service or a second organization, in which the particular service or second organization comprises at least one of: (i) a law enforcement agency, in which the conclusion is that the particular organization is involved in a law enforcement investigation, and (ii) a certain organization associated with a specific field, in which the conclusion is that the particular organization is involved in said specific field.

In one embodiment, the system is further configured to associate the new object 1-object-2 with the particular organization based on said association of the new object with the target object 1-ped-2, thereby updating the initial list into an updated list of objects (now including object 1-object-2 in the updated list) that are currently known to be associated with the particular organization, thereby facilitating said surveillance. In one embodiment, said at least one target object is several employees 1-ped-1, 1-ped-2 of the particular organization; and said new object 1-object-2 is a specific building; wherein: the association of the specific building 1-object-2 with the particular organization is based on a conclusion that said several employees 1-ped-1, 1-ped-2 are working in the specific building, which is based on the respective appearances.

In one embodiment, said at least one target object is a certain building 1-object-3 belonging to the particular organization; and said new object is a certain vehicle 10i; wherein: the association of the certain vehicle 10i with the particular organization is based on a conclusion that the certain vehicle is entering into or parking by the certain building 1-object-3, which is based on the respective appearances.

In one embodiment, said at least one target object is several employees 1-ped-1, 1-ped-2 of the particular organization; and said new object is a particular person 1-ped-4 (FIG. 6D); wherein: the association of the particular person 1-ped-4 with the particular organization is based on a conclusion that said several employees 1-ped-1, 1-ped-2 are interacting, together as a group or separately, with the particular person 1-ped-4, which is based on the respective appearances.

In one embodiment, said at least one target object is a certain building 1-object-3 belonging to the particular organization; and said new object is a particular person 1-ped-4; wherein: the association of the particular person 1-ped-4 with the particular organization is based on a conclusion that the particular person is working in the certain building 1-object-3, which is based on the respective appearances.

Figure 12:
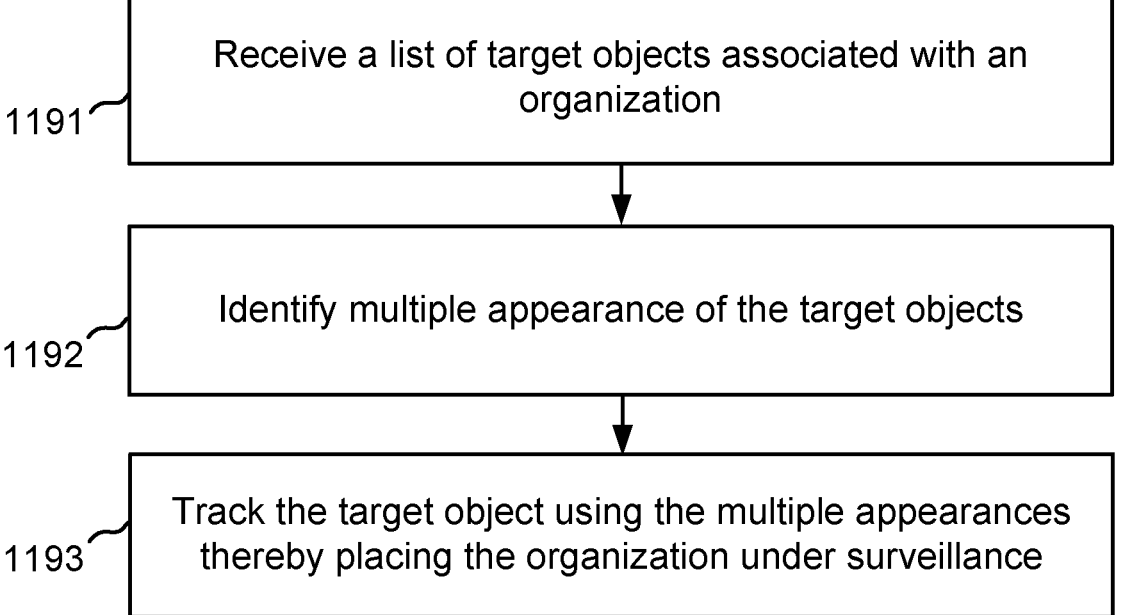
FIG. 12 illustrates one embodiment of a method for utilizing a corpus of imagery data collected by a plurality of on-road vehicles for surveying an organization.

FIG. 12 illustrates one embodiment of a method for utilizing a corpus of imagery data collected by a plurality of on-road vehicles for surveying an organization. The method includes: in step 1191, receiving an initial list (e.g., a list comprising three entries associated respectively with the three objects 1-ped-1, 1-ped-2, 1-object-3) comprising descriptions of target objects 1-ped-1, 1-ped-2, 1-object-3 currently known to be associated with a particular organization. In step 1192, identify, in a corpus of visual data 4-visual collected by plurality of on-road vehicles 10a, 10b, 10c, 10d, 10e, 10f, using said descriptions, multiple appearances (e.g., 4-visual-a2, 4-visual-c9, and 4-visual-b1) of each of at least some of the target objects (e.g., 1-ped-2), as captured by multiple ones of the on-road vehicles at different times. In step 1193, tracking movement of or activity in at least some of the target objects using said multiple appearances, thereby placing the particular organization under surveillance.

In one embodiment, the method further comprising intervening with navigation plans of at least some of the plurality of on-road vehicles 10a, 10b, 10c, 10d, 10e, 10f, thereby causing the plurality of on-road vehicles to produce better visual data in facilitation of said surveillance. In one embodiment, better visual data comprises at least one of: (i) visual data captured in close proximity to at least some of the target objects, in which said close proximity is facilitated by causing at least some of the on-road vehicles to pass closer to at least some of the target objects, and (ii) visual data captured while moving in low or zero relative velocity to at least some of the target objects, in which said low relative velocity is facilitated by causing at least some of the on-road vehicles to stop near or match a velocity of the target objects.

In one embodiment, said tracking movement comprises tracking movement of target objects such as employees 1-ped-1, 1-ped-2 of the particular organization.

In one embodiment, said tracking activity comprises tracking activity of target objects such as structures or buildings 1-object-3 associated with the particular organization.

In one embodiment, said activity comprises at least one of: (i) working times of employees in the structures or buildings, (ii) number of employees working in the structures or buildings, and (iii) flux of contractors or supplies into and out-of the structures or buildings.

Figure 13A:
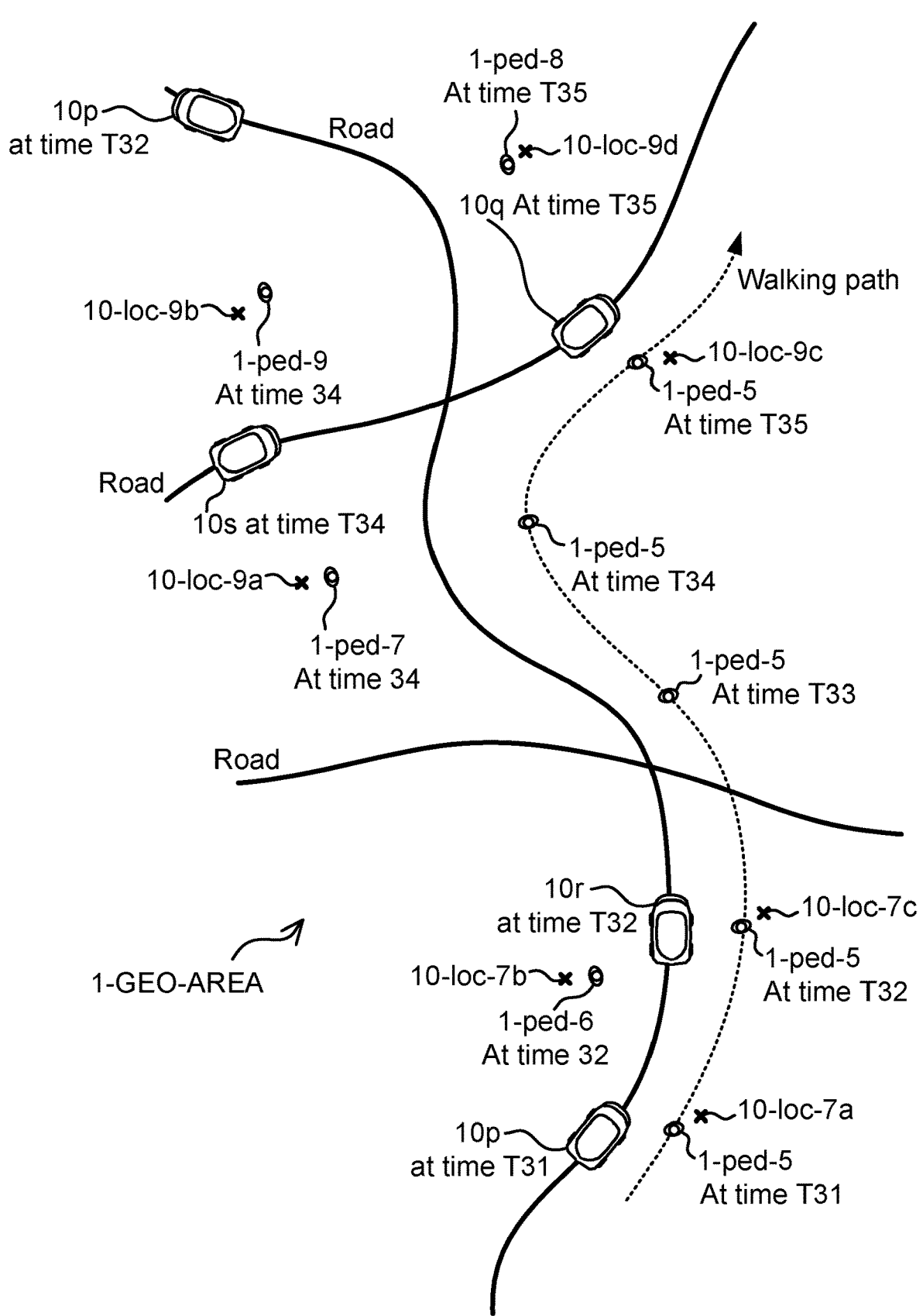
FIG. 13A illustrates one embodiment a plurality of on-road vehicles traversing a certain geographical area while capturing surrounding imagery data that contains multiple appearances of various pedestrians.

FIG. 13A illustrates one embodiment a plurality of on-road vehicles 10p, 10q, 10r, 10s traversing a certain geographical area 1-GEO-AREA while capturing surrounding imagery data that contains multiple appearances of various pedestrians 1-ped-5, 1-ped-6, 1-ped-7, 1-ped-8, 1-ped-9. Pedestrian 1-ped-5 is walking along a certain path, perhaps on sidewalks alongside several roads, in which during said walk: (i) at time T31 and at or nearby location 10-loc-7a, vehicle 10p passes by pedestrian 1-ped-5 and captures imagery data comprising at least one appearance of pedestrian 1-ped-5, (ii) at time T32 and at or nearby locations 10-loc-7b, 10-loc-7c, vehicle 10r passes by pedestrians 1-ped-5, 1-ped-6 and captures imagery data comprising at least one additional appearance of pedestrian 1-ped-5 and at least one appearance of pedestrian 1-ped-6, (iii) at time T34 and at or nearby locations 10-loc-9a, 10-loc-9b, vehicle 10s passes by pedestrians 1-ped-7, 1-ped-9 and captures imagery data comprising at least one appearance of pedestrian 1-ped-7 and at least one appearance of pedestrian 1-ped-9, and (iv) at time T35 and at or nearby locations 10-loc-9c, 10-loc-9d, vehicle 10q passes by pedestrians 1-ped-5, 1-ped-8 and captures imagery data comprising at least one additional appearance of pedestrian 1-ped-5 and at least one appearance of pedestrian 1-ped-8. It is noted that there is not a single vehicle that has captured all appearances of pedestrian 1-ped-5, and that although some of the vehicles 10p, 10r, 10q have collectively captured several appearances of pedestrian 1-ped-5, there is currently no association between these appearances, as they were captured separately by the different vehicles. In addition, it is noted that none of the vehicles is expected to have captured most of the appearances of pedestrian 1-ped-5, since the vehicles are unable to follow pedestrian 1-ped-5 through the entire walking path, as a result the vehicles moving much faster than pedestrian 1-ped-5, and as a result the vehicles traversing different paths than the walking path taken by pedestrian 1-ped-5. It is also noted that at this point there is no available model that can be used to detect/identify any specific one of the pedestrians 1-ped-5, 1-ped-6, 1-ped-7, 1-ped-8, 1-ped-9 appearing in the imagery data.

Figure 13B:
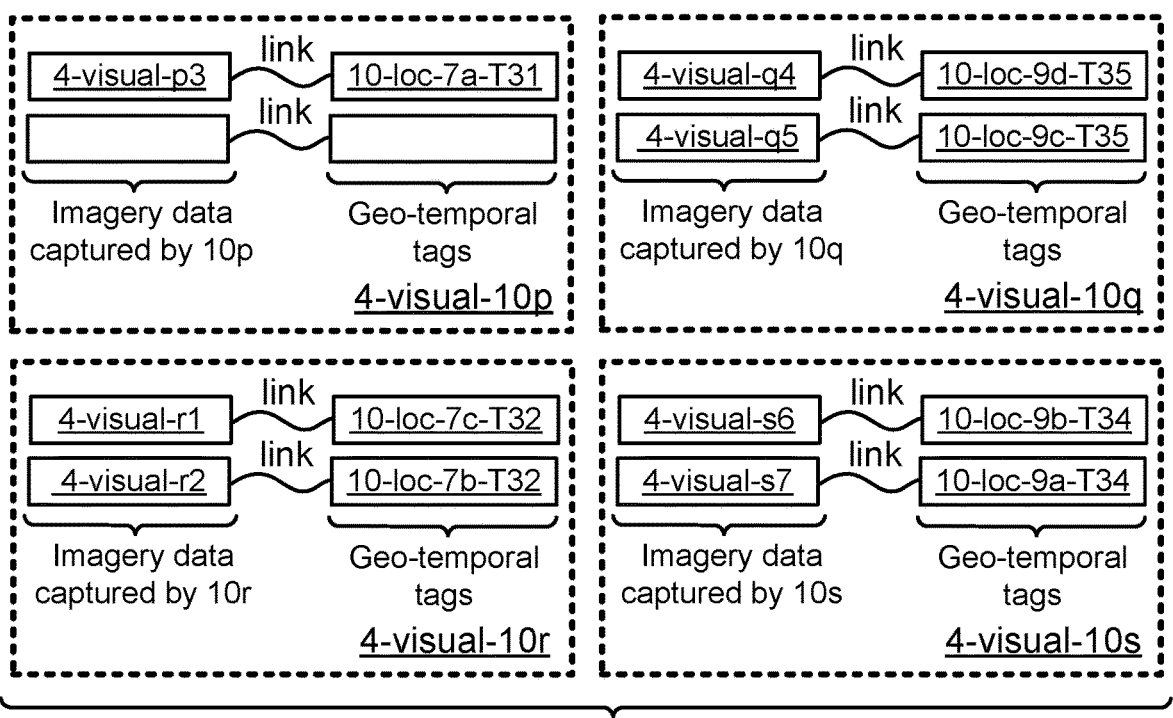
FIG. 13B illustrates one embodiment of imagery data collectively captured and stored in a plurality of on-road vehicles.

FIG. 13B illustrates one embodiment of imagery data 4-visual-p3, 4-visual-q4, 4-visual-q5, 4-visual-r1, 4-visual-r2, 4-visual-s6, 4-visual-s7 collectively captured and stored in a plurality of on-road vehicles 10p, 10q, 10r, 10s while traversing the certain geographical area 1-GEO-AREA as shown in FIG. 13A. Imagery data 4-visual-p3, as captured by vehicle 10p, is linked with geo-temporal tag 10-loc-7a-T31, which records the fact that Imagery data 4-visual-p3 was captured at time T31 and in vicinity of location 10-loc-7a. Imagery data 4-visual-q4, 4-visual-q5, as captured by vehicle 10q, is linked with geo-temporal tags 10-loc-9d-T35, 10-loc-9c-T35, which record the fact that Imagery data 4-visual-q4, 4-visual-q5 was captured at time T35 and in vicinity of location 10-loc-9d, 10-loc-9c. Imagery data 4-visual-r1, 4-visual-r2, as captured by vehicle 10r, is linked with geo-temporal tags 10-loc-7*c*-T32, 10-loc-7*b*-T32, which record the fact that Imagery data 4-visual-r1, 4-visual-r2 was captured at time T32 and in vicinity of location 10-loc-7*c*, 10-loc-7*b*. Imagery data 4-visual-s6, 4-visual-s7, as captured by vehicle 10*s*, is linked with geo-temporal tags 10-loc-9*b*-T34, 10-loc-9*a*-T34, which record the fact that Imagery data 4-visual-s6, 4-visual-s7 was captured at time T34 and in vicinity of location 10-loc-9*b*, 10-loc-9*a*. The geo-temporal tags are created by the vehicles using perhaps a global navigation satellite system (GNSS) receiver 5-GNSS (FIG. 1A) onboard the vehicles, such as a global positioning system (GPS) receiver, or perhaps using terrain matching techniques in conjunction with a visual map of the area and a time source.

Figure 13C:
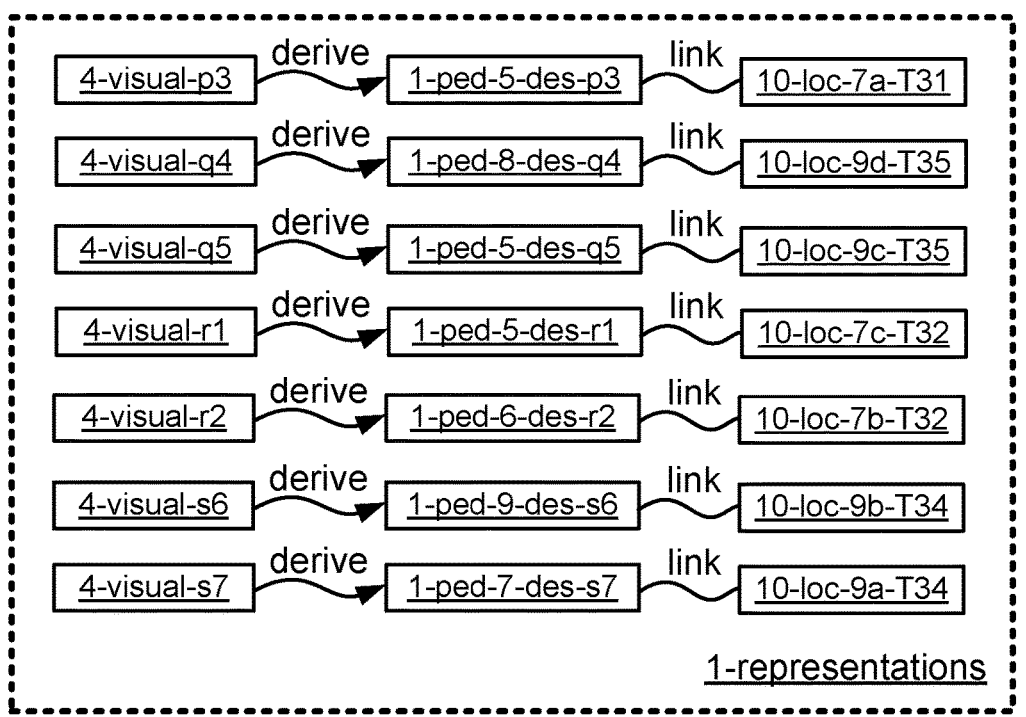
FIG. 13C illustrates one embodiment of representations of persons as derived from the imagery data and including geo-temporal tags associated with the representations.

FIG. 13C illustrates one embodiment of representations 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7 of persons 1-ped-5, 1-ped-6, 1-ped-7, 1-ped-8, 1-ped-9 as derived from the imagery data 4-visual-p3, 4-visual-q4, 4-visual-q5, 4-visual-r1, 4-visual-r2, 4-visual-s6, 4-visual-s7 and including geo-temporal tags 10-loc-7*a*-T31, 10-loc-9*d*-T35, 10-loc-9*c*-T35, 10-loc-7*c*-T32, 10-loc-7*b*-T32, 10-loc-9*b*-T34, 10-loc-9*a*-T34 associated with the representations. Imagery data 4-visual-p3, as captured by vehicle 10*p* at time T31 and in vicinity of location 10-loc-7*a*, contains an appearance of pedestrian 1-ped-5, in which such appearance is converted, perhaps onboard vehicle 10*p*, into a respective representation 1-ped-5-des-p3 of pedestrian 1-ped-5. Such representation 1-ped-5-des-p3 may be just an image or a sequence of images showing pedestrian 1-ped-5, or it may be a machine-generated description of pedestrian 1-ped-5, or it may be a feature breakdown of pedestrian 1-ped-5 as apparent from the imagery data, or in may be some sort of compression applied on the imagery data in conjunction with the respective appearance of pedestrian 1-ped-5. Imagery data 4-visual-q4, as captured by vehicle 10*q* at time T35 and in vicinity of location 10-loc-9*d*, contains an appearance of pedestrian 1-ped-8, in which such appearance is converted, perhaps onboard vehicle 10*q*, into a respective representation 1-ped-8-des-q4 of pedestrian 1-ped-8. Imagery data 4-visual-q5, as captured by vehicle 10*q* at time T35 and in vicinity of location 10-loc-9*c*, contains another appearance of pedestrian 1-ped-5, in which such appearance is converted, perhaps onboard vehicle 10*q*, into a respective representation 1-ped-5-des-q5 of pedestrian 1-ped-5. Imagery data 4-visual-r1, as captured by vehicle 10*r* at time T32 and in vicinity of location 10-loc-7*c*, contains yet another appearance of pedestrian 1-ped-5, in which such appearance is converted, perhaps onboard vehicle 10*r*, into a respective representation 1-ped-5-des-r1 of pedestrian 1-ped-5. Imagery data 4-visual-r2, as captured by vehicle 10*r* at time T32 and in vicinity of location 10-loc-7*b*, contains an appearance of pedestrian 1-ped-6, in which such appearance is converted, perhaps onboard vehicle 10*r*, into a respective representation 1-ped-6-des-r2 of pedestrian 1-ped-6. Imagery data 4-visual-s6, as captured by vehicle 10*s* at time T34 and in vicinity of location 10-loc-9*b*, contains an appearance of pedestrian 1-ped-9, in which such appearance is converted, perhaps onboard vehicle 10*s*, into a respective representation 1-ped-9-des-s6 of pedestrian 1-ped-9. Imagery data 4-visual-s7, as captured by vehicle 10*s* at time T34 and in vicinity of location 10-loc-9*a*, contains an appearance of pedestrian 1-ped-7, in which such appearance is converted, perhaps onboard vehicle 10*s*, into a respective representation 1-ped-7-des-s7 of pedestrian 1-ped-7.

Figure 13D:
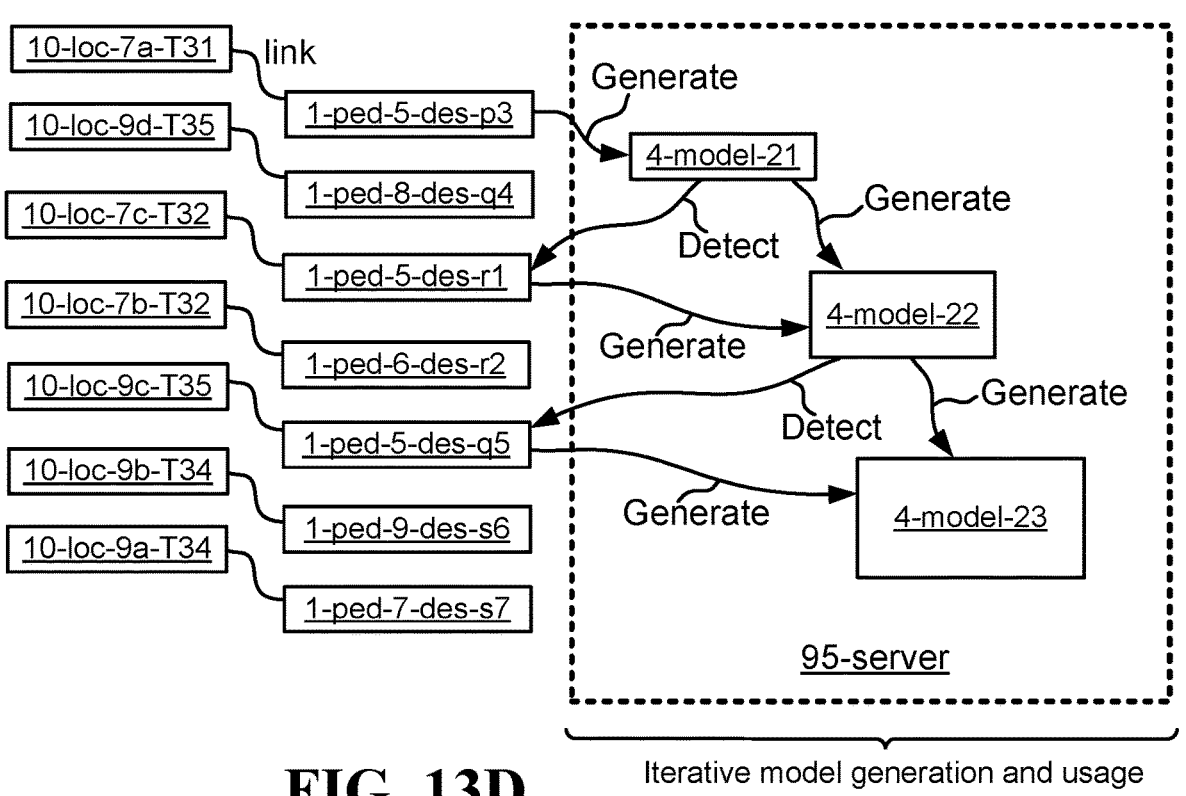
FIG. 13D illustrates one embodiment of iteratively generating and using models in an attempt to detect multiple appearances of a certain person out of a large plurality of representations associated with various different persons.

FIG. 13D illustrates one embodiment of iteratively generating and using models 4-model-21, 4-model-22, 4-model-

23 in an attempt to detect multiple appearances of a certain person 1-ped-5 out of a large plurality of representations 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7 associated with various different persons 1-ped-5, 1-ped-6, 1-ped-7, 1-ped-8, 1-ped-9. At first, one of the representation 1-ped-5-des-p3, which represents an appearance of person 1-ped-5 as captured in imagery data 4-visual-p3 by vehicle 10*p* in conjunction with geo-temporal tag 10-loc-7*a*-T31, is either selected at random, or is selected as a result or an occurrence of interest associated with geo-temporal tag 10-loc-7*a*-T31, in which such selection can be made in a server 95-server after receiving at least some of the representations from the vehicles, or it can be made by one of the vehicles. The selected representation 1-ped-5-des-p3 represents pedestrian 1-ped-5 that is currently "unknown" to server 95-server in the sense that pedestrian 1-ped-5 cannot be distinguished by the server, or by the vehicles (collectively by the system), from the other pedestrians 1-ped-6, 1-ped-7, 1-ped-8, 1-ped-9 for which representations 1-ped-8-des-q4, 1-ped-5-des-q5, 1-ped-5-des-r1, 1-ped-6-des-r2, 1-ped-9-des-s6, 1-ped-7-des-s7 exist. Server 95-server, which may be located off-board the vehicles, is now tasked with finding other occurrences (i.e., appearances) of pedestrian 1-ped-5, perhaps in order to track such pedestrian, or perhaps in order to arrive at any kind of conclusion or discovery regarding such pedestrian 1-ped-5 or associated activities. Server 95-server therefore takes and uses representation 1-ped-5-des-p3 to generate an initial model 4-model-21 operative to detect further appearances of pedestrian 1-ped-5. For example, representation 1-ped-5-des-p3 may comprise a simple machine-based description of pedestrian 1-ped-5, such as a description of clothes worn by pedestrian 1-ped-5—e.g., representation 1-ped-5-des-p3 may simply state that pedestrian 1-ped-5 wore (at time T31 as indicated by geo-temporal tag 10-loc-7*a*-T31 associated with representation 1-ped-5-des-p3) a green shirt and blue jeans—and therefore initial model 4-model-21 may be a trivial model that is operative to simply detect any pedestrian wearing a green shirt and blue jeans. In one embodiment, model 4-model-21 has to be trivial, as it was generated from a single appearance/representation 1-ped-5-des-p3 of pedestrian 1-ped-5, and a single appearance of any pedestrian is not sufficient to generate a more complex model. In another embodiment, model 4-model-21 has to be trivial, as it was generated from a single or few appearances/representations of pedestrian 1-ped-5, which were derived from distant images taken by a single or few vehicles—e.g., when imagery data 4-visual-p3 was captured by vehicle 10*p* while being relatively distant from pedestrian 1-ped-5, and therefore only very basic features of such pedestrian were captured. Since model 4-model-21 is trivial, it would be impossible to use it for detecting additional appearances of pedestrian 1-ped-5 over a large geo-temporal range, as there may be hundreds of different pedestrians wearing a green shirt and blue jeans when considering an entire city or an entire country. However, 4-model-21 is good enough to be used for successfully finding other appearances of pedestrian 1-ped-5 if the search span could be restricted to a limited geo-temporal span. For example, model 4-model-21 is based on representation 1-ped-5-des-p3 having a geo-temporal tag 10-loc-7*a*-T31, meaning that pedestrian 1-ped-5 was spotted near location 10-loc-7*a* at time T31, so that the geo-temporal span of searching for other appearances of pedestrian 1-ped-5 using model 4-model-21 could be restricted to those of the representations that are within a certain range of 10-loc-7*a* and within a certain time-differential of T31, in which such certain range could be perhaps 100 meters, and such certain time-differential could be perhaps 60 seconds, meaning that the search will be performed only in conjunction with representations that were derived from imagery data that was captured within 100 meters of location 10-loc-7a and within 60 seconds of time T1. When such a restricted search is applied, chances are that even a trivial model such as 4-model-21 can successfully distinguish between pedestrian 1-ped-5 and a relatively small number of other pedestrians 1-ped-6 found within said restricted geo-temporal span. For example, representation 1-ped-6-des-r2 of pedestrian 1-ped-6, as derived from imagery data captured by vehicle 10r and having geo-temporal tag 10-loc-7b-T32, is associated with location 10-loc-7b (FIG. 13A) that is perhaps 70 meters away from 10-loc-7a, and with time T32 that is perhaps 40 seconds after T31, and therefore 1-ped-6-des-r2 falls within the geo-temporal span of the search, and consequently model 4-model-21 is used to decide whether 1-ped-6-des-r2 is associated with pedestrian 1-ped-5 or not. Since pedestrian 1-ped-6 did not wear a green shirt and blue jeans at time T32, server 95-server concludes, using 4-model-21, that 1-ped-6-des-r2 is not associated with pedestrian 1-ped-5. Representation 1-ped-5-des-r1 of pedestrian 1-ped-5, as derived from imagery data captured by vehicle 10r and having geo-temporal tag 10-loc-7c-T32, is associated with location 10-loc-7c (FIG. 13A) that is perhaps 90 meters away from 10-loc-7a, and with time T32 that is 40 seconds after T31, and therefore 1-ped-5-des-r1 also falls within the geo-temporal span of the search, and consequently model 4-model-21 is used to decide whether 1-ped-5-des-r1 is associated with pedestrian 1-ped-5 or not. Since pedestrian 1-ped-5 didn't change his clothing during the 40 second period between T31 and T32, then a green shirt and blue jeans are detected by server 95-server using 4-model-21, and it is therefore concluded that representation 1-ped-5-des-r1 is associated with pedestrian 1-ped-5. Now, that model 4-model-21 was successfully used to detect another representation 1-ped-5-des-r1 of pedestrian 1-ped-5, a better model 4-model-22 can be generated to better detect yet other appearances of pedestrian 1-ped-5, but this time over a larger geo-temporal range. For example, server 95-server can now combine the two representations 1-ped-5-des-p3, 1-ped-5-des-r1, or alternatively to combine the model 4-model-21 and the newly found representation 1-ped-5-des-r1, to generate the better model 4-model-22. In one embodiment, model 4-model-22 is more complex than model 4-model-21, and can optionally be generated using machine learning (ML) techniques that uses the two appearances 1-ped-5-des-p3, 1-ped-5-des-r1 to train a model until producing model 4-model-22, which is now specifically trained to detect pedestrian 1-ped-5. Server 95-server now uses the better model 21-model-22 to search again for additional appearances of pedestrian 1-ped-5, but this time over a much larger geo-temporal span, which in one embodiment may contain all of the geo-temporal tags 10-loc-7a-T31, 10-loc-9d-T35, 10-loc-9c-T35, 10-loc-7c-T32, 10-loc-7b-T32, 10-loc-9b-T34, 10-loc-9a-T34, and therefore include the representations 1-ped-8-des-q4, 1-ped-5-des-q5, 1-ped-9-des-s6, 1-ped-7-des-s7 that were not considered in the previous search and that represent various new pedestrians 1-ped-7, 1-ped-8, 1-ped-9 as well as pedestrian 1-ped-5. Model 4-model-22 is good enough to successfully filter away representations 1-ped-8-des-q4, 1-ped-9-des-s6, 1-ped-7-des-s7 belonging to pedestrians 1-ped-7, 1-ped-8, 1-ped-9, and to detect that only representation 1-ped-5-des-q5 is associated with pedestrian 1-ped-5. With the new representation 1-ped-5-des-q5 just detected, the server 95-server can now construct a geo-temporal path 10-loc-7a-T31, 10-loc-7c-T32, 10-loc-9c-T35 via which pedestrian 1-ped-5 has walked. Again, server 95-server can now generate an even more sophisticated and accurate model 4-model-23 of pedestrian 1-ped-5 using the three representations 1-ped-5-des-p3, 1-ped-5-des-r1, 1-ped-5-des-q5, or alternatively using the model 4-model-22 and the newly detected representation ped-5-des-q5. It is noted that the representations 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7, as shown in FIG. 13D, seem to be located outside server 95-server, but in one embodiment, at least some of the representations may be stored internally in server 95-server, after being received in the server from the vehicles. In another embodiment, at least some of the representations 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7 are stored locally in the respective vehicles, and are accessed by the server as may be needed by the server. It is noted that the detection of representations using the respective models 4-model-21, 4-model-22, as shown in FIG. 13D, seems to be occurring inside server 95-server, but in one embodiment, the detection of at least some of the representations may be done onboard the vehicles storing the representations, after receiving the respective models 4-model-21, 4-model-22 from the server. In one embodiment, the detection of representations using the respective models 4-model-21, 4-model-22 is done inside server 95-server.

In one embodiment, the process as described above is repeated in conjunction with billions of different representations of millions of different pedestrians, in which the billions of different representations are derived from billions of imagery data records captured by hundreds of thousands or even millions of on-road vehicles moving in a certain city or a certain country, thereby tracking movement of said millions of different pedestrians, while eventually generating, iteratively, and over long periods of times that can amount to months or even years, a super-detailed and extremely accurate model per each of at least some of the millions of pedestrians and other persons appearing in all of the imagery data available from all of the vehicles.

One embodiment is a system operative to generate and train specific models to detect specific persons by utilizing a corpus of imagery data captured by a plurality of on-road vehicles, comprising: a plurality of on-road vehicles 10i, 10j, 10k (FIG. 6A, FIG. 6B, FIG. 6C respectively) moving in a certain geographical area 1-GEO-AREA, in which each of the on-road vehicles 10i, 10j, 10k is configured to capture imagery data of areas surrounding locations visited by the on-road vehicle 10i, 10j, 10k, thereby resulting in a corpus of imagery data 4-visual (FIG. 6E) collectively captured by the plurality of on-road vehicles 10i, 10j, 10k, in which various persons 1-ped-4 (FIG. 6D), such as pedestrians and drivers, appear in the corpus of imagery data 4-visual, and in which each of at least some of the persons 1-ped-4 appear more than once in the corpus of imagery data 4-visual and in conjunction with more than one location or time of being captured.

In one embodiment, the system is configured to: use at least one of the appearances, or a representation thereof 4-visual-i1 (FIG. 6E), of one of the persons 1-ped-4 in the corpus of imagery data 4-visual collectively captured by the plurality of on-road vehicles 10i, 10j, 10k, to generate an initial specific model 4-model-1 (FIG. 6F) operative to at least partially detect and identify said one person 1-ped-4 specifically; identify, using the initial specific model 4-model-1, additional appearances, or representations thereof 4-visual-j4 (FIG. 6E), of said one of the persons 1-ped-4 in the corpus of visual data 4-visual collectively captured by the plurality of on-road vehicles 10i, 10j, 10k; and improve said initial specific model 4-model-1 using the additional appearances identified 4-visual-j4, thereby resulting in an improved specific model 4-model-2 (FIG. 6F) operative to better detect and identify said one person 1-ped-4 specifically.

In one embodiment, the system is further configured to: identify, using the improved specific model 4-model-2, yet additional appearances, or representations thereof 4-visual-k5, of said one of the persons 1-ped-4 in the corpus of visual data 4-visual collectively captured by the plurality of on-road vehicles 10i, 10j, 10k; and improve further said initial model using the yet additional appearances identified 4-visual-k5, thereby resulting in an even more improved specific model 4-model-3 (FIG. 6G) operative to even better detect and identify said one person 1-ped-4 specifically.

In one embodiment, said improvement of the initial specific model 4-model-1 is done by training or re-training the model using at least the additional appearances 4-visual-j4 as input, in which said training is associated with machine learning techniques. In one embodiment, at least some of the additional appearances 4-visual-j4 (FIG. 6D, FIG. 6E) are captured while the respective person 1-ped-4 was less than 10 (ten) meters from the respective on-road vehicle 10j capturing the respective imagery data, and so as to allow a clear appearance of the person's face; and said clear appearance of the person's face is used as an input to said training or re-training the model. In one embodiment, at least some of the additional appearances 4-visual-j4 are captured in conjunction with the respective person 1-ped-4 walking or moving, and so as to allow a clear appearance of the person's walking or moving patterns of motion; and said clear appearance of the person 1-ped-4 walking or moving is used as an input to said training or re-training the model, thereby resulting in said improved specific model 4-model-2 that is operative to both detect and identify the person's face and detect and identify the person's motion dynamics. In one embodiment, said using of the clear appearance of the person's face as an input to said training or re-training the model, results in said improved specific model 4-model-2 that is operative to detect and identify said one person 1-ped-4 specifically; and the system is further configured to use the improved specific model 4-model-2 to identify said one person 1-ped-4 in an external visual database, thereby determining an identity of said one person 1-ped-4.

In one embodiment, the system is further configured to: generate representations 4-visual-i1 for at least some appearances of persons 1-ped-4 in the corpus of imagery data 4-visual, in which each of the representations 4-visual-i1 is generated from a specific one appearance, or from a specific one sequence of related appearances, of one of the persons 1-ped-4, in imagery data captured by one of the on-road vehicles 10i; estimate, per each of at least some of the representations 4-visual-i1, a location-at-the-time-of-being-captured 10-L3 of the respective person 1-ped-4, based at least in part on the location of the respective on-road vehicle 10i during the respective capture, thereby associating the representations 4-visual-i1 with static locations 10-L3 respectively, and regardless of a dynamic nature of the on-road vehicles 10i that are on the move; and associate each of the representations 4-visual-i1 with a time T7 at which the respective person 1-ped-4 was captured, thereby possessing, per each of the representations 4-visual-i1, a geo-temporal tag T7,10-L3 comprising both the time T7 at which the respective person 1-ped-4 was captured and estimated location 10-L3 of the respective person 1-ped-4 at the time of being captured. In one embodiment, said at least one of the appearances 4-visual-i1 of one of the persons 1-ped-4, which is used to generate the initial specific model 4-model-i, comprises at least two appearances, in which the two appearance are found in the system by: pointing-out, using the geo-temporal tags T7,10-L3, at least two of the representations as representations having a similar, though not necessarily identical, geo-temporal tags, which indicates geo-temporal proximity, in which the representations that are currently pointed-out were generated from imagery data captured previously by at least two different ones of the on-road vehicles respectively; and analyzing the representations, which were pointed-out, to identify which of the representations belong to a single person, in which the representations identified constitute said at least two appearances found in the system.

In one embodiment, the initial specific model 4-model-1 is passed by a server 95-server (FIG. 6F, FIG. 6G) in the system to at least some of the on-road vehicles 10i, 10j, 10k; and said identification, using the initial specific model 4-model-1, of the additional appearances 4-visual-j4 of said one of the persons 1-ped-4 in the corpus of visual data, is done locally on-board the on-road vehicles 10j.

In one embodiment, at least some of the appearances 4-visual-j4 are passed by the on-road vehicles 10j to a server 95-server (FIG. 6F, FIG. 6G) in the system; and said identification, using the initial specific model 4-model-1, of the additional appearances 4-visual-j4 of said one of the persons 1-ped-4 in the corpus of visual data, is done in the server 95-server.

One embodiment is a system operative to generate models for detecting persons by utilizing imagery data captured by a plurality of on-road vehicles, comprising: a plurality of on-road vehicles 10p, 10q, 10r, 10s (FIG. 13A) moving in a certain geographical area 1-GEO-AREA, in which each of the on-road vehicles 10p, 10q, 10r, 10s is configured to capture imagery data 4-visual-p3, 4-visual-q4, 4-visual-q5, 4-visual-r1, 4-visual-r2, 4-visual-s6, 4-visual-s7 (FIG. 13B) of areas surrounding locations visited by the on-road vehicle, in which various persons 1-ped-5, 1-ped-6, 1-ped-7, 1-ped-8, 1-ped-9 (FIG. 13A), such as pedestrians, appear in the imagery data; a plurality of representations 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7 (FIG. 13C), in which each of the representations is derived from one of the appearances of one of the persons 1-ped-5, 1-ped-6, 1-ped-7, 1-ped-8, 1-ped-9 in the imagery data 4-visual (e.g., pedestrian 1-ped-5 appears in imagery data 4-visual-p3 captured by vehicle 10p, in which that appearance is represented by representation 1-ped-5-des-p3 that is derived from imagery data 4-visual-p3); and a plurality of geo-temporal tags 10-loc-7a-T31, 10-loc-9d-T35, 10-loc-9c-T35, 10-loc-7c-T32, 10-loc-7b-T32, 10-loc-9b-T34, 10-loc-9a-T34 (FIG. 13B, FIG. 13C) associated (linked) respectively with the plurality of representations 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7, in which each of the geo-temporal tags is a record of both a location and a time at which the respective appearance was captured by the respective on-road vehicle. For example: geo-temporal tag 10-loc-7a-T31 (FIG. 13C) is a record of both a location 10-loc-7a (FIG. 13A) and a time T31 (FIG. 13A) at which an appearance of pedestrian 1-ped-5 was captured by vehicle 10p in conjunction with imagery data 4-visual-p3. The geo-temporal tag 10-loc-7a-T31 is associated with a representation 1-ped-5-des-p3 of that appearance.

In one embodiment, the system is configured to: select one of the representations (e.g., 1-ped-5-des-p3 is selected); use said representation selected 1-ped-5-des-p3 to generate a provisional model 4-model-21 (FIG. 13D) of the respective person 1-ped-5; use the geo-temporal tag 10-loc-7a-T31 of the representation selected 1-ped-5-des-p3 to determine an initial geo-temporal span (e.g., the initial geo-temporal span is determined to include only geo-temporal tags having: (i) a location that is within a certain distance from 10-loc-7a and (ii) time tag that is within a certain time-differential from T31); and use the provisional model generated 4-model-21 to search and detect at least one other representation 1-ped-5-des-r1 of the respective person 1-ped-5, in which said search is confined to those of the representations 1-ped-5-des-r1, 1-ped-6-des-r2 having a geo-temporal tag 10-loc-7c-T32, 10-loc-7b-T32 that falls within said initial geo-temporal span.

In one embodiment, the system is further configured to: use said one other representation detected 1-ped-5-des-r1, together with the provisional model 4-model-21, to generate a better model 4-model-22 (FIG. 13D) of the respective person 1-ped-5. In one embodiment, the system is further configured to: increase the initial geo-temporal span into a larger geo-temporal span; use the better model generated 4-model-22 to search and detect yet another representation 1-ped-5-des-q5 of the respective person 1-ped-5, in which said search is confined to those of the representations 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7 having a geo-temporal tag 10-loc-7a-T31, 10-loc-9d-T35, 10-loc-9c-T35, 10-loc-7c-T32, 10-loc-7b-T32, 10-loc-9b-T34, 10-loc-9a-T34 that falls within said larger geo-temporal span; and use said yet another representation detected 1-ped-5-des-q5, together with the better model 4-model-22, to generate an even better model 4-model-23 (FIG. 13D) of the respective person 1-ped-5, thereby implementing a procedure for iteratively improving accuracy of the models 4-model-21, 4-model-22, 4-model-23 used to detect the respective person 1-ped-5.

In one embodiment, the system further comprises a server 95-server, wherein: each of the representations 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7 is: (i) derived locally in the respective on-road vehicle 10p, 10q, 10r, 10s from the respective imagery data captured therewith 4-visual-p3, 4-visual-q4, 4-visual-q5, 4-visual-r1, 4-visual-r2, 4-visual-s6, 4-visual-s7 (e.g., representation 1-ped-1-des-d6 in FIG. 2A is derived from the appearance of person 1-ped-1 in imagery data 4-visul-d6 captured by vehicle 10d), and (ii) stored locally in said respective on-road vehicle (e.g., the representation 1-ped-1-des-d6 is stored in vehicle 10d using onboard storage space 5-store-d shown in FIG. 1E); and the search and detection of said at least one other representation 1-ped-5-des-r1 comprises: sending the provisional model generated 4-model-21, from the server 95-server, to at least those of the on-road vehicles 10p, 10r known to have traveled inside the initial geo-temporal span; and performing said search locally onboard each of the on-road vehicles 10p, 10r using the provisional model 4-model-21 received from the server 95-server therewith.

In one embodiment, the system further comprises a server 95-server, wherein: each of the representations 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7 is: (i) derived locally in the respective on-road vehicle 10p, 10q, 10r, 10s from the respective imagery data captured therewith 4-visual-p3, 4-visual-q4, 4-visual-q5, 4-visual-r1, 4-visual-r2, 4-visual-s6, 4-visual-s7, and (ii) sent to the server 95-server; and the search and detection of said at least one other representation 1-ped-5-des-r1 is done in the server 95-server.

In one embodiment, each of the representations 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7 comprises at least one of: (i) an image or a sequence of images of the respective person (e.g., the image of 1-ped-2 as appears in FIG. 1H) taken from the respective imagery data captured by the respective on-road vehicle, (ii) a description of the respective person (e.g., the description 1-ped-1-des-d6 as appears in FIG. 2A), such as a description of features of said respective person, in which the description is derived from the respective imagery data captured by the respective on-road vehicle, (iii) a compression, such as a machine-learning aided data compression or image compression, of imagery data captured by the respective on-road vehicle and associated with the respective person, (iv) facial markers (e.g., 1-ped-2-des-c9 as appears in FIG. 2B) of imagery data captured by the respective on-road vehicle and associated with the respective person, (v) neural-network aided feature detection of features associated with imagery data captured by the respective on-road vehicle and associated with the respective person, and (vi) a classification of features related to the respective person, such as classification of facial features of the respective person, motion features of the respective person, such as a certain walking dynamics, clothing worn by the respective person including clothing colors and shapes, body features of the respective person, such as height, width, construction, proportions between body parts, and the person appearance or behavior in general.

In one embodiment, said determination of the initial geo-temporal span is done by determining: (i) a maximum distance from a location 10-loc-7a (FIG. 13A) present in the geo-temporal tag 10-loc-7a-T31 of the representation selected 1-ped-5-des-p3, and (ii) a maximum time-differential from a time tag T31 present in the geo-temporal tag of the representation selected.

In one embodiment, per each of the geo-temporal tags (e.g., 10-loc-7a-T31), the respective location 10-loc-7a (FIG. 13A) at which the respective appearance was captured, is determined using a global navigation satellite system (GNSS) receiver 5-GNSS (FIG. 1A), such as a global positioning system (GPS) receiver, onboard the respective on-road vehicle.

In one embodiment, said provisional model 4-model-21 is associated with at least one of: (i) a machine learning classification model, in which said generation of the provisional model is associated with training the classification model to detect the respective person 1-ped-5 or features thereof based on the representation selected 1-ped-5-des-p3, (ii) a neural-network detector, in which said generation of the provisional model is associated with training the neural-network detector to detect the respective person 1-ped-5 or features thereof based on the representation selected 1-ped-5-des-p3, and (iii) a feature detector, in which said generation of the provisional model is associated with identifying and measuring at least a certain feature of the respective person 1-ped-5 as present in the representation selected 1-ped-5-des-p3.

Figure 13E:
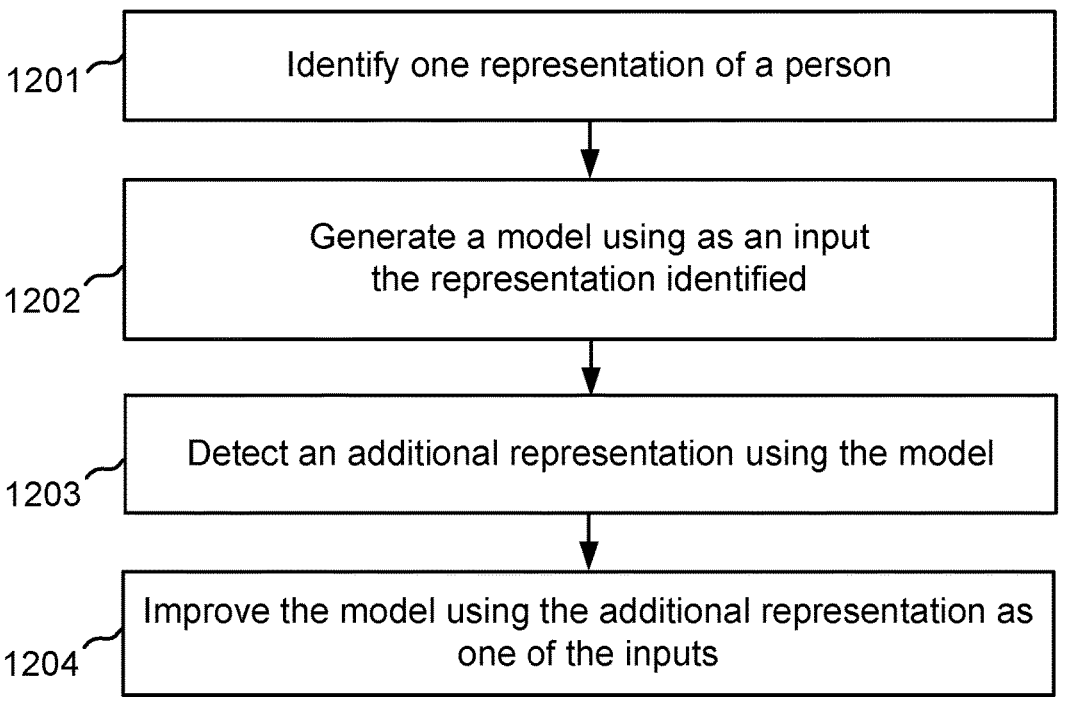
FIG. 13E illustrates one embodiment of a method for iteratively generating and using models operative to detect persons by utilizing imagery data captured by a plurality of on-road vehicles.

FIG. 13E illustrates one embodiment of a method for iteratively generating and using models operative to detect persons by utilizing imagery data captured by a plurality of on-road vehicles. The method includes: in step 1201, receiving in a server 95-server, from on-road vehicles 10p, 10q, 10r, 10s (FIG. 13A), a plurality of representations of various persons, and identifying one of the representation 1-ped-5-des-p3 of one of the persons 1-ped-5 (FIG. 13A), out of the plurality of representations of various persons 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7 (FIG. 13C), in which each of the representations was derived from a respective imagery data 4-visual-p3, 4-visual-q4, 4-visual-q5, 4-visual-r1, 4-visual-r2, 4-visual-s6, 4-visual-s7 (FIG. 13B) captured by the respective on-road vehicle 10p, 10q, 10r, 10s (FIG. 13A) while moving in a certain geographical area 1-GEO-AREA. In step 1202, generating a model 4-model-21 (FIG. 13D) using at least the representation identified 1-ped-5-des-p3 as an input. In step 1203, detecting, using the model generated 4-model-21, out of at least some of the plurality of representations 1-ped-5-des-r1, 1-ped-6-des-r2, at least one additional representation 1-ped-5-des-r1 of said person 1-ped-5. In step 1204, improving said model 4-model-21 by generating a new and better model 4-model-22 (FIG. 13D), in which said generation of the new and better model uses, as an input, the at least one additional representation detected 1-ped-5-des-r1, together with at least one of: (i) the representation identified 1-ped-5-des-p3, and (ii) the model 4-model-21.

In one embodiment, each of the representations 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7 is associated with a geo-temporal tag 10-loc-7a-T31, 10-loc-9d-T35, 10-loc-9c-T35, 10-loc-7c-T32, 10-loc-7b-T32, 10-loc-9b-T34, 10-loc-9a-T34 (FIG. 13B, FIG. 13C), in which each of the geo-temporal tags is a record of both a location and a time at which the respective imagery data 4-visual-p3, 4-visual-q4, 4-visual-q5, 4-visual-r1, 4-visual-r2, 4-visual-s6, 4-visual-s7 was captured by the respective on-road vehicle 10p, 10q, 10r, 10s; and said detection of the additional representation 1-ped-5-des-r1 is done out of a sub-set 1-ped-5-des-r1, 1-ped-6-des-r2 of the plurality of representations, in which said subset includes only those of the representations ped-5-des-r1, 1-ped-6-des-r2 having a geo-temporal tags 10-loc-7c-T32, 10-loc-7b-T32 being within a certain geo-temporal range of the geo-temporal tag 10-loc-7a-T31 belonging to the representation identified 1-ped-5-des-p3; wherein the method further comprises: expanding said certain geo-temporal range into an extended geo-temporal range; and detecting, using the new and better model 4-model-22, out of at least some of the plurality of representations 1-ped-5-des-p3, 1-ped-8-des-q4, 1-ped-5-des-q5, 1-ped-5-des-r1, 1-ped-6-des-r2, 1-ped-9-des-s6, 1-ped-7-des-s7 having geo-temporal tags 10-loc-7a-T31, 10-loc-9d-T35, 10-loc-9c-T35, 10-loc-7c-T32, 10-loc-7b-T32, 10-loc-9b-T34, 10-loc-9a-T34 that are within the extended geo-temporal range, at least one other new representation 1-ped-5-des-q5 of said person 1-ped-5; and improving again said new and improved model 4-model-22 by generating an even newer and even better model 4-model-23 (FIG. 13D), in which said generation of the even newer and even better model uses, as an input, the at least one other new representation detected 1-ped-5-des-q5, together with at least one of: (i) the additional representation and the presentation identified 1-ped-5-des-r1, 1-ped-5-des-p3, and (ii) the new and improved model 4-model-22.

One embodiment is a system operative to analyze past events using a set of imagery data collected and stored locally in a plurality of autonomous on-road vehicles, com-prising: a plurality of data interfaces 5-inter-i, 5-inter-j, 5-inter-k (FIG. 6E) located respectively onboard a plurality of autonomous on-road vehicles 10i (FIG. 6A), 10j (FIG. 6B), 10k (FIG. 6C) moving in a certain geographical area 1-GEO-AREA; a plurality of storage spaces 5-store-i, 5-store-j, 5-store-k (FIG. 6E) located respectively onboard said plurality of autonomous on-road vehicles 10i, 10j, 10k and associated respectively with said plurality of data interfaces 5-inter-i, 5-inter-j, 5-inter-k; and a server 95-server (FIG. 6F, FIG. 6G).

In one embodiment, each of the data interfaces 5-inter-i, 5-inter-j, 5-inter-k is configured to: (i) collect visual records of areas surrounding locations visited by the respective autonomous on-road vehicle (e.g., 4-visual-i1 and 4-visual-i3 collected by 10i, 4-visual-j2 and 4-visual-j4 collected by 10j, 4-visual-k3 and 4-visual-k5 collected by 10k), and (ii) store locally said visual records in the respective storage space (e.g., 4-visual-i1 and 4-visual-i3 stored in 5-store-i, 4-visual-j2 and 4-visual-j4 stored in 5-store-j, 4-visual-k3 and 4-visual-k5 stored in 5-store-k), thereby generating, by the system, an imagery database 4-visual-i1, 4-visual-i3, 4-visual-j2, 4-visual-j4, 4-visual-k3, 4-visual-k5 that is distributed among the plurality of autonomous on-road vehicles 10i, 10j, 10k; the server 95-server is configured to obtain a request to analyze a specific past event 1-event-4 (FIG. 6D, appears as 1-event-4-T7, 1-event-4-T8, 1-event-4-T13) associated with at least one particular location 10-L3, 10-L4 at a certain time in the past T7, T8; as a response to said request, the system is configured to identify, in the imagery database, several specific ones of the visual records that were collected respectively by several ones of the autonomous on-road vehicles, at times associated with the certain time in the past, while being in visual vicinity of said particular location, in which the several specific visual records identified contain, at least potentially, imagery data associated with said specific past event (e.g., the system identifies 4-visual-i1 as a visual record that was taken by 10i while in visual vicinity of 10-L3, in which the event 1-event-4 at time T7 appears in 4-visual-i1 perhaps as a pedestrian 1-ped-4, FIG. 6D. The system further identifies 4-visual-j4 as another visual record that was taken by 10j while in visual vicinity of 10-L4, in which the same event 1-event-4 at time T8 appears in 4-visual-j4 perhaps again as the same pedestrian 1-ped-4, FIG. 6D. which is now in location 10-L4); and the system is further configured to extract said several identified specific visual records 4-visual-i1, 4-visual-j4 from several of the respective storage spaces 5-store-i, 5-store-j in the several respective autonomous on-road vehicles 10i, 10j, and to make said several identified specific visual records available for processing, thereby facilitating said analysis of the specific past event 1-event-4.

In one embodiment, the server 95-server is further configured to: receive said several specific visual records 4-visual-i1, 4-visual-j4 (FIG. 6F); locate, in each of the several specific visual records 4-visual-i1, 4-visual-j4, at least one object 1-ped-4 associated with the specific past event 1-event-4, in which each of the several specific visual records contains imagery data associated with that object at a specific different point in time (e.g., 4-visual-i1 contains imagery data associated with 1-ped-4 at time T7, and 4-visual-j4 contains imagery data associated with 1-ped-4 at time T8); and process the imagery data of the object 1-ped-4 in conjunction with the several specific different points in time T7, T8, thereby gaining understanding of the object 1-ped-4 evolving over time and in conjunction with said specific past event 1-event-4. In one embodiment, during the course of said processing, the sever 95-server is further configured to detect movement of the object 1-ped-4 from said particular location 10-L3, 10-L4 to or toward a new location 10-L5 (FIG. 6D), or from a previous location to said particular location; and consequently; the system is configured to identify again, in the imagery database, several additional ones of the visual records 4-visul-k5 that were collected respectively by several additional ones of the autonomous on-road vehicles 10*k*, at several additional different points in time respectively T13, while being in visual vicinity of said new or previous location 10-L5, in which the several additional specific visual records 4-visul-k5 identified contain additional imagery data associated with said specific past event 1-event-4 (1-event-4-T13); and the system is further configured to extract said additional several identified specific visual records 4-visul-k5 from several of the additional respective storage spaces 5-store-k in the several additional respective autonomous on-road vehicles 10*k* (FIG. 6G), and to export again said several additional specific visual records, thereby facilitating further analysis and tracking of at least a path taken by the object 1-ped-4 in conjunction with the specific past event 1-event-4. In one embodiment, the specific past event 1-event-4 is associated with at least one of: (i) a past crime, in which the system is configured to track, back in time or forward in time relative to a reference point in time T7, T8, criminals or objects 1-ped-4 associated with said crime, (ii) a past social event such as people gathering or moving in a group, in which the system is configured to analyze social dynamics associated with people 1-ped-4 involved in the social event, (iii) a past commuting event, in which the system is configured to track, back in time or forward in time relative to a reference point in time T7, T8, commuters 1-ped-4 moving from home to work or vice versa, and thereby establishing an association between the commuters and a respective place of work, or a respective place of residence, and (iv) a past interaction between a pedestrian and a vehicle, such as a pedestrian entering a taxi or a pedestrian entering a parking car and driving away, in which the system is configured to track, back in time relative to a reference point in time T7, T8, pedestrians 1-ped-4 associated with said interaction, thereby training a machine learning model operative to predict such events in the future (e.g., predicting when a pedestrian is about to order or look for a taxi based on past behavior of pedestrians prior to actually entering a taxi).

In one embodiment, the system if configured to use the specific visual records extracted to analyze the specific past event, in which the specific past event 1-event-4 is associated with at least one of: (i) a past crime, in which the system is configured to track, back in time or forward in time relative to a reference point in time T7, T8, criminals or objects 1-ped-4 associated with said crime, (ii) a past social event such as people gathering or moving in a group, in which the system is configured to analyze social dynamics associated with people 1-ped-4 involved in the social event, (iii) a past commuting event, in which the system is configured to track, back in time or forward in time relative to a reference point in time T7, T8, commuters 1-ped-4 moving from home to work or vice versa, and thereby establishing an association between the commuters and a respective place of work, or a respective place of residence, (iv) a past interaction between objects such as a shopper entering a shop, a pedestrian entering a taxi, or pedestrians reading street ads, in which the system is configured to analyze said interaction and ascertain certain parameters such as an identity of the parties involved, or a duration of the interaction, or a nature of the interaction, (v) a past activity of a certain place or structure such as a shop or a working place, in which the system is configured to analyze said past activity and ascertain certain parameters such at time and level of activity, identities or types of associated people, and a nature of the past activity, (vi) a past traffic event such as a traffic congestion, accident, cars getting stuck, a road hazard evolving, or a traffic violation, in which the system is configured to track, back in time or forward in time relative to a reference point in time T7, T8, elements associated with the traffic event, in which the system is configured to analyze said traffic event and consequently establish a precise chain of events or an underlying cause of the traffic event, and (vii) a past interaction between a pedestrian and a vehicle, such as a pedestrian entering a taxi or a pedestrian entering a parking car and driving away, in which the system is configured to track, back in time relative to a reference point in time T7, T8, pedestrians 1-ped-4 associated with said interaction, thereby training a machine learning model operative to predict such events in the future (e.g., predicting when a pedestrian is about to order or look for a taxi based on past behavior of pedestrians prior to actually entering a taxi).

In one embodiment, said identification comprises: pointing-out, by the server 95-server, using a record (FIG. 6E) comprising locations visited by the autonomous on-road vehicles and times of visit, said several ones of the autonomous on-road vehicles 10*i*, 10*j* in possession of said several ones of the specific visual records 4-visual-i1, 4-visual-j4; and requesting, by the server 95-server, from each of said several autonomous on-road vehicles pointed-out 10*i*, 10*j*, to locate, in the respective storage space, the respective one of the specific visual records in conjunction with the particular location 10-L3, 10-L4 and the certain time.

In one embodiment, said identification comprises: each of the autonomous on-road vehicles 10*i*, 10*j*, 10*k* keeping a record (FIG. 6E) of locations 10-L3' (associated with 10-L3), 10-L4' (associated with 10-L3), 10-L5' (associated with 10-L5), visited by the autonomous on-road vehicle, in which each of the visual records is linked with a respective one of the locations visited and with a respective time of being captured; the server 95-server sending, to the plurality of autonomous on-road vehicles 10*i*, 10*j*, 10*k*, a request for visual records, in which said request includes the particular location 10-L3, 10-L4 and the certain time; and each of said plurality of autonomous on-road vehicles 10*i*, 10*j*, 10*k*: (i) receiving said request for visual records, (ii) locating, if relevant to the autonomous on-road vehicle, at least a specific one of the visual records associated with said particular location and certain time requested, and (iii) replying by sending the specific visual records located (e.g., 10*i* sends 4-visual-i1, and 10*j* sends 4-visual-j4).

One embodiment is a system operative to analyze past events by identifying and delivering specific imagery data that was collected and stored locally by a plurality of autonomous on-road vehicles, comprising a plurality of data interfaces 5-inter-a, 5-inter-b, 5-inter-c, 5-inter-d, 5-inter-e, 5-inter-f (FIG. 1E) located respectively onboard a plurality of autonomous on-road vehicles 10*a*, 10*b*, 10*c*, 10*d*, 10*e*, 10*f* (FIG. 1D) moving in a certain geographical area 1-GEO-AREA, in which each of the data interfaces is configured to collect and store visual records such as 4-visual-a1, 4-visual-a2, 4-visual-a3, 4-visual-b1, 4-visual-c9, 4-visual-d2, 4-visual-e2, 4-visual-f1 (FIG. 1E) of areas 20-area-1, 20-area-2, 20-area-3, 20-area-4 (FIG. 1D) surrounding locations 10-loc-1, 10-loc-2, 10-loc-3, 10-loc-4, 10-loc-5 (FIG. 1D) visited by the respective autonomous on-road vehicle; and a server 99-server (FIG. 1F), 99-server' (FIG. 1J).

In one embodiment, the server 99-server (FIG. 1F), 99-server' (FIG. 1J) is configured to acquire a request to obtain visual records of a particular location of interest 10-L1 (FIG. 1D) within said certain geographical area 1-GEO-AREA, in which said particular location of interest is associated with a specific past event to be analyzed; as a response to said request, the system is configured to identify at least a specific one of the visual records 4-visual-a2, 4-visual-b1, 4-visual-c9 (FIG. 1E) that was collected by at least one of the autonomous on-road vehicles 10a, 10b, 10c while being in visual vicinity 10-loc-2 of said particular location of interest 10-L1, in which said specific visual records identified 4-visual-a2, 4-visual-b1, 4-visual-c9 at least potentially contain imagery data associated with the specific past event to be analyzed; and the system is further configured to deliver said specific visual records identified 4-visual-a2, 4-visual-b1, 4-visual-c9 (FIG. 1E) from the respective autonomous on-road vehicles 10a, 10b, 10c to the server 99-server (FIG. 1F), 99-server' (FIG. 1J).

In one embodiment, each of the autonomous on-road vehicles 10a, 10b, 10c, 10d, 10e, 10f is operative to send to the server 99-server (FIG. 1F) a record 1-rec-a, 1-rec-b, 1-rec-c, 1-rec-d, 1-rec-e, 1-rec-f (FIG. 1F) of said locations visited 10-loc-1, 10-loc-2, 10-loc-3, 10-loc-4, 10-loc-5 by the autonomous on-road vehicle, in which each of the visual records 4-visual-a1, 4-visual-a2, 4-visual-a3, 4-visual-b1, 4-visual-c9, 4-visual-d2, 4-visual-e2, 4-visual-f1 is linked (FIG. 1E) with a respective one of the locations visited 10-loc-1, 10-loc-2, 10-loc-3, 10-loc-4, 10-loc-5; the server 99-server (FIG. 1F) is further configured to point-out, using the records of locations 1-rec-a, 1-rec-b, 1-rec-c, 1-rec-d, 1-rec-e, 1-rec-f (FIG. 1F) received from the plurality of autonomous on-road vehicles 10a, 10b, 10c, 10d, 10e, 10f, at least one of the plurality of autonomous on-road vehicles 10a, 10b, 10c that was in visual vicinity (e.g., 10-loc-2) of said particular location of interest 10-L1; the server 99-server (FIG. 1F) is further configured to send a request for visual records to said at least one autonomous on-road vehicle pointed-out 10a, 10b, 10c, in which said request includes the particular location of interest 10-L1 or one of the locations 10-loc-2' (acting as a pointer) appearing in the records that is in visual vicinity of the particular location of interest 10-L1; and the at least one autonomous on-road vehicle pointed-out 10a, 10b, 10c is configured to: (i) receive said request for visual records, (ii) locate, using said link between the visual records and locations visited, at least a specific one of the visual records associated with said particular location of interest requested (e.g., 10a locates using the pointer 10-loc-2' the visual record 4-visual-a2, 10b locates using the pointer 10-loc-2' the visual record 4-visual-b1, and 10c locates using the pointer 10-loc-2' the visual record 4-visual-c9), and (iii) reply by said delivering of the specific visual records associated with said particular location of interest, thereby achieving said identification and delivery of the specific visual records (e.g., 10a sends 4-visual-a2 to 99-server, 10b sends 4-visual-b1 to 99-server, and 10c sends record 4-visual-c9 to 99-server, FIG. 1F).

In one embodiment, each of the autonomous on-road vehicles 10a, 10b, 10c, 10d, 10e, 10f is operative to keep a record of said locations 10-loc-1, 10-loc-2, 10-loc-3, 10-loc-4, 10-loc-5 visited by the autonomous on-road vehicle, in which each of the visual records is linked with a respective one of the locations visited (e.g., 4-visual-a2 is linked with geospatial coordinate 10-loc-2' associated with location 10-loc-2 visited by autonomous on-road vehicle 10a—FIG. 1E); the server 99-server' (FIG. 1J) is further configured to send, to the plurality of autonomous on-road vehicles 10a,

10b, 10c, 10d, 10e, 10f, a request for visual records, in which said request includes the particular location of interest 10-L1; and each of said plurality of autonomous on-road vehicles 10a, 10b, 10c, 10d, 10e, 10f is configured to: (i) receive said request for visual records, (ii) locate, if relevant to the autonomous on-road vehicle, using said link between the visual records and locations visited, at least a specific one of the visual records associated with said particular location of interest requested (e.g., 10a locates using the pointer 10-loc-2' the visual record 4-visual-a2, 10b locates using the pointer 10-loc-2' the visual record 4-visual-b1, and 10c locates using the pointer 10-loc-2' the visual record 4-visual-c9—FIG. 1E), and (iii) reply by sending the specific visual records located (e.g., 10a sends 4-visual-a2 to 99-server', 10b sends 4-visual-b1 to 99-server', and 10c sends record 4-visual-c9 to 99-server', FIG. 1J), thereby achieving said identification and delivery of the specific visual records.

In one embodiment, the system further comprises, per each of the autonomous on-road vehicles 10a, 10b, 10c, 10d, 10e, 10f: image sensors onboard the autonomous on-road vehicle and associated with the respective data interface onboard (e.g., image sensors 4-cam-a, 4-cam-b, 4-cam-c, 4-cam-d, 4-cam-e, 4-cam-f, FIG. 1E, onboard 10a, 10b, 10c, 10d, 10e, 10f respectively, and associated respectively with data interfaces 5-inter-a, 5-inter-b, 5-inter-c, 5-inter-d, 5-inter-e, 5-inter-f, (FIG. 1E); a global-navigation-satellite-system (GNSS) receiver, such as a GPS receiver, onboard the autonomous on-road vehicle and associated with the respective data interface onboard (e.g., GNSS receivers 5-GNSS-a, 5-GNSS-b, 5-GNSS-c, 5-GNSS-d, 5-GNSS-e, 5-GNSS-f, FIG. 1E, onboard 10a, 10b, 10c, 10d, 10e, 10f respectively, and associated respectively with data interfaces 5-inter-a, 5-inter-b, 5-inter-c, 5-inter-d, 5-inter-e, 5-inter-f, (FIG. 1E); and a storage space onboard the autonomous on-road vehicle and associated with the respective data interface onboard (e.g., storage space 5-store-a, 5-store-b, 5-store-c, 5-store-d, 5-store-e, 5-store-f, FIG. 1E, onboard 10a, 10b, 10c, 10d, 10e, 10f respectively, and associated respectively with data interfaces 5-inter-a, 5-inter-b, 5-inter-c, 5-inter-d, 5-inter-e, 5-inter-f, (FIG. 1E), wherein, per each of the autonomous on-road vehicle 10a, 10b, 10c, 10d, 10e, 10f, the respective data interface onboard 5-inter-a, 5-inter-b, 5-inter-c, 5-inter-d, 5-inter-e, 5-inter-f is configured to: perform said collection of the visual records (e.g., 4-visual-a2 collected by 10a), using the respective image sensors onboard (e.g., using 4-cam-a by 10a); and perform said storage, in conjunction with the respective storage space onboard, of each of the visual records collected together with storing the geospatial information regarding the location visited at the time said visual record was collected (e.g., storing 4-visual-a2 together with geospatial information 10-loc-2' in 5-store-a by 10a), thereby creating a link between the visual records and the locations visited, in which said geospatial information is facilitated by the respective GNSS receiver onboard (e.g., a link is created between 4-visual-a2 and 10-loc-2' in 5-store-a, in which 10-loc-2' was determined using 5-GNSS-a at the time of 10a collecting 4-visual-a2); and wherein, per at least each of some of the autonomous on-road vehicle (e.g., per 10a), the respective data interface onboard (e.g., 5-inter-a) is configured to: receive, from the server 99-server (FIG. 1F), 99-server' (FIG. 1J), a request for visual records, in which said request includes a particular location of interest 10-L1 or a location 10-loc-2' associated with said particular location of interest; locate, as a response to said request, in the respective storage space onboard 5-store-a, using said link between the visual records and locations visited, at least said specific one of the visual records 4-visual-a2 associated with said particular location of interest requested, thereby facilitating said identification; and perform said delivery, to the server 99-server (FIG. 1F), 99-server' (FIG. 1J), of the specific visual records located 4-visual-a2.

In one embodiment, per each of the data interfaces 5-inter-a, 5-inter-b, 5-inter-c, 5-inter-d, 5-inter-e, 5-inter-f: the respective visual records (e.g., 4-visual-a1, 4-visual-a2, 4-visual-a3 per 5-inter-a), collected in the respective autonomous on-road vehicle 10a, are stored in a respective storage space onboard the respective autonomous on-road vehicle (e.g., storage space 5-store-a onboard 10a); said respective visual records 4-visual-a1, 4-visual-a2, 4-visual-a3 comprise a very large number of visual records associated respectively with very large number of locations 10-loc-1, 10-loc-2, 10-loc-3 visited by the respective autonomous on-road vehicle 10a, and therefore said respective visual records occupy a very large size in the respective storage space 5-store-a; said delivery, of the specific visual records identified 4-visual-a2, from the respective autonomous on-road vehicles 10a to the server 99-server (FIG. 1F), 99-server' (FIG. 1J), is done by the data interface 5-inter-a using a respective communication link 5-comm-a onboard the respective autonomous on-road vehicle 10a; and said respective communication link 5-comm-a is: (i) too limited to allow a delivery of all of the respective very large number of visual records 4-visual-a1, 4-visual-a2, 4-visual-a3 to the server 99-server (FIG. 1F), 99-server' (FIG. 1J), but (ii) sufficient to allow said delivery of only the specific visual records identified 4-visual-a2. In one embodiment, said very large number of visual records 4-visual-a1, 4-visual-a2, 4-visual-a3 and respective locations visited loc-1, 10-loc-2, 10-loc-3 is above 100,000 (one hundred thousand) visual records and respective locations per each day of said moving; the size of an average visual record is above 2 megabytes (two million bytes); said very large size is above 200 gigabytes (two hundred billion bytes) per each day of said moving; and said respective communication link 5-comm-a is: (i) not allowed or is unable to exceed 2 gigabytes (two billion bytes) of data transfer per each day, and is therefore (ii) too limited to allow said delivery of all of the respective very large number of visual records 4-visual-a1, 4-visual-a2, 4-visual-a3 to the server, but (iii) capable enough to allow said delivery of only the specific visual records identified 4-visual-a2.

In one embodiment, said locations 10-loc-1, 10-loc-2, 10-loc-3, 10-loc-4, 10-loc-5 visited by each of the autonomous on-road vehicles 10a, 10b, 10c, 10d, 10e, 10f are simply the locations though which the autonomous on-road vehicle passes while moving, thereby resulting in a continuous-like visual recording of all of the areas 20-area-1, 20-area-2, 20-area-3, 20-area-4 surrounding the autonomous on-road vehicle while moving.

In one embodiment, said request further includes a certain time of interest associated with said particular location of interest 10-L1 and associated with said certain past event to be analyzed, in which said specific visual records identified 4-visual-a2 are not only associated with said particular location of interest requested 10-L1, but are also associated with said specific time of interest.

In one embodiment, said identification comprises the identification of at least a first specific one 4-visual-a2 (FIG. 1E) and a second specific 4-visual-b1 (FIG. 1E) one of the visual records that were collected respectively by at least a first one 10a and a second one 10b of the autonomous on-road vehicles while being in visual vicinity of said particular location of interest 10-L1; said delivery of the specific visual records identified comprises: the delivery, from the first autonomous on-road vehicle 10a to the server 99-server (FIG. 1F), 99-server' (FIG. 1J), of said first specific visual record identified 4-visual-a2; and said delivery of the specific visual records identified further comprises: the delivery, from the second autonomous on-road vehicle 10b to the server 99-server (FIG. 1F), 99-server' (FIG. 1J), of said second specific visual record identified 4-visual-b1. In one embodiment, the server 99-server (FIG. 1F), 99-server' (FIG. 1J) is further configured to: receive at least said first specific visual record 4-visual-a2 and said second specific visual record 4-visual-b1; and use said first specific visual record 4-visual-a2 and said second specific visual record 4-visual-b1 to achieve said analysis of the specific past event. In one embodiment, said analysis comprises: detecting movement of a certain object (such as a pedestrian 1-ped-2) associated with the specific past event and appearing in both the first and second specific visual records 4-visual-a2, 4-visual-b1, and therefore tracking said certain object in conjunction with the specific past event. In one embodiment, said analysis comprises: surveying a past activity of a certain place or structure 1-object-2 such as a shop or a working place, in which the system is configured to analyze said past activity and ascertain certain parameters such at time and level of activity (e.g., number of people 1-ped-2 entering and leaving the structure 1-object-2), identities or types of associated people, and a nature of the past activity, in which the specific past event is said past activity in conjunction with the certain place or structure and during a certain past period.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/ cases will sometimes be described in singular form for clarity. However, some embodiments/cases may include multiple iterations of a method or multiple instantiations of a mechanism unless noted otherwise. For example, when a controller or an interface are disclosed in an embodiment/ case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/ case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

We claim:

1. A system operative to utilize a plurality of on-road vehicles for increasing descriptive accuracy of areas and/or objects, comprising:

a plurality of data interfaces located respectively onboard a plurality of on-road vehicles moving in a certain geographical area;

a plurality of data gathering configurations located respectively onboard said plurality of on-road vehicles and associated respectively with said plurality of data interfaces; and a server;

wherein:

each of the data interfaces is configured to: (i) use the respective data gathering configuration to create a representation of areas and/or objects surrounding locations visited by the respective on-road vehicle, in which said representation comprises an inherent inaccuracy, and (ii) send said representation to the sever;

the server is configured to receive said plurality of representations respectively from the plurality of on-road vehicles, in which the plurality of representations comprises respectively the plurality of inherent inaccuracies; and the server is further configured to correlate, in a post-capture analysis, from the plurality of representations received from the plurality of on-road vehicles, at least two representations of a same area and/or object, wherein said at least two representations were captured by different ones of said plurality of on-road vehicles at different times; and process said correlated at least two representations into a fused representation using at least one data combining technique, in which said fused representation comprises a better descriptive accuracy.

2. The system of claim 1, wherein the plurality of data gathering configurations are a plurality of lidar (light-imaging-detection-and-ranging) sensors.

3. The system of claim 2, wherein said inherent inaccuracy is associated with an inherent inaccuracy of a laser beam angle and/or timing in the lidar sensor.

4. The system of claim 2, wherein said inherent inaccuracy is associated with an inherent inaccuracy in determining the exact geo-spatial position of the lidar sensor.

5. The system of claim 2, wherein said inherent inaccuracy is associated with movement of the on-road vehicle while creating said representation.

6. The system of claim 2, wherein said inherent inaccuracy is associated with a failure to capture sufficient information related to the object in conjunction with image capturing performed by only one of the on-road vehicles.

7. The system of claim 1, wherein the plurality of data gathering configurations are a plurality of multi-camera vision configurations.

8. The system of claim 1, wherein the representations comprises representation of static objects in said areas.

9. The system of claim 8, wherein the static objects are associated with at least one of: (i) buildings, (ii) traffic signs, (iii) roads, (iv) trees, and (v) road hazards such as pits.

10. The system of claim 1, wherein said data combining technique is associated with at least one of: (i) statistical averaging, (ii) inverse convolution, (iii) least-mean-squares (LMS) algorithms, (iv) monte-carlo methods, and (v) application of machine learning models.

11. The system of claim 1, wherein said inherent inaccuracy is manifested as a reduced resolution of the representation.

12. The system of claim 1, wherein said inherent inaccuracy is manifested as a reduced accuracy in geo-spatial positioning of elements in the representation.

13. The system of claim 1, wherein said inherent inaccuracy is manifested as a reduced machine-learning model complexity associated with the representation.

14. A method for utilizing a plurality of on-road vehicles for increasing descriptive accuracy of areas and/or objects, comprising:

in a post-capture analysis, receiving, in a server, a plurality of descriptions respectively from a plurality of on-road vehicles moving in visual vicinity of said particular area and/or an object, in which each of the descriptions having an inherent descriptive inaccuracy;

correlating, by the server, at least two of the received descriptions of a same area and/or object, wherein said at least two descriptions were captured by different ones of said plurality of on-road vehicles at different times; and processing, in the server, said correlated descriptions, into a fused description, using at least one data combining techniques, in which said fused description has a better descriptive accuracy.

* * * * *